US010187337B2

(12) United States Patent
Smullen et al.

(10) Patent No.: US 10,187,337 B2
(45) Date of Patent: *Jan. 22, 2019

(54) SYSTEMS AND METHODS FOR INVOKING CHATBOTS IN A CHANNEL BASED COMMUNICATION SYSTEM

(71) Applicant: Pypestream Inc., New York, NY (US)

(72) Inventors: Richard Smullen, New York, NY (US); Joerg Habermeier, San Francisco, CA (US); Soren Larson, New York, NY (US)

(73) Assignee: Pypestream Inc., New York, NY (US)

(*) Notice: Subject to any disclaimer, the term of this patent is extended or adjusted under 35 U.S.C. 154(b) by 119 days.

This patent is subject to a terminal disclaimer.

(21) Appl. No.: 15/452,486

(22) Filed: Mar. 7, 2017

(65) Prior Publication Data
US 2017/0180284 A1 Jun. 22, 2017

Related U.S. Application Data

(63) Continuation-in-part of application No. 15/294,368, filed on Oct. 14, 2016, now Pat. No. 9,647,968, and
(Continued)

(51) Int. Cl.
*G06F 15/16* (2006.01)
*H04L 12/58* (2006.01)
(Continued)

(52) U.S. Cl.
CPC .......... *H04L 51/046* (2013.01); *H04L 12/185* (2013.01); *H04L 51/02* (2013.01);
(Continued)

(58) Field of Classification Search
CPC ..... H04L 67/306; H04L 67/18; H04L 67/303; H04L 51/32; H04L 51/14; H04L 51/36;
(Continued)

(56) References Cited

U.S. PATENT DOCUMENTS 6,044,142 A 3/2000 Hammarstrom et al.
8,122,084 B2* 2/2012 Beringer ................ G06Q 10/10
709/204
(Continued)

FOREIGN PATENT DOCUMENTS

CA 2 884 775 A1 3/2013

OTHER PUBLICATIONS

International Search Report for International Patent Application No. PCT/US2016/024373, dated Jul. 12, 2016, 15 pages.

*Primary Examiner* — Ruolei Zong
(74) *Attorney, Agent, or Firm* — Morgan, Lewis & Bockius LLP

(57) ABSTRACT

The disclosed systems and methods join a user to a subchannel within a primary communication channel. A message from the user comprises a user identifier and a text communication. The communication is compared to each tag in each set of tags in a plurality of sets of tags, each set of tags being uniquely associated with (i) a different chatbot in one or more chatbots associated with the sub-channel or (ii) a different node within a plurality of nodes in a chatbot. The communication is routed to a first chatbot in the one or more chatbots, or a first node within the first chatbot, on the basis of being associated with a tag that best matches the communication. A responsive message by the first chatbot within the sub-channel includes the user identifier, thereby facilitating a conversation between the user and an enterprise data source associated with the sub-channel.

48 Claims, 43 Drawing Sheets

Related U.S. Application Data a continuation-in-part of application No. 15/269,697, filed on Sep. 19, 2016, now Pat. No. 9,641,470, which is a continuation of application No. 15/081,766, filed on Mar. 25, 2016, now Pat. No. 9,450,901.

(60) Provisional application No. 62/407,873, filed on Oct. 13, 2016, provisional application No. 62/265,988, filed on Dec. 11, 2015, provisional application No. 62/264,850, filed on Dec. 8, 2015, provisional application No. 62/137,843, filed on Mar. 25, 2015.

(51) Int. Cl.
  *H04L 29/08* (2006.01)
  *H04L 12/18* (2006.01)
  *H04L 29/06* (2006.01)

(52) U.S. Cl.
  CPC ............ *H04L 63/18* (2013.01); *H04L 67/02* (2013.01); *H04L 67/306* (2013.01); *H04L 67/322* (2013.01); *H04L 69/14* (2013.01); *H04L 67/42* (2013.01); *Y02D 50/30* (2018.01)

(58) Field of Classification Search
  CPC ............ H04L 12/1859; H04L 12/5855; H04L 63/104; G06F 17/30867
  USPC ........................................................ 709/206
  See application file for complete search history.

(56) References Cited

U.S. PATENT DOCUMENTS

| | | | |
|---|---|---|---|
| 8,677,451 | B1 | 3/2014 | Bhimaraju et al. |
| 9,240,970 | B2* | 1/2016 | Holzman .............. H04L 51/066 |
| 2003/0023691 | A1* | 1/2003 | Knauerhase ............ H04L 51/04 |
| | | | 709/206 |
| 2003/0028451 | A1 | 2/2003 | Ananian |
| 2003/0055907 | A1 | 3/2003 | Stiers |
| 2005/0080862 | A1* | 4/2005 | Kent, Jr. .............. G06Q 10/107 |
| | | | 709/206 |
| 2005/0102401 | A1 | 5/2005 | Patrick et al. |
| 2006/0036671 | A1 | 2/2006 | Rhim et al. |
| 2006/0036679 | A1 | 2/2006 | Goodman et al. |
| 2007/0192414 | A1* | 8/2007 | Chen ....................... H04L 29/04 |
| | | | 709/205 |
| 2007/0206086 | A1 | 9/2007 | Baron et al. |
| 2008/0104244 | A1 | 5/2008 | Chen et al. |
| 2010/0064015 | A1 | 3/2010 | Sacks et al. |
| 2012/0089698 | A1* | 4/2012 | Tseng ................... G06Q 10/101 |
| | | | 709/217 |
| 2013/0191481 | A1* | 7/2013 | Prevost ............... H04L 12/1859 |
| | | | 709/206 |
| 2014/0280936 | A1 | 9/2014 | Nandagopal et al. |
| 2015/0310446 | A1* | 10/2015 | Tuchman ............. G06Q 30/016 |
| | | | 705/304 |

* cited by examiner

Generate, for each respective primary communication channel in at least a subset of the plurality of primary communication channels of a first user in the plurality of users, a corresponding plurality of sub-channels based upon the user profile information for the first user automatically without human intervention, each said plurality of sub-channels forming a corresponding hierarchical tree in which the corresponding primary communication channel is a root node and the plurality of sub-channels are child nodes. At least one sub-channel in each said corresponding hierarchy of sub-channels enables a secure bidirectional conversation between (i) a remote user device associated with the first user and (ii) the enterprise data source associated with the primary communication channel of the corresponding hierarchical tree, thereby facilitating secure exchange of a plurality of messages between the corresponding enterprise data source and the remote user device associated with the first user within the at least one sub-channel.

The unique identifier of the first user is a contact number of the user.

A depth of a hierarchical tree associated with a primary communication channel in the plurality of primary communication channels is N, where N is a positive integer greater than one (e.g., N is 2, 3, 4, or greater than 4).

A first sub-channel in a corresponding hierarchy of sub-channels hosts a first secure bidirectional conversation between the first user and the corresponding enterprise data source. The first sub-channel is associated with a sub-channel identifier. The first conversation is associated with an application programming interface key. A message in the plurality of messages is sent in the first conversation when the first user or the enterprise data source sending the respective message includes the sub-channel identifier, the application programming interface key, and an access token for the conversation.

A first sub-channel in the corresponding plurality of sub-channels associated with a respective primary communication channel in the plurality of primary communication channels makes use of a first electronic data source associated with the corresponding enterprise data source. A second sub-channel in the corresponding plurality of sub-channels associated with the respective primary communication channel makes use of a second electronic data source associated with the corresponding enterprise data source. The first electronic data source is other than the second electronic data source.

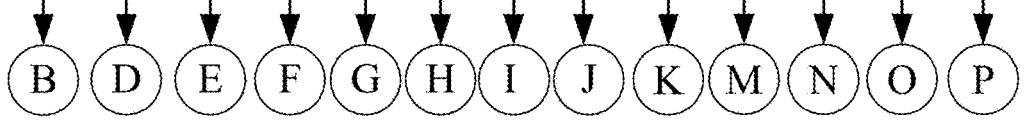

Fig. 5B

CONDITIONAL INVOCATION OF HUMAN SUPPORT

512 (cont)

A first sub-channel in the corresponding plurality of sub-channels associated with a respective primary communication channel in the plurality of primary communication channels hosts a first conversation between the corresponding enterprise data source and the first user. The first conversation has a first human intervention status. When the first human intervention status is deemed automated, messages in the first conversation from the remote user device associated with the first user are processed by a first automated human interface module. When the first human intervention status is deemed non-automated, messages in the first conversation from the remote user device associated with the first user are placed in a queue for processing by a human associated with the corresponding enterprise data source of the first sub-channel. — 522

— 524

When the first human intervention status is deemed to be automated, the method further comprises applying messages on the first sub-channel from the remote user device associated with the first user to a trained classifier associated with the first sub-channel thereby obtaining a classifier result. When the classifier result falls into a predetermined category, the first human intervention status is changed from automated to non-automated until a predetermined event occurs. — 526

The predetermined event is a break in communications in the first conversation, the elapsing of a predetermined amount of time, or a manual switch of the first human intervention status from non-automated to automated by a human operator associated with the corresponding enterprise data source. — 528

The classifier produces a binomial classification and the predetermined category is one of the two outputs of the classifier. — 530

The classifier is a decision tree, a random forest, a Bayesian network, a support vector machine, a neural network or logistic regression. — 532

The classifier is trained across a plurality of sub-channels using feedback data provided by the plurality of users regarding a plurality of their interactions with the server system using the sub-channels. — 534

The plurality of interactions include electronic payment processing, customer sign-up, and customer service by the plurality of users using the sub-channels provided by the server system.

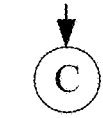

Fig. 5C

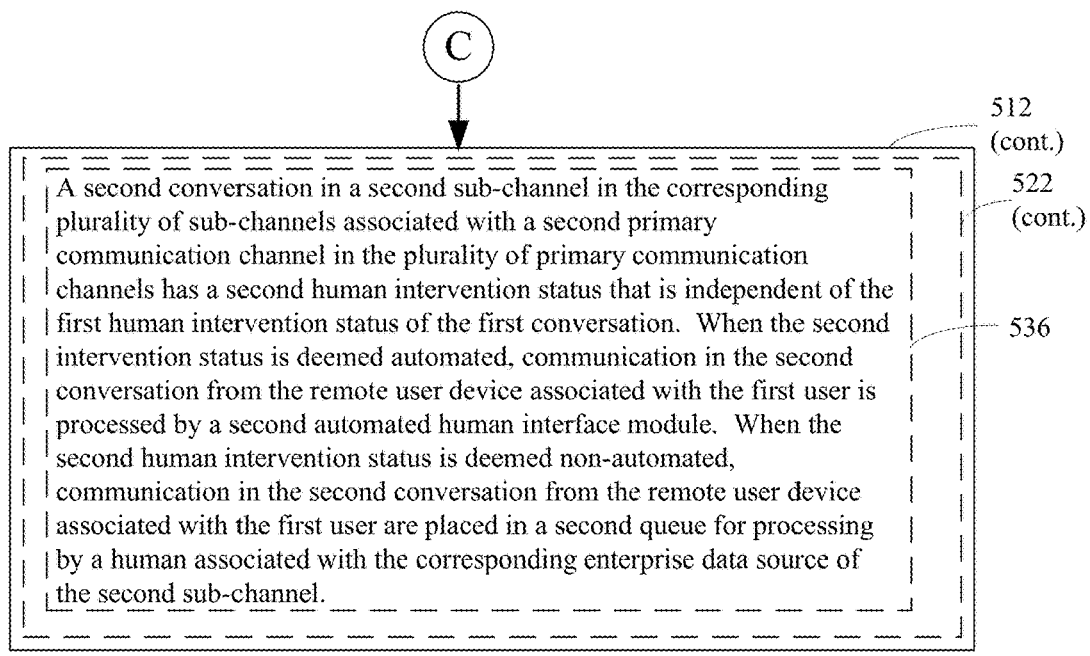
ACCESS TO ENTERPRISE DATA SOURCE INFORMATION
THROUGH AN APPLICATION PROGRAMMING INTERFACE
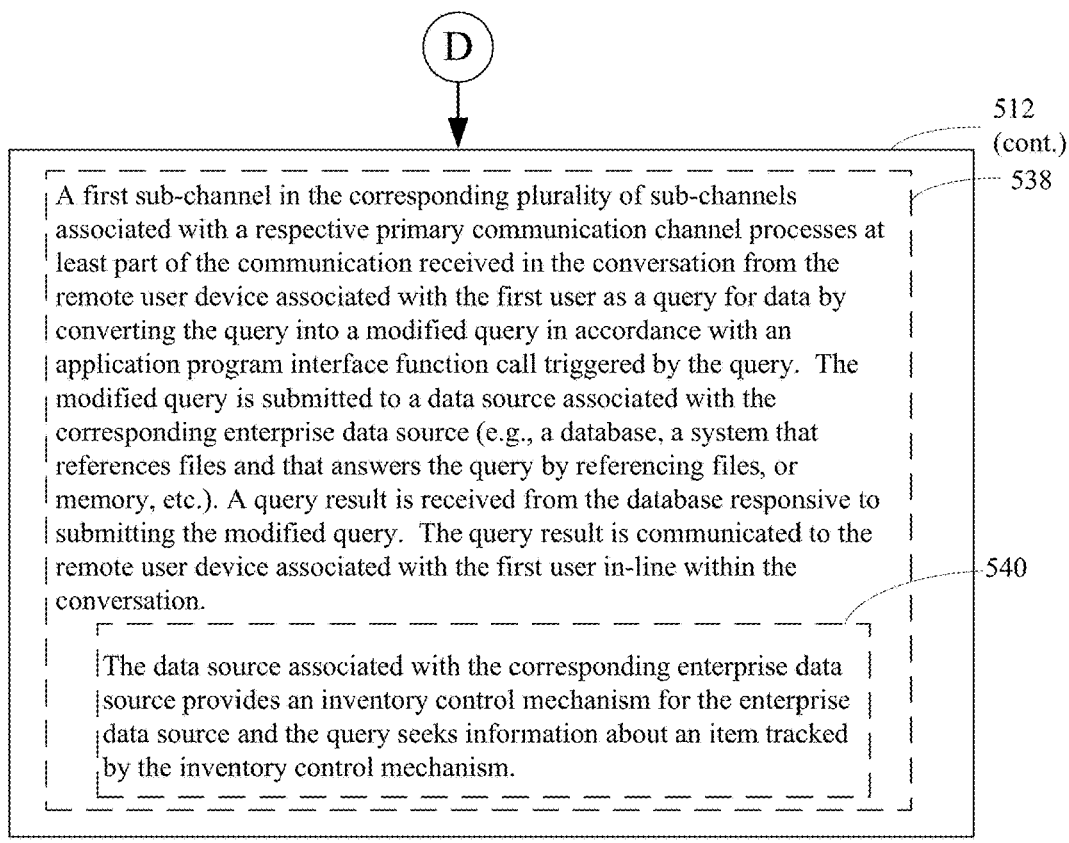
Fig. 5D

FILE CABINET ASSOCIATED WITH CHANNELS THAT IS AUTOMATICALLY POPULATED WITH CHANNEL ATTACHMENTS

MARKETING APPLICATION PROGRAMMING INTERFACE

A first sub-channel in the corresponding plurality of sub-channels associated with a respective primary communication channel processes at least part of the communication from the corresponding enterprise data source that is bound for the remote user device associated with the first user by receiving an original message from the corresponding enterprise data source in accordance with a message campaign sponsored by the enterprise data source responsive to receiving the original message. Then, automatically and without human intervention, an application programming interface function is invoked for the message campaign. This passes information in the original message to the application programming interface function and generates an applet that is communicated within the first sub-channel to the remote user device associated with the first user. Then monitoring is set up to monitor, through communications received from the remotely installed applet within the first sub-channel, responses to the messaging campaign.

Invoking the application programming interface function makes use of a value of a demographic characteristic (e.g., age, a location, a level of participation a customer rewards program, a length of time enrolled in a customer rewards program, a number of purchases the user has made with the enterprise data source, a total of amount of purchases the first user has made with the enterprise data source during a predetermined time frame, the last time the first user has made with the enterprise data source, a type of item the first user has purchased from the enterprise data source, or a sex of the first user)in the user profile corresponding to the first user to determine which information in the message to pass to the application programming interface function.

512 (cont)
592
594

SECURITY, NON-REPUDIATION

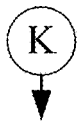

A conversation in a first sub-channel in the plurality of sub-channels associated with a respective primary communication channel is associated with the unique identifier corresponding to the first user. The unique identifier is used as a basis for non-repudiation of the conversation.

The conversation is used to conduct a purchase or other form of transaction by the first user from the corresponding enterprise data source associated with the first sub-channel.

APPLICATIONS RUNNING IN CLOUD AND USING DISCLOSED SYSTEMS TO COMMUNICATE WITH END USER (cont.)
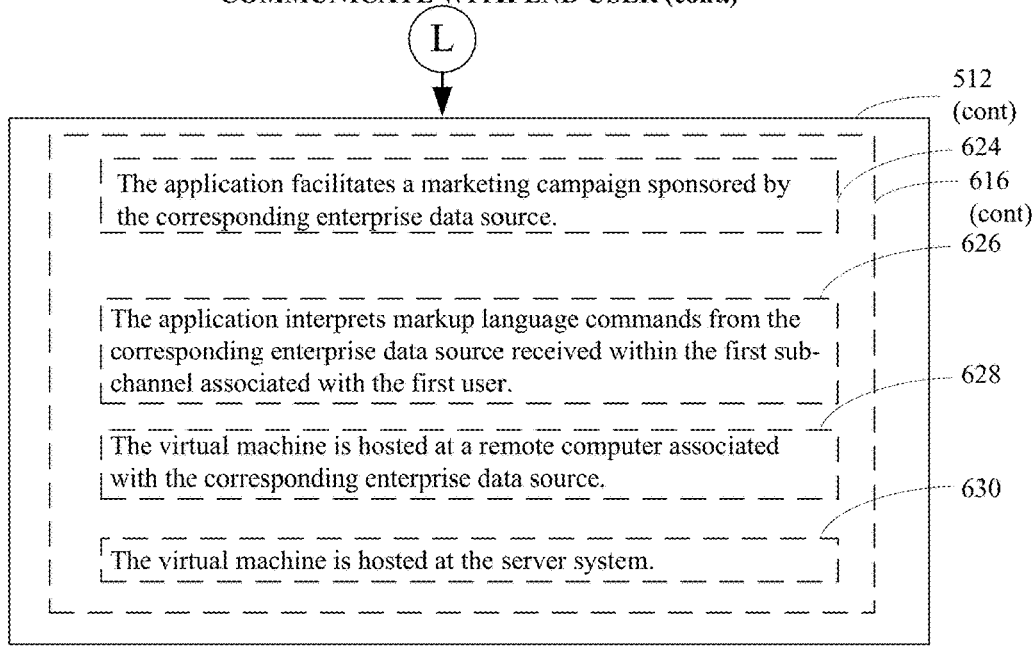
SECURE ENROLLMENT OF ENTERPRISE DATA SOURCES
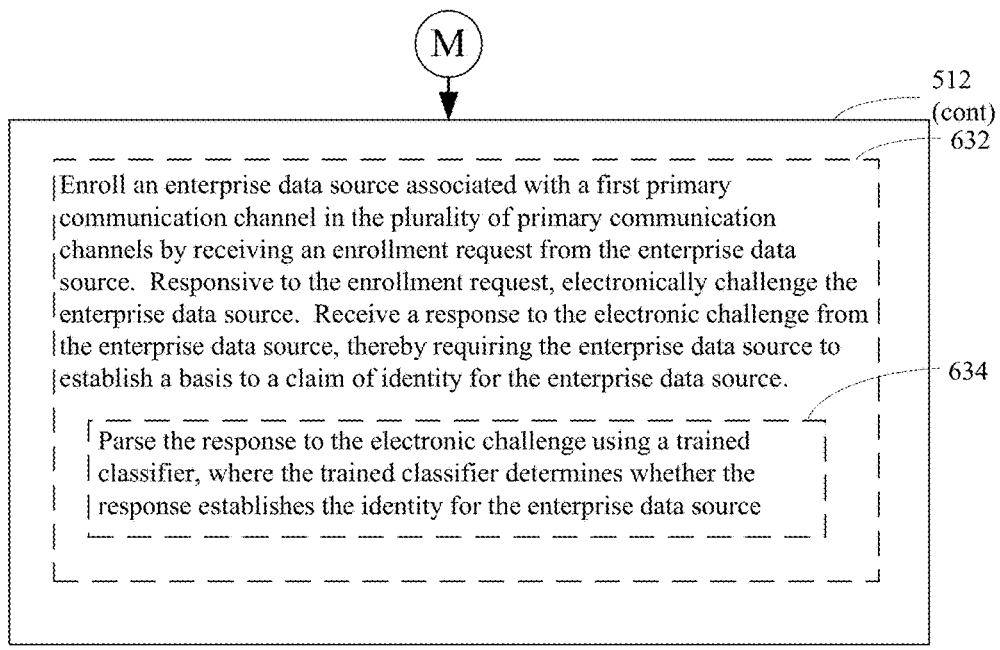
Fig. 5M

ADVANTAGES OF SUB-CHANNELS AS A REPLACEMENT TO CONVENTIONAL USER INSTALLED APPLICATIONS

NATURAL LANGUAGE PROCESSING OF CUSTOMER QUERIES WHILE VIEWING CATALOGS

Communicate a catalog from the enterprise data source to the remote user device associated with the first user within a first sub-channel in the corresponding plurality of sub-channels associated with a respective primary communication channel in the plurality of primary communication channels. Receive a response from the first user regarding the catalog within the first sub-channel. Process the catalog selection using an automated human interface module employing a trained classifier, thereby generating a reply to the catalog selection. Determine whether the reply is deemed to be satisfactory. When the reply is deemed to be satisfactory, communicate the reply to the remote device associated with the first user within the first sub-channel. When the reply is deemed to not be satisfactory, switch communication on the first sub-channel from the remote user device associated with the first user to a human associate with the corresponding enterprise data source of the first sub-channel.

The trained classifier makes the determination as to whether the reply is deemed to be satisfactory.

The automated human interface module employing the trained classifier is not associated with the enterprise data source.

Receive a query from a remote user device associated with a first user within a first sub-channel in the corresponding plurality of sub-channels associated with a respective primary communication channel in the plurality of primary communication channels. Process the query using an automated human interface module employing a trained classifier, thereby generating a reply to the query. Determine whether the reply is deemed to be satisfactory. When the reply is deemed to be satisfactory, communicate the reply to the remote device associated with the first user within the first sub-channel. When the reply is deemed to not be satisfactory, switch communication on the first sub-channel from the remote user device associated with the first user to a human associate with the corresponding enterprise data source of the first sub-channel.

The trained classifier makes the determination as to whether the reply is deemed to be satisfactory.

The automated human interface module employing the trained classifier is not associated with the enterprise data source.

Fig. 5O

NATURAL LANGUAGE PROCESSING OF CUSTOMER QUERIES WHILE VIEWING CATALOGS (cont.)

Receive a query from a remote user device associated with a first user within a first sub-channel in the corresponding plurality of sub-channels associated with a respective primary communication channel in the plurality of primary communication channels. Process the query using an automated human interface module employing a trained classifier, thereby generating a reply to the query. Communicate the reply to the remote device associated with the first user within the first sub-channel. Determine whether the reply is deemed to be satisfactory. When the reply is deemed to not be satisfactory, switch communication on the first sub-channel from the remote user device associated with the first user to a human associate with the corresponding enterprise data source of the first sub-channel.

The determination as to whether the reply is deemed to be satisfactory is based, at least in part, on further communication received from the first user within the first sub-channel.

The automated human interface module employing the trained classifier is not associated with the enterprise data source.

GEOGRAPHICALLY DEPENDENT MESSAGING

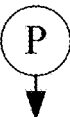

Receive a location of the remote user device associated with the first user within a first sub-channel in the corresponding plurality of sub-channels associated with a respective primary communication channel in the plurality of primary communication channels. Determine whether the location is within a geographical zone in a plurality of geographical zones. When the location is within a geographical zone in the geographical plurality of zones, communicate information from the enterprise data source to the remote user device associated with the first user within the first sub-channel based, at least in part, on the location. When the location is not within a geographical zone in the geographical plurality of zones, communicate no information from the enterprise data source to the remote user device associated with the first user within the first sub-channel.

```
{
  "$schema": "http://json-schema.org/draft-04/schema#",
  "type": "object",
  "properties": {
374  "business_id": {
       "type": "string",
       "description": "Unique identifier representing a specific consumer."
     },
376  "name": {
       "type": "string",
       "description": "Business' name"
     },
378  "super_admin_id": {
       "type": "string",
       "description": "Super_admin that administers the company."
     },
380  "pype_admins": {
       "type": "array",
       "description": "A list of pype_admins within the business"
     },
392  "stream_admins": {
       "type": "array",
       "description": "A list of stream_admins within the business"
     }
  },
  "required": [
    "name"
  ]
}
```

Fig. 8

```
{
  "$schema": "http://json-schema.org/draft-04/schema#",
  "type": "object",
  "properties": {
    "message_id": {
      "type": "string",
      "description": "Unique identifier representing a specific chatroom."
    },
    "text": {
      "type": "string",
      "description": "Content of the message"
    },
    "embeds": {
      "type": "array",
      "description": "Content of the message, if using controls"
    },
    "author_id": {
      "type": "string",
      "description": "The identifier of the author of the post"
    },
    "author_name": {
      "type": "string",
      "description": "The name of the author of the post"
    },
    "chatroom_id": {
      "type": "string",
      "description": "associated chatroom of the message."
    },
    "consumer_id": {
      "type": "string",
      "description": "Identifier of the consumer in the message"
    },
    "stream_admin_id": {
      "type": "string",
      "description": "Identifier of the consumer in the message"
    }
  }
}
```

Fig. 12

```
# -*- coding: utf-8 -*-
import sys
import os
import json
import re class TestFeat():
    def __init__(self):
        self.intialized = True def execute(self, payload=None, cbFunction=None):
        node_list = [
            (0, {'nodetype':'D','purpose':'Welcome!', 'int_ref':'root',
                'tags':['jump*menu','bee bop'],
                'interaction':"Hello. This is a test. We will test a number of features. First let us test disambiguation. Enter cake",
                'ans_req':True, 'node_data':[],
                'perm':True,'entry':True}), (1, {'nodetype':'D','purpose':'Chocolate Cake','int_ref':'disam1',
                'tags':['cake','chocolate','root*1'],
                'interaction':'chocolate cake [[button,<<yes~disam1*yes>>,<<no~disam1*no>>]]',
                'ans_req':True, 'node_data':[],'perm':False}), (2, {'nodetype':'D','purpose':'Vanilla Cake', 'int_ref':'disam2',
                'tags':['cake','vanilla','root*2'],
                'interaction':'vanilla cake! [[button,<<yes~disam2*yes>>,<<no~disam2*no>>]]',
                'ans_req':True,'node_data':[],'perm':False}), (3, {'nodetype':'D','purpose':'end','int_ref':'end',
                'tags':['disam1*yes','disam1*no','disam2*yes','disam2*no'],
                'interaction':'goodbye baby!',
                'ans_req':False,'node_data':[],'perm':False}), (4, {'nodetype':'A','purpose':'Action Node Stub','int_ref':'action_node_stub',
                'tags':[],'command':'cmds.FWK.ActionNodeScriptName',
                'payload':{'data_loc':['disam1'],'format_type':'dispatch','input':None,'valid':None,'error_msg':None},
                'node_data':[],'dir_field':'valid'}),
        ]

edge_list = [(0,1),(0,2),
                    (1,3),
                    (2,3),
                    (3,4)]
        edge_list = [(edge[0],edge[1],{'edgetype':
```

Fig. 27

SYSTEMS AND METHODS FOR INVOKING CHATBOTS IN A CHANNEL BASED COMMUNICATION SYSTEM

CROSS REFERENCE TO RELATED APPLICATIONS

This application claims priority to U.S. patent application Ser. No. 15/294,368 entitled "Systems and Methods for Invoking Chatbots in Channel Based Communication System," filed Oct. 14, 2016, which claims priority to U.S. Provisional Patent Application No. 62/407,873 entitled "Systems and Methods for Invoking Chatbots in Channel Based Communication System," filed Oct. 13, 2016, each of which is hereby incorporated by reference.

This application also claims priority to U.S. patent application Ser. No. 15/269,697 entitled "Channel Based Communication and Transaction System," filed Sep. 19, 2016, which claims priority to U.S. Pat. No. 9,450,901 entitled "Channel Based Communication and Transaction System," filed Mar. 25, 2016, which claims priority to U.S. Provisional Patent Application No. 62/137,843, entitled "Channel Based Communication and Transaction System," filed Mar. 25, 2015, U.S. Provisional Patent Application No. 62/265,988, entitled "Bidirectional Communication And Message Processing," filed Dec. 11, 2015, and U.S. Provisional Patent Application No. 62/264,850, entitled "Message Aggregation and Processing," filed Dec. 8, 2015, each of which is hereby incorporated by reference in its entirety.

FIELD

The present disclosure relates generally to secure mobile communications platforms that provide primary communication channels. Users connect to primary communication channels and, in so doing, engage in secure bidirectional communication with enterprise data sources associated with such channels, thereby enabling the enterprise data sources to respond directly or broadcast messages to users.

BACKGROUND

Enterprise data sources use different types of communication systems to connect with end users, such as consumers. For example, some enterprise data sources rely on electronic mail (email), telephone, etc., to communicate with consumers, who in turn can respond to the enterprise data sources. However, email communication systems are more than two decades old, not secure, typically laced with spam, a primary deliverer of viruses, cluttered, are error prone, and are a cause for disconnects between enterprise data sources and consumers. Anyone who has tried to obtain customer support using a telephone system will appreciate that call centers do not improve the situation. A consumer must listen to numerous recorded messages, navigate through countless menus, and start over if there is a single incorrect number entered. Moreover, the consumer, once lucky enough to reach a live operator, is often transferred, often more than once, each time providing countless security credentials in order to provide some modicum of security to the call. Thus, typical communication systems do not facilitate direct and secure performance of transactions with consumers.

Given the above background, there is a long felt but unresolved need for computer implemented systems and methods that replace conventional email communication systems and call in systems and facilitate secure bidirectional communication and transactions with consumers in real time.

SUMMARY

The present disclosure addresses the above-identified shortcomings. Systems and methods are provided for receiving identification information from remote user devices associated with users. The identification information serves to obtain corresponding stored user profiles for the users. Primary communication channels are generated for each user based upon such profiles. In typical embodiments, such primary communication channels are already preexisting and the act of "generating" a primary communication channel, from the user perspective, means joining the primary communication channel, and, from the enterprise data source perspective, means adding the user to the pre-existing primary communication channel. Each such primary channel is limited to communication with, and facilitates electronic communication between, a single corresponding enterprise data source (e.g., businesses) and users.

For each respective primary channel in a subset of the primary channels associated with a first user, a corresponding plurality of sub-channels is generated based upon their profile. Here again, in typical embodiments such sub-channels are pre-existing and the act of "generating" a sub-channel channel, from the user perspective, means joining the sub-channel, and, from the enterprise data source perspective, means adding a conversation between the enterprises data source and the user to the pre-existing sub-channel. Each such plurality of sub-channels forms a corresponding hierarchical tree with the corresponding primary channel as root node and the sub-channels as child nodes. In other words, each primary channel of each enterprise data source is associated with a plurality of sub-channels organized into a hierarchy. A sub-channel in a hierarchy of sub-channels enables secure bidirectional communication between (i) the remote user device associated with the first user and (ii) the enterprise data source associated with the primary channel of the hierarchy. More specifically, a sub-channel in a hierarchy of sub-channels enables a plurality of conversations, and each such conversation has secure bidirectional conversation between (i) a single remote user device associated with the first user and (ii) the enterprise data source associated with the primary channel of the hierarchy. Thus, an enterprise data source may invoke a number of sub-channels, each such sub-channel hosting a plurality of conversations, but each such conversation limited to the enterprise data source (e.g., an automated human interface module associated with the sub-channel or a live operator associated with the enterprise data source). With such a platform, users connect to primary communication channels and, in so doing, interact with enterprise data sources in secure bidirectional communication enabling enterprise data sources to respond directly or broadcast messages to their entire audience of users.

One aspect of the present disclosure provides a method comprising, at a server system comprising one or more processors and memory, receiving identification information from a remote user device associated with a first user. The identification information for the first user comprises a unique identifier for the first user. The unique identifier is used to obtain characteristic information from a user profile corresponding to the first user that is stored in one or more data stores. The first user is joined to a plurality of pre-existing primary communication channels based upon the user profile information for the first user. Each primary communication channel in the plurality of primary communication channels is limited to communication with a single corresponding enterprise data source in a plurality of enterprise data sources and facilitates electronic communication between the single corresponding enterprise data source and the first user. Each primary communication channel in the plurality of communication channels hosts a different plurality of users. In the method, for each respective primary communication channel in at least a subset of the plurality of primary communication channels associated with the first user, the first user is joined to a corresponding plurality of pre-existing sub-channels based upon the user profile information for the first user. In some embodiments, this is done automatically without human intervention. The plurality of sub-channels form a corresponding hierarchical tree in which the corresponding primary communication channel is a root node and the plurality of sub-channels are child nodes. A sub-channel in each of the corresponding hierarchy of sub-channels enables a secure bidirectional conversation between (i) a remote user device associated with the first user and (ii) the enterprise data source associated with the primary communication channel of the corresponding hierarchical tree. In this way, secure exchange of a first plurality of messages between the corresponding enterprise data source and the remote user device associated with the first user within the sub-channel is facilitated. The sub-channel hosts a plurality of conversations, each conversation in the plurality of conversations limited to the corresponding enterprise data source and a different single user in a plurality of users. In some embodiments, unique identifier of the first user is a contact number of the user. In some embodiments, a depth of a hierarchical tree associated with a primary communication channel in the plurality of primary communication channels is N, where N is a positive integer greater than one (e.g., N is two, N is three, N is four or greater, etc.).

Another aspect of the present disclosure provides a method, comprising, at a server system comprising one or more processors and memory, using a unique identifier received from a first user to obtain characteristic information from a user profile corresponding to the first user that is stored in one or more data stores. The first user is then joined to a plurality of pre-existing primary communication channels based upon the user profile information for the first user, where each primary communication channel in the plurality of primary communication channels facilitates electronic communication between a corresponding enterprise data source and a first remote user device associated with the first user. Each primary communication channel in the plurality of communication channels hosts a different plurality of users. The first user is joined, for a first primary communication channel in the plurality of primary communication channels associated with the first user, to one or more pre-existing sub-channels associated with the first primary communication channel. A first message that is posted by the first user is received. The first message comprises (a) a key identifying a first sub-channel in the one or more pre-existing sub-channels, (b) a first application programming interface token identifying the first user, and (c) a first communication. Responsive to the first message, a first automated human interface module is initiated to engage in electronic conversation with the first user using the first sub-channel. The first automated human interface module includes a first node graph. The first node graph comprises a first plurality of nodes and a first plurality of edges. Each edge in the first plurality of edges connects two nodes in the first plurality of nodes. A second message that is posted by the first automated human interface module is received. The second message includes (a) the key identifying the first sub-channel, (b) the first application programming interface token identifying the first user, and (c) a second communication responsive to the first communication. The first application programming interface token and the key are used to route the second message to the first remote user device within the first sub-channel thereby initiating a first secure bidirectional conversation between (i) the first remote user device associated with the first user and (ii) a first enterprise data source associated with the first primary communication channel. The first node graph directs one or more states of the first secure bidirectional conversation.

In some embodiments, the first sub-channel further comprises a second secure bidirectional conversation between (i) a second remote user device associated with a second user and (ii) the first enterprise data source. In such embodiments, the method further comprises receiving a third message posted by the first enterprise data source. The third message comprises (a) the key identifying the first sub-channel and (b) a second application programming interface token identifying the second user associated with a second remote user device. The second application programming interface token and the key are used to route the third message to the second remote user device within the first sub-channel.

In some embodiments, the first sub-channel hosts five or more conversations, each conversation between the first enterprise data source and a different user in the plurality of users associated with the first primary communication channel.

In some embodiments, the first enterprise data source is a store, a chain of stores, a government institution or service, a company, a corporation, an enterprise, an advertising firm, a restaurant, a healthcare organization, an organization, or a social organization.

In some embodiments, all or a portion of the first secure bidirectional conversation is recorded into a first data structure, and the method further comprises transferring the first secure bidirectional conversation to a first survey automated human interface module at a conclusion of the first secure bidirectional conversation thereby initiating a survey of the first user by the survey automated human interface module. The survey of the first user is not recorded in the first data structure. In some embodiments, an identity of the first survey automated human interface module is determined by an identity of the first sub-channel. In some embodiments, an identity of the first survey automated human interface module is determined by an identity of the first primary communication channel.

In some embodiments, the method further comprises using the survey of the first user to generate a net promotor score for the first secure bidirectional conversation and making the net promotor score available to an administrator associated with the first sub-channel or the enterprise data source corresponding to the first primary communication channel. In some such embodiments, the net promotor score comprises a plurality of questions and the net promotor score is determined from the answers provided by the first user to the plurality of questions. In some embodiments, the net promotor score associated with each conversation in a plurality of conversations associated with the first sub-channel or the first primary communication channel is aggregated thereby forming an aggregate net promotor score. Further, this aggregate net promotor score is made available to the administrator associated with the first sub-channel or the enterprise data source corresponding to the first primary communication channel. In some such embodiments, conversations occurring in the first sub-channel prior to a predetermined period of time (e.g., prior to the past day, prior to the past week, prior to the past month) are excluded from the plurality of conversations that are aggregated to form the aggregate net promotor score. In some embodiments, the individual net promotor scores of conversations terminating more recently are given more weight than the individual net promotor scores of conversations ending less recently when forming the aggregate net promotor score.

In some embodiments, the first sub-channel is monitored by a first live agent serving in a role as a sub-channel administrator for the sub-channel. Further, the method also comprises using the survey of the first user to generate a net promotor score for the first secure bidirectional conversation, aggregating the net promotor score associated with each conversation in a plurality of conversations associated with the first sub-channel thereby forming an aggregate net promotor score, and making the aggregate net promotor score available to the first live agent or the enterprise data source corresponding to the first primary communication channel.

In some embodiments, the survey collects numeric survey data from the first user on a response scale between a first numeric value and a second numeric value. In some embodiments, the survey collects text based feedback from the first user.

In some embodiments, the method further comprising, prior to receiving the second message, loading information regarding one or more prior electronic conversations between the first user and the enterprise data source corresponding to the first primary communication channel, and using the information regarding one or more prior electronic conversations to determine the second communication. For instance, in some embodiments, the information regarding one or more prior electronic conversations comprises an electronic shopping cart including items offered by the enterprise data source corresponding to the first primary communication channel that the first user has selected in the one or more prior electronic conversations. In some embodiments, the information regarding one or more prior electronic conversations is used to determine which node, in the first plurality of nodes, of the first node graph is initially used by the first automated human interface module to drive the first secure bidirectional conversation. In some embodiments, the information regarding one or more prior electronic conversations is used to pre-populate answers to questions asked by the first automated human interface module in the first secure bidirectional conversation.

In some embodiments, a determination is made as to whether there are one or more prior electronic conversations between the first user and the enterprise data source corresponding to the first primary communication channel. The first user is queried, when there are one or more prior electronic conversations between the first user and the enterprise data source, whether information regarding the one or more prior electronic conversations should be used in the first secure bidirectional conversation. Upon affirmation by the first user that information regarding the one or more prior electronic conversations should be used in the first secure bidirectional conversation, the information regarding one or more prior electronic conversations is used in the first secure bidirectional conversation. For instance, in some such embodiments, the information regarding one or more prior electronic conversations comprises an electronic shopping cart including items offered by the enterprise data source corresponding to the first primary communication channel that the first user has selected in the one or more prior electronic conversations. In other embodiments, the information regarding one or more prior electronic conversations is used to determine which node, in the first plurality of nodes, of the first node graph is initially used by the first automated human interface module to drive the first secure bidirectional conversation. In still other embodiments, the information regarding one or more prior electronic conversations is used to pre-populate answers to questions asked by the first automated human interface module in the first secure bidirectional conversation.

In some embodiments a determination is made as to whether there are one or more prior electronic conversations between the first user and the enterprise data source corresponding to the first primary communication channel. The first user is queried, when there is a plurality of prior electronic conversations between the first user and the enterprise data source, whether information regarding any one of the prior electronic conversations should be used in the first secure bidirectional conversation. Upon selection by the first user of a first prior electronic conversation in the plurality of prior electronic conversations, the information regarding the first prior electronic conversation is used in the first secure bidirectional conversation. For instance, in some embodiments, the information regarding one or more prior electronic conversations comprises an electronic shopping cart including items offered by the enterprise data source corresponding to the first primary communication channel that the first user has selected in the one or more prior electronic conversations. In other embodiments, the information regarding the first prior electronic conversation is used to determine which node, in the first plurality of nodes, of the first node graph is initially used by the first automated human interface module to drive the first secure bidirectional conversation. In some embodiments, the information regarding the first prior electronic conversation is used to pre-populate answers to questions asked by the first automated human interface module in the first secure bidirectional conversation.

In some embodiments, a node in the first plurality of nodes is a summary node, and the method further comprises invoking the summary node to provide the first user a summary of information currently gathered by the first automated human interface module in the first secure bidirectional conversation. In some embodiments, the method further comprises receiving instructions from the first user to edit the summary information. For instance, in some such embodiments, the instructions from the first user to edit the summary information changes the status of information held by nodes, other than or in addition to, the summary node in the first plurality of nodes of the first node graph. In some embodiments, the first plurality of edges defines an ordered sequence in which nodes in the first plurality of nodes are invoked, and the instructions to edit the summary information drive the first secure bidirectional conversation outside of the ordered sequence.

In some embodiments, the method further comprises evaluating the first communication, prior to receiving the second message, to select an initial node in the first plurality of nodes based upon the content of the first communication. The initial node is used by the first automated human interface module to generate the second communication.

In some embodiments, upon conclusion of the first secure bidirectional conversation, the first user is subject to a survey within the first sub-channel thereby obtaining a survey result within the first sub-channel based upon one or more responses of the first user to the survey. Further, the survey result is evaluated to select an initial node in a second plurality of nodes of a second automated human interface module based upon the survey result. The initial node is used by the second automated human interface module to initiate a second secure bidirectional conversation between (i) the first remote user device associated with the first user and (ii) the first enterprise data source associated with the first primary communication channel.

In some embodiments, upon conclusion of the first secure bidirectional conversation, an initial node in a second plurality of nodes of a second automated human interface module is selected based upon an end state of the first secure bidirectional conversation, wherein the initial node is used by the second automated human interface module to initiate a second secure bidirectional conversation between (i) the first remote user device associated with the first user and (ii) the first enterprise data source associated with the first primary communication channel. In some embodiments, the end state comprises a request by the first end user to engage in another transaction.

In some embodiments, the first automated human interface module comprises an exception handler. Further, a first node in the first node graph is dedicated to exception handling, and the method further comprises receiving a request from the first automated human interface module for data from a remote data system external to the server system. An attempt is made to service the request by obtaining the requested data from the remote data system. When this attempt fails to make contact with the remote data system or the remote data system returns an error code, the exception handler moves the first secure bidirectional conversation to the first node. In some embodiments, the first node is customizable by the enterprise data source corresponding to the first primary communication channel thereby enabling the enterprise data source to customize a message sent to the first user when the conversation is moved to the first node. In some embodiments, the first node directs the first secure bidirectional conversation to a live agent associated with the first sub-channel when the first secure bidirectional conversation is moved to the first node.

In some embodiments, the first automated human interface module comprises an exception handler. A request is received from the first automated human interface module for data from a remote data system external to the server system. An attempt is made to service the request by obtaining the requested data from the remote data system. When the attempting fails to make contact with the remote data system or the remote data system returns an error code, the exception handler initiates a process comprising: terminating the first automated human interface module and moving the conversation to a second automated human interface module, where the second automated human interface module is dedicated to exception handling. In some such embodiments, the second automated human interface module is customizable by the enterprise data source corresponding to the first primary communication channel thereby enabling the enterprise data source to customize a message sent to the first user when the conversation is moved to the second automated human interface module. In some embodiments, the second automated human interface module directs the conversation to a live agent associated with the first sub-channel when the conversation is moved to the second automated human interface module.

In some embodiments, a first node in the first node graph is dedicated to exception handling and the first automated human interface module comprises an exception handler that executes a process that runs concurrently with the method.

In such embodiments, the process comprises monitoring progress of the first secure bidirectional conversation across the plurality of nodes. When a latency after a third message posted by the first user arises, the process further comprises moving the first secure bidirectional conversation to the first node. In some such embodiments, the first node is customizable by the enterprise data source corresponding to the first primary communication channel thereby enabling the enterprise data source to customize a message sent to the first user when the first secure bidirectional conversation is moved to the first node. In some such embodiments, the first node directs the first secure bidirectional conversation to a live agent associated with the first sub-channel when the first secure bidirectional conversation is moved to the first node.

In some embodiments, the first automated human interface module comprises an exception handler that executes a process that runs concurrently with the method. The process comprises monitoring progress of the first secure bidirectional conversation across the plurality of nodes. When a latency after a third message posted by the first user arises, the process further comprises terminating the first automated human interface module and moving the first secure bidirectional conversation to a second automated human interface module, wherein the second automated human interface module is dedicated to exception handling. In some embodiments, the second automated human interface module is customizable by the enterprise data source corresponding to the first primary communication channel thereby enabling the enterprise data source to customize a message sent to the first user when the first secure bidirectional conversation is moved to the second automated human interface module. In some embodiments, the second automated human interface module directs the first secure bidirectional conversation to a live agent associated with the first sub-channel when the first secure bidirectional conversation is moved to the second automated human interface module.

In some embodiments, the method further comprises compiling the first automated human interface module from a plurality of uncompiled processes, at a time prior to receiving the first message, thereby creating a final compiled output file. In such embodiments, the initiating the first automated human interface module comprises executing an instance of the final compiled output file. In some embodiments, an uncompiled process in the plurality of uncompiled processes comprises a keyword tag or phrase, and the compiling expands the keyword tag or phrase. In some embodiments, the compiling error checks the first node graph.

In some embodiments, a first node in the first node graph is a statistics node, and the statistics node executes a process that runs concurrently with the method, the process comprising monitoring progress of the first secure bidirectional conversation by collecting a time metric associated with the first secure bidirectional conversation. In some such embodiments, the time metric comprises an overall chat duration or an active chat duration.

In some embodiments, each node in the plurality of nodes is associated with a different plurality of tags, and a first node in the first node graph is a disambiguation node. In such embodiments, the method further comprises receiving a third message that includes (a) the key identifying the first sub-channel, (b) the first application programming interface token identifying the first user, and (c) a third communication, where the third communication is free form input from the first user, and where the disambiguation node executes a process that runs concurrently with the method. The process comprises evaluating the third communication against each tag in each different plurality of tags associated with a node in the plurality of nodes, thereby obtaining one or more tags that match the third communication. When the one or more matches is a single match, the disambiguation node passes the first secure bidirectional conversation to the node in the plurality of nodes that is associated with the matching tag. When the one or more matches is a plurality of matching tags, the disambiguation node offers the first user a plurality of options for proceeding with the first secure bidirectional conversation, where each option in the plurality of options is associated with a node in the plurality of nodes that is associated with a tag in the plurality of matching tags. In some such embodiments, the evaluating the third communication against each tag in each different plurality of tags associated with a node in the plurality of nodes uses a scoring table that is customized for the first sub-channel. In some such embodiments, the evaluating the third communication against each tag in each different plurality of tags associated with a node in the plurality of nodes uses a scoring table that is customized for the first primary communication channel. In some embodiments, a first node in the first node graph is a sensitive data node, and a second node in the first node graph is a non-sensitive data node, the method further comprises passing the first secure bidirectional conversation to the non-sensitive data node, wherein the non-sensitive data node stores a first set of communications from the first user that have been processed by the non-sensitive data node in a chat history unique to the first secure bidirectional conversation, and passing the first secure bidirectional conversation to the sensitive data node, where the non-sensitive data node processes a second set of communications from the first user but does not store them in the chat history and masks the second set of communications on a display of the first remote user device.

In some embodiments, each node in the plurality of nodes is associated with a different plurality of tags, and a first node in the first node graph is a jump node. In such embodiments, the method further comprises receiving a third message that includes (a) the key identifying the first sub-channel, (b) the first application programming interface token identifying the first user, and (c) a third communication, wherein the third communication is free form input from the first user, and wherein the jump node executes a process that runs concurrently with the method. The process comprises evaluating the third communication against each tag in each different plurality of tags associated with a node in the plurality of nodes, thereby obtaining zero or more tags that match the third communication, suspending the first automated human interface module and moving the first secure bidirectional conversation and the zero or more tags that match the third communication to a second automated human interface module, where the second automated human interface module is dedicated to servicing conversations transferred from jump-nodes. In some such embodiments, tags that are associated with nodes that are closer to a node in the plurality of nodes that processed the third communication are up-weighted by the evaluating relative to tags associated with nodes that are further from the node that processed the third communication. In some such embodiments, the first automated human interface module is in a plurality of automated human interface modules, each respective automated human interface module in the plurality of automated human interface module includes a corresponding node graph, each corresponding node graph comprises a plurality of nodes and a plurality of edges, and each node in each plurality of nodes is associated with a different plurality of tags, and the evaluating the third communication evaluates the third communication against each tag in each different plurality of tags associated with a node in each plurality of nodes, thereby obtaining zero or more tags that match the third communication. In some such embodiments, the one or more pre-existing sub-channels is a plurality of sub-channels including the first sub-channel, each sub-channel in the plurality of sub-channels is associated with one or more tags, and the evaluating the third communication evaluates the third communication against each tag associated with each sub-channel in the plurality of sub-channels. In some such embodiments, each tag that is in the first sub-channel is up weighted by the evaluating relative to each tag that is not in the first sub-channel. In some such embodiments, the method further comprises posting a fourth message that includes the first application programming interface token identifying the first user and a fourth communication and resuming the first secure bidirectional conversation in the first automated human interface module. In some such embodiments, an action taken by the second automated human interface module when the first secure bidirectional conversation is moved to the second automated human interface module is defined by the first enterprise data source.

ADDITIONAL EMBODIMENTS

Another aspect of the present disclosure provides a method comprising, at a server system (e.g., by the secure mobile communications platform 200) comprising one or more processors and memory, joining a first user to a primary communication channel, where the primary communication channel facilitates electronic communication between a corresponding enterprise data source and a remote user device associated with the first user. The first user is further joined to a sub-channel associated with the primary communication channel. In some embodiments, the sub-channel hosts a plurality of users including the first user. A first message that is posted by the first user is received in the method. The first message comprises (a) an application programming interface token identifying the first user and (b) a first text communication. No other users on the first sub-channel, other than the enterprise data source can access this first message. Responsive to the first message, the first text communication is compared to each tag in each respective set of tags in a plurality of sets of tags. Each respective set of tags in the plurality of sets of tags is uniquely associated with (i) a different automated human interface module (chatbot) in one or more automated human interface modules associated with the sub-channel or (ii) a different node within a plurality of nodes in an automated human interface module in the one or more automated human interface modules. The first message is routed to a first automated human interface module in the one or more automated human interface modules or a first node within the first automated human interface module that is associated with a tag that best matches the first text communication. Then, the first automated human interface module prepares a second message responsive to the first message. In the method, the second message that is posted by the first automated human interface module is received (e.g., by the secure mobile communications platform 200). The second message includes (a) the first application programming interface token identifying the first user, and (b) a second communication responsive to the first message. The application programming interface token is used to route the second message to the first user within the sub-channel thereby facilitating a secure bidirectional conversation between (i) the remote user device associated with the first user and (ii) the corresponding enterprise data source associated with the primary communication channel.

In some such embodiments, the first message further comprises (c) a key identifying the sub-channel in the one or more sub-channels, and the second message further comprises (c) the key identifying the sub-channel.

In some embodiments, the comparing the first text communication to each tag in each respective set of tags in the plurality of sets of tags includes performing a procedure that comprises tokenizing the first text communication thereby obtaining a plurality of tokens. The plurality of tokens is converted into a query vector. The query vector is evaluated against a first set of tags in the plurality of sets of tags, where the first set of tags is in the form of a matrix of target vectors, and where each target vector in the matrix of target vectors includes a relative frequency of occurrence of each term in a plurality of terms. In some such embodiments, the plurality of terms is associated with a context or an industry associated with the sub-channel or primary communication channel.

In some embodiments, the comparing the first text communication to each tag in each respective set of tags in a plurality of sets of tags further comprises applying one or more extension modules to the first text communication, thereby forming an augmented first text communication that is compared to each tag in each respective set of tags in the plurality of sets of tags.

In some such embodiments, an extension module, in the one more extension modules, is a spell checker and the augmented first text communication is a spell-checked version of the first text communication.

In some such embodiments, an extension module, in the one more extension modules, is a context extraction module and the augmented first text communication comprises a context identified by the context extraction module.

In some embodiments, the comparing the first text communication to each tag in each respective set of tags in the plurality of sets of tags includes performing a procedure that comprises converting the first text communication into a query vector, applying one or more extension modules to the query vector, thereby forming an augmented query vector, and using the augmented query vector to identify a subset of sets of tags from the plurality of sets of tags to evaluate. In such embodiments, each set of tags in the subset of sets of tags is in the form of a matrix of target vectors in a subset of a plurality of matrices of target vectors. Further, each target vector in each respective matrix in the subset of the plurality of matrices of target vectors includes a relative frequency of occurrence of each term in a plurality of terms. The procedure further comprises comparing the augmented vector to each respective target vector in each respective matrix in the subset. In some such embodiments, an extension module, in the one more extension modules, is a spell checker and the augmented vector is a spell-checked version of the query vector. In some such embodiments, an extension module, in the one more extension modules, is a context extraction module, the augmented vector includes a context identified by the context extraction module, and the context determines the identity of the subset of the plurality of matrices of target vectors.

In some embodiments, the first automated human interface module comprises a node graph. The node graph comprises a first plurality of nodes and a first plurality of edges. Each edge in the first plurality of edges connects two nodes in the first plurality of nodes. A subset of the first plurality of nodes in the node graph performs a dedicated function and is called by one or more referencing nodes in the node graph that are not part of the subset of the first plurality of nodes. In some embodiments, the dedicated function is a script that is designed to obtain information from the first user within the secure bidirectional conversation. In some embodiments, the dedicated function receives status data from a referencing node in the one or more referencing nodes to facilitate performing the dedicated function. In some embodiments, the dedicated function receives a destination node in the first plurality of nodes from a referencing node in the one or more referencing nodes, and, once the subset of the first plurality of nodes in the node graph performs the dedicated function, the method further comprises passing the secure bidirectional conversation to the destination node. In some embodiments, the destination node is the same as the referencing node. In some embodiments, the destination node is other than the referencing node.

In some embodiments, the method further comprises determining a context for the secure bidirectional conversation based, at least in part, on the first text communication as part of a first layer of natural language processing, and, responsive to determining the context, routing the secure bidirectional conversation to a first node in the plurality of nodes in the automated human interface module that includes an interface module for the context. In some embodiments, the context is a type of reservations. In some embodiments, the first node performs image analysis. In some embodiments, the context is a medical application.

In some embodiments, the method further comprises detecting a communication protocol used by the server system to communicate the second communication to the remote user device. When the communication protocol is other than a default communication protocol, the method further comprises invoking a transformation layer that translates the second message to a format associated with the communication protocol prior to routing the second message to the remote user device.

In some such embodiments, the communication protocol is other than a default communication protocol, and the invoking the transformation layer translates the second message to a JSON file that is routed as the second message to the remote user device. In some such embodiments, the communication protocol is other than a default communication protocol, the second message comprises one or more objects in other than ASCII format, and the invoking the transformation layer translates an object in the one or more objects to ASCII format prior to the second message being routed to the remote user device.

In some such embodiments, the transformation layer includes a lookup table that provides a translation schedule for each object in a plurality of objects, for each communication protocol in a plurality of communication protocols. In some embodiments, the communication protocol is other than a default communication protocol, the second message comprises one or more objects in other than ASCII format, and the invoking the transformation layer translates an object in the one or more objects to another format prior to the second message being routed to the remote user device in accordance with the lookup table.

In some embodiments, the remote user device includes a client side communications module for sending and receiving communications. In such embodiments, the method further comprises determining an identity of the client side communications module. When the client side communications module is determined to be a first type of client side communications module, the method further comprises invoking a transformation layer that translates the second message to a format associated with the client side communications module prior to routing the second message to the remote user device. Moreover, when the client side communications module is determined to be a second type of client side communications module, the method further comprises routing the second message to the remote user device without translating the second message to a format associated with the client side communications module. In some such embodiments, the client side communications module is determined to be the first type of client side communications module, and the invoking the transformation layer translates the second message to a JSON file that is routed as the second message to the remote user device. In some such embodiments, the client side communications module is determined to be the first type of client side communications module, the second message comprises one or more objects in other than ASCII format, and the invoking the transformation layer translates an object in the one or more objects to ASCII format prior to the second message being routed to the remote user device.

In some such embodiments, the transformation layer includes a lookup table that provides a translation schedule for each object in a plurality of objects, for each type of client side communications module in a plurality of types of client side communications module.

In some such embodiments, the client side communications module is determined to be the first type of client side communications module, the second message comprises one or more objects in other than ASCII format, and the invoking the transformation layer translates an object in the one or more objects to another format prior to the second message being routed to the remote user device in accordance with the lookup table. In some such embodiments, the enterprise data source is associated with a customer relationship application on a server computer associated with the enterprise data source, and the routing the second message to the first user within the sub-channel comprises routing the second message to the customer relationship application. In some such embodiments, the secure bidirectional conversation comprises a conversation history and the routing the second message to the customer relationship application includes the conversation history and the application programming interface token identifying the first user. In some such embodiments, the method further comprises using the application programming interface token identifying the first user to poll the customer relationship application on a recurring basis for a response by the customer relationship application to the second message, and, responsive to receiving the response to the second message, using the application programming interface token to route the response to the second message to the first automated human interface module or the first node within the first automated human interface module that provided the second communication.

In some embodiments, the sub-channel hosts five or more conversations, each conversation between the enterprise data source and a different user in the plurality of users.

In some embodiments, the enterprise data source is a store, a chain of stores, a government institution or service, a company, a corporation, an enterprise, an advertising firm, a restaurant, a healthcare organization, an organization, or a social organization.

In some embodiments, all or a portion of the secure bidirectional conversation is recorded into a first data structure, and the method further comprises transferring the secure bidirectional conversation to a first survey automated human interface module at a conclusion of the secure bidirectional conversation thereby initiating a survey of the first user by the survey automated human interface module, and the survey of the first user is not recorded in the first data structure. In some such embodiments, an identity of the first survey automated human interface module is determined by an identity of the sub-channel. In some such embodiments, an identity of the first survey automated human interface module is determined by an identity of the primary communication channel. In some such embodiments, the method further comprises using the survey of the first user to generate a net promotor score for the secure bidirectional conversation and making the net promotor score available to an administrator associated with the sub-channel or the enterprise data source corresponding to the primary communication channel. In some embodiments, the net promotor score comprises a plurality of questions and the net promotor score is determined from the answers provided by the first user to the plurality of questions. In some embodiments, the method further comprises aggregating the net promotor score associated with each conversation in a plurality of conversations associated with the sub-channel or the primary communication channel thereby forming an aggregate net promotor score, and making the aggregate net promotor score available to the administrator associated with the sub-channel or the enterprise data source corresponding to the primary communication channel. In some such embodiments, conversations occurring in the sub-channel prior to a predetermined period of time are excluded from the plurality of conversations that are aggregated to form the aggregate net promotor score. In some embodiments, the individual net promotor scores of conversations terminating more recently are given more weight than the individual net promotor scores of conversations ending less recently when forming the aggregate net promotor score.

In some embodiments, the sub-channel is monitored by a first live agent serving in a role as a sub-channel administrator for the sub-channel, and the method further comprises using the survey of the first user to generate a net promotor score for the secure bidirectional conversation aggregating the net promotor score associated with each conversation in a plurality of conversations associated with the sub-channel thereby forming an aggregate net promotor score; and making the aggregate net promotor score available to the first live agent or the enterprise data source corresponding to the primary communication channel. In some embodiments, the survey collects numeric survey data from the first user on a response scale between a first numeric value and a second numeric value. In some embodiments, the survey collects text based feedback from the first user.

In some embodiments, the method further comprise, prior to receiving the second message, loading information regarding one or more prior electronic conversations between the first user and the enterprise data source corresponding to the primary communication channel; and using the information regarding one or more prior electronic conversations to determine the second communication. In some embodiments, the information regarding one or more prior electronic conversations comprises an electronic shopping cart including items offered by the enterprise data source corresponding to the first primary communication channel that the first user has selected in the one or more prior electronic conversations. In some embodiments, the information regarding one or more prior electronic conversations is used in the determination of which node, in the plurality of nodes, is initially used by the automated human interface module to drive the secure bidirectional conversation.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIGS. 5A, 5B, 5C, 5D, 5E, 5F, 5G, 5H, 5I, 5J, 5K, 5L, 5M, 5N, 5O, and 5P collectively provide a flow chart of processes and features of a system for enabling users to connect to primary communication channels through on-line catalogs and, in so doing, engage in secure bidirectional communication with enterprise data sources, in accordance with various embodiments of the present disclosure. In these figures, elements in dashed boxes are optional.

FIG. 8 illustrates an enterprise data source description for an enterprise data source in accordance with some embodiments.

FIG. 12 illustrates the format of a post request to a sub-channel in accordance with one aspect of the present disclosure.

FIG. 27 illustrates an example bot definition file that is compiled into a bot in accordance with an embodiment of the present disclosure.

DESCRIPTION OF EMBODIMENTS

The present disclosure relates generally to the field of secure mobile communications in which enterprise data sources are listed as primary communication channels in searchable catalogs. Users connect to primary communication channels through such catalogs and, in so doing, engage in secure bidirectional communication with enterprise data sources thereby enabling the enterprise data sources to respond directly to users.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
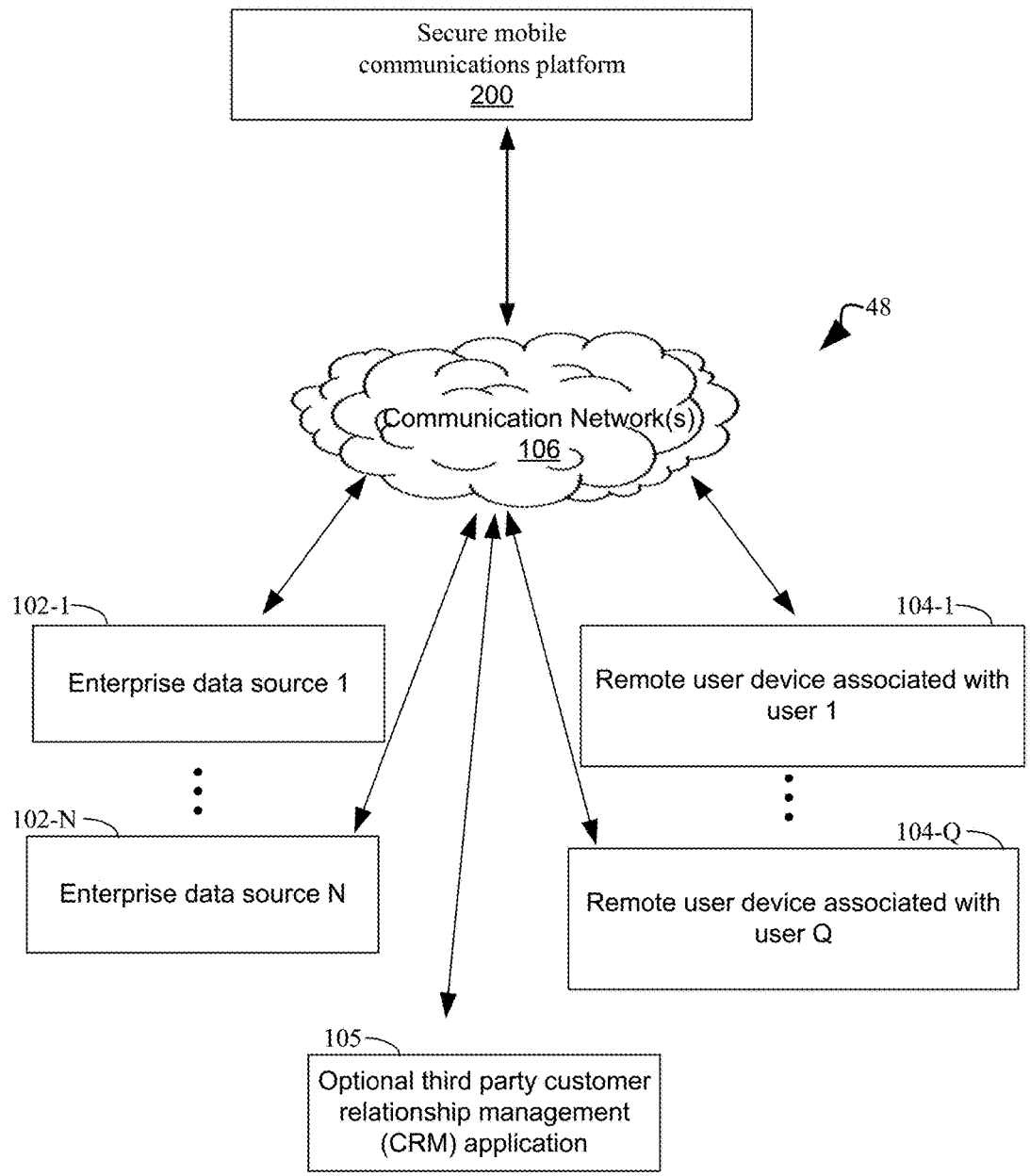
FIG. 1 illustrates a system topology that includes a secure mobile communications platform, a plurality of remote user devices associated with users of the secure mobile communications platform, and a plurality of enterprise data sources that communicate with the plurality of users through primary communication channels and sub-channels using the secure mobile communications platform in accordance with an aspect of the present disclosure.
Figure 2:
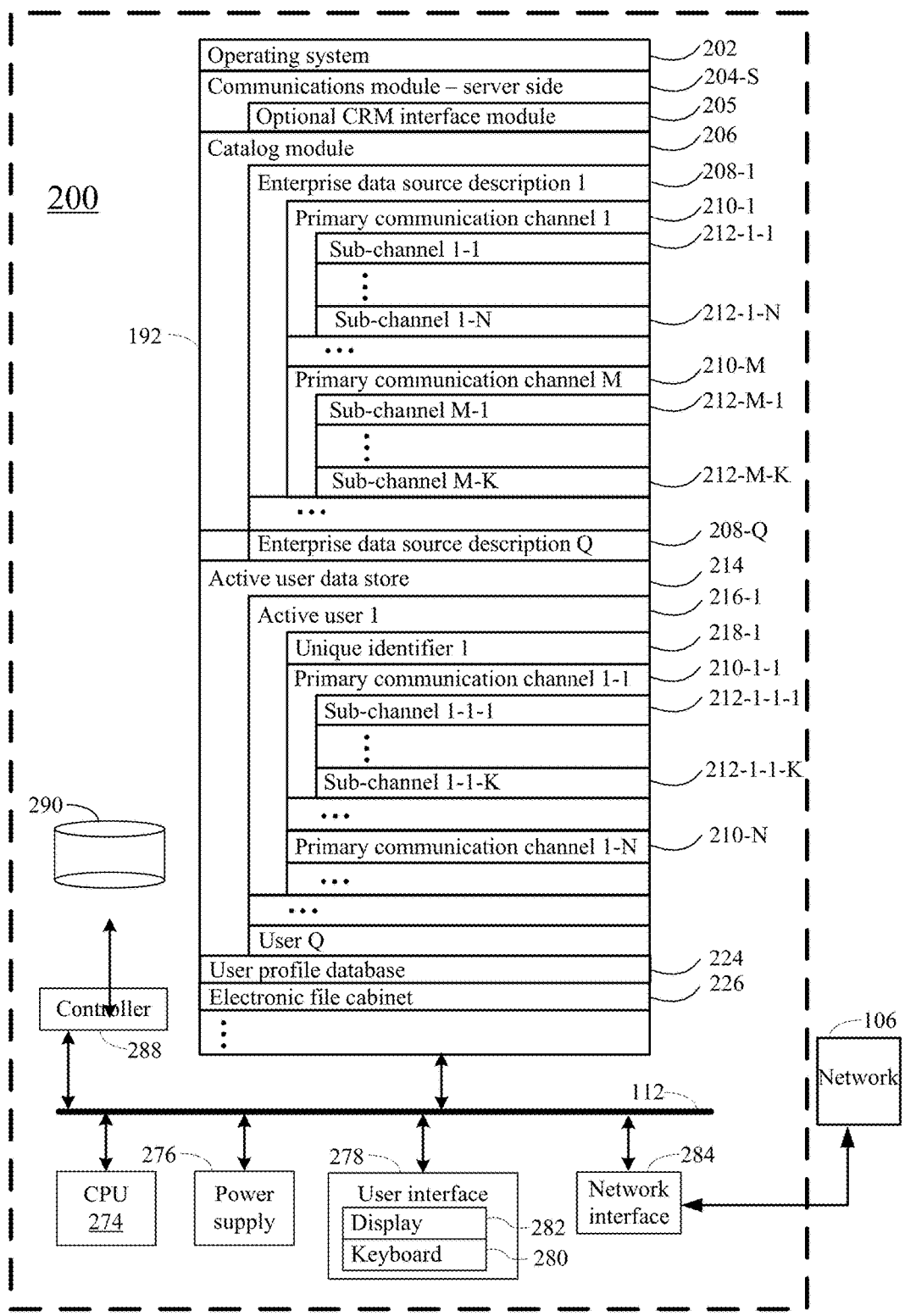
FIG. 2 illustrates a secure mobile communications platform in accordance with an embodiment of the present disclosure.
Figure 3:
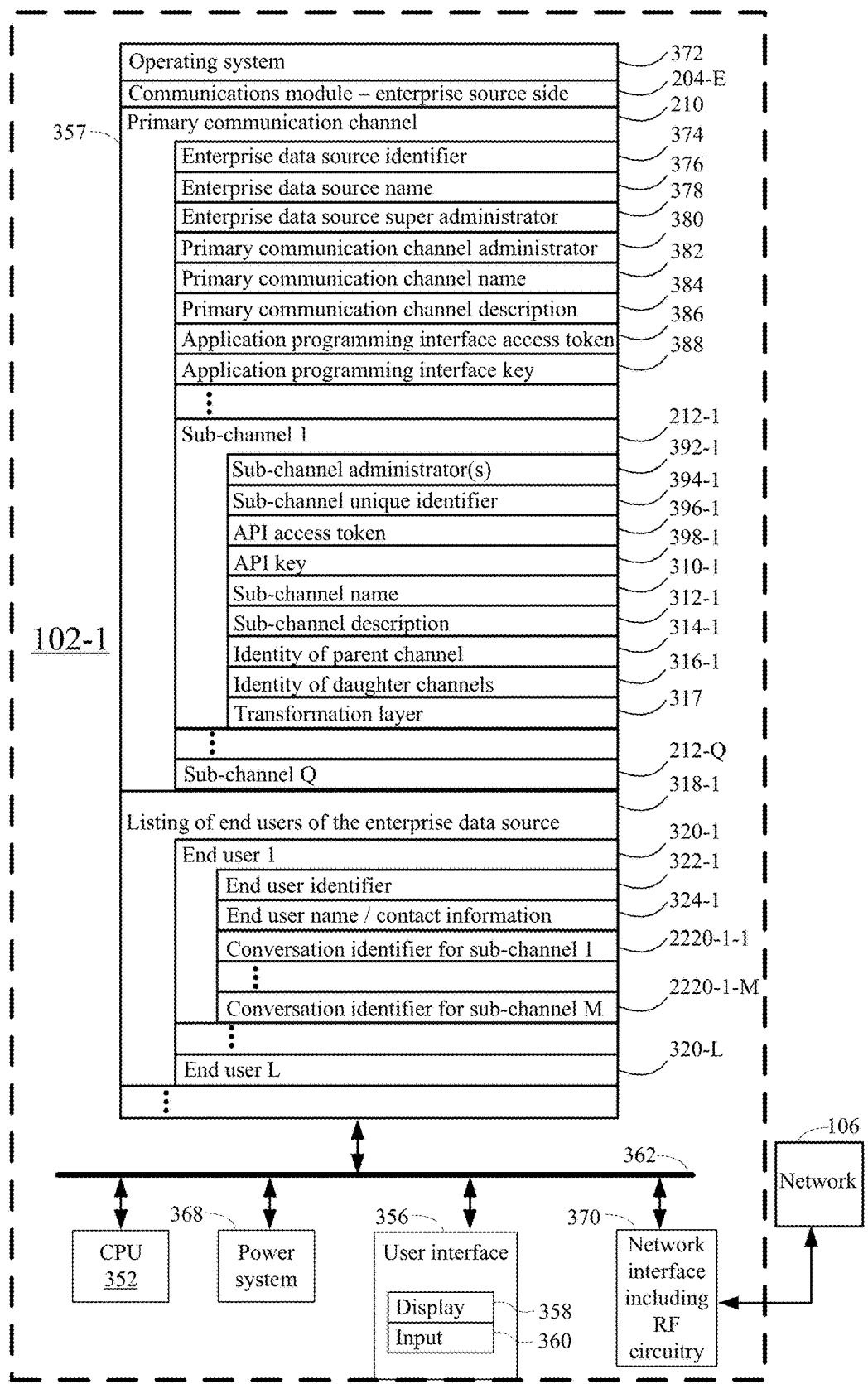
FIG. 3 illustrates an enterprise data source, in accordance with an embodiment of the present disclosure.
Figure 4:
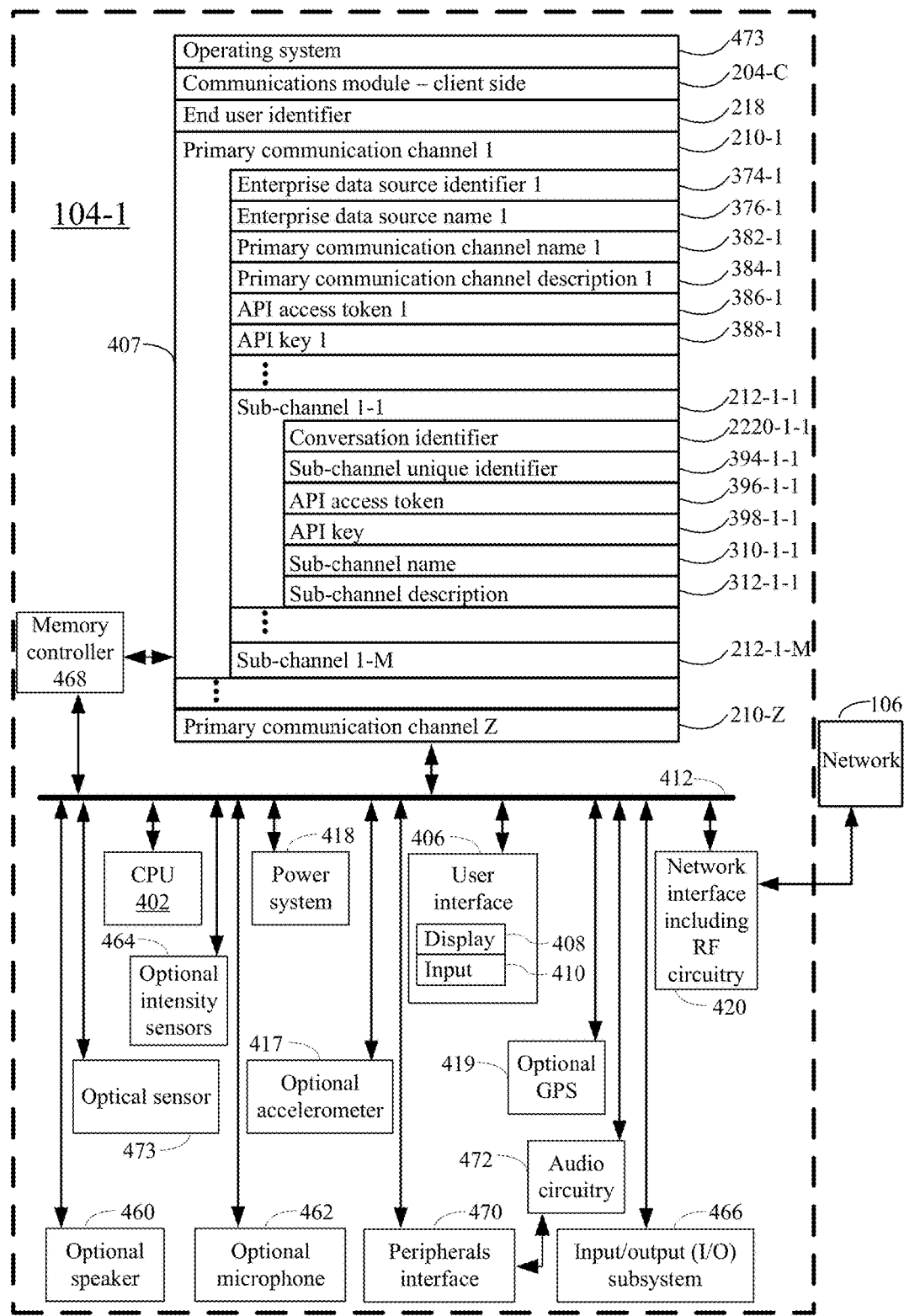
FIG. 4 illustrates a remote user device, in accordance with an embodiment of the present disclosure.

A detailed description of a system 48 which enables bidirectional communication between users and enterprise data sources in accordance with the present disclosure is described in conjunction with FIGS. 1 through 4. As such, FIGS. 1 through 4 collectively illustrate the topology of the system in accordance with the present disclosure. In the topology, there is a secure mobile communications platform 200 (FIGS. 1 and 2), enterprise data sources 102 that provide customer services and products to users through the secure mobile communications platform 200 (FIGS. 1 and 3), and remote user devices 104 associated with users that consume such customer services and products (FIGS. 1 and 4).

Of course, other topologies of system 48 are possible, for instance, secure mobile communications platform 200 can in fact constitute several computers that are linked together in a network or be a virtual machine in a cloud computing context. As such, the exemplary topology shown in FIG. 1 merely serves to describe the features of an embodiment of the present disclosure in a manner that will be readily understood to one of skill in the art.

Referring to FIG. 2, in typical embodiments, a secure mobile communications platform 200 comprises one or more computers. For purposes of illustration in FIG. 2, the secure mobile communications platform 200 is represented as a single computer that includes all of the functionality of the secure mobile communications platform 200. However, the disclosure is not so limited. The functionality of the secure mobile communications platform 200 may be spread across any number of networked computers and/or reside on each of several networked computers and/or by hosted on one or more virtual machines at a remote location accessible across the communications network 106. One of skill in the art will appreciate that a wide array of different computer topologies is possible for the secure mobile communications platform 200 and all such topologies are within the scope of the present disclosure.

Turning to FIG. 2 with the foregoing in mind, a secure mobile communications platform 200 comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 112 for interconnecting the aforementioned components, and a power supply 276 for powering the aforementioned components. Data in memory 192 can be seamlessly shared with non-volatile memory 290 using known computing techniques such as caching. Memory 192 and/or memory 290 can include mass storage that is remotely located with respect to the central processing unit(s) 274. In other words, some data stored in memory 192 and/or memory 290 may in fact be hosted on computers that are external to the secure mobile communications platform 200 but that can be electronically accessed by the secure mobile communications platform over an Internet, intranet, or other form of network or electronic cable (illustrated as element 106 in FIG. 2) using network interface 284.

The memory 192 of the secure mobile communications platform 200 stores:

an operating system 202 (e.g., iOS, DARWIN, RTXC, LINUX, UNIX, OS X, WINDOWS, ANDROID, or an embedded operating system such as VxWorks) that includes procedures for handling various basic system services;

a communications module 204-S for supporting bidirectional secure communication between the secure mobile communications platform 200, enterprise data sources 102 and remote user devices 104;

a catalog module 206 that provide enterprises data source descriptions 208 of the enterprises data sources 102 that are available to users of the remote user devices 104, including for each respective enterprise data source the associated primary communication channel 210 and sub-channels 212;

an active user data store 214 that tracks the current active users 216 of the secure mobile communications platform, including for each such user a unique identifier 218, and their active primary communication channels 220 and sub-channels 222, and in some embodiments, the conversation identifiers of the conversations of the active users;

a user profile database 224 that stores a user profile for each user; and an optional electronic file cabinet 226 which stores attachments sent in sub-channels to users.

In some embodiments, communications module 204-S is a web application. Advantageously, in such embodiments, since it is a web application it is accessible on any browser (phone, tablet, laptop/desktop) such as remote user device 104 of FIGS. 1 and 4. In some embodiments communications module 204 runs on native device frameworks, and is available for download onto remote user device 104 running operating systems (e.g., iOS, DARWIN, RTXC, LINUX, UNIX, OS X, WINDOWS, or an embedded operating system such as VxWorks).

In some embodiments, sub-channels 212 support "channel based bidirectional communication," which is a two-way, duplex, communication, for example, a business to consumer (B2C) communication. The channel based bidirectional communication comprises communication of content associated with multiple topics or subjects via multiple primary communication channels 210 and/or sub-channels 212. Furthermore, the channel based bidirectional communication comprises performance of one or more transactions via the sub-channels. In some embodiments, sub-channels 212 are configured for mobile chat that replaces electronic mail (email) for business to consumer communication. This mobile chat takes the form of conversations, each having a conversation identifier, and each limited to the enterprise data source and a single end user. In some embodiment, the primary channels 210 and sub-channels are implemented in a cloud computing environment. As used herein, "cloud computing environment" refers to a processing environment comprising configurable computing physical and logical resources, for example, networks, servers, storage, applications, services, etc., and data distributed over a network, for example, the Internet. The cloud computing environment provides on-demand network access to a shared pool of the configurable computing physical and logical resources.

In some implementations, one or more of the above identified data elements or modules of the secure mobile communications platform 200 is stored in one or more of the previously described memory devices, and correspond to a set of instructions for performing a function described above. The above-identified data, modules or programs (e.g., sets of instructions) need not be implemented as separate software programs, procedures or modules, and thus various subsets of these modules may be combined or otherwise re-arranged in various implementations. In some implementations, the memory 192 and/or 290 optionally stores a subset of the modules and data structures identified above. Furthermore, in some embodiments the memory 192 and/or 206 stores additional modules and data structures not described above.

Referring to FIG. 3, in some embodiments an enterprise data source 102 includes a server computer having one or more processing units (CPU's) 352, a network or other communications interface 370, a memory 357 (e.g., random access memory), a user interface 356, the user interface 356 including a display 358 and input 360 (e.g., keyboard, keypad, touch screen), one or more communication busses 362 for interconnecting the aforementioned components, and a power system 368 for powering the aforementioned components. It should be appreciated that the enterprise data source 102 depicted in FIG. 3 is only one example of an enterprise data source, and that the enterprise data source 102 optionally has more or fewer components than shown in FIG. 3, optionally combines two or more components, or optionally has a different configuration or arrangement of the components. Moreover, it will be appreciated that an enterprise data source 102 may use any number of computers to support the disclosed systems and methods. The various components shown in FIG. 3 are implemented in hardware, software, firmware, or a combination thereof, including one or more signal processing and/or application specific integrated circuits.

As illustrated in FIG. 3, memory 357 of the enterprise data source 102 preferably comprises:

an operating system 372 (e.g., iOS, DARWIN, RTXC, LINUX, UNIX, OS X, WINDOWS, or an embedded operating system such as VxWorks) that includes procedures for handling various basic system services;

a communications module 204-E for supporting bidirectional secure communication between the secure mobile communications platform 200, enterprise data sources 102 and end users associated with remote user devices 104, the communications module 204-E optionally including a customer relationship management (CRM) interface module 205 as further described below;

a primary communication channel 210 associated with the enterprise data source that includes a unique enterprise data source identifier 374, a name 376, one or more super administrators 378, one or more primary communication channel administrators 380, a primary communication channel name 382, a primary communication channel description 384, an application programming interface access token 386, an application programming interface key 388, as well as one or more sub-channels 212, each sub-channel including enumeration of sub-channel administrators(s) 392, a sub-channel unique identifier 394, an API access token 396, an API key 398, a sub-channel name 310, a sub-channel description 312, an identity of a parent channel 314 to the sub-channel 212, an identification of one or more daughter channels 316 to the sub-channel 212, and one or more transformation layers 317 (wherein FIG. 3 shows one such transformation layer); and a listing of a plurality of end users of the enterprises data source 318, including for each such respective end user 320, a user identifier 322, an end user name 324, and an identification of each conversation 2220 (e.g., see FIG. 22 for example additional disclosure on conversations) the end user is participating in, where each such conversation is in a different sub-channel 212 of the primary communication channels 210 associated with the enterprise data source 102.

Thus, FIG. 3 details a primary communication source 102 which includes a primary communication channel 210 and a plurality of sub-channel 212. End users associated with remote user devices 104 participate in conversations in sub-channels 212. Each such conversation is between a single end user and the enterprise data source 102. However, each sub-channel 212 may host a plurality of such conversations. To ensure the privacy of these conversations, each conversation 2220 has an identifier and only one end user has access rights to the conversation whereas the enterprise data source 102 has access rights to all the conversations. In some embodiments, a sub-channel 212 hosts ten or more conversations 2220, one hundred or more conversations 2220, or one thousand or more conversations 2220.

FIG. 4 provides a description of a remote user device 104 associated with an end user in accordance with the present disclosure. Remote user device 104 has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker 460, an optional microphone 462, one or more optional intensity sensors 464 for detecting intensity of contacts on the device 104 (e.g., a touch-sensitive surface such as a touch-sensitive display system 408 of the device 102), optional input/output (I/O) subsystem 466, one or more optional optical sensors 474, one or more communication busses 412 for interconnecting the aforementioned components, and a power system 418 for powering the aforementioned components.

In some embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons.

Device 104 optionally includes, in addition to accelerometer(s) 417, a magnetometer (not shown) and a GPS 419 (or GLONASS or other global navigation system) receiver for obtaining information concerning the location and orientation (e.g., portrait or landscape) of device 104.

It should be appreciated that device 104 is only one example of a multifunction device that may be used by end users when engaging with the secure mobile communications platform 200, and that device 104 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of device 100, such as CPU(s) 407 is, optionally, controlled by memory controller 468.

Peripherals interface 470 can be used to couple input and output peripherals of the device to CPU(s) 402 and memory 407. The one or more processors 402 run or execute various software programs and/or sets of instructions stored in memory 407 to perform various functions for device 102 and to process data.

In some embodiments, peripherals interface 470, CPU(s) 402, and memory controller 468 are, optionally, implemented on a single chip. In some other embodiments, they are, optionally, implemented on separate chips.

RF (radio frequency) circuitry 108 of network interface 420 receives and sends RF signals, also called electromagnetic signals. RF circuitry 108 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks 106. In some embodiments, circuitry 108 does not include RF circuitry and, in fact, is connected to network 106 through one or more hard wires (e.g., an optical cable, a coaxial cable, or the like).

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a user and device 104. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the device 104 optionally also includes one or more optical sensors 473. Optical sensor(s) 473 optionally include charge-coupled device (CCD) or complementary metal-oxide semiconductor (CMOS) phototransistors. Optical sensor(s) 473 receive light from the environment, projected through one or more lens, and converts the light to data representing an image. In conjunction with imaging module 431 (also called a camera module), optical sensor(s) 473 optionally capture still images and/or video. In some embodiments, an optical sensor is located on the back of device 104, opposite display system 408 on the front of the device, so that the touch screen is enabled for use as a viewfinder for still and/or video image acquisition. In some embodiments, another optical sensor 473 is located on the front of the device 104 so that the user's image is obtained (e.g., to verify the identity of the user, etc.).

As illustrated in FIG. 4, memory 407 of the remote user device preferably comprises:

- an operating system 473 (e.g., iOS, DARWIN, RTXC, LINUX, UNIX, OS X, WINDOWS, or an embedded operating system such as VxWorks) that includes procedures for handling various basic system services;
- a communications module 204-C for supporting bidirectional secure communication between the secure mobile communications platform 200, enterprise data sources 102 and remote user devices 104;
- an end user identifier 218 that uniquely identifies a user; and
- one or more primary communication channels 210 that the end user is participating in, and for each such primary channel 210, a unique enterprise data source identifier 374, enterprise data source name 376, a primary communication channel name 382, a primary communication channel description 384, an application programming interface access token 386, an application programming interface key 388, as well as one or more sub-channels 212 that the end user is participating in, each such sub-channel including an identifier of the conversation 2220 that the end user is participating in, a sub-channel unique identifier 394, an API access token 396, an API key 398, a sub-channel name 310, and/or a sub-channel description 312.

As such, FIGS. 1 through 4 exemplarily illustrate a business to consumer architecture of a channel based bidirectional communication and transaction system (secure mobile communications platform "SMCP" 48) for facilitating channel based communication and transactions with consumers in real time. In some embodiments, the SMCP 48 is accessible by consumers, using their remote user devices 104, via an ionic framework comprising a web browser application that implements, for example, the hypertext markup language 5 (HTML5) content presentation technology, or a mobile application installed on consumer devices, for example, tablet computing devices such as the iPhone® of Apple Inc., Android devices, WINDOWS® devices of Microsoft Corporation, BLACKBERRY® devices of BlackBerry Limited, etc. Referring to FIG. 3, the SMCP 48 provides a communications module 204-E that provides a graphical communication interface comprising a public business application programming interface for enterprise data sources to communicate with users (e.g., consumers), and referring to FIG. 4, a communication module 204-C for users (e.g., consumers) to communicate with the enterprise data sources 102. The enterprise data sources 102 (e.g., business entities) publish messages, for example, text messages, audio messages, video messages, images, etc., to consumers via the communications module 204-E. The users (e.g., consumers) can subscribe to offers provided by the enterprise data sources 102 (e.g., business entities) and transmit messages associated with multiple topics to the enterprise data sources 102 via the communications module 204-C.

Figure 5A:
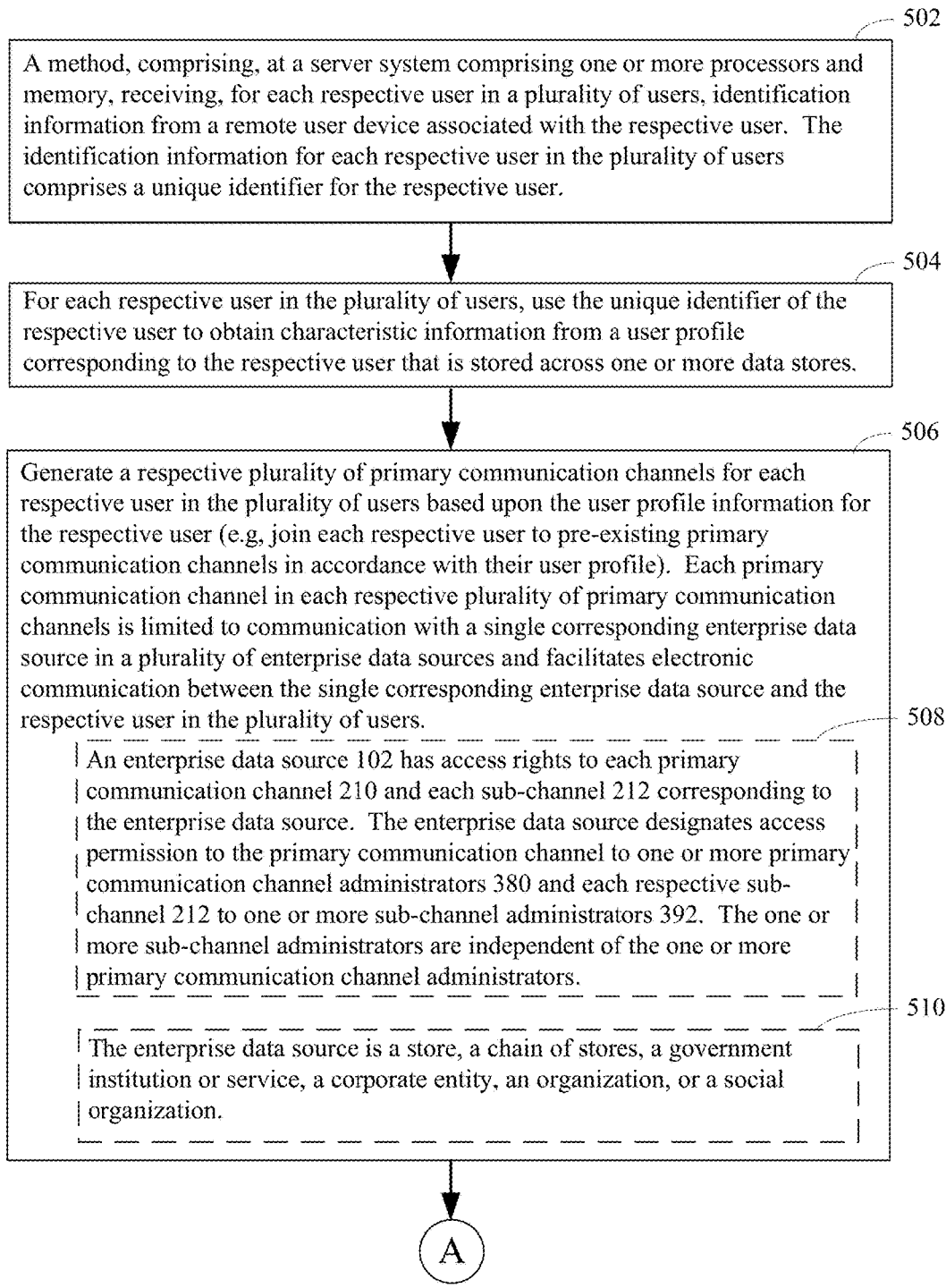

Now that details of a SMCP 48 that provides enterprise data sources as primary communication channels in searchable catalogs has been described, a flow chart of processes and features of the system, in accordance with an embodiment of the present disclosure, are disclosed with reference to FIGS. 5A through 5P.

Block 502.

One aspect of the present disclosure provides a method performed at a secure mobile communications platform 200 (e.g. server system) comprising one or more processors and memory in which there is received, for each respective user in a plurality of users, identification information from a remote user device 104 associated with the respective user. The identification information for each respective user in the plurality of users comprises a unique identifier 218 for the respective user. In some embodiments the unique identifier 218 is a unique identification number assigned to the user after the user has enrolled with the secure mobile communications platform. In some such embodiments, the user does not have access to the unique identifier 218. For instance, in some embodiments, the user chooses a login and enrolls in the secure mobile communications platform 200 whereupon the user is assigned the unique identifier 218 which is stored on the user device 104 associated with the user and/or in the profile associated with the user. In some instances, the unique identifier 218 is stored in an encrypted format. Then, when the user logs into the secure mobile communications platform 200, the unique identifier 218 is automatically sent to the secure mobile communications platform 200 (or retrieved from the user's profile) as part of the login in process of block 502. In some alternative embodiments, the unique identifier is a login chosen by the user and assigned to the user once the uniqueness of the login has been verified (e.g., no other user has already chosen the login and the login is deemed to be robust enough to serve as a login).

Figure 6:
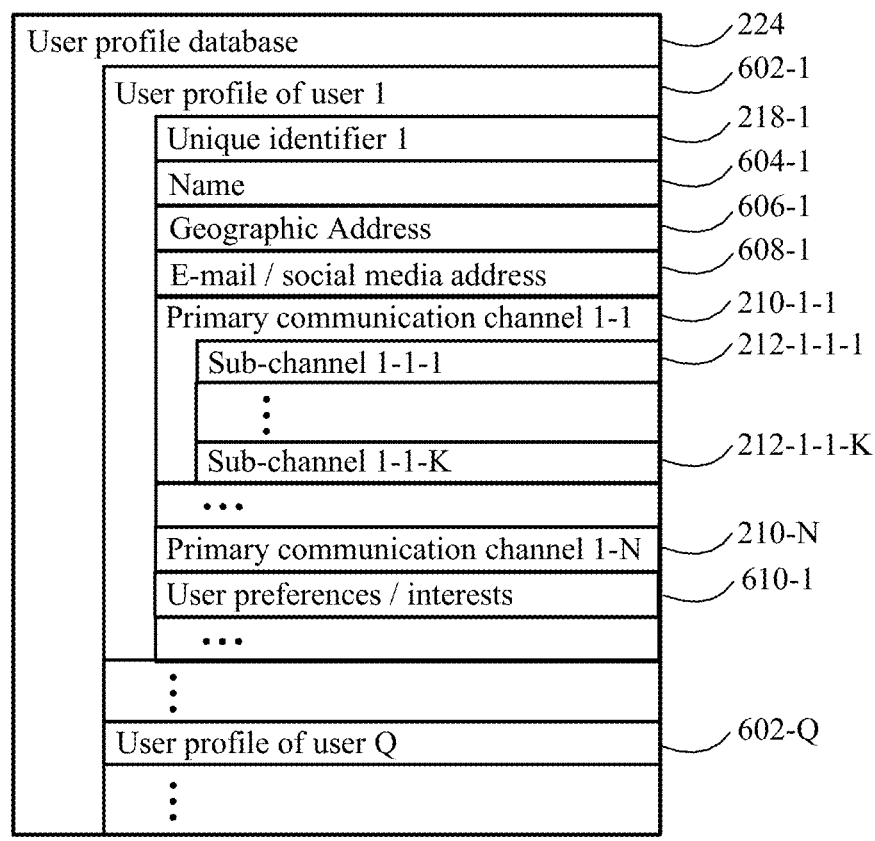
FIG. 6 illustrates an example user profile database in accordance with some embodiments of the present disclosure.
Figure 9:
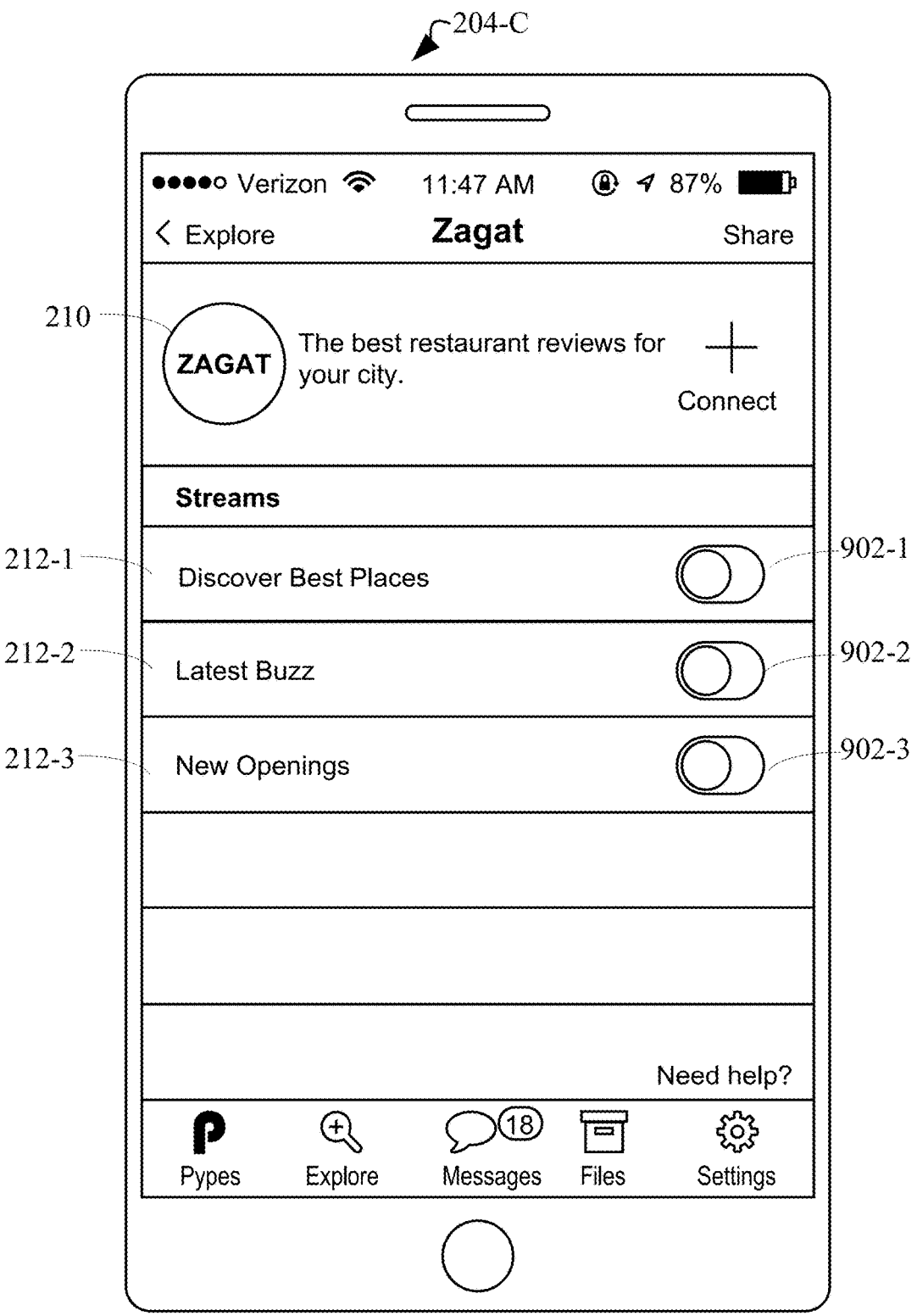
FIG. 9 illustrates a user interface that enables a user to select which sub-channels of a primary channel are invoked in accordance with an embodiment of the present disclosure.
Figure 18:
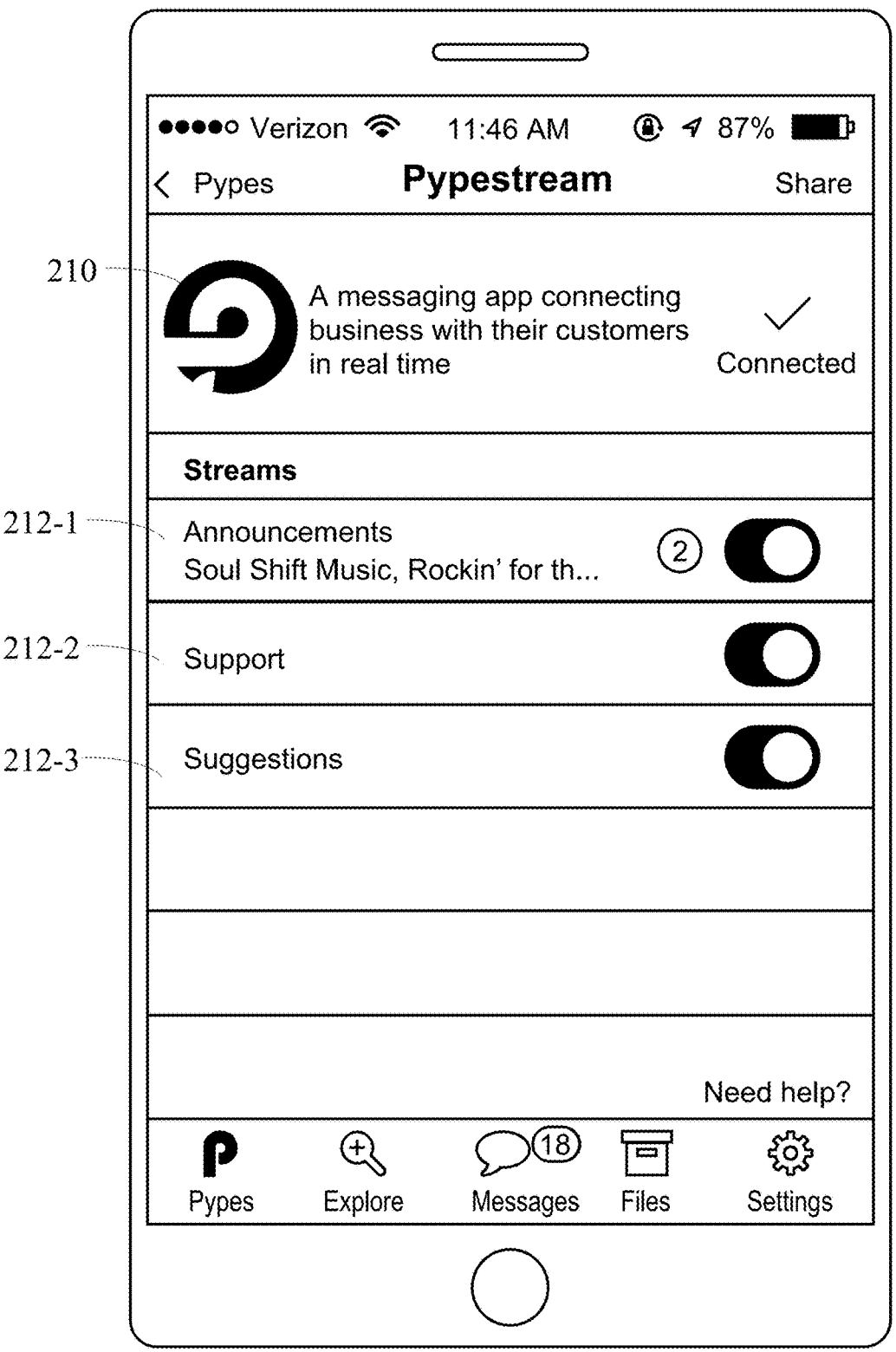
FIG. 18 and FIG. 19 each illustrate a user interface that enables a user to select which sub-channels of a primary channel are invoked in accordance with an embodiment of the present disclosure.
Figure 19:
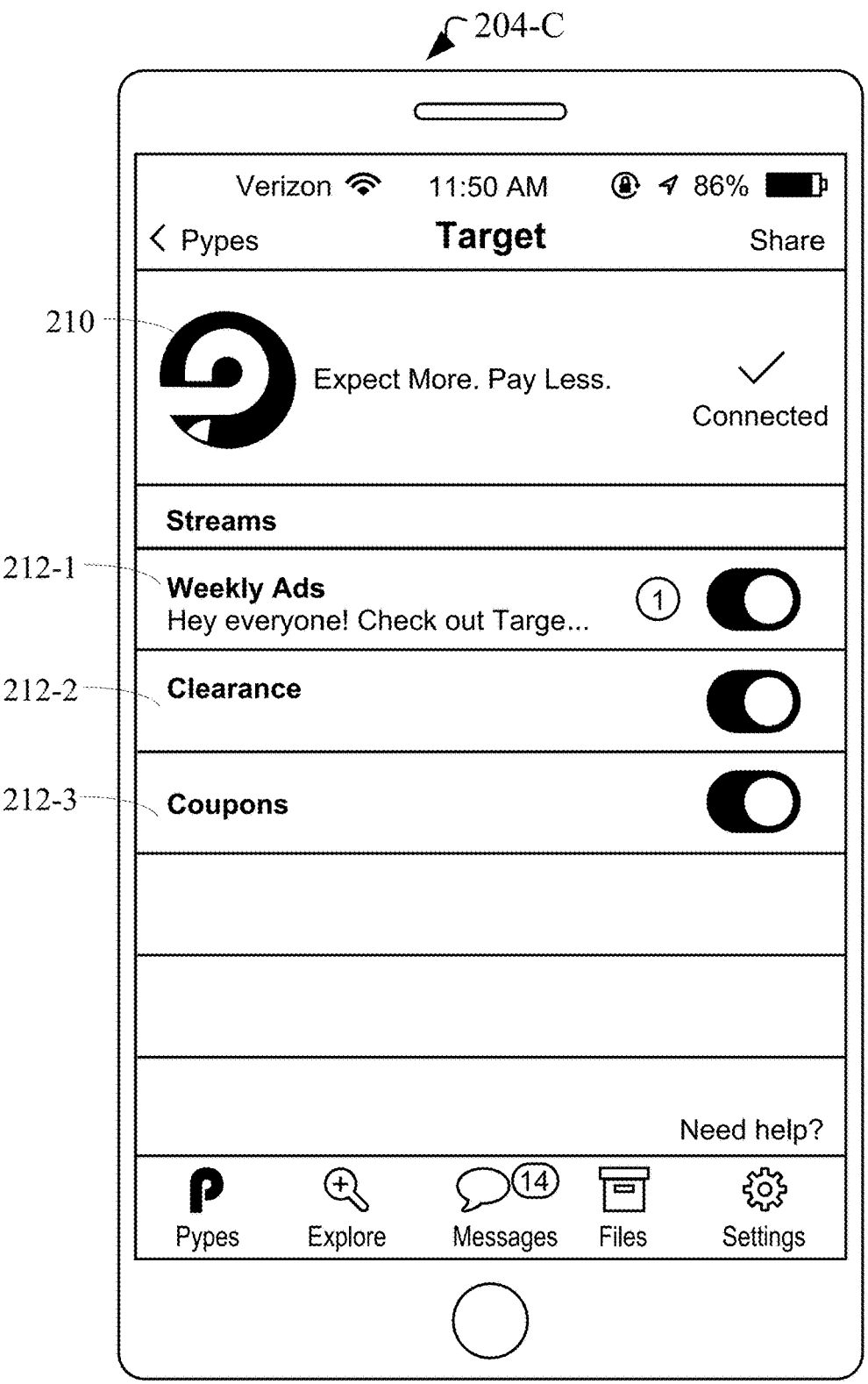
Figure 20:
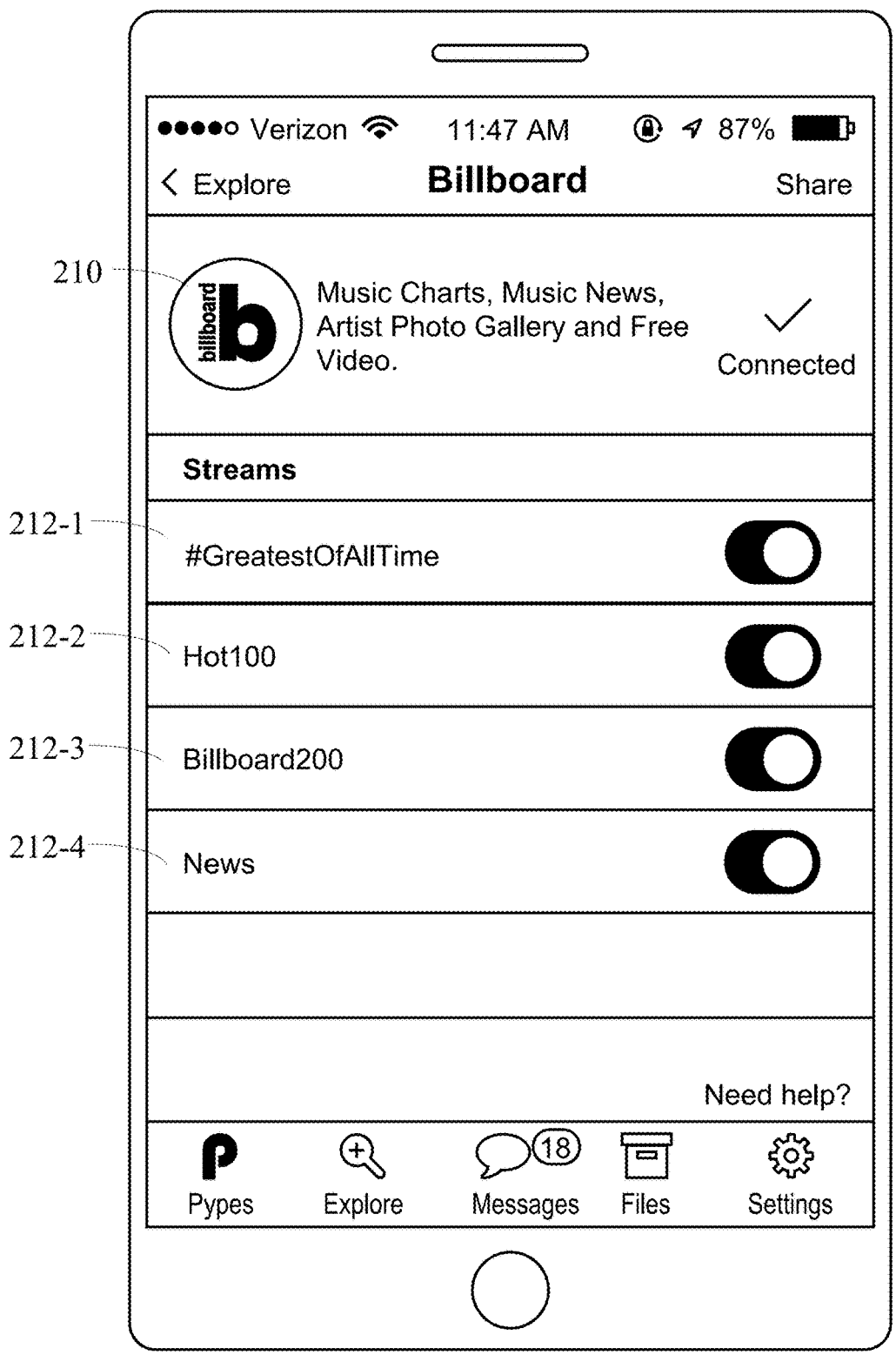
FIG. 20 illustrates a communication module which provides several different application programming interface functions in accordance with an embodiment of the present disclosure.

Turning to block 504, for each respective user in the plurality of users, the unique identifier of the respective user is used to obtain characteristic information from a user profile corresponding to the respective user that is stored across one or more data stores. The secure mobile communications platform 200 retrieves characteristic information of each of the users (e.g., consumers, also referred to herein as "end users") using the unique identifier from one or more databases (e.g., user profile database 224), for example, by performing a database lookup based on the unique identifier. In some embodiments, the characteristic information comprises, for example, demographic information, consumer preferences on different subjects or topics, location information, etc., of each of the users. For instance, referring to FIG. 2, in some embodiments, user profiles are stored in user profile database 224 of secure mobile communications platform 200. However, in alternative embodiments the user profile is stored on the remote user device 104 (e.g. in encrypted format). FIG. 6 provides more details of a user profile database in accordance with some embodiments of the present disclosure. In the user profile database 224, a user profile 602 is stored for each user. In some embodiments, a user profile 602 for a respective user includes the unique identifier 218 of the user (e.g., a contact number of the user), the name 604 of the user, the geographic address (e.g., street address) 606 of the user, as well as one or more E-mail and/or social media addresses of the user. Further, the profile details the primary communication channels 210 to which the user has subscribed. For those primary communication channels 210 in which the user is able to select which sub-channels 212 are invoked, a description of the sub-channels the user has invoked are also included in the profile of the user 602. Such a situation is illustrated in FIG. 9 where the primary channel 210 associated with the enterprise data source "ZAGAT" is illustrated and the user is able to turn off and on the sub-channels "Discover Best Places" 212-1, "Latest Buzz" 212-2, "and "New Openings" 212-3. In some instances, the user does not get to select which sub-channels 212 of a primary communication channel are invoked and in such instances information regarding sub-channels 22 for such primary communication channels 210 is not stored in the user profile. FIGS. 18, 19, and 20 provide additional examples of this feature. In some embodiments, the user profile of a user additionally stores the identifier of each conversation in each sub-channel that the user is presently participating in.

Turning to block 506 of FIG. 5A, as part of the user login process, a respective plurality of primary communication channels 210 is generated for each respective user in the plurality of users based upon the information stored in the user profile 602 for the respective user.

Figure 7:
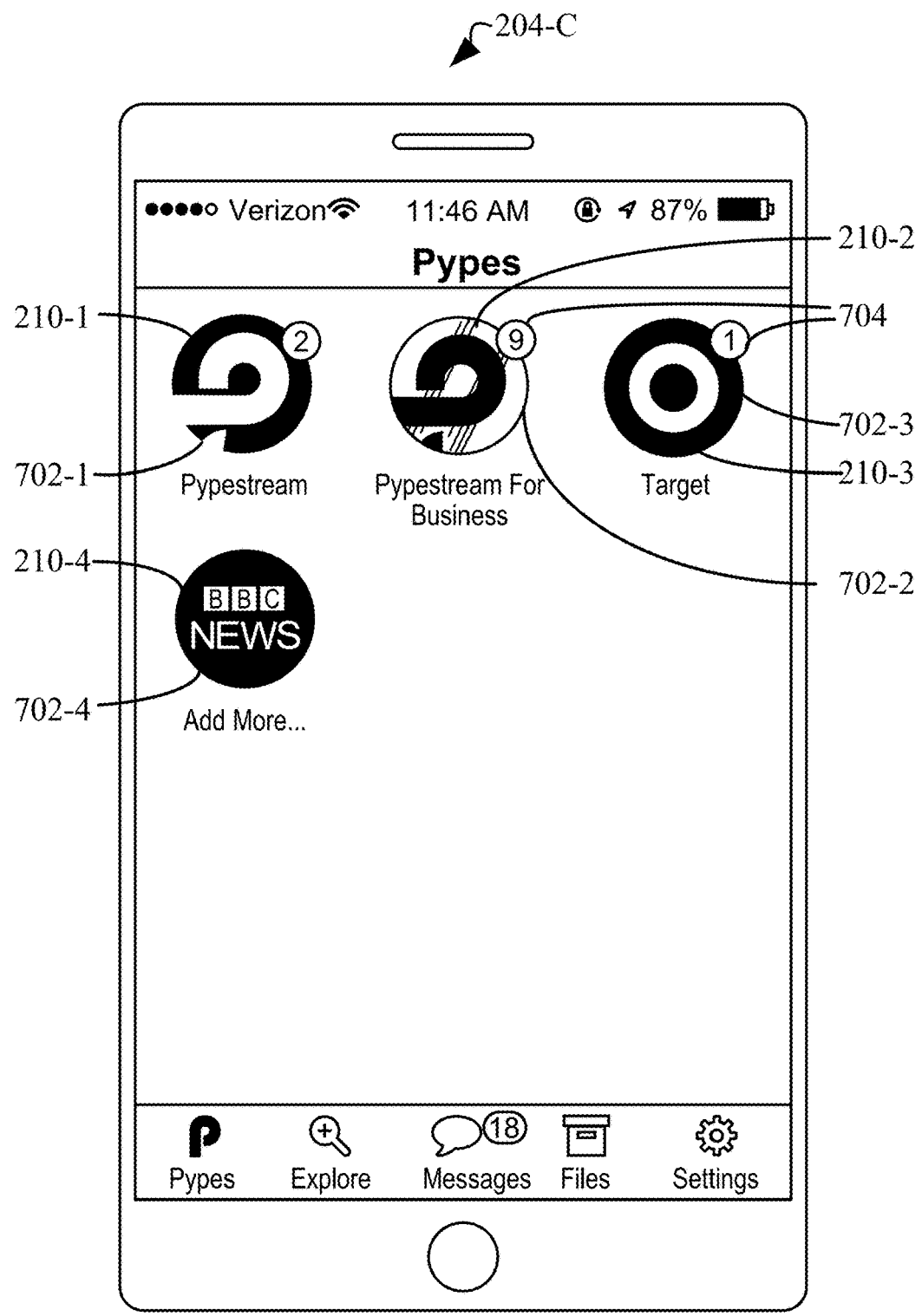
FIG. 7 provides an illustration of a graphical user interface running on a remote user device in accordance with some embodiments of the present disclosure.

In typical embodiments, these primary communication channels 210 already existed, with other users connected to them, and the generating involves joining the user to such primary communication channels 210. Each primary communication channel 210 in each respective plurality of primary communication channels (1) enables one-to-one communication between a corresponding enterprise data source 102 in a plurality of enterprise data sources and a respective user in the plurality of users and (2) facilitates electronic communication between the single corresponding enterprise data source 102 and the single respective user. For instance, user A associated with remote user device 104-1 logs into the secure mobile communications platform 200. As part of the login process, the user profile of the user 602 is obtained. From the user profile 602, a list of primary communication channels 210 that the user is associated with is obtained. Each of these primary communication channels 210 is generated (e.g., activated). In some embodiments, no action takes place when generating the plurality of communication channels 210 other than to display a representation of these channels on the display of the corresponding remote user device. For instance, referring to FIGS. 7 and 17, generating the plurality of primary communication channels for a first user involves displaying an icon for each of the primary channels. In particular, FIGS. 7 and 17 each provide an illustration of a graphical user interface 702 provided by communication module 204-C on a remote user device 104 after completion of block 506 in accordance with some embodiments of the present disclosure. An icon 702 is provided for each primary communication channel 210. Such primary communication channels 210 are interchangeably referred to herein as "Pypes." Further, it is quite likely that a number of other users are already engaged with these primary communication channels 210 when the first user log in.

Sub-channels 212 are interchangeably referred to herein as "Streams."

If there has been communication (e.g., messages from the corresponding enterprise data source) posted to a sub-channel associated with a given primary channel for a given user (e.g., posted to the conversation associated with the user in the sub-channel) since the last time that user has logged in, a count icon 704 is displayed that numerically indicates the number of such messages that have been posted to the sub-channels of that primary channel since the last time the user has checked the sub-channels. For instance, referring to FIG. 7, two messages have been posted on conversations in the sub-channels for the primary channel "Pypestream" since that last time the user has opened the icon for that primary channel on the remote user device 104. Further referring to FIG. 7, a message has been posted in a conversation on one of the sub-channels for the primary channel "Target" since that last time the user has opened the icon for "Target" on the remote user device 104.

In typical embodiments, although each primary communication channel 210 enables one-to-one communication between the corresponding enterprise data source and a respective user and (2) facilitates electronic communication between the single corresponding enterprise data source and the respective user, messages are not typically communicated between the enterprise data source 102 and the remote user devices 104 on the primary communication channel 210. Rather, sub-channels 212 associated with the primary channel 210 are used for this purpose as discussed in further detail below.

Figure 13:
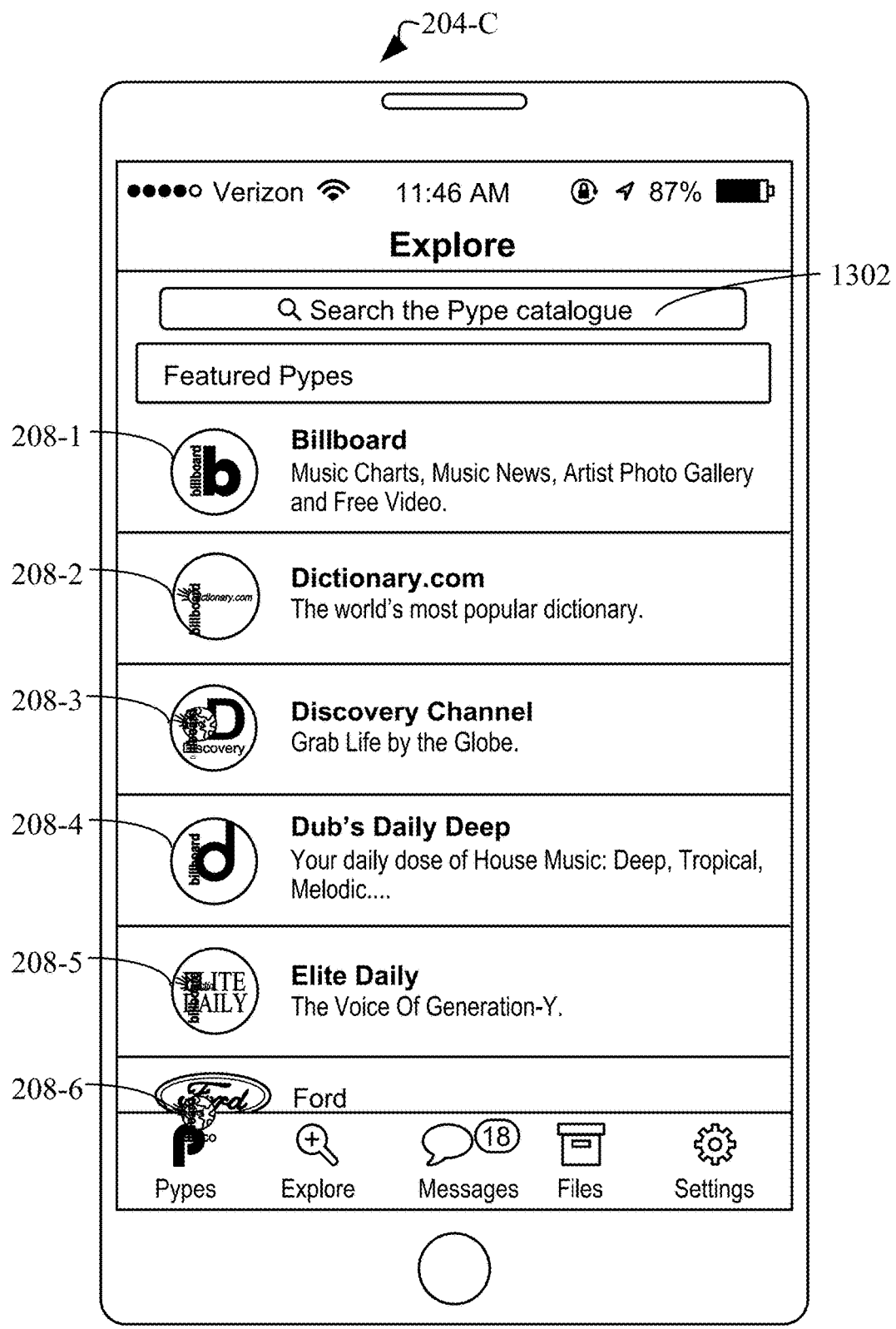
FIG. 13, FIG. 14, and FIG. 15 illustrate how a user, at a remote user device, may peruse a description of available enterprise data sources obtained from a catalog and request to establish a primary channel with a selected enterprise data source in accordance with an aspect of the present disclosure.
Figure 14:
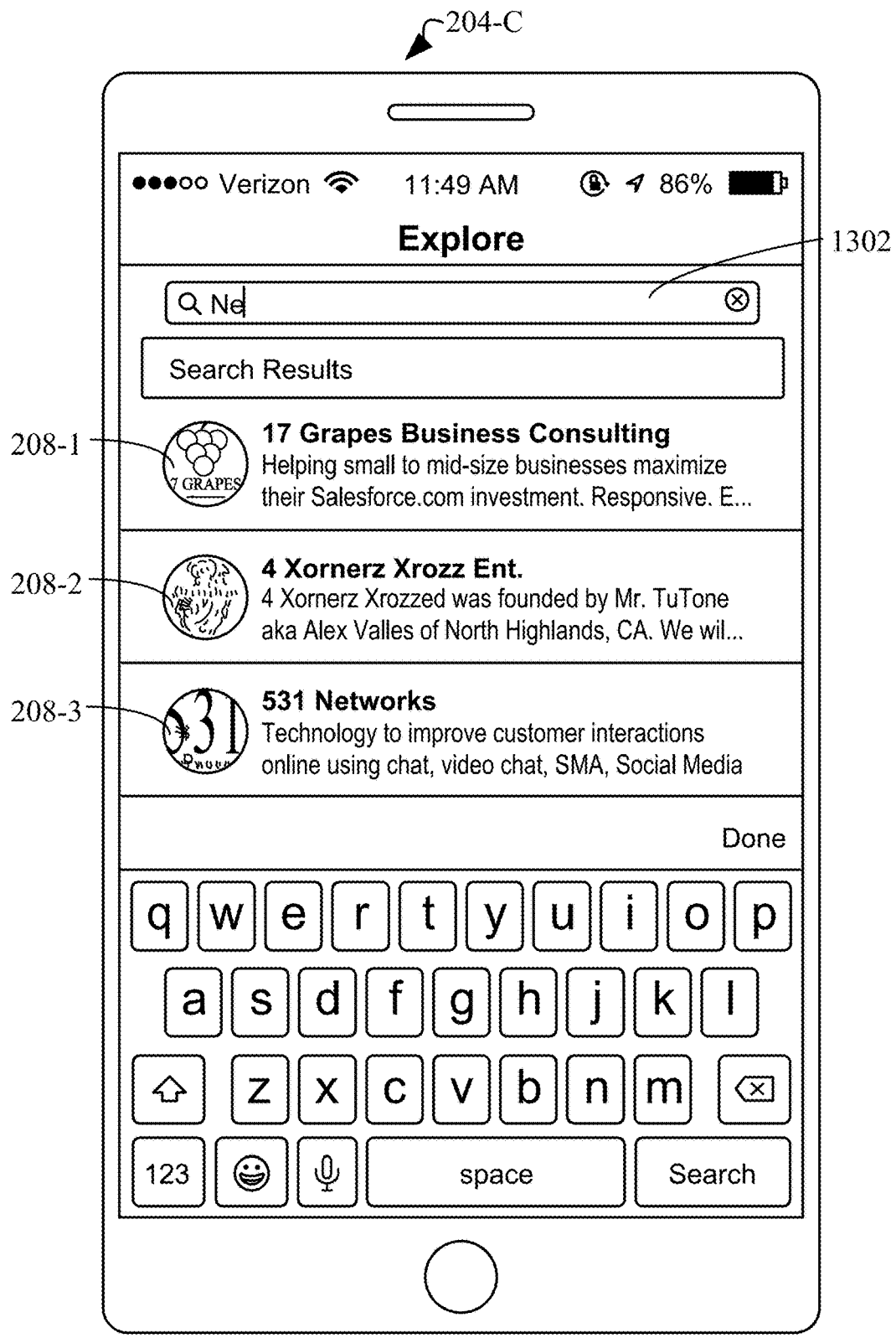
Figure 15:
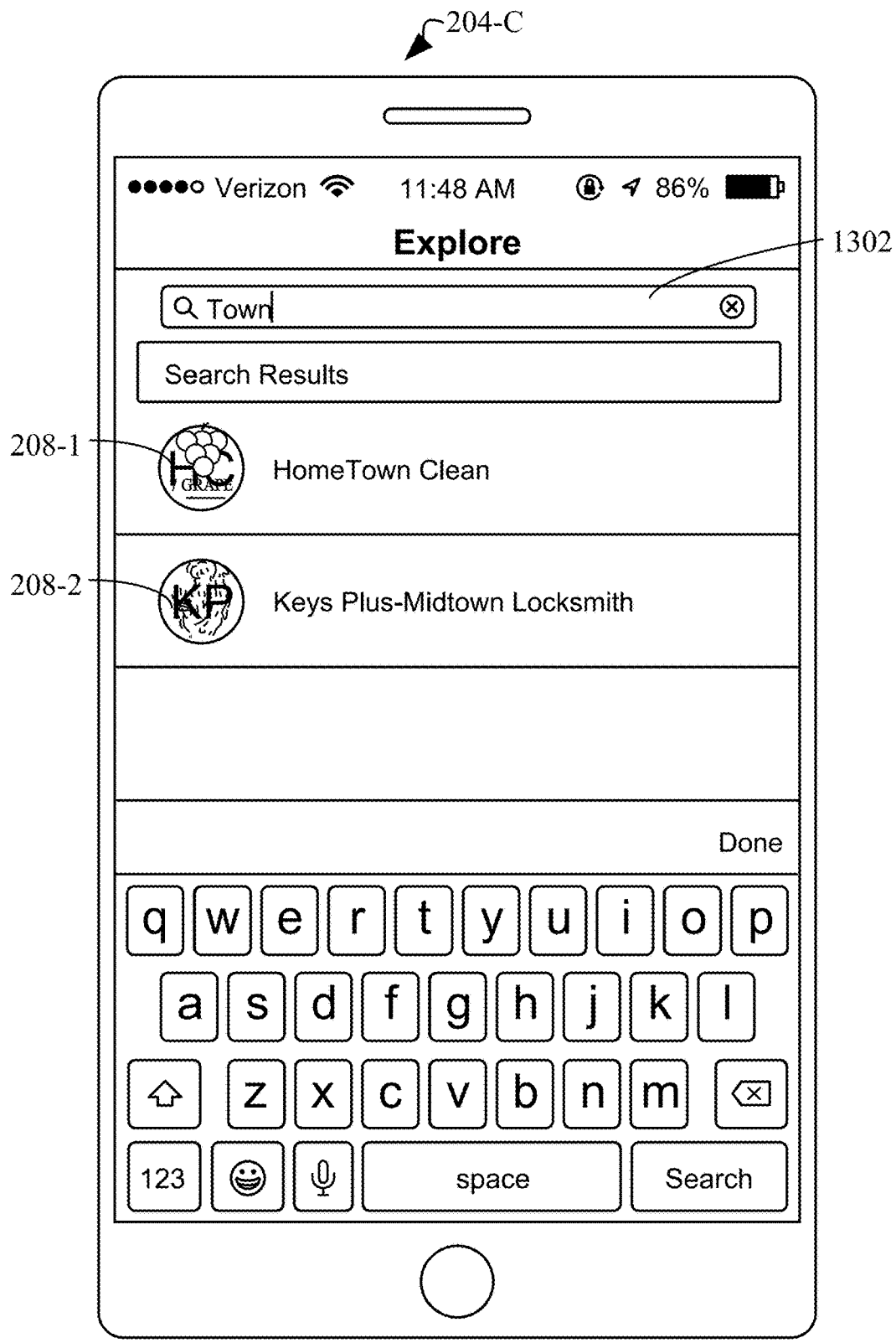

To build the profile of primary channels associated with a user, the user can request to establish a primary channel 210 with any enterprise data source 102 (e.g. business entity) by using the secure mobile security platform 200. In an embodiment, referring to FIGS. 13, 14 and 15 for illustration, at a remote user device 104, the client side version of communications module 204-C lists a description 208 of available enterprise data sources 102 obtained from catalog module 206 of the secure mobile security platform 200. Further, a user may enter an alphanumeric query for enterprise data sources 102 of interest using prompt 1302. Referring to FIGS. 14 and 15, as the user enters the alphanumeric query, enterprise data sources 102 from the digital catalog 206 that match the partial query are displayed. In this way, users can search through the digital catalog 206 and request to establish (e.g., join) a primary channel 210 with a selected enterprise data source 102. In some embodiments, the secure mobile communications platform 200 generates revenue by charging each enterprise data source 102 (e.g., business entity) a fee, for example, a monthly fee for listing them in the digital catalog 206.

Referring to block 508, in some embodiments, an enterprise data source 102 has access rights to each primary communication channel 210 and each sub-channel 212 corresponding to the enterprise data source. The enterprise data source designates access permission to the primary communication channel to one or more primary communication channel administrators 380 and each respective sub-channel 212 to one or more sub-channel administrators 392. The one or more sub-channel administrators are independent of the one or more primary communication channel administrators.

FIG. 8 illustrates a non-limiting example of a portion of an enterprise data source description 208 that is stored in the catalog module 206 of secure mobile communications platform 200 for each enterprise data source 102 in some embodiments. As illustrated in FIG. 8, the enterprise data source description 208 includes an enterprise data source identifier 374 (e.g., "business identifier") that uniquely identifies the enterprise. In some embodiments the identifier 374 is a unique number or expression associated with the corresponding enterprise data source 102. As illustrated in FIG. 8, the enterprise data source description 208 includes an enterprise data source name 376 for the enterprise data source 102. The enterprise data source name 376 is the name that is displayed to users of remote user devices 104. The enterprise data source description 208 further includes a super administrator identifier 378 for the enterprise data source 102. The super administrator is able to participate in the primary channel 210 and each of the sub-channels 212 associated with the enterprise data source 102. The enterprise data source description 208 further includes an identification of the primary communication channel administrators 380 for the enterprise data source 102. Each such primary communication channel administrator is able to participate in the primary channel 210 associated with the enterprise data source 102. The enterprise data source description 208 further includes an identification of the sub-channel administrators 392 for the primary channel 210 for the enterprise data source 102. Each such sub-channel administrator is able to participate in the one or more designated sub-channels associated with the enterprise data source 102. In some embodiments, as illustrated in FIG. 8, the identity of the super administrator 378, primary communication channel administrators 380, and sub-channel administrators 392 are independent of each other. For instance, the super administrator(s) 378 may be the same or different person(s) than the primary communication channel administrators 380 which, in turn, may the same or different persons than the sub-channel administrators 392.

Referring to block 510 of FIG. 5A, in some embodiments an enterprise data source 102 is a store, a chain of stores, a government institution or service, a corporate entity, an organization, or a social organization.

As discussed above, each primary channel 210 includes one or more sub-channels. During the login process, the sub-channels 212 of the primary channels associated with a user are generated. In other words, referring to block 512 of FIG. 5B, there is generated, for each respective primary communication channel 210 in at least a subset of the plurality of primary communication channels of a first user in the plurality of users, a corresponding plurality of sub-channels 212 based upon the user profile information for the first user automatically without human intervention. In typical embodiments, these sub-channels 212 already existed, with other users connected to them, and the generating involves adding a conversation to the sub-channel between the user and the enterprise data source that other users may not participate in.

Each of the plurality of sub-channels forms a corresponding hierarchical tree in which the corresponding primary communication channel is a root node and the plurality of sub-channels are child nodes. FIG. 9 illustrates such a hierarchical tree. The primary channel 210 "Zagat" is the root node and the sub-channels "Discover Best Places" 212-1, "Latest Buzz" 212-2, and "New Openings" 212-3 are child nodes. At least one sub-channel in each of the corresponding hierarchy of sub-channels enables secure bidirectional conversation between (i) a remote user device 104 associated with the first user and (ii) the enterprise data source 102 associated with the primary communication channel 210 of the corresponding hierarchical tree, thereby facilitating secure exchange of a plurality of messages between the corresponding enterprise data source 102 and the remote user device 104 associated with the first user within the at least one sub-channel 212. Each such conversation includes only a single user associated with a remote user device 104 although a sub-channel may host any number of conversations, each such conversation between the corresponding enterprise data source and a respective user.

Figure 10:
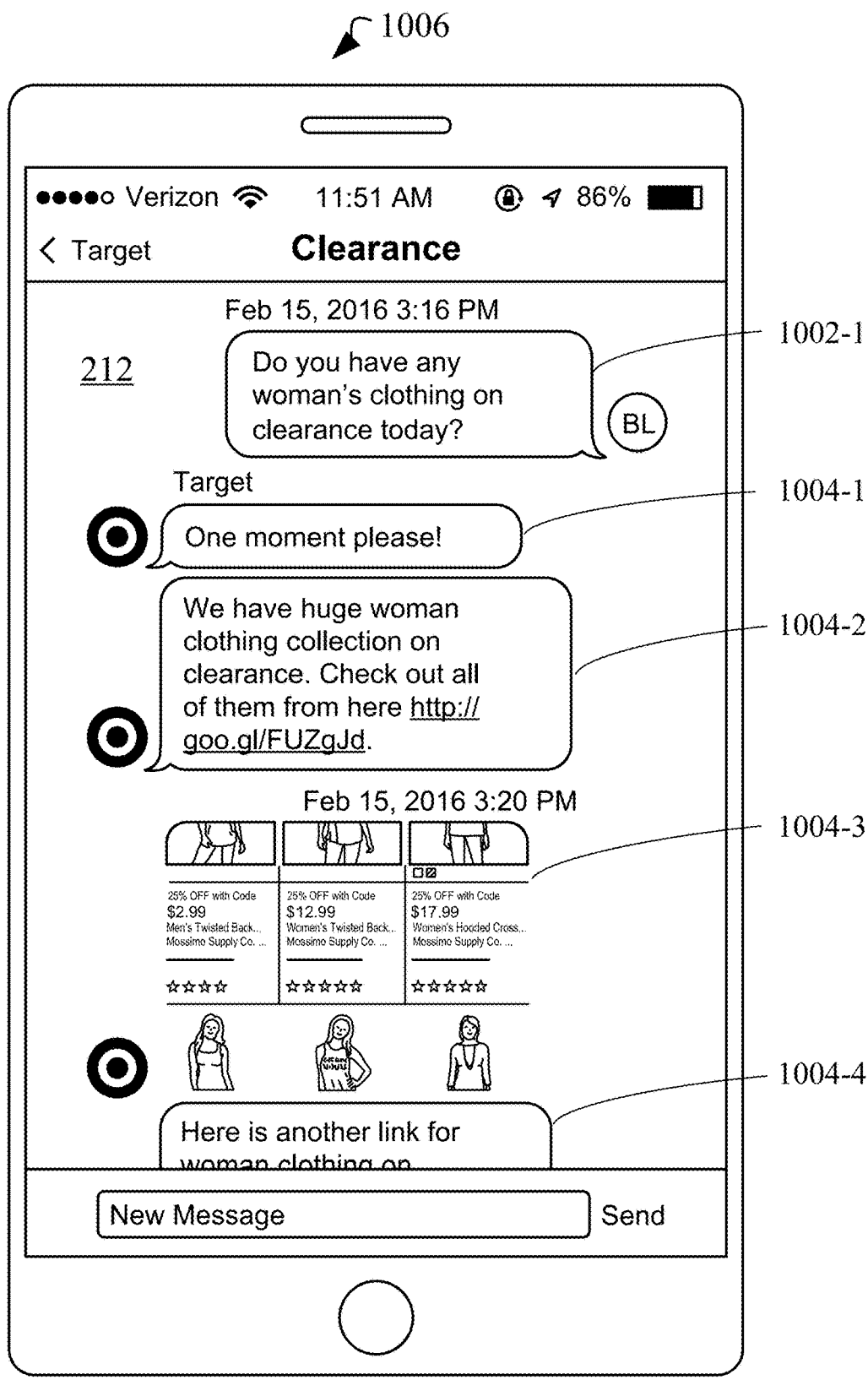
FIG. 10 illustrates the secure bidirectional communication that occurs on one such sub-channel in accordance with an embodiment of the present disclosure.

FIG. 10 illustrates the secure bidirectional communication that occurs on one such sub-channel 212 in the form of a conversation. Message 1002 originates from the user associated with a particular remote user device 104. This message is communicated in the sub-channel 212 to the corresponding enterprise data source 102. The enterprise data source 102 responds to message 1002 with messages 1004, which are routed only to the particular remote user device 104 that originated message 1002. That is, messages in the sub-channel illustrated in FIG. 10 are limited to the particular associated remote user device 104 and the particular enterprise data source associated with the sub-channel.

As illustrated in FIG. 10, the communications module 204-C operating on remote user device 104 renders a graphical communications interface 1006, for example, in an electronic mail (email) layout on the remote user device 104 for enabling bidirectional communication of messages and content between the user and the enterprise data source 102 in real time through a sub-channel 212. The content comprises, for example, one or more of messages (e.g., messages 1002-1, 1004-1, 1004-2, and 1004-4 of FIG. 10) image content (e.g., image 1004-3 of FIG. 10), audio content, video content, audiovisual content, multimedia content, animations, digital content, email content, voicemail content, document content, files, etc., and any combination thereof. As illustrated in FIG. 10, the graphical communications interface 1006 combines a peer to peer chat application with an email layout on the consumer device to create the graphical communication interface. In some embodiments, the secure mobile communication platform 200 encodes each of the messages and the content using strong encryption technologies, for example, public-key cryptography with a private key such as a personal identification number (PIN) and a two-factor authentication, and facilitates a secure transmission and a secure reception of the messages and the content through the sub-channel 210 via the rendered graphical communication interface 1006. As used herein, "public-key cryptography" refers to a class of cryptographic algorithms that requires a private key and a public key. Also, as used herein, "two-factor authentication" refers to an unambiguous identification of a user using a combination of two different components which a user knows or possesses. In an embodiment, the secure mobile communications platform 200 securely stores the encoded messages and the encoded content in one or more databases and/or in the consumer devices. The secure mobile communications platform 200 uses different types of encoding methods for secure storage and secure transmission of the messages and the content. In an embodiment, the secure mobile communications platform 200 offers different levels of security based on a user's security needs. For example, the secure mobile communications platform 200 provides a RSA® hardware certificate, a RSA SECURID® of the EMC corporation, or a one-time key or token to consumers who require a high level of security. In an embodiment, the secure mobile communications platform 200 receives and sends requests for establishing primary communication channels 210 between enterprise data sources 102 and users via the communications module 204-C of FIG. 4.

Figure 11:
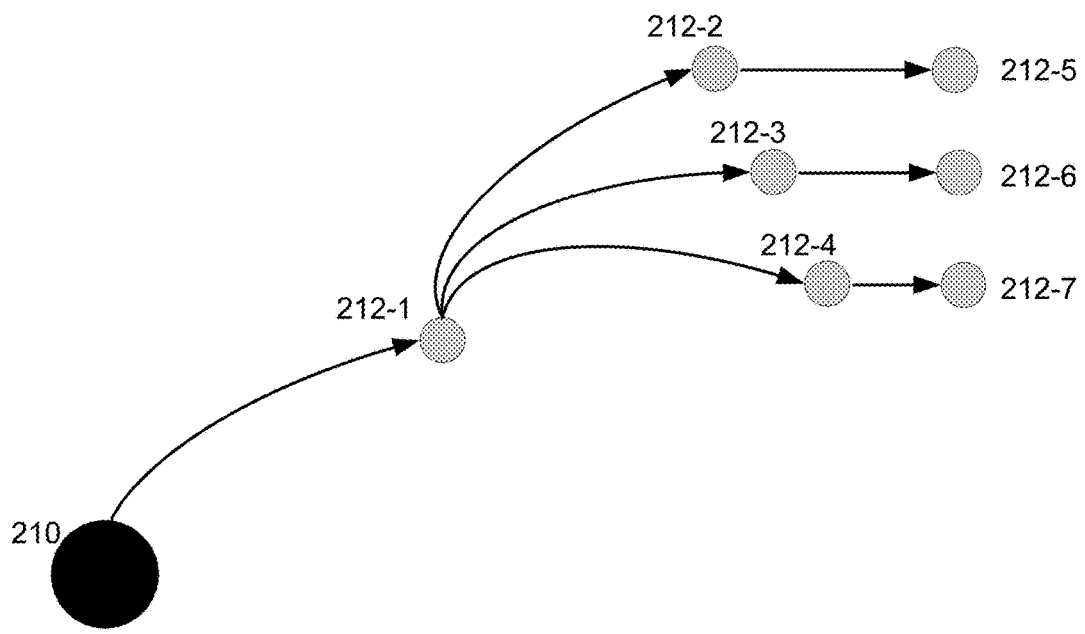
FIG. 11 illustrates a hierarchical tree in which the primary communication channel 210 is a root node and the plurality of sub-channels are child nodes, in which the hierarchical tree has a depth of four.

Referring to block 516, in some embodiments a depth of the hierarchical tree associated with a primary communication channel in the plurality of primary communication channels is N, where N is a positive integer greater than one (e.g., N is 2, 3, 4, or greater than 4). FIG. 10 illustrates a hierarchical tree with a depth of two, where the primary channel 210 is the root node and each of the sub-channels 212 are direct child nodes to the primary channel. However, the present disclosure is not so limited. For instance, some sub-channels 212 may be child nodes to other child nodes 212 leading to hierarchical trees with depths of 3 or greater. FIG. 11 illustrates a hierarchical tree in which the primary communication channel 210 is a root node and the sub-channels in the plurality of sub-channels 212 are child nodes, in which the hierarchical tree has a depth of four. Sub-channels 212-5, 212-6, and 212-7 are respective child nodes to sub-channels 212-2, 212-3, and 212-4 which, in turn, are respective child nodes to sub-channel 212-1 which, in turn, is a sub-node to primary channel 210. In the hierarchical tree illustrated in FIG. 11, secure bidirectional communication occurs between (i) a remote user device 104 associated with the first user and (ii) the enterprise data source 102 associated with the primary communication channel 210 of the corresponding hierarchical tree on one or more of the sub-channels 212.

Thus, in typical embodiments, the secure mobile communications platform 200 generates one or more sub-channels 212 from each of the established primary channels 210 associated with each user's unique identifier based on the received characteristic information for communicating with each of the users and for facilitating one or more transactions with each of the consumers within the generated sub-channels 212. The secure mobile communications platform 200 provides complete transaction support inside a sub-channel 212. Using the secure mobile communications platform 200, enterprise data sources 200 (e.g., business entities) can establish one or more primary communication channels 210 with their users (e.g., consumers), after which sub-channels 212 covering different subjects and topics and offering transaction services can be established once the users have opted in to particular sub-channels 212. Within each sub-channel, a user, participating in a private (secure) conversation with the enterprise data source can reply to a transaction message, for example, an electronic commerce (e-commerce) offer message by purchasing the ecommerce offer as disclosed in the examples below. The secure mobile communications platform 200 implements e-commerce using one or more payment infrastructures, for example, STRIPE® of Stripe, Inc., PAYPAL® of PayPal, Inc., etc.

Consider an example where an enterprise data source 102 (e.g., business entity) such as the STARWOOD® Hotel of Starwood Capital Group LLC, with a promotions team establishes a primary channel 210 with a consumer (e.g., user). The secure primary communications platform 200 retrieves characteristic information of the consumer (e.g., user profile 602 of the user) from one or more databases (e.g., user profile database 224) using the consumer's unique identifier 218, for example, the consumer's contact number. The consumer indicates, e.g., through user preferences/interests 610 in their user profile 602 of FIG. 6, an inclination to avail themselves of exclusive offers, for example, exclusive deals and exclusive packages, from the STARWOOD® Hotel via the established primary channel 210. The secure mobile communication platform 200 generates a sub-channel 210 for exclusive offers named, for example, "Special", and the promotions team of STARWOOD® Hotel sends the exclusive deals and the exclusive packages with discounts to the consumer via a conversation in the sub-channel 212. The secure mobile communication platform 200 allows the user (e.g. consumer) to perform a transaction, for example, buying of an exclusive package based on an exclusive deal within the generated sub-channel 212 using one or more payment infrastructures. Because other users cannot participate in the conversation, the transaction cannot be repudiated and privacy is ensured.

Using the secure primary communications platform 200 (e.g., channel based communication and transaction system) any enterprise data source 102 (e.g., business entity) can offer an electronic commerce channel or an electronic shopping channel. Through this electronic commerce channel or electronic shopping channel, the secure primary communications platform 200 allows the enterprise data source 102 to send deals and packages to a user (e.g., consumer) in real time, and allows the consumer to make purchases therewithin. Consider an example where an enterprise data source 102, for example, the W® Miami Hotel of Starwood Hotels & Resorts Worldwide, Inc., offers a three-night package for $500 to the first 500 consumers who opt in to purchase the package. The W® Miami Hotel establishes a primary channel 210 with each of the users (e.g., consumers) via the secure primary communications platform 200. If the consumers indicate an inclination to avail offers from the W® Miami Hotel via the established primary communication channel, the secure primary communications platform 200 generates a sub-channel 212, for example, an eShop sub-channel (by adding a conversation to the sub-channel for the user) and transmits a communication of the three-night package for $500 through this conversation hosted on the eShop sub-channel. Furthermore, the secure primary communications platform 200 facilitates a transaction service within the eShop sub-channel 212, when the consumer opts in to buy the three-night package, thereby facilitating a transaction or trading of the three-night package within the eShop sub-channel in real time. In an embodiment, the secure primary communications platform 200 identifies a new user (e.g., consumer) based on a location of the remote user device 104 associated with the new user, for example, via a positioning system and sends a hotel deal to the new user for a night stay using the sub-channel 212. In an embodiment, the secure primary communications platform 200 generates revenue from a percentage of a transaction amount associated with each transaction made within the sub-channel 212.

The secure mobile communication platform ("SMCB") 200 provides a spam free communication experience to users (e.g., consumers) as the SMCB 200 does not allow transactions to be performed in the primary channel 210 in typical embodiments. In an embodiment, the SMCB 200 provides a channel permissions mechanism that sets a semaphore flag for the sub-channel 212, for example, to true or false. By design, the SMCB 200 does not allow or display transactions in the primary communication channel. The SMCB 200 provides access control lists (ACLs) to enterprise data sources 102 for fine grained control of what can occur in the primary channel 210 or the sub-channels 212. For instance, in the example described above for the W® Miami Hotel, the SMCB 200 sends deals and packages through conversations hosted by the eShop sub-channel 212. If a user receives an offer in a non-eShop sub-channel, then that would be considered as spam, which is prevented by the SMCB 200. The SMCB 200 does not send messages or chats in the primary channel 210. The SMCB 200 sends general information related to the enterprise data source 102, for example, updated sub-channel news, names of new sub-channels, log or information tracking subscriptions to the sub-channels, disconnections from the sub-channels, etc., through the primary channel 210.

In another example, an enterprise data source 102 (e.g., business entity), for example, the EQUINOX® organization of Equinox Holdings, Inc., offers a discount on a package for spinning classes. The SMCB 200 establishes a primary channel 210 with a user (e.g., consumer) and transmits general information related to the enterprise data source 102 through the established primary channel 210. If the user indicates an inclination to avail themselves of offers from the EQUINOX® organization via the established primary channel 210, the SMCB 200 generates a sub-channel 212, for example, an eShop sub-channel (e.g. by adding a conversation to the eShop sub-channel between EQUINOX and the user), transmits a communication on the discounted package through the conversation in the eShop sub-channel, and provides a transaction service where the user can opt in to buy the discounted package via the eShop sub-channel 212. The SMCB 200 therefore generates and uses live, real time primary channels 210 and sub-channels 212 to deliver product and services to users (e.g., consumers) on a transaction basis.

In typical embodiments, an enterprise data source 102 uses the same sub-channel to communicate with multiple users. While the enterprise data source 102 can review messages sent by each of these users, each respective user cannot see messages sent by the enterprise data source 102 to other users nor can they see messages originated by other users. Accordingly, in some embodiments a first sub-channel 212 in the corresponding plurality of sub-channels associated with a respective primary communication channel 210 in the plurality of primary communication channels comprises (e.g. hosts) a first secure bidirectional conversation between (i) a first remote user device 104 associated with the first user and (ii) the enterprise data source 102 associated with the primary communication channel of the corresponding hierarchical tree, thereby facilitating secure exchange of the first plurality of messages. Moreover, the first sub-channel 212 comprises (e.g. hosts) a second secure bidirectional conversation between (i) a second remote user device associated with a second user and (ii) the enterprise data source associated with the primary communication channel of the corresponding hierarchical tree, thereby facilitating secure exchange of a second plurality of messages. The first user cannot see any of the messages in the second plurality of messages. The second user cannot see any of the messages in the first plurality of messages. The enterprise data source 102 can see all the messages in the first plurality of messages and the second plurality of messages.

In some embodiments, this above-described one-to-one aspect of the communication between a given enterprise data source 102 and respective users is imposed using application program interface ("API") keys and tokens, where the API key identifies a particular enterprise data source resource 102, such as a particular sub-channel 212 belonging to a particular enterprise data source resource 102 and the API token indicates the identity of source message or content. For instance, in such embodiments, when the enterprise data source 102 wishes to post content on a particular sub-channel 212, a content post request is made, which includes the message or content to be posted to the sub-channel 212. The post request further includes the API key thereby identifying the correct sub-channel 212 of the enterprise data source 102 and the API token, thereby identifying the originator of the content or message (here, the enterprise data source 102). In some such embodiments, the API token not only serves to identify the originator of the content, it also serves to designate what access privileges the originator of the content or message have over the sub-channel 212. In some embodiments, the post request will further include a chatroom identifier (e.g., conversation identifier) and/or chatroom consumer identifier (e.g., conversation user identifier). In typical embodiments, only one user will have access to such a chatroom (conversation), thereby establishing the one-to-one communication between an enterprise data source 102 and an end user.

In another illustrative embodiment, a first message in a first plurality of messages is posted by the enterprise data source 102, where the first message is (a) associated with an application programming interface key identifying the sub-channel of the enterprise data source and (b) a first application programming interface token identifying the first user. Further, a second message in the second plurality of messages is posted by the enterprise data source 102. The second message is associated with (a) the application programming interface key identifying the sub-channel of the enterprise data source and (b) a second application programming interface token identifying a second user associated with a second remote user device. In this example, the first application programming interface token and the application programming interface key are used to route the first message to the first remote user device within the sub-channel 212. The second application programming interface token and the application programming interface key are used to route the second message to the second remote user device within the sub-channel. Thus the first message is in a first conversation hosted by the sub-channel and the second message is in a second conversation hosted by the sub-channel.

FIG. 12 illustrates the format of an example post request in accordance with one aspect of the present disclosure. The post request includes a unique identifier representing a specific chatroom (conversation) 1202, the content of the message 1204, the content of the message if using controls 1206, the identifier of the author of the post 1208, the name of the author of the post 1210, a chatroom (conversation) identifier that identifies a chatroom (conversation) 1212 to which the message is to be posted, an identifier of the consumer (end user) of the message 1214, and optionally, an identifier of the administrator 1216 of the sub-channel 212 that is hosting the specific chatroom (conversation).

In some embodiments, messages posted on sub-channels are encrypted at the originating device (e.g., remote user device 104 or enterprise data source 102) using private information. For instance, if the message is posted by the end user, private information associated with the end user, or the end user's remote device, is used to encrypt the message. If the message is posted by the enterprise data source, private information associated with the enterprise data source is used to encrypt the message.

Referring to FIG. 5B, in some embodiments a sub-channel 212 in a hierarchy of sub-channels is associated with a sub-channel identifier, and an application programming interface key, and a message in the plurality of messages is sent in the sub-channel when the first user or the enterprise data source sending the respective message includes the sub-channel identifier, the application programming interface key, and an API key. The API key serves to specify the access rights of the message originator.

In some embodiments, each of the sub-channels 212 associated with a given enterprise data source 102 is used to perform a different customer service task. For instance, referring to FIG. 9, one sub-channel 212 may be used to offer a service such as "discovering best places," another sub-channel 212 may be used to offer the "latest buzz" while still another sub-channel 212 may be used to offer "new openings."

Each such sub-channel may host a number of conversations, each conversation between the enterprise data source and a different end user. The enterprise data source 102 is associated with (e.g., participates in) each of the conversations. Each conversation is with only a single user of a remote user device 104.

Referring to block 518 of FIG. 5B, in some embodiments, to ensure that each conversation in a plurality of conversations taking place on a single sub-channel 212 is secure, that is only the intended user can see messages in a conversation, the sub-channel 212 is associated with a sub-channel identifier and the conversation within the sub-channel is associated with an application programming interface key. A message is sent within (posted to) the conversation in the sub-channel when the user (associated with the remote user device 104) or the enterprise data source 102 (that is associated with the sub-channel) sending the respective message includes the sub-channel identifier, the application programming interface key, and an access token. The access token serves to identify the access rights of the message originator to the conversation.

Block 518 provides just one example of the use of API keys and tokens. In some embodiments of the present disclosure, API keys designate a number of operations available in the secure mobile communication platform 200, including but not limited to, defining an enterprise data source 102 within the secure mobile communication platform 200, defining each primary communication channel 210 associated with the enterprise data source 102, defining each sub-channel 212 associated with the enterprise data source, connecting a user to a primary communication channel 210, and so forth.

Each sub-channel 212 can be set up to access data in a manner that is independent of other sub-channels. Thus, referring to block 520, in an example embodiment, a first sub-channel 212 in the corresponding plurality of sub-channels associated with a respective primary communication channel 210 makes use of a first database (or other form of information such as an external system that accesses data) associated with the corresponding enterprise data source 102. For instance, this first database may be related to a payment system used by the enterprise data source 102 to obtain payment for goods and/or services provided to users. A second sub-channel 212 in the corresponding plurality of sub-channels associated with the respective primary communication channel 210 makes use of a second database (or other form of information such as an external system that accesses data) associated with the corresponding enterprise data source. The first database is other than the second database. For instance, the second database may be related to a system used for tracking customer complaints or the shipment information for customer orders.

Conditional Invocation of Human Support.

Sub-channels 212 support numerous chat rooms, with each such chat room consisting of a conversation between an enterprise data source 102 and a single user. That is, each such conversation in a sub-channel is between (i) the enterprise data source 102, or a proxy for the enterprise data source 102, and (ii) a single user associated with a remote user device 104. Messages placed in such conversations by the enterprise data source 102 are delivered to the remote user device 104 of the associated user, who is typically allowed to consume the message only once. Advantageously, in some embodiments, the messages in a conversation in a sub-channel are created by automated human interface modules associated with a sub-channel. Such automated human interface modules parse messages and other responses by a user in a conversation and use this input to determine suitable reply messages to send to the user. When the automated human interface module is not able to parse the messages adequately, the automated human interface module may refer the conversation to another automated human interface module or to the queue of a live operator of the sub-channel.

Block 522 of FIG. 5C illustrates how this is accomplished in accordance with one embodiment. A first sub-channel 212 in the corresponding plurality of sub-channels associated with a respective first primary communication 210 channel in a plurality of primary communication channels hosts a first conversation between the enterprise data source 102 corresponding to the first primary communication 210 and a first user. The first conversation has a first human intervention status. When the first human intervention status is deemed automated, messages in the first conversation from the remote user device 104 associated with the first user are processed by a first automated human interface module. When the first human intervention status is deemed non-automated, messages in the first conversation from the remote user device 104 associated with the first user are placed in a queue for processing by a human associated with the corresponding enterprise data source 102 of the first sub-channel 212.

In some embodiments, a user input specifically triggers the change from automated to non-automated. For example, the user might say "I want to talk with an operator", and that might result in reclassifying further messages in the conversation such that they are routed to a non-automated agent (human call center representative, etc.). This routing could in principle change back and forth many times during a conversation, between an automated agent (the first human intervention status of the conversation is deemed automated) and a non-automated (human) agent (the first human intervention status of the conversation is deemed non-automated).

As noted above, several conversations may concurrently be held on a sub-channel, of which only one is with a particular end user. The status of each of these conversations may be different. For instance, consider the case where there are seven conversations concurrently being held on a given sub-channel. In this example, four of the conversations may be deemed automated and serviced by an automated human interface module whereas the remaining three may be deemed non-automated and serviced by a human operator.

In some embodiments, a trained classifier is used to monitor conversations on a sub-channel 212 for the purpose of changing the status of such conversations from automated to non-automated. For instance, such a trained classifier may parse the messages posted by users for certain keywords such as "operator" or other words or events that have been determined to be associated with a need for human intervention. For instance, the user may have looped through several different nodes of an automated human interface module and may be getting frustrated. Advantageously, in some embodiments, classifiers are trained based on the broad aggregate of user interactions from a plurality of users over time.

Referring to block 524 of FIG. 5C, in some embodiments, when the first human intervention status of a first conversation is deemed to be automated, the method further comprises applying messages on the first sub-channel from the remote user device associated with the first user to a trained classifier associated with the first sub-channel thereby obtaining a classifier result. When the classifier result falls into a predetermined category, the first human intervention status is changed from automated to non-automated until a predetermined event occurs. Referring to block 526, this predetermined event may be, for example, a break in communications in the first conversation, the elapsing of a predetermined amount of time, or a manual switch of the first human intervention status from non-automated to automated by a human operator associated with the corresponding enterprise data source. Referring to block 528, in some such embodiments, the classifier produces a binomial classification and the predetermined category is one of the two outputs of the classifier. Referring to block 530 of FIG. 5C, in some such embodiments, the classifier is a decision tree, a random forest, a Bayesian network, a support vector machine, a neural network or logistic regression. Referring to block 532, in some embodiments, the classifier is trained across the conversations of a plurality of sub-channels 212 using feedback data provided by the plurality of users regarding a plurality of their interactions with the server system using the sub-channels. Referring to block 534, examples of such interactions include electronic payment processing, customer sign-up, and customer service by the plurality of users using the sub-channels provided by the server system.

A first user may have one conversation in one sub-channel with a first enterprise data source 102 that is deemed automated while having another conversation in another sub-channel with a second enterprise data source 102 that is deemed non-automated, or vice versa. That is, the status of each conversation is independent. Block 536 of FIG. 5D illustrates. A second conversation in a second sub-channel 212 in the corresponding plurality of sub-channels associated with a second primary communication channel 210 in the plurality of primary communication channels has a second human intervention status that is independent of the first human intervention status of the first conversation. When the second intervention status is deemed automated, communication in the second conversation from the remote user device associated with the first user is processed by a second automated human interface module. When the second human intervention status is deemed non-automated, communication in the second conversation from the remote user device associated with the first user are placed in a second queue for processing by a human associated with the corresponding enterprise data source of the second sub-channel.

Access to Enterprise Data Source Information Through an Application Programming Interface.

Referring to block 538 of FIG. 5D, a first sub-channel 212 in the corresponding plurality of sub-channels associated with a respective primary communication channel 210 process a communication received from a remote user device associated with the first user in the conversation as a query for data by converting the query into a modified query in accordance with an application program interface function call triggered by the query received from the first user. In some embodiments, the modified query is submitted to a database associated with (electronically addressable by) the corresponding enterprise data source 102. However, the present disclosure is not so limited. In some embodiments, the modified query is submitted to any electronic data source or system that retrieves electronic data and that has been designated for such purpose by the enterprise data source 102. This can be, for instance, a system that references files or is capable of addressing any kind of non-transitory memory storage mechanism. This system may be owned or leased by the enterprise data source, or may be in the public domain, depending on the application. A query result is received from the data source responsive to submitting the modified query. In some embodiments this query request is reformatted. The reformatted query result is then communicated to the remote user device 104 associated with the first user directly in-line within the conversation between the enterprise data source 102 and the remote user device 104. In one use case, the client side communication module 204-C (FIG. 4) invokes a first API call within a conversation. In response to this API call, the communications module-enterprise source side 204-E (FIG. 3) receives the API call and makes another API call to a back-end system associated with the corresponding enterprise data source 102 and gets a result. The query result is processed into another format by the communications module-enterprise source side 204-E and this result is returned to the client side communication module 204-C (FIG. 4) for display in the conversation.

Referring to block 540 of FIG. 5D, in some embodiments, the data source associated with the corresponding enterprise data source 102 provides an inventory control mechanism for the enterprise data source and the query seeks information about an item tracked by the inventory control mechanism.

Automated Human Interface Modules 2202.

Figure 22:
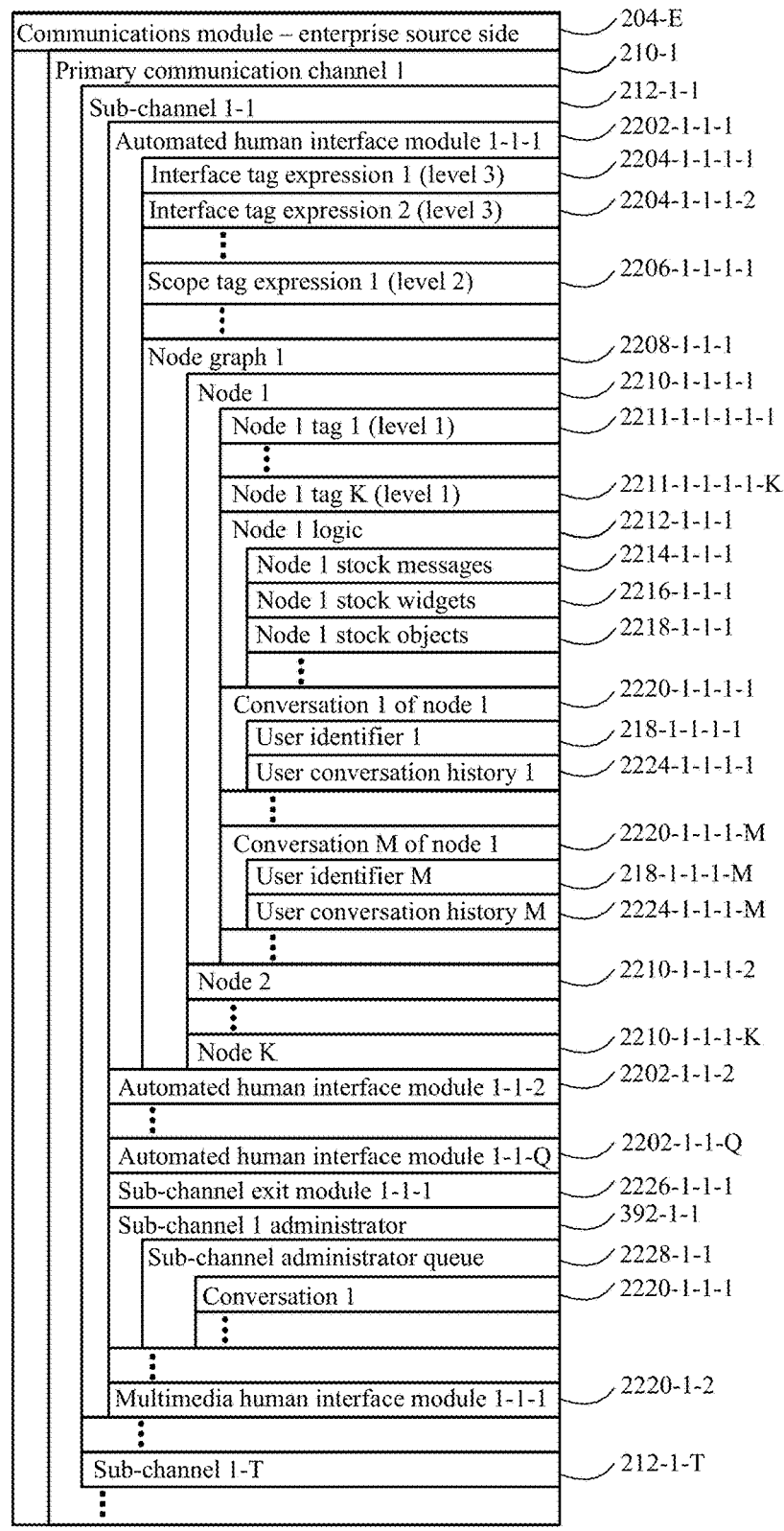
FIG. 22 illustrates a plurality of automated human interface modules ("automated messaging bots") in accordance with an embodiment of the present disclosure.

Referring to FIG. 22, the disclosed secure mobile communication platform 200 provides a plurality of automated human interface modules ("automated messaging bots") 2202 and a system for managing and deploying these automated messaging bots. Each automated messaging bots reflects a defined message and/or transaction capability. Automated messaging bots can contain a range of content and functionality, from a simple static response, to sophisticated knowledge systems that can power automated conversations leading to solutions and integrated transactions with external systems; e.g. payments, reservations, etc. The secure mobile communication platform 200 supports the generation of custom, native, intelligent automated messaging bots 2202, selection of automated messaging bots from third party platforms, and defining flexible integrations of these automated messaging bots into automated messaging response networks.

Automated Messaging Bots.

Each automated messaging bots 2202 provides a certain scope and capability for automatically engaging end users in a conversational flow. Functional transactions can also be integrated into conversational exchange. The goal is for each automated messaging bot 2202 to help end users typically either resolve a question/problem or to fulfill a specific transaction, all via the disclosed messaging communications framework. An end user's conversation 2220 with an automated messaging bots is initiated when the initial message from the end user associated with a remote user device 104 is assigned to the automated messaging bot 2202. The automated messaging bot 2202 will initiate a response to the initial message based on its available logic. The end user's selection of available predefined responses or a typed message response are the triggers the bot 2202 uses to navigate the end user through it's available content logic (node graph 2208). If an automated messaging bot's exit criteria/conditions are met, the conversation either ends or is moved out of the bot 2202 and is either reassessed by the system, moved to a live support message queue 2228, or reassigned to another automated messaging bot 2202 (e.g., one that has a different logic flow and thus will provide a complementary orthogonal end user experience).

Bot Creation and Management.

Some embodiments of the disclosed systems and methods provide the ability to create, manage and administer bots 2202 to make them available for use in creating, editing, or deleting bots 2202 via a primary communication channel user interface, by either using a user interface based automated message flow builder or by uploading VXML, or properly formatted JSON files.

Bot Designer.

Some embodiments of the disclosed systems and methods provide a user interface based bot 2202 designer to assist in the creation and editing of the automated message flows within bots 2202. Referring to FIG. 22, in some embodiments this automated message flow is manifested as a node graph 2208. The bot 2202 designer includes the ability to define the name of the automated message bot, create, edit, and delete individual nodes 2210 in the bot 2202, the ability to expand/collapse node 2210 branches, the ability to see and edit the message content for a node 2210 (e.g., stock messages 2214, stock widgets 2216, stock multimedia objects 228), and the ability to see node traversals (e.g., when one or more nodes 2210 connect to a different node).

In some embodiments, a node 2210 of a bot 2202 reflects a predetermined decision point within the bot. The bot tries to evaluate an incoming message from a remote user device 104 by parsing the incoming for recognized keywords and phrases. Based on detection of such keywords, the automated human interface module 2202 will progress the end user in a particular direction within the node graph 2208. Thus, the use of nodes 2210 within a bot 2202 is similar to walking through a decision tree, with different nodes 2210 in the bot 2202, where the bot knows the position of an end user in the decision tree and can progress the end user in the node graph 2208. However, the analogy to the decision tree here is merely exemplary. More generally, nodes 2210 in the node graph 2208 embody a logic that can evaluate messages, and based on this evaluation, take some action such as send a message to the end user and/or send the conversation 2220 associated with the end user to another node in the node graph 2208 of the bot 2202, the node graph 2208 of another bot 2208, or to the queue 2228 of a live operator (e.g., the sub-channel 1 administrator 392) depending on the end user message, the choices made by the end user, the user conversation history 2224, etc.

In some embodiments, the automated human interface module 2202 designer further includes the ability to add, edit, and delete the end user's response options (e.g. option buttons provided in a widget 2216) per node 2210. Such response options, include, but are not limited to, an ability to define a specific destination node 2208 for each end user option, an ability to define a node option to close a chat session (e.g., by user selecting the session closing "problem is resolved" option, and in some embodiments with the system able to send a final response within the conversation such as "Happy to help, have a great day"), connecting to a different bot 2202, ability to move the end user to a different automated human interface module 2202 ability to select a specific destination node 2210 within the node graph 2208 of the bot 2202, ability to have the bot 2202 send multiple separate messages to the end user in the conversation 2220 in sequence, for instance one right after the other (near instantaneous), ability to add, change or delete an embedded third party widget 2216 (e.g. payment transaction) for a node 2210, ability to add, change or delete a predefined system widget 2216 (e.g.: list picker for a list of service or production options, date picker, etc., a visual indicator for whether a node 2210 has any node tags 2211 associated with it. A tag is a single keyword or phrase and can be assigned by the enterprise data source 102.

Tags reflect a single keyword or phrase and can be assigned to specific nodes 2210 within a node graph 2208 of an automated human interface module 2202 and for the overall scope of the automated human interface module 2202 when an end user's conversation 2220 has been entered into the automated human interface module's 2202 automated message flow (node graph 2208).

In some embodiments, the automated human interface module 2202 administrator interface based bot 2202 designer provides the ability to add, edit, and delete one or more node level 2210 tags 2211, the ability to add, edit, and delete one or more human interface module tags 2204 and scope tags 2206, and the ability to add a multimedia human interface module 2232 to one or more nodes 2210 in a node graph 2208 of an automated human interface module 2202. As illustrated in FIG. 22, each node tag 2211 is required to point to a specific node 2210 in the node graph 2208 of an automated human interface module 2202. However, as further illustrated in FIG. 22, node tags 2211 can be grouped, that is multiple node tags can all point to the same node in the node graph 2208 of an automated human interface module 2202.

Multimedia Library.

Primary communication channel administrators 380 can configure one or more multimedia libraries by uploading objects 2218 such as images, audio files, movie files, reference documents (e.g. PDF) files. Each object 2218 can optionally be tagged with one or more keywords or phrases. Each object 2218 can be assigned to a bot 2202 node 2210, as the bot's response to end user input. If the bot 2202 includes a reference to a multimedia human interface module 2232, discussed below, any node response option can be configured to check for automated content from the multimedia content provided by the multimedia human interface module 2232. There is provided the option to filter by media type and ability to specify specific tags, or pass through the tag history associated with the end user responses from the current conversation (e.g., the user conversation history 2224).

Multimedia Human Interface Module 2232.

In some embodiments a multimedia library is configured to behave like an automated reference system that is made available as a multimedia human interface module 2232 ("multimedia bot"). The multimedia bot can operate at the sub-channel level 212 level, as illustrated in FIG. 22, parallel to various other bots assigned to the sub-channel 212. For example, a given sub-channel 212 may have five bots 2202, each such bot handling a set of conversations, and further the given sub-channel 212 may have one or more multimedia bots 2232 that listen in on the conversations within the sub-channel and provide multimedia objects to these conversations when there is a match between the tags to objects accessible to the multimedia bot 2232 and content in the conversations (e.g., messages from the users associated with end user devices 104). In still other embodiments, a multimedia bot 2232 may operate a widget 2216 at a particular node 2216 within an automated human interface module 2202.

In some embodiments, the multimedia human interface module 2232 is configured to be active for only dedicated requests from a bot node 2202 (e.g., as specific nodes 2210 within the bot node) and/or custom message responses a user provides while interacting within a bot. In some embodiments, a maximum response time for the message bot 2232 to provide a multimedia object to a query is specified. In some embodiments, a default is provided. This is done to ensure that the multimedia object is provided within the right context in a conversation. For instance, consider the case where the multimedia bot 2232 has detected the tag "Los Angeles" which is associated within the bot 2232 with a picture of Los Angeles. Posting of the image into the conversation in which the tag "Los Angeles" was detected is only appropriate within a certain period of time after the message containing the tag was posted into the conversation. Thus accordingly, in some embodiments, if the multimedia human interface module 2232 seek request takes longer than allowed, the search will be abandoned. In some embodiments, there is an option for defining how many tags from a user's current tag history (found in the user conversation history 2224 for the user) to include per search sequence by the multimedia human interface module 2232.

Figure 23:
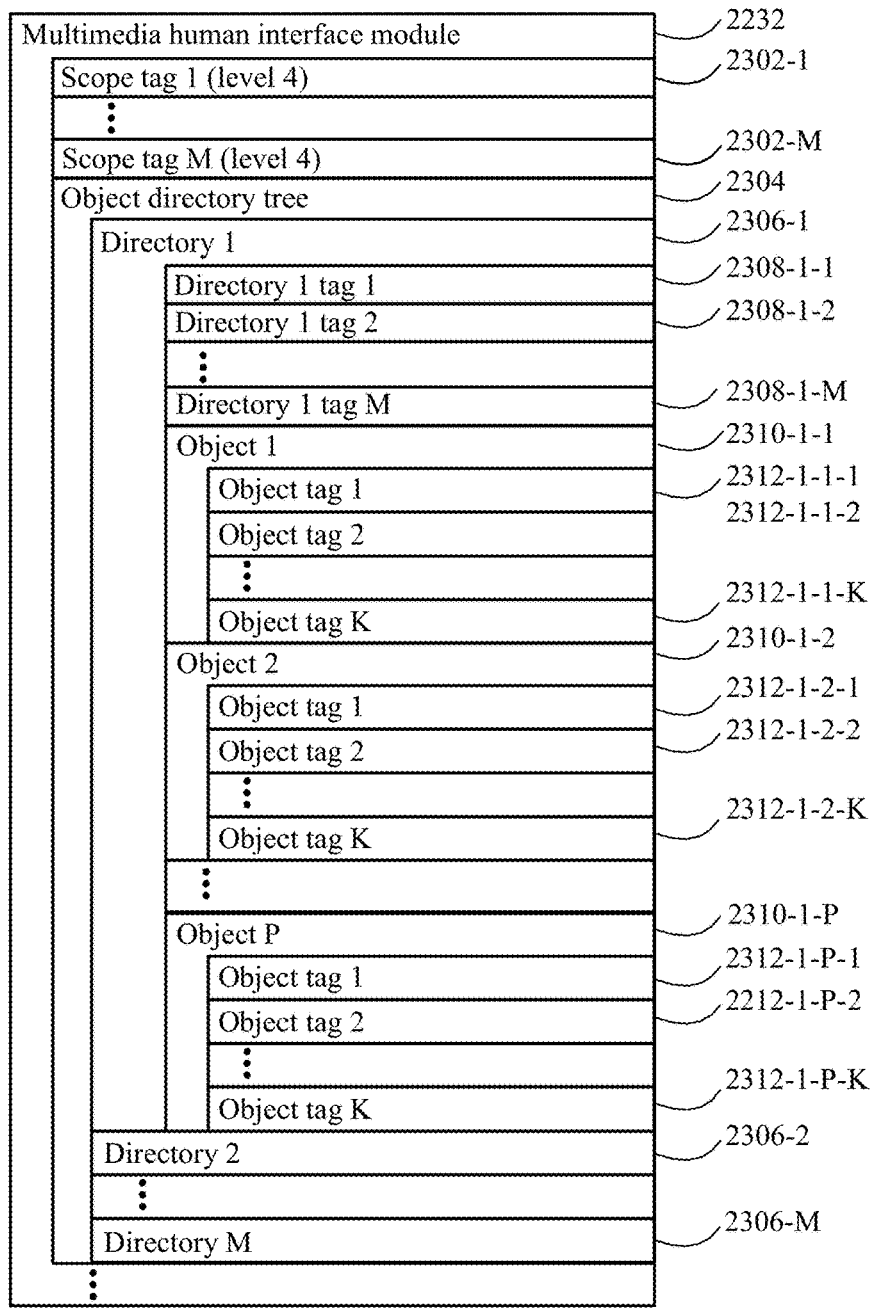
FIG. 23 illustrates a multimedia human interface module in accordance with an embodiment of the present disclosure.

Referring to FIG. 23, in some embodiments, the multimedia human interface module 2232 makes use of tags at two (or three) levels. Multimedia module 2232 scope tags 2302 provide one or more keywords or phrases that can be used as triggers, when detected in messages from users in conversations, for automated retrieval of multimedia content (or at least activation of the multimedia module 2232 to perform a search. Each object (e.g., media file) 2312 to be made available as part of the multimedia module 2232 is tagged with one or more object tags 2312. Further, as illustrated in FIG. 23, in some embodiments, objects 2310 are arranged into directories 2306. For instance, each directory can represent a different product offered by the enterprise data source 102. Although FIG. 23 illustrates a directory tree with one a single layer of sub-directories, in principle such directories can be nested to any desired level, so that a directory may have sub-directories, which in turn may have sub-directories, and so forth, which each level of sub-directories having their own independent directory tags 2308.

Parallel Content Channels.

In some embodiments, one or more of the following functionalities are included in the multimedia human interface module 2232: the ability to define specific content (objects 2310) to be added to the object directory tree 2304, the ability to assign the content to an organizational branch (directory 2306) in the object directory tree 2304 or a section of the branch and/or the ability to enable/disable parallel content channels by defining the inclusion of the multimedia human interface module 2232 into a node 2210 of an automated human interface module 2202.

Upsell Content.

In some embodiments, among the stock messages 2214, stock widgets 2216 and stock objects 2218 is content that represents an initial inquiry message that can be added to a conversation by the automated human interface module 2202. For example, "Would you be interested in upgrading to the product version X? Provides X better performance and you may qualify for a special offer? (Yes) (No)." If the answer in the conversation from the user device 104 associated with the user in the conversation is "Yes," the automated human interface module 2202 takes any of the following predetermined options in accordance with the node logic 2212 for the node 2210 that imposed this question: a target node 2210 in the currently active automated human interface module 2202 and in the current conversation, a target node 2210 in another active automated human interface module 2202 and in the current conversation, or to a new conversation in another automated human interface module 2202.

Advertising Content.

In some embodiments, the enterprise data source can include advertising content among the stock messages 2214, stock widgets 2216 and stock objects 2218 of a node 2210 in an automated human interface module 2202. This includes defined messages and/or a media file (link to a multimedia object, a link to an external advertisement platform). Such a configuration can include getting the communications module-enterprise source side 204-E to send a list of tags or organized parameter mappings to such an external advertisement platform. In some such embodiments, the communications module-enterprise source side 204-E would then make an application programming interface call and receive an advertisement image in response and post this ad image into the conversation. Included in such embodiments is the ability to define placement of the advertisements (e.g., at what nodes in the node graph 2208 such advertisements are possible), when they are to be presented, what options are provided with such advertisements, what advertisement responses are solicited from the user (e.g., a menu of options like "tell me more," or "dismiss"), and the ability to designate a dedicated advertising area in the user interface application provided by communication module-client side 204-C of FIG. 4. In some embodiments, beyond the simple, available organizational structure for media libraries illustrated in FIG. 23, it is possible to create a specialized custom multimedia library reference bot containing a blend of conversational node logic as illustrated in FIG. 22 with direct links to various multimedia files at specific nodes 2210.

VXML Import.

Setting up node graphs 2208 to direct user conversations within sub-channel 392 can involve some work, particularly when more complex decision logic is desired. Advantageously, one embodiment of the present disclosure provides for importing call center logic, which is typically in VXML format. VXML is a digital document standard for specifying interactive media and voice dialogs between humans and computers. It is used for developing audio and voice response applications, such as banking systems and automated customer service portals. In some embodiments, an enterprise data source 102 (e.g., the enterprise data source super administrator 378, the primary communication channel administrator 382, the sub-channel administrator 392) can provide support flow data in VXML format and load that into the communications module-enterprise source side 204-E. In such embodiments, the enterprise data source 102 defines a name for the new imported automated human interface module 2202. Further the enterprise data source either uploads a VXML file directly, or copies and paste the VXML content into an entry field in the user interface provided by some embodiments the communications module-enterprise source side 204-E. Then the user clicks on a button (e.g. "Create") to initiate the process that converts the VXML into an automated human interface module 2202. In so doing the VXML file is parsed, and VXML data is validated to ensure proper formatting. If the validation fails an error message, identifying any validation issues, is displayed. In some embodiments, the data is converted into an automated human interface module 2202 specific JSON file format that represents the internal mapping, organization and overall data structure for the automated human interface module 2202, including the node graph 2208 which embodies message flows hosted by the automated human interface module 2202. The uploaded data can then be reviewed and edited in an automated message bot editor provided in some embodiments of the communications module-enterprise source side 204-E.

JSON Import.

In some embodiments, automated human interface modules 2202 are coded in a custom JSON structured data format that stores the bot's node graph 2208 (message flow network). In some embodiments, an enterprise data source 102 is able to directly create native JSON files that can be uploaded into the communications module-enterprise source side 204-E. The process includes automatic validation of the format, structure and specific parameter nomenclature. Validation issue notification alerts the enterprise data source 102 to the problems the communications module 204-E found.

Automated Human Interface Module Store.

The development time often required to generated logic that directs a conversation automatically and yet provides a user with a good customer experience can be extensive. Advantageously, in some embodiments of the present disclosure, the secure mobile communications platform 200 provides an array of predefined default automated human interface module 2202 templates. Each template provides a node graph that contains placeholder content for an enterprise data source 102 to customize for their purposes. In some embodiments, available templates are presented in a "Bot Store" and can include automated human interface module 2202 and/or multimedia human interface modules 2232 created by registered entities of the secure mobile communication platform 200 (e.g., registered enterprise data sources 102). Examples of such template automated human interface modules 2202 include, but are not limited to, different payment bots. For instance, one sample payment bot could comprise a node graph 2208 that encodes a linear flow that leads a user in a conversation through a product/service selection process, payment transaction, and ends with the receipt getting stored in the user's file storage. Another sample bot could comprise a node graph that simply provides basic store information such as location and office hours. The template customer would select a template from the list and then customize the necessary nodes 2210 in the node graph 2208 of the template with the business and specific content. In some embodiments, the enterprise data source 102 administrator has the option of following a step by step wizard to enter in the content for all the nodes 2210 in the node graph 2208 of the template module 2202 that require customized content or preferred widgets 2216 (e.g. payment widget). In some such embodiments, during this process, a "node graph network view" will visually indicate all nodes 2210 that still require customization. In this view, the enterprise data source 102 administrator clicks on a node to edit it. Further the enterprise data source 102 administrator can save an incompletely customized template. However, in some embodiments, template automated human interface modules 2202 and/or multimedia human interface modules 2232 can only be activated for a sub-channel 212 if all required customization nodes have been updated.

Automated Human Interface Module Template Designer.

In some embodiments, templates for automated human interface modules 2202 are created with a template design module. In some embodiments, a basic configuration option identifies the module 2202 as a template. The templates are defined by creating the underlying content and functional flow logic structure comprising the node graph 2208. Any node 2210 in the node graph 2208 can be defined as a customization node and it is intended for the enterprise data source 102 administrator to define the content for such nodes for their own use. For instance, in some embodiments, the enterprise data source 102 administrator specifies a title and description/help text for each customization node. This is to help the enterprise data source 102 administrator with defining appropriate content for the node 2210.

Automated Human Interface Module Template Distribution.

In some embodiments, templates for automated human interface modules 2202 have a configuration option relating to distribution. In such embodiments, this configuration option (default setting is "off") can be enabled to make the template available to all enterprise data sources 102 making use of the secure mobile communications platform 200. In some such embodiments where such bot templates can be distributed, the bot template will require input for the following metadata (i) title/name, (ii) description, purpose, scope, solution provided, (iii) category (e.g., select up to three from a predefined list), and (iv) price (can be defined as free).

Third Party Automated Human Interface Modules.

In some embodiments, the secure mobile communications platform 200 enables third party bots to be used in the platform 200. In some embodiments, two approaches are made available to select third party bots. First, the secure mobile communications platform 200 provides a 'web hook' integration infrastructure that enables secure mobile communications platform 200 customers to connect to third party bot platforms (via the secure mobile communications platform 200 developer interface). A specific third party bot is made available via such integration. Second, generic/customizable third party bots can be added as automated human interface modules 2202 to a store by a developer defining a third party 'web hook' integration as available for "distribution"/"the Bot Store". In such embodiments, the following metadata is provided with such third party bots: (i) bot title/name, (ii) description, purpose, scope, solution provided, (iii) category (e.g., select up to three from a predefined list), and (iv) price (can be defined as free).

Primary Communication Channel 210 Manager Manual.

In some embodiments, any automated human interface module 2202 that has been created and enabled for a primary communication channel 210 becomes available in the primary communication channel 210 manager interface. Sub-channel 212 managers can select from any of the available modules 2202 (as well as selecting specific widgets 2216 (e.g. payment widgets), multimedia library content, etc. and deploy them as a response to a user's incoming message in a conversation 2220. An end user who is entered into an automated human interface module 2202 will then be engaged by the automated human interface module's 2202 automated messaging conversation 2220 (e.g., navigated though the node graph 2208 of the module 2202) until the automated human interface module 2202 exits the end user. An end user who is returned to the live person message queue (e.g., the sub-channel administrator queue 2228) will show up at the bottom of this queue.

Sub-Channel Based Automated Human Interface Module Auto Assignment.

In some embodiments, and as illustrated in FIG. 22, secure mobile communications platform 200 administrators can select one or more available automated human interface modules 2202 and third party automated flow bots and assign them to one or more sub-channels 212. In some such embodiments, if a single automated human interface module 2202 is selected, any end user messages sent through that sub-channel 212 is moved into the automated flow (node graph 2208) of that module 2202. If multiple automated human interface modules 2202 are assigned to a sub-channel 212, then an automatic automated human interface module 2202 assignment protocol is activated and all incoming messages are processed to send the end user to the most thematically appropriate automated human interface module 2202.

In some embodiments, there is provided the ability to enable/disable automated human interface module 2202 assignments for a primary communication channel 210 (across all sub-channels 212).

In some embodiments, there is provided the ability to refine/override primary communication channel 210 based schedule at the sub-channel 212 level. In such embodiments, for example, sub-channel A of a given primary communication channel may have different automated human interface modules 2202 activated than sub-channel B of the given primary communication channel.

In some embodiments, the enterprise data source 102 administrator is given clear user interface indications as to whether automated human interface modules 2202 are active or inactive at a sub-channel 212 level.

In some embodiments, there is provided an ability for secure mobile communications platform 200 administrators (e.g., enterprise data source super administrator 378, primary communication channel administrator 380) to define an automated human interface module 2202 activity schedule that can be edited at any time. In some embodiments, sub-channel 212 administrators 392 may review the schedule but cannot edit the schedule. In some embodiments, sub-channel 212 administrators 392 may review the schedule and edit the schedule.

Third Party Automated Human Interface Module 2202 Integration.

In some embodiments, the secure mobile communications platform 200 provides the flexibility for integrating third party automatic message bots, and mixing and matching the third party bots with secure mobile communications platform's 200 native automated human interface modules 2202 into a sub-channel 212 by:

assigning a single or multiple automated human interface modules 2202 (with sub-channel 212 level automated human interface module 2202 auto assignment) to a single sub-channel,
assigning a single third party bot to the single sub-channel 212, assigning a combination of native automated human interface modules 2202 and third party bots (with sub-channel 212 level automated human interface module auto assignment) to the single sub-channel, or assigning single or multiple automated human interface modules 2202 (with auto assign) and connection to third party bots from within an automated human interface module 2202; e.g. a given node 2210 with an automated human interface module 2202 can transfer a conversation to a third party bot or to another (native) automated human interface module 2202.

Automatic Human Interface Module 2202 Assignment Protocol.

In some embodiments, when two or more automated human interface modules 2202 are assigned to the same sub-channel 212, then the enterprise data source 102 administrator is prompted to specify unique interface tag expressions 2204 (e.g., exclusive keywords or phrases for each selected automated human interface module 2202) to each automated human interface module as illustrated in FIG. 22. Both native automated human interface modules 2202 and third party automated human interface modules 2202 are assigned interface tag expressions 2204. Then, when a new unassigned conversation 2220 is initiated on the sub-channel by way of an incoming message from an end user, the content of the end user's message is scanned for matches between this content and the interface tag expressions 2204. In some embodiments, when a match is found between an interface tag expressions 2204 of a particular automated human interface module 2202 in the sub-channel, the conversation is routed to that particular automated human interface module 2202. In some embodiments, the enterprise data source 102 administrator has the ability to add, edit, and delete these interface tag expressions 2204. Thus, when an end user submits a message to the sub-channel 212, the system looks for any [tag] matches between the message content and the interface tag expressions 2204 defined for any of the automated human interface modules 2202 assigned to the sub-channel. The conversation is moved into the best matching automated human interface module 2202.

In some embodiments a "default response mode" is enabled for a sub-channel 212. In such instances, one of the automated human interface modules 2202 is designated as a default 'bot' for the sub-channel and represents the default bot to be selected in case no interface tag expression 2204 matches are found for any of the primary assigned automated human interface modules 2202.

In some embodiments, a sub-channel exit module 2226 is provided. A primary purpose of this exit module is to reengage the automatic human interface module 2202 assignment anytime a user responds to a flow based message with a custom/typed response that moves the user out of the automated human interface module 2202 they were inserted into and conversing with. In some such embodiments, there is an associated configuration option to not allow the user to be reentered into the same automated human interface module 2202 they were just moved out of By default this option is enabled, e.g., allowing the sub-channel 212 to reenter the user into the same automated human interface module 2202 they just exited. In some embodiments, there is an added option to define an appropriate message for reinserting the user into the same automated human interface module 2202, for example, "Let's try rebooting your modem again."

Unattended Mode.

Some embodiments of the present disclosure provide a full automatic mode by which the sub-channel 212 operates. In such embodiments, if the unattended mode is "on", all conversations 2220 that exited an automated human interface module 2202, will automatically be reassessed at the sub-channel 212 level using, for instance the automatic human interface module 2202 assignment protocol described above in which the user conversation history is searched from matches to the interface tag expressions 2204 of participating automated human interface modules 2202. If the conversation 2220 can't be matched to any assigned automated human interface modules 2202 in this manner, the conversation 2220 is routed to the default automated human interface module 2202, which is intended to provide a prepared close to the conversation.

Session Reassessment Mode.

In some embodiments, in scenarios where a user's incoming message fails all tag matches, the system will assign the message either into the live chat support (e.g., sub-channel administrator queue 2228 of FIG. 22) or the default automated human interface module (in "unattended mode") by default. When "session reassessment mode" is enabled, the system will instead automatically present the user with a message that asks the user to select from a list of options, which are based on a (to be selected) list of interface tag expressions 2204 from any available automated human interface modules 2202 attached to the sub-channel 212. For example, assume there are two available automated human interface modules 2202 in the sub-channel 212:

module 2202-1 expression tags 2204: tomatoes, squash module 2202-1 expression tags 2204: broccoli, green beans, swiss chard The direct session assessment mode is configured to present the following options:

Tomatoes (module 2202-1)

Squash (module 2202-1)

Broccoli (module 2202-2)

Green Beans (module 2202-1)

[Other] (fallback option; sends user to live chat or 'default module 2202)

Tag Assessment Logic.

Tag assessment and matching is a central function leveraged by processes managing automated conversation flows. Tag matching involves matching words or phrases from messages from end users and a defined list of tags associated with nodes 2210 (node tags 2210) or an automated human interface modules 2202 (interface tag expressions 2204). In some embodiments, the following considerations are imposed when defining such tags: interface tag expressions 2204 are not duplicated across multiple automated human interface modules 2202 assigned to the same sub-channel 212. Further, within an automated human interface module 2202, the scope tag expressions 2206 should be unique. Node tags 2211 within an automated human interface module 2202 can be duplicated across nodes 2210. This is because node tags 2211 are assessed when a user replies to an automated set of options from a specific node 2210 with a custom message. So, for example, the tag "Apple" assigned as a node tag 2211 to two different nodes 2210 in the same node graph 2208 may only get evaluated for a given conversation when the conversation is at that node 2210.

Tag Matching Process.

One tag matching process in accordance with the present disclosure is as follows. When there is a singular tag match within an asset (e.g., the interface tag expressions 2204 of only one human interface module 2204 match a message in a conversation) automatic selection occurs. When multiple tag matches within an asset (e.g. an interface tag expression or node tags 2211), tags are evaluated in order of priority they are listed. Assume a message contains the following keywords "apples oranges lemons". If the active node 2210 has the following 2211 tags (and destination nodes) associated with it:

node tag 2211-1:: "oranges apples"→(node A200)
node tag 2211-2:: "apples oranges"→(node A220)
node tag 2211-3:: "apples"→(node B210)
node tag 2211-4:: "oranges"→(node B220)
node tag 2211-5:: "kiwi"→(node B230)

then the match is for the node tag 2211-2 "apples oranges" and the conversation is moved to destination node A220.

If at the sub-channel 212 level there are multiple equal tag matches across automated human interface modules 2202 the following heuristics are imposed in some embodiments. If an incoming message has multiple interface tag expression 2204 matches with several different automated human interface modules 2202 within the sub-channel, it may not be suitable to select an automated human interface module 2202 on this basis. In some embodiments, the system 200 will automatically respond back and challenge the end user to select a conversational topic by reflecting back individual choices reflecting each tag match. For example, assume a message from an end user contains the following keywords "apples oranges lemons" and three automated human interface modules 2202 that each have separate interface tag expressions 2204 associated with them (they can't have the same tags assigned):

automated human interface module 2202-1 has the tag 2204-1 "oranges"
automated human interface module 2202-2 has the tag 2204-2 "apples"
automated human interface module 2202-3 has the tag 2204-3 "kiwis"

In this example, the sub-channel 212 would respond to the user "Which topic would you prefer to discuss first?" (oranges) (apples). Note, in the case of multiple, but unequal matches the request back to the end user would be, for example "Which topic would you prefer to discuss first?" (oranges and pineapples) (apples) (kiwis).

Chat Session Maintenance.

In some embodiments, system 200 manages conversations to help track and identify the progress and process of each conversation and to be able to differentiate different conversations originating from a specific end user. In such embodiments, the system tracks a conversation by (i) the active conversation identifier, (ii) the process module identifier (e.g., automated human interface module 2202, live chat with sub-channel administrator, etc.), (iii) node identifier 2210, and/or (iv) support representative (e.g., sub-channel administrator) identifier (live chat).

Session Tracking—Conversation Initiation.

In some embodiments, an initial incoming message from an end user (ID) does not contain a conversation identifier and is therefore automatically assigned a unique conversation identifier. In some embodiments, the conversation identifier is specific to a user/and sub-channel 212 combination.

Session Tracking—Conversation Close.

In some embodiments, the conversation identifier is closed when, for instance, the system identifies that the conversation has ended. That can be accomplished by a designated conversation closing node 2210 such that once conversation reaches this designed node, the conversation ends. In some embodiments, the designated conversation closing node may send a final message to the end user. In some embodiments, the conversation closing node option specific ends a final conversation close question to the user. At least one node option, if selected by the user would indicate that the conversation has ended, e.g. "Issue resolved/Not resolved," with the "resolved" option clearing the conversation. In some embodiments, the conversation closing node is configured to send a final response to the end user (e.g., "Thank you/Have a nice day") before clearing the conversation identifier.

Manual Flow Management.

In some embodiments, automated human interface module administrators could close a conversation by either (i) selecting and sending a predefined, custom or system, conversation close module, which includes a defined closing message, (ii) clicking on the "close conversation" button which ends the conversation (e.g., after providing a customized response back to the end user providing a message such as "Greg, glad to be of assistance; have fun at the SF Giants game on Saturday!"

Additional Considerations—Session Close Question.

If the system sends a "final response" and the end user answers with a custom message (e.g. not selecting either issue is: "resolved" "unresolved" options in a menu), then the conversation identifier is retained.

Additional Considerations—Multiple Topic Conversations.

A conversation may cover multiple topics, e.g. with the conversation moving from one module 2202 to another module 2202. In such embodiments, the conversation will retain the same conversation identifier.

Additional Considerations—Automated Human Interface Module 2202/Node Identifiers 2210.

When an automated human interface module 2202 can't resolve a conversation and needs to bounce a conversation (out), e.g. back up to the sub-channel level, the automated human interface module 2202 and node identifiers are cleared from the conversation, but the conversation identifier is retained. For instance when the sub-channel reassigns the conversation to another automated human interface module 2202 or to live chat, the appropriate automated human interface module 2202 identifier or live chat identifier is added into the conversation.

Additional Considerations—Elapsed Time Configuration Settings.

Some embodiments of the present disclosure provide configuration options, enabling enterprise data source 102 administrators to define time based conversation closing rules (e.g., if 'X' hours/days pass and/or user closes application without the user sending a response, the conversation is closed; if conversation close type response was sent to the end user, but the end user does not respond and either closes the application, and/or 'X' hours pass, the conversation is closed).

Automated Human Interface Modules 2202 Automated Conversation Logic Process.

Automated Conversation Flow.

The default conversational flow in an automated human interface module 2202 moves a conversation 2220 through the node graph 2208 of nodes 2210. Each node 2210 can contain multiple options for the end user to select. Each node option can move the conversation to a specific destination node 2210 in the automated human interface module's node graph 2208. Multiple nodes 2210 can point to the same specific destination node 2210. The node graph 2208 can therefore be comprised of complex branches of connected nodes. In some embodiments, a node graph is a cyclic or acyclic graph with branches. Resulting conversation flows can jump from a node in one node branch to a different node branch in such graphs. It is also possible to move the conversation 2220 from a first node 2210 in a first module 2202 to a second node 2210 in a second module 2202.

Dynamic Message Assessment.

Some embodiments of the present disclosure provide dynamic message assessment that can reroute user conversations 2220 within the automated human interface module 2202. The native automated human interface modules 2202 can be configured to listen for keywords/phrases of an entered message. In some embodiments, the message is evaluated at up to four levels two which are within an automated human interface module 2202.

Level 1.

Referring to FIG. 22, node tags 2211 provide one or more keywords/phrases that are added to a source node 2210. Each of these tags 2211 is also assigned a destination node 2210 that the end user is moved to if the node tag is fired. For example: assume that node 'A112' has three defined node tags 2211, e.g. node tag 2211-1 "Apples", node tag 2211-2 "Oranges", and node tag 2211-3 "Kiwis". Each node tag would further be associated with a destination node; e.g. node tag 2211-1 "Apples" connects to node 'B234'. When an end user initiates a custom response within a conversation 2220 after having arrived at node 'A112', then if his message contains "Apples," the conversation would continue at node 'B234'. The automated human interface module 2202 checks for node tag matches at the current node 2210 first. If there are no matches with the node tags 2211 of the current node, the automated human interface module 2202 goes to the level 2 assessment described below.

Level 2: Human Interface Module Tags.

Referring to FIG. 22, one or more keywords/phrases can be assigned at the automated human interface module 2202 scope as scope tag expressions 2204. When the node tags 2211 at the current active node 2210 fails to match the end user message, the end user message is compared to each of the scope tag expressions 2206 of the automated human interface module 2202 that is currently hosting the conversation. Each scope tag expression 2206 at the automated human interface module 2202 is assigned to a destination node 2210 in the node graph 2208. Thus, if a match is found with a particular scope tag expression 2204 and the end user message, the conversation is progressed to the node 2210 referenced by the scope tag expression 2206.

Level 3: Reinsertion into Sub-Channel.

When the level 1 and level 2 tags fail to find a match (e.g., the automated human interface module 2202 presently hosting the conversation within a sub-channel 212, the user is excited out of the current automated human interface module 2202 and moved back to the 1.1 automatic assignment protocol, which then reassesses the message at the sub-channel's 212 assigned bot level. Thus, the message is compared to the interface tag expressions (level 3) of each of the automated human interface modules in the sub-channel 212. In some embodiments, this system behavior is automatically enabled whenever the sub-channel 212/primary communication channel's "1.1. Unattended Mode" is "on". In some embodiments, there is a configuration option to disable sub-channel 212 level auto flow bot reassignment when the unattended Mode is "off". When disabled, conversations are automatically moved to the live support conversations (e.g., the sub-channel administrator queue 2228 of the sub-channel) after they exit an automated human interface module 2202.

Level 4—Multimedia Human Interface Module 2220.

While it is possible to define a specific multimedia content lookup as part of the message content for an automated human interface module 2202, the inclusion of a multimedia human interface module 2232 in an automated human interface modules 2202 adds automated media file retrieval. When enabled, the multimedia human interface module 2232 will attempt to follow the conversation from the automated human interface module 2202. Referring to FIG. 23, as the conversation proceeds to drill down into a specific topic, the multimedia human interface module 2232 will define its scope for evaluating tag matches within the corresponding directory 2306 in its own organizational structure, as long as there is a directory 2306 to drill into. If the conversation moves the user from one node 2210 to another, the destination node will inherit the branch hierarchy in the form of a tag sequence that is passed to the destination node. This allows the multimedia human interface module 2220 to reset itself in its own organizational hierarchy. The inherited branch hierarchy represents a list of tags that in the view of the multimedia human interface module 2232 takes precedence over the actual conversation tag history. The multimedia human interface module 2232 will only evaluate tag matches for objects 2310 if it contains any files in its current conversation (following) in the new directory 2306 location.

The multimedia human interface module 2232 process can be invoked in two ways, depending on configuration. In one approach, it is invoked by defining any node response option to pass through multimedia human interface module 2232. The multimedia human interface module 2232 will review the associated keywords from the node option and follow the automated human interface module's 2202 automated node response with an appropriate media file that will also be sent to the end user. In another approach, by assessing the user's last custom message against the multimedia human interface module 2232 tags. The automated human interface module 2202 passes to the multimedia human interface module 2232 the user response, any node tags, and the tag history from the current the automated human interface module 2202 session in that order. The order of the tags reflects a matching preference with the first listed keywords receiving more weight. In some embodiments, the multimedia human interface module 2232 looks for media file tag matches in the following order. First it checks user response and node tags against the tags 2308 and appropriate tags 2312. If there are no matches to tags from the user node option, custom message, or node tags, the multimedia human interface module 2232 will include a fixed number (configurable) of tag history tags for evaluation. If there is an inherited tag hierarchy it will take priority over the full conversation hierarchy. If there are no 'hits', multimedia human interface module 2232 will pause. If multiple objects 2310 result in hits, the object 210 with the highest hit score (total 'weight' score of matching tags) and is posted to the conversation or is passed to the automated human interface module 2202 for posting into the conversation.

Parallel Content Channels.

In some embodiments there is layered within the multimedia library organizational hierarchy options to leverage upsell or advertisement content. These options can be enabled/disabled on a per automated human interface module 2202 basis.

Elapsed Time Limit.

In some embodiments, based on a primary communication channel 210 configuration setting, a maximum amount of time is allotted for the system to respond from within an automated human interface module 2202. When that time is exceeded, the user will be moved out of the automated human interface module 2202. In some embodiments, a reference search via the multimedia human interface module 2232 has its own time out limit. If a multimedia human interface module 2232 search times out, the user is retained in the automated human interface module 2202 and it's conversation continues.

Conversation Tag History.

As a conversation or message interaction unfolds, the system will aggregate a tag history (e.g., referring to FIG. 23, user conversation history) for the user's conversations in a sub-channel 212. In some embodiments, the tag history structure will include (i) primary communication channel 210 name and identifiers, sub-channel 212 name and identifier, end user identifier, conversational method (e.g., live interaction, automated human interface module 2202 name and identifier), sequence of messages the user provided (user conversation history 2224), matching (level 1, 2, 3, 4) tags associated with any end user response, and an active: Y/N flag (reflecting whether the user is actively interacting).

Automated Flow Human Interface Module 2202 Usage Pattern Analysis.

Some embodiments of the present disclosure provide reports that provide overview data about user sessions and provide summary data and statistics for various aggregation application scopes such as, for the primary communication channel 210, breakdown of data across sub-channels 212 and for sub-channels 212, breakdown of data across messaging channels, e.g., automated human interface modules 2202 and live messaging with the sub-channel administrator 392. For sub-channels, such reports provide a breakdown of data across nodes 2210 of each automated human interface module 2202 and the type of widget 2216, and live sessions (also lists automated human interface modules 2202, and objects 2310 delivered by the multimedia human interface module 2232. These reports provide for the ability to drill into the more detailed scope reports from the highest level; e.g. the primary channel 210 scope. For visual clarity, in some embodiments these reports will present numbers in/beside graphical indicators (e.g. circles, whose size and color depth reflects the size of the number to be displayed in comparison to all other numbers in the report). This allows the enterprise data source 102 administrator to quickly look at the report and identify where the most end users are.

Active User Sessions.

Some embodiments of the present disclosure provide a real time dashboard indicating distribution of user data across the various scopes (listed above), such as number of live users (with active message interactions), number of inactive users with completed conversations in the past (selectable date range and default periods), total number of incoming messages, average response time to messages initiated by end users, average conversation/interaction time, average number of message exchanges before resolution or exit, number and percent of positive resolutions by live messaging, number and percent of positive resolutions by automated human interface modules 2202, and/or number and percent of unresolved inquiries by automated human interface modules 2202.

Automated Human Interface Module 2202 Reports.

Some embodiments of the present disclosure provide a summary overview of how end users moved through the automated human interface module 2202 conversations. For example, some embodiments present where and volume of end users entered the automated human interface module 2202. Some embodiments of the present disclosure provide a resolved path and exit report presentation of where with what volume end users exited the automated human interface module 2202 with the conversation 'unresolved'. Some embodiments of the present disclosure provide an unresolved hot spot exit report presentation of where with what volume end users exited the automated human interface module 2202 with the conversation 'unresolved'. This secure mobile communications platform 200 'hot spot' report provides a clear indication of the automated human interface module's 2202 user exit performance. Some embodiments of the present disclosure feature clear indicators of any "hot spots"; e.g. nodes in the automated human interface module 2202 where there is concentration of unresolved conversations that then exited the automated human interface module 2202. Some embodiments of the present disclosure provide a tag summary report for each node through which any end users exited the automated human interface module 2202. The report provides a breakdown of the specific tags that resulted in the user's exit from the automated human interface module 2202. For instance, the tag report for a specific node may provide a volume based breakdown of the conversation tags associated with the exit messages this display may include volume word clouds and a table sorted by volume of tags or phrases. Some embodiments of the present disclosure provide an automated report the system can automatically send a daily or weekly email update on sub-channel 212 and automated human interface module 2202 performance, including a summary on automated human interface module 2202 exit performance and top 'hot spot' nodes along with top tags. Some embodiments of the present disclosure provided differential reports showing changes in automated human interface module 2202 performance based on customizable time periods and also between saved automated human interface module 2202 updates.

Automated Human Interface Module 2202 Training.

In some embodiments, automated human interface modules 2202 can be evolved in a number of ways to expand their capability and the range of topics they can cover via automated message interactions. One of the primary ways that enterprise data source administrators 101 use this to improve the effectiveness of their automated human interface modules 2202 is to periodically check the "primary channel reports" which identify the 'hot spots' in the automated human interface module 2202 messaging logic network and that reflect a primary opportunity to evaluate modifying/expanding the automated human interface module 2202 in those specific nodes/areas to expand the automated human interface module's 2202 ability to increase the success rate of completing conversations. Further, the node tag report will provide very specific data about what end users are focused on with their response selections and custom messages at time of exit. By expanding the automated human interface module's 2202 capacity to automatically extend and resolve more conversations the efficiency of the automated messaging platform is increased.

Survey Bots/Bot Survey Mode.

Most organizations are eager to receive user feedback for their customer support services. Bot survey mode (or Survey bots) enables the communications module 204 to extend a conversation session 2220 of one of the automated messaging bots 2202 described above so that answers to survey questions are directly connected to the conversation session 2220 scope of the automated messaging bot 2202. At the same time, the end user's 320 interactions are managed and stored separate from the record of the conversation session 2220, ensuring that the survey bot question interactions are not stored as part of the actual conversation history of the conversation session 2220, survey questions are not reviewable by the end user 320, and the survey question responses are not directly viewable by live support agents such as the sub-channel administrators 392 or the primary communication channel administrators 380.

In an exemplary embodiment, at a server system 200 comprising one or more processors 24 and memory 192/290, using a unique identifier 218 received from a first user to obtain characteristic information from a user profile corresponding to the first user that is stored in one or more data stores 224, the first user is joined to a plurality of pre-existing primary communication channels 210 based upon the user profile information for the first user. Each primary communication channel in the plurality of primary communication channels facilitates electronic communication between a corresponding enterprise data source 102 and a first remote user device 104 associated with the first user. Each primary communication channel 210 in the plurality of communication channels hosts a different plurality of users. The first user is joined, for a first primary communication channel in the plurality of primary communication channels associated with the first user, to one or more pre-existing sub-channels 212 associated with the first primary communication channel. A first message that is posted by the first user is received. The first message comprises (a) a key 398 identifying a first sub-channel 212 in the one or more pre-existing sub-channels, (b) a first application programming interface token identifying the first user, and (c) a first communication. An example first communication is the text message "I would like to see what is on sale today." Another example of the first communication is a selection of an affordance of a GUI presented to the first user, which includes an affordance for "Sales." Selection of this affordance (e.g., radio button) by the first user generates the first communication that indicates that the user would like to see what is on sale. Responsive to the first message, a first automated human interface module 2202 engages in electronic conversation with the first user using the first sub-channel 212. The first automated human interface module includes a node graph 2208 that directs one or more states of the electronic conversation. A second message that is posted by the first automated human interface module is received. The second message includes (a) a key identifying the first sub-channel, (b) the first application programming interface token identifying the first user, and (c) a second communication responsive to the first communication. The first application programming interface token and the key included in the second message to route the second message to the first remote user device within the first sub-channel thereby initiating a first secure bidirectional conversation between (i) the first remote user device 104 associated with the first user and (ii) a first enterprise data source 102 associated with the first primary communication channel.

In some embodiments, the conversation with the first user is not with an automated human interface module but is rather between a sub-channel administrator 392 or primary communication channel administrator 380 and an end user. In some embodiments, the conversation with the first user begins with an automated human interface module but is later transferred to a sub-channel administrator 392 or primary communication channel administrator 380. In some embodiments, a survey chat bot is engaged at the end of such a live conversation (between a sub-channel administrator 392 or primary communication channel administrator 380 and an end user), at the end of a conversation 2220 with an automated messaging bot 2202, or is initiated by a live supporting agent, such as a sub-channel administrator 392 or the primary communication channel administrators 380. In some embodiments, a survey chat bot is engaged at the end of a conversation even in instances where no part of the conversation ever went live between a sub-channel administrator 392 or primary communication channel administrator 380 and the first end user.

In some embodiments, the survey chat bot is configurable within the communication module 204 to work within a particular sub-channel 212 that is hosting multiple conversations 2220 within one or more automated messaging bots 2202. In such embodiments, the survey chat bot is set up so that when a conversation 2220 in the sub-channel 212 is marked as ended by a live agent (e.g., a sub-channel administrators 392 or the primary communication channel administrators 380) or the automated messaging bot 2202 itself, the survey chat bot is automatically appended to the conversation 2220 in order to interact with the end user 322 in order to conduct a survey associated with the survey chat bot. As an example, in some embodiments, all or a portion of a first secure bidirectional conversation is recorded into a first data structure and the first secure bidirectional conversation to is transferred to a survey automated human interface module at a conclusion of the first secure bidirectional conversation thereby initiating a survey of the first user by the survey automated human interface module. The survey of the first user is not recorded in the first data structure.

Some embodiments of the present disclosure provide automated messaging bots 2202 that have an automatic transfer to a default survey bot. That is, the node graph 2208 of the automated messaging bot 2202 specifies a particular default survey bot that is to conduct a survey at the end of each conversation 2220 hosted by the respective automated messaging bot 2202. In such embodiments, end users 320 are seamlessly transitioned to the first node in the survey chat bot.

Some embodiments of the present disclosure define a default survey bot on a sub-channel 212 basis. In such embodiments, each respective conversation 2220 within the sub-channel 212 is automatically transitioned to the default survey chat bot after the respective conversation is closed by either a (i) live support agent (e.g., sub-channel administrators 392 or the primary communication channel administrators 380) or (ii) the corresponding automated messaging bot 2202 that is hosting the respective conversation 2220. In such embodiments, end users 320 are seamlessly transitioned to the first node in the survey chat bot.

Some embodiments of the present disclosure define a default survey bot on a primary communication channel 210 basis. In such embodiments, each respective conversation 2220 in each sub-channel 212 within the primary communication channel 210 is automatically transitioned to the default survey chat bot after the respective conversation is closed by either a (i) live support agent (e.g., sub-channel administrators 392 or the primary communication channel administrators 380) or (ii) the corresponding automated messaging bot 2202 that is hosting the respective conversation 2220. In such embodiments, end users 320 are seamlessly transitioned to the first node in the survey chat bot.

In some embodiments, a survey chat bot is fully customizable on a per sub-channel 212 or a per primary communication channel 210 basis and can contain a multitude of nodes in the form of a node graph 2208 disclosed above for the automated messaging bot 2202. That is, in some embodiments, all node types that are available for automated messaging bots 2202 are available for survey chat bots. As such, in some embodiments, the survey chat bot comprises a multitude of nodes 2210 within its node graph 2208, and these nodes are connected by edges.

In some embodiments, a different survey chat bot is defined for each sub-channel 212. In some embodiments, a different survey chat bot is defined for each primary communication channel 210.

Net Promoter Score.

In some embodiments, a survey chat bot facilitates the computation of a net promoter score for a conversation 2220. A net promoter score is designed to represent how an end user 320 feels about the enterprise data source 102 that they engaged with in the conversation 2220. For instance, in some embodiments, the net promoter score provides a measure of how the end user 320 feels about the quality of customer support in the conversation 2220. In some embodiments the survey chat bot asks the end user 320 a single question in order to derive the net promoter score such as, "On a scale of one to ten, how would you rate your experience with our support service with you today?" Based on what the user selects to a question such as this, the net promoter score is computed. In some embodiments, the computation of the net promoter score is more complex and multiple questions are posed to the end user 320 by the survey chat bot. For instance, in some embodiments, the survey chat bot asks three or four questions and then computes the net promoter score using a predetermined formula based upon the responses to the three or four questions. In some embodiments, the questions are nodes 2210 on a graph and which nodes (and thus which questions) are posed to the end user 320 is determined by the end user's answers to earlier questions in the session with the survey chat bot.

In some embodiments, the net promoter score is reported for a single conversation 2220. In some embodiments the net promoter score is aggregated across all the conversations 2220 in which a particular sub-channel administrator 392 is engaged in a live conversation at some point within the overall conversation. In some embodiments, the net promoter score is aggregated across all the conversations 2220 in a particular sub-channel 212. In some embodiments, the net promoter score is aggregated across all the conversations 2220 in all or a sub-set of the sub-channels 212 associated with a primary communication channel 210. In some embodiments, only those conversations that have completed within a predetermined period of time are used in such aggregation (e.g., the past five minutes, the past hour, the past day, the past week). In some embodiments, those conversations that terminate or occur at particular times of the day (e.g. business hours) or the week (work days versus holidays) are aggregated. In some embodiments, net promoter scores of conversations that have more recently been completed are given higher weight than conversations that were less recently completed in such aggregation.

Figure 24:
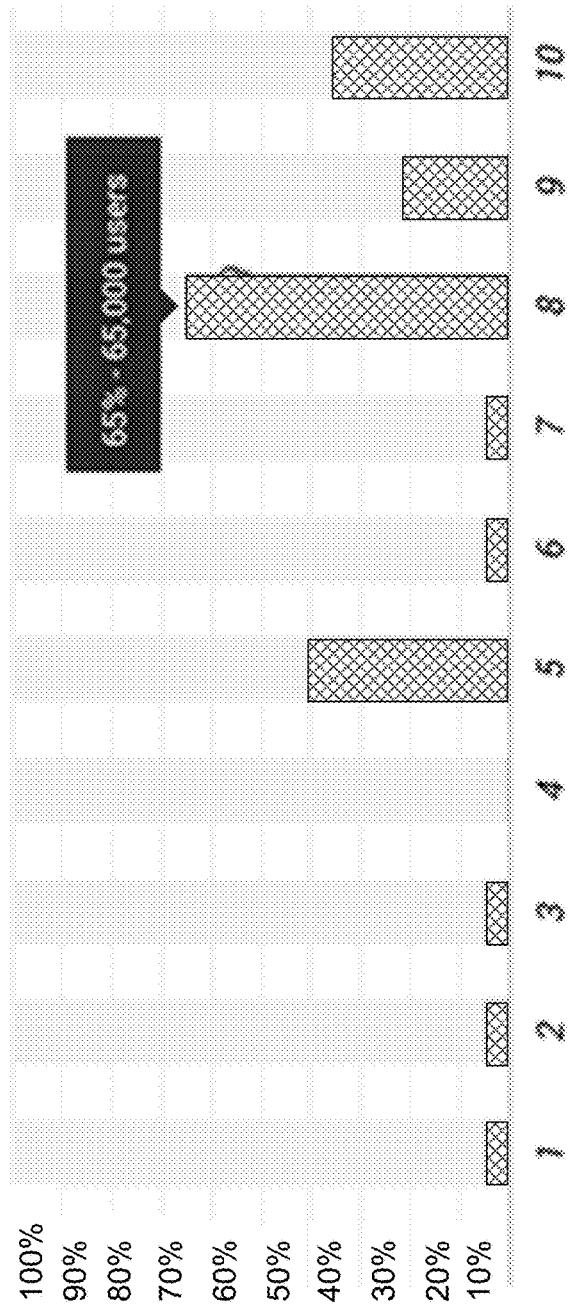
FIG. 24 illustrates a sample aggregated report from a survey chat bot that collects numeric survey data in accordance with an embodiment of the present disclosure.
Figure 25:
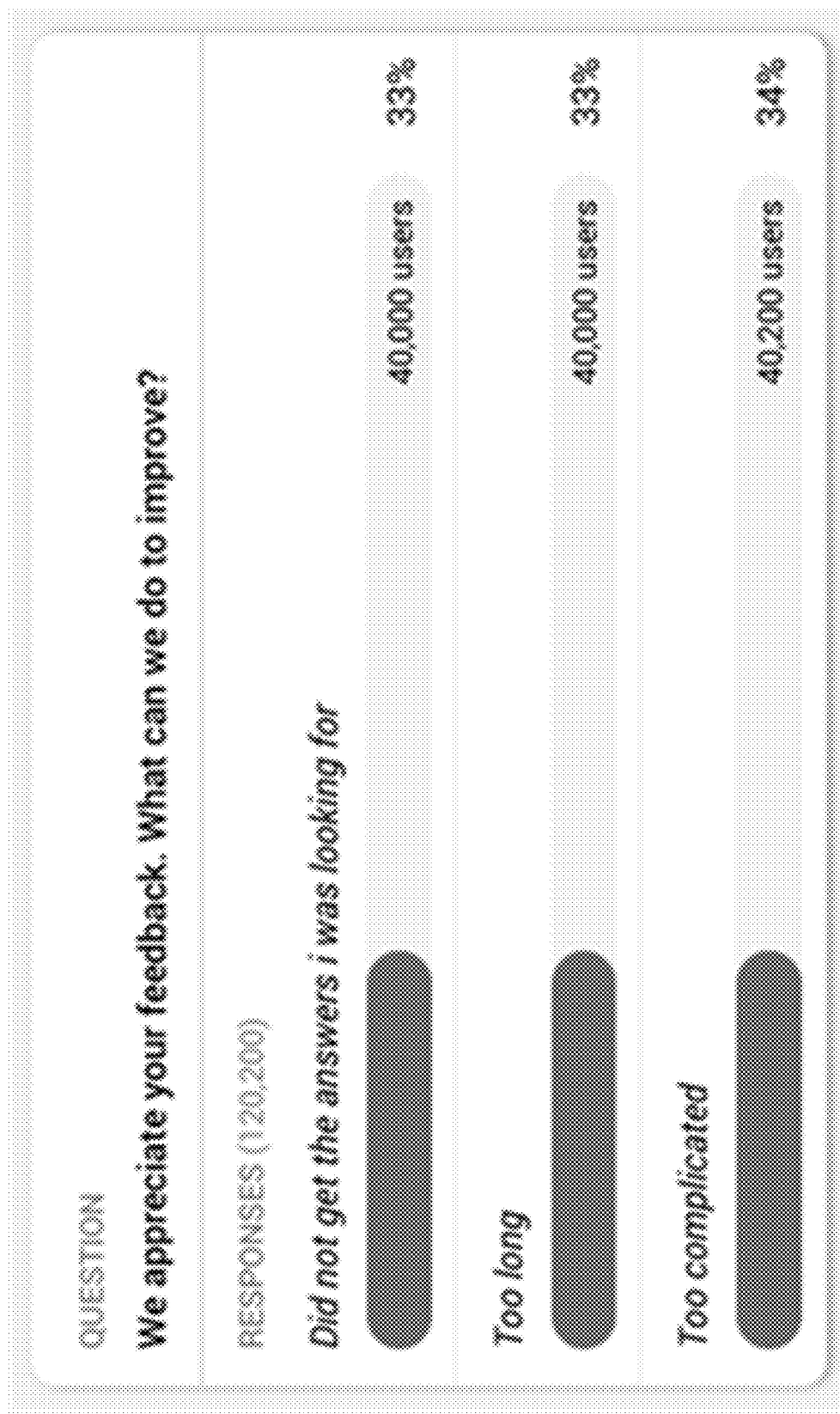
FIG. 25 illustrates a sample aggregated report from a survey chat bot that collects text based feedback in accordance with an embodiment of the present disclosure.

In some embodiments, for each survey chat bot, a specific net promoter score survey question is defined. Data for the node 2210 hosting this survey question is automatically collected, aggregated and presented back to the support center administrator (e.g., the sub-channel administrator 392). In some embodiments, the net promoter score is automatically tracked for (i) each automated messaging bot 2202 conversation 2220, (ii) each live agent (e.g., sub-channel administrator 392) conversation, and/or (iii) per automated messaging bot 2202 per day as well as historically as well as across all automated messaging bots within a sub-channel 212 and/or in all or a subset of the sub-channel 212 in a primary communication channel 210. In some such embodiments, a dedicated report is automatically generated covering all questions for each survey chat bot. In some such embodiments, each report presents survey data in one of two formats, depending on whether the survey question answers gathered integer/numeric or character/text based feedback. FIG. 24 illustrates a sample aggregated report from a survey chat bot that collects numeric survey data. FIG. 25 illustrates a sample aggregated report from a survey chat bot that collects text based feedback.

Chat Bot Session Self-Management and Instantiation.

Referring now to the automated messaging bots 2202 as disclosed in FIG. 22, in some embodiments each chat bot conversation 2220 is based on a dedicated chat bot instance. In some such embodiments, the automated messaging bot 2202 provides a chat bot conversation 2220 self-management and initiation feature that provides flexibility for chat bot conversations 2220 to be ended and initiated by automated messaging bots 2202 themselves. For instance, consider the case where a given end user 320 has initiated a conversation 2220 to order products. Historical data associated with the given user 320 indicates that the user typically orders six products. Thus, in this example, the chat bot conversation 2220 self-management and initiation feature would recall the cart from the last conversations the given end user 320 participated in and pre-populate the cart with the six products the user is likely to order. The end user 320 can then remove or add items to pre-populated cart and the pre-populated cart represents a better initial state then requiring the user to add the six items the commonly order to the cart.

Thus, in some embodiments, an automated messaging bot 2202 provides the option of loading the details of a prior conversation that a particular end user 320 engaged in. For instance the end user 320 could have completed a particular transaction they were doing, but it may still be helpful to have some or all of the details of the last transaction. Thus, for some automated messaging bots 2202, for some types of transactions, the historical data is automatically loaded. In alternative embodiments, the end user is given the option to load the historical data from one or more prior conversations 2220 the particular end user 320 engaged in. For instance, in such alternative embodiments, the end may say, "No, it doesn't make sense to load the historical data. I have something completely different that I want to do. I'm going to just, you know, I want to start without historical data." In another example, the automated messaging bot 2202 offers to a particular end user 320 "We have historical data for you that indicate that you engaged with us the following five times in the past two months. Would it be helpful to load the selections you made in any of these transactions to more streamline the current transaction?" Responsive to this, the end user 320 may pick not just the last transaction, but maybe they would say, "Oh, you know, the transaction from three weeks ago is the one I would like to start with."

In still another example of the self-management and initiation feature for an automated messaging bot 2202 that directs a user through a set of steps in each conversation 2220. In this example, the automated messaging bot 2202 loads the prior conversation 2220 associated with the given end user and provides a summary of the conversation to the effect: "Okay. This is what you did the last time at each of these six steps—would you like to change your response to any of the steps?" The user can then navigate through the historical information making any necessary changes before proceeding. In this way, the user does not have to enter in all the information for each of the six steps each time they engage in an instance of a conversation 2220 in order to perform a repetitive or partially repetitive transaction. Instead, the end user 320 goes through, selecting the nodes 2210 or aspects that need to be changed rather than entering all new information. The automated messaging bot 2202 takes the end user 320 to each node, and the user modifies their selection. In some such embodiments, after making their selections at each of the relevant nodes 2210, the end user 320 gets an updated summary, of their selections that they review again, and, once they are satisfied with their selections, indicate to the automated messaging bot 2202 that all the entered information is correct. In this way, a conversation 2220 for an automated messaging bot 2202 that has an arbitrary number of steps each requiring end user 320 input can be executed by making a minimum number of changes, if any, and, advantageously, the end user 320 is able to now complete the order or whatever the process is associated with the automated messaging bot 2202 and encoded by the automated messaging bot's node graph 2208 in a streamlined experience.

A chat bot can thereby end its own chat bot instance, and thereby end the conversation, and at the same time initialize a process to instantiate a new chat bot instance and seamlessly initiate a new conversation for the end user in a different bot within the stream's Pypebot framework (extended bot graph).

New Chat Bot Instance Initialization Options.

Advantageously, in some embodiments, automated messaging bots 2202 include a number of initialization options. One such option is to load historical data, such as data from a recent chat session (conversation 2220) with an automated messaging bot 2202 and the present end user 212 that operated in the same sub-channel 212 as the newly initialized automated messaging bot 2202. In this way, during invocation of the automated messaging bot 2202 (or the initialization of a new conversation 2220 with the bot 2202) historical data may be loaded, such as data from a recent chat session with an automated messaging bot 2202 and the present end user 212 that operated in any sub-channel 212 under the same primary communication channel 210 as the newly initialized automated messaging bot 2202. When automated messaging bot 2202 invocation is enabled in this way, data from the user's last chat session with such an automated messaging bot 2202 can be automatically preloaded into a summary node of the chat bot session hosted by the automated messaging bot 2202, or any of the nodes 2210 of the automated messaging bot 2202. For instance, the data can be seeded into appropriate nodes 2210 of the automated messaging bot 2202.

Moreover, beyond just initialization of a bot 2202 or the initialization of a conversation 2220 hosted by a bot 2202, the use of the summary node can significantly reduce the interactions a user needs to have with the automated messaging bot 2202 to complete their intended transaction(s). For instance, consider the case where the automated messaging bot 2202 is asking a series of questions within a conversation 2220 that it needs all the answers to in order to be able to complete a particular interaction or business transaction. Before finalizing the transaction, the automated messaging bot 2202 may say, "Okay. We have spent the last X amount of minutes answering questions. Here is what I have. Here is what I'm going to submit. Please take a quick look to see if there is anything you want to change." In this way, the summary node is used to bring in historical data. As noted here, the summary node may be used to bring in historical data from within the same chat session or from a prior chat session. The summary node may be used when a bot initializes a new conversation 2220 or any time during the conversation 2220.

In some embodiments, a number of automated messaging bot 2202 configuration options are provided. One such option is default, which indicates whether historical chat data should be loaded by default. When this option is invoked historical chat data (e.g., from the same sub-channel 212 with the same user 216) is loaded by default by the automated messaging bot 2202. Another such option is that historical chat data is loaded by user choice. For instance, when a data inclusion user choice option is invoked, the automated messaging bot 2202 asks the active user 212 whether the most recent historical data associated with the active user in the sub-channel 212 should be loaded. As another example, when a historical chat session selection option is invoked, the active user 216 is asked to select a specific historical chat session, by e.g. date/time, from which the data should be referenced. This option enables the active user 216 to select and have the automated messaging bot 2202 load the historical data set that is most similar to the user's current needs.

Summary Nodes.

In some embodiments, as referenced above, one of the nodes 2210 of an automated messaging bot 2202 is a summary node. When the automated messaging bot 2202 has historical data for a series of connected nodes 2210 in the node graph 2208 of the bot 2202, the bot can present a summary of the user's data in one message. This enables the bot 2202 to display the available data to the user. This saves the user the time to respond to each question. As an example, the bot 2202 may say "Here is what I have based on the historical data we loaded for you and all the information is accounted for except for two missing items." So the user would fill those in or if everything's complete, like I mentioned earlier, then the user might select a specific items to say, "Okay. I just want to change, out of these ten items, I want to change number two and number seven." And then they'd go ahead and do that, get an updated summary, and, if they're all good, right?, they'd say, "Okay. I'm good to go. Let's process this transaction." Thus, when an automated messaging bot 2202 requires one or two data points, it would present the user with those nodes and then present the summary node message. Through the summary node edit process, the user can efficiently edit only those data points that are applicable for that particular session and leverage the remaining data from a previous conversation 2220. As such, an embodiment of the systems and methods of the present disclosure provides a summary node edit process in which the user 216 can select and change a response to a specific node 2210 and will then immediately be presented with an updated version of the summary node. The user 216 may elect to edit specific additional node data. In some embodiments, direct return (boomerang) node edges are present in the node graph 2208. This edge type in the node graph 2208 enables the summary node to navigate the user to the appropriate/selected node 2210 in the bot 2202. After the user interacts with that node, the user is immediately returned back to the summary node, bypassing any standard node flow sequence from that node. For instance, if the user was in the summary node, and indicated that a desire to change one thing, the bot 2202 presents a second node that enables the user to make this change. However, because the user was brought over to the second node as part of a special process (along a boomerang edge), the user is then actually sent back to the summary node, as opposed to the node or nodes that second node normally progresses to upon node completion. As such, it will be appreciated that the plurality of edges of a bot define an ordered sequence in which nodes in the plurality of nodes of the bot are invoked, and the instructions to edit the summary information drives a secure bidirectional conversation associated with the bot outside of the ordered sequence.

Defined Start Node Bot Instantiation.

The defined start node bot instantiation enables a bot 2202 or live agent to trigger the initialization of a new bot instance 2202 (e.g. a conversation 2220 hosted by the bot instance) and also define the exact starting point, e.g. node 2210, of the new conversation within the bot. Without this option any new bot framework instance starts at a default bot specific starting point, which is typically to await and then evaluate initial end user input and then send the user to the most appropriate bot. Since there are many use cases where it is preferable or necessary to start a new bot conversation 2220 at a pre-defined node 2210 within the bot 2202, the start node can be specified as part of the bot instantiation request function in accordance with the systems and methods of the present disclosure. The bot may thereby, for example, present the user with an initial message and options to select from that are accurately relevant to the topic/task the user is interested in. If that information is already available prior to the instantiation of the bot, leveraging that knowledge will yield a better user experience. As such, in some embodiments, a first communication initiating a conversation from an end user is evaluated, prior to the bot responding with a second message, to select an initial node in the plurality of nodes of the bot based upon the content of the first communication. This selected initial node is then used by the bot to generate the second (responsive) communication.

One use case example for the above-described defined start node bot instantiation is a survey bot. In this use case, the end user 216 has completed a conversation (e.g. it has been closed by either a chat bot or a live agent). In this use case, the end user is presented with a survey; e.g. transitioned to a survey bot. The user completes the survey and is then presented with a multitude of options, including (optionally) the opportunity to initiate a new conversation in the same or a different bot. Thus, consider the case in which the user is in an existing conversation 2220 with a bot 2202 and the conversation is reaching an end point. For instance, a transaction within the conversation has been completed. Instead of the bot 2202 just signing off and saying, "Okay. The conversation's ended," the first bot 2202 hosting the transaction itself, or via transfer to a survey chatbot 2202 can make use of the defined start node bot instantiation feature to provide the user with options for further transactions associated with the enterprise data source 208. For instance, the bot 2202 may say the bot can provide one or more survey questions such as "Is there something we can help you in the technology department or would you like to make an appointment now?" Thus, the answer to this question can lead to one of two specific starting nodes in a new conversation. Indeed, the answer to the question can lead to the instantiation of different types of bots, initiated at particular nodes. Thus, in accordance with this example, upon conclusion of a first secure bidirectional conversation with a first automated human interface module (bot), an end user is subjected to a survey within the sub-channel that was hosting the first secure bidirectional conversation. In this way, a survey result is obtained within the first sub-channel based upon one or more responses of the end user to the survey. The survey results are evaluated to select an initial node in a plurality of nodes of another automated human interface module (bot) based upon the survey result. This initial node is used by the second automated human interface module to initiate a second secure bidirectional conversation between the remote user device associated with the end user and the enterprise data source associated with a primary communication channel that includes the sub-channel.

Another use case example for the define start node bot instantiation is facilitating and streamlining multiple orders/tasks. For instance, at the end of a particular transaction, a bot 2202 may say "Okay. Well, is there something else I can help you with?" For instance, the user may have successfully completed their first task of, e.g. changing the flight time for a trip on the same day. The user now wishes to complete a booking for a different trip. By using the define start node bot instantiation, the bot 2202 is able to pass on information so that when the new bot gets initialized, the bot can be smart and proactive enough to say to the user 216 "Okay. We've completed the last session in which you indicated that you actually want to make this reservation now, we're going to allow you to do that at this time." In this way the reservation is treated as a separate ticket. As an alternative to this, for a particular end user 216, the bot 2202 supports the ability to trigger a new conversation 2220 and at the end of a transaction presents the user with an affordance. If the user selects the affordance, the bot will either initiate a survey bot or jump to a survey node within its own node graph. In either case, the end user is presented with the message such as "Can I help you with anything else?" when the affordance is selected. Thus, the current bot 2202 instance (e.g., the conversation 2220 hosted by the current bot 2202) plans to shut down but the bot knows the user clicked on the affordance (e.g., button). So as soon as the current bot instance shuts down (e.g., the current conversation 2220 is terminated), the bot 2202 initiates a new bot 2202 instance and, instead of the user 216 just typing in the standard introductory requested information specified by the node graph of the new bot 2202, the new bot, because of the additional information from the last bot instance by way of the defined state node bot instantiation, will initiate at a very specific node in the bot node graph. For instance, the bot may say "Okay. You've finished a prior transaction. We are starting a new transaction here, and, because of the information you had previously provided, we are starting you right off here." Advantageously, the end user 216 does not have to worry about the separate ticket numbers for the two conversations 2220 or whether the bot 2202 hand off occurs. However, from an overall tracking perspective the defined start node bot instantiation feature provides the flexibility to allow end user 216 to spin up or spin down bot instances (e.g., conversations 2220) and jump to specific nodes within these instances. Moreover, the bot instances 2202 that are spun up (initiated based on a prior bot instance) can be in a different category than the original bot. Thus, in some embodiments, upon conclusion of a first secure bidirectional conversation with a first bot, an initial node in a plurality of nodes of a second automated human interface module (bot) is selected based upon an end state of the first secure bidirectional conversation. This initial node is used by the second bot to initiate a second secure bidirectional conversation between (i) a first remote user device associated with the first user and the enterprise data source associated with a primary communication channel that includes the sub-channel.

As another example, consider the case where there is an overall bot platform and one bot handles reservations. The way a reservation is normally handled is the user opens up their application and types "I'd like to make a reservation" to which the response "Where would you like to go?" is provided. But in some cases, where the user has already made a reservation, the user is given options to say, "Okay. Are we all done? Would you like to make another reservation?" If the user clicks on "Make Another Reservation" and if the enterprise data source wants to execute this as a separate conversation and transaction, instead of just moving the user back to a certain node in the existing bot instance, the enterprise data source 374 may desire that the current conversation be closed in favor of a new ticket/bot instance. Then, because it is known that the user wants to make a new reservation, the user is moved to a very specific node within the new bot instance to start a process of making the new reservation.

Still another use case example for the define start node bot instantiation is live agent (e.g., sub-channel administrator 392) to chat bot 2202 conversation transfer. This is the ability for agents to transfer a conversation to a chat bot. The primary scenario is for an agent to select a specific available chat bot 2202 and typically an accessible target 'entry' node within the selected bot.

Thus, consider the case in which there is a conversation between a user 216 and a bot 2202 and the bot moves the user you to a live agent. Thus, the user talks to the live agent, and, at some point in this live the conversation, they complete whatever issue there was and resolve it. It that time the live agent determines that a remaining issue the user has is easily handled by a bot. In accordance with an embodiment of the systems and methods of the present disclosure, the agent is able to pass the conversation back into a bot. But, instead of just always moving the user to the top of the node graph 2208 of the bot where the bot queries the user for basic information all over again, that is the bot doesn't know anything and/or is just waiting for the user to make an input by typing an initial message, the conversation 2220 is moved to a very specific node 2220 in the bot. So, then, as soon as the transition happens from the live agent to the bot, the conversation is moved into a specific node. Because of this, for example, the bot may immediately say, "Oh, okay. I can help you make that reservation and here is the information I need." This advantageously provides a much more seamless transition that enables the bot to move a conversation to a very specific node, where the bot immediately provides the user with a comment or asks a specific question for the user that advances the transaction from the point the live agent intended.

The process requires the bot initialization function. It also depends on the ability to specify the target node 2210 within the node graph 2208 of the chat bot 2202, which allows a bot to initiate the conversation 2220 with the end user 216 as part of the transfer. Since the agent knows what the user is looking for, it is appropriate for the bot 2202 to begin the conversation at the right point (e.g., at the right node 2214 in the node graph 2208 of the automated human interface module 2202) without the user having to restate the question for the bot. This use case scenario is beneficial because it allows agents to offload conversations that may have initially required live agent support, but have transitioned back to a standard workflow. This use case scenario is also beneficial because it allows the live agent to, upon identifying a common scenario, initiate a transfer to a chat bot. This use case scenario is also beneficial in situations where the initial live support case is successfully concluded and the user has an additional request, one that can be readily handled by a chat bot.

Multi-Level Bot Level Exception Handling—Level 3.

Bots 2202 are designed to be able to pull information from external data systems. This may be done by any of a number of standard methods, such as API calls. Thus, under normal circumstances, a bot 2202 gets to a certain node 2210 in its node graph 2208. The bot 2202 has enough information to make an authenticated call to an external system in order to pull information in for a specific user 216. However, sometimes the external system may be down when this call is made. Accordingly, in some embodiments, each automated human interface module 2202 includes a core multilevel exception handling protocol to handle such situations. For instance, if the bot 2202 finds a conversation 2220 it is hosting to be in an exception state, such as the above illustrated case where an external system completely failed to respond to a call (as opposed to instance where the external system properly responded to the call with null results because there was nothing that match the query made by the bot in the call to the external system), the bot 2202 recognizes the occurrence of the exception state and transitions the conversation 2220 to an exception handling node 2210 within the bot's node graph 2208. In some embodiments, this exception handling node 2210 is customizable by the enterprise data source 208 of the associated primary communication channel hosting the bot 2202 so that the enterprise data source 208 has control over the look and feel of such exceptions. For instance, in some embodiments options are provided to the enterprise data source 208 to customize some of the wording and some of the options that they want to make available when an exception arises. In some embodiments, such options include whether to move the conversation to a live agent. In some embodiments, such options include notifying the user that this part of the bot 2202 doesn't work and providing the user with a help menu or suggesting to the user that they try a different transaction.

As such, in some embodiments, the systems and methods of the present disclosure provides bots 2202 that include what is termed here to be level three exception handling. Level three exception handling is a data exchange failure with an external system. As discussed above, many bots 2202 interact with external data stores by way of, for example, APIs. The bot 2202 external data exchange exception handling process is aware of when a bot instance is awaiting a response to, for example, an API request. If there is no response or the server responds with an HTTP error code, the bot 2202 understands the issue and initiates an appropriate protocol that retrieves the error code and then moves that information to a customizable exception handling node within its own node graph 2208 or terminates the conversation 2220 and initiates another specific bot 2202 (an exception handling bot) to handle the error. The exception handling node or bot can be customized to provide the user with a predetermined type of response, including the most appropriate alternative/next steps the user can take. As such, level three bot 2202 exception handling supports any number of similar failure types, external API call failures being just one example. Another example is the failure of a feature extending plugin.

Multi-Level Bot Level Exception Handling—Level 2.

In some embodiments, the systems and methods of the present disclosure provide bots 2202 that include what is termed here level two exception handling. Level two exception handling is a bot 2202 conversation 2220 failure. In such embodiments, the communications module 204 and/or the bot 2202 provides a background monitoring process that provides a continuous assessment of each bot conversation 2220. This allows the bot to be aware if it becomes stuck on some process (e.g., at some node 2210), for instance due to a design flaw or any event that results in unexpected behavior resulting in the bot becoming unresponsive. In some embodiments, the bot 2202 platform (e.g., communications module 204) can be configured to define the allowable latency. Once the latency period is reached, the core of the bot 2202 exits the bot out of its current holding state and moves the conversation 2220 to the exception handling node.

As an example, consider the case in which a bot 2202 is constructed to make some calculations and while making these calculations there is an exception. The bot 2202 has received information that it, in the end, can't compute. Typically, this is the result of some king of design oversight in terms of how the bot is designed. Perhaps, as a result of this design flaw the bot is stuck in some form of logic loop or did not put in place enough control over the data input (e.g., where the user is provided three input options and the bot just accepts the option and then later tries to aggregate the information, but the inputted information is out of bounds or out of scope. For instance, the bot should have told the "Oh, I can only accept a number between one and ten." but, for some reason, the bot designer didn't put validation parameters around the input and allowed the user to put a number that is out of range such that later calculations by the bot fail. Level 2 exceptions define what happens when these types of bot failures arise. Typically, the exception is processed by routing the conversation 2220 to the level two exception handling node 2220 or ending the conversation 2220 and routing the user to a level two exception-handling bot 2220 that will provide an appropriate message back to the end user.

Another example of a level two exception is as simple as the input was a telephone number, dashes are not allowed, but the user wasn't told that. So the user put dashes in. The bot does not tell the user there shouldn't be dashes and then a little bit later on, the bot is trying to do something with the phone number, like run the comparison or some kind of check. Then, with the unexpected dashes, the script fails and gets stuck.

Multi-Level Bot Level Exception Handling—Level 1.

In some embodiments, the systems and methods of the present disclosure provide bots 2202 that include what is termed here level one exception handling. Level one exception handling is for exceptions arising from the platform 200 itself. For example, consider the case where a new message comes in. By default, what is supposed to happen is that the bot communications module 204 is supposed to wake up. That is, there is supposed to be an instantiation of a chat bot 2202. But suppose there is no response. For instance, the communications module 204 is signaling there is a message coming in and nothing happens. That is, no bot 2202 acknowledges to the communications module 204 that it will handle the new message. So, in that case, a level 1 exception is thrown, outside of the bot platform itself. That is, the system 48 needs to be smart enough to understand there is a problem and to send the user a message that indicates the chatbot platform is not available, or something to that effect, and then automatically move the conversation to a live agent.

In some embodiments, the bots 2202 are served from a source (e.g., server, server farm, virtual machine) that is separate and apart from bot platform hosting the enterprise source side communications module 204. At the communications module 204, when a message from a user comes in within a particular sub-channel 212, the module 204 is configured to know that for this particular communication in this particular sub-channel, that there are certain bots 2202 that such messages should be routed through. That is, such messages are to be routed to a bot 2202 first instead of going directly to a live agent. So the communications module 204 will try to initialize a conversation 2224 with an appropriate bot 2204 responsive to the message. This is done be sending instructions within the appropriate sub-channel 212 for the bot 2202. If the communications module 204 does not get an acknowledgement from a bot 2204 in response to the instruction, then the communications module 204 will throw the level 1 exception. As a result of the level 1 exception, the communications module 204 may, for example, send the user a message that lets them know that the automated service is offline but that they are going to be transferred to a queue for a live agent. Thus, when a level one bot platform failure is detected, a process external to the bot framework triggers a process that enables the platform to inform the user that the platform is currently not available. The exception handling node/bot could be setup to automatically make a connection with a live agent the primary alternative. Moreover, alert notifications can be triggered to be sent out to external channels.

Bot Compiler and Intrinsic Bot Capabilities.

In some embodiments, when a bot 2202 is implemented, the required last step to activate the bot is to compile it. The compiler has two primary purposes. First, to provide an efficient definition output file. In some embodiments, the compiler creates the finalized bot 2202 definition file in an efficient JSON format. This output file is similar to the instructions/information contained in a complete DNA sequence of a living organism, in that it contains all the instructions to instantiate a bot 2202 and run any number of bot sessions, each hosting a conversation 2220. The second primary purpose of compilation is to provide intrinsic bot 2202 capabilities. The compiler contains a set of core bot blueprint instructions that define core, intrinsic bot behavior. It is a set of processes that are included in the structure of every bot. This set of instructions defines the essence of bots 2202, as it governs the core bot capabilities and rules by which they operate. This allows for the efficient continuous expansion and evolution of the bot 2202 framework and operating system. FIG. 27 illustrates an example bot definition file that is compiled into a bot 2202.

In some embodiments, the bot compiler creates a final output file for a bot 2202. As part of this compilation process, the compiler makes sure that there are certain core elements to the bot 2202 and that the output file that meets specific requirements. In this way, any time a bot 2202 design is updated, the bot has to go through the compilation process because that compilation process produces the end output file that is needed by the actual bot platform that runs the bots. Once a bot 2202 is compiled, which only happens once to produce an output file, the output file is stored on the secure mobile communication platform server 200 or on a server computer that is securely addressable by the communication platform server 200. When a new message comes in, the overall messaging framework calls out to the bot framework to alert the framework that a new message has arrived. In response, the bot framework spins up a new bot instance by reading from the very bot file that contains all the information that is needed for the bot to behave properly. In this way, a very efficient way to spin up an instance of a bot is provided in response to a new incoming message that, when parsed, triggers the beginning of a new conversation. The compilation process performs the time-consuming tasks such as automatically expanding keyword tags and phrases for all the entry nodes, making sure that the node graph 2208 has got all the proper connections, and similar tasks. So it is acceptable that the compilation process to take a little bit of time. The compilation process results in an efficient output file that is perfectly suited, to spin up instances of bots 2206 very efficiently and quickly responsive to incoming new messages that signify the request for new conversations 2220.

In some embodiments, the core bot definition comprises an automated node tag/phrase pluralization and lemmatization. Compilation automatically extends the tags and phrases used for the NLP matching algorithm for every node in the graph.

In some embodiments, the core bot definition includes a statistics node, which is a central node that captures all aspects of each conversation session and saves it to chat session metric logs. Exemplary session metric logs include, but are not limited, to, active chat duration in which the bot framework tracks both overall chat session (conversation 2220) duration and the active interaction time. The 'overall chat duration' tracks the time between the beginning and end of the chat session. The 'active chat duration' is derived from removing all 'pause' segments during which the user is unresponsive for more than a pre-configured active period of time, e.g. 30 seconds, or 1 minute. The "active chat duration" thereby accounts for typical chat conversations, which may naturally involve breaks in the conversation; e.g. if the user is temporarily otherwise engaged (e.g. incoming phone call, or peer to peer chat). Combined with the overall chat duration, the 'active chat' duration metric thereby provides a clear picture of the actual amount of time end users interact with a bot.

In some embodiments, the core bot definition includes an exception handling node, which is the node 2210 through which all bot 2202 internal exception communication, described above, flows.

In some embodiments, the core bot definition includes a conversation re-routing/jump node, which is a base node through which all 'unexpected' free form user input flows, as described in more detail below.

In some embodiments, the core bot definition includes a disambiguation node. This is the base node that receives and processes multiple node matches based on natural language processing evaluation of the end user's message. When a bot expects free form input from a user, the user's message is evaluated for the most appropriate node matches across the entire graph. When the matching algorithm determines that one or more matches have relatively equal matching scores, the chat bot protocol, via the disambiguation node, responds back to the user, inviting the user to select from the available interpretations and their associated matches across bots. Example disambiguation chat exchange is:
  User: "Can you help me with a claim?"
  Bot: "Sure, I am glad to help you. Please select one of the claim options:" (Submit a new claim) (Check claim status)
This reflects natural conversational response and will on average result in a more streamlined resolution and better user experience, compared to the chat bot always automatically selecting the most highly matched option. Thus, in some embodiments, each node in the plurality of nodes of a bot is associated with a different plurality of tags as illustrated in FIG. 22. One of the bot nodes in the bot node graph is a disambiguation node. A message from the end user is received by the bot that includes a communication that is free form input from the end user. The disambiguation node executes a process that evaluates the communication against each tag in each different plurality of tags associated with a node in the plurality of nodes of the bot, thereby obtaining one or more tags that match the communication. When the one or more matches is a single match, the disambiguation node passes the conversation to the node in the plurality of nodes that is associated with the matching tag. On the other hand, when the one or more matches is a plurality of matching tags, the disambiguation node offers the end user a plurality of options for proceeding with the conversation, where each option in the plurality of options is associated with a node in the plurality of nodes that is associated with a tag in the plurality of matching tags.

In some embodiments, the core bot definition includes a configurable node match inclusion range, which is the range of scores considered for node match inclusion and can be configured per primary communication channel 210 or by sub-channel 212; e.g. a tighter range may deliver better performance for one channel 210 or sub-channel 212, whereas in another, a broader range may serve better.

In some embodiments, the core bot definition includes support for sensitive data nodes. In such embodiments, any node 2210 in a node graph 2208 of a bot 2202 can be defined to contain and thereby operate as a sensitive data node. This configuration setting can be applied to a single node, a subset, or all nodes. In sensitive data mode, data associated with the node (e.g., obtained from the user by the node) is stored as masked data. That is, any data provided or selected by the user is stored in masked characters; e.g. a social security number is stored as: *--****. In sensitive data mode, chat history contains masked data—since sensitive data is stored masked by the bot platform, it thereby appears masked in the conversation's chat history. Any device used for a conversation will always display any sensitive data as masked in the chat stream. For example:
  Bot: "Please enter your customer ID"
  User enters: "1013456" and clicks "Send"
The chat stream now shows the exchange as follows:
  Bot: "Please enter your customer ID"
  User: "*******"
This ensures that sensitive data will not become a security risk if, for example, the device is lost or stolen. All sensitive data will be masked/unreadable. Live support agents are also not able to read any sensitive data in the chat history of conversations between end users and chat bots. The sensitive data will be masked out. Accordingly, one embodiment of the systems and methods of the present disclosure provide a first node in a node graph of a bot that is a sensitive data node and a second node in the node graph of the bot that is a non-sensitive data node. At some point in a conversation hosted by the bot is passed to the non-sensitive data node. While the non-sensitive data node is hosting the conversation, it receives a first set of communications (one or more communications) from the first user as part of the conversation. The non-sensitive data node stores the first set of communications from the first user that have been processed by the non-sensitive data node in a chat history unique to this conversation. At some point in the conversation hosted by the bot, the conversation is passed to the sensitive data node. While the sensitive data node is hosting the conversation, it receives a second set of communications (one or more communications) from the first user as part of the conversation. The non-sensitive data node processes the second set of communications from the first user but does not store them in the chat history. Moreover, it masks the second set of communications on a display of a device used by the end user to facilitate the conversation.

The reason sensitive data is often required is to ensure user authentication or provide required input parameters to complete application program interface requests to external systems. For these use cases, the sensitive data needs to be available in unmasked format. Sensitive data is therefore stored in an active chat bot's session memory. The data only persists as long as the chat session and is secured via standard security protocols. As soon as a chat bot's instance is closed, for example the conversation 2202 is over, all sensitive and non-sensitive data are immediately flushed from session memory.

Conversation Flow Routing/Hyperspace.

Some embodiments of the systems and methods of the present disclosure provide a core user interaction support to respond to 'unexpected' free form user input. This arises, for example, in instances where bots respond to free form user input in one of two primary scenarios (i) when the bot presents the user with a set of predefined options, such as: buttons or a list picker and (ii) when a bot is designed to be conversational in tone and does not present the users with button options during chat flow (in a section or its entirety). Without the ability to a) recognize free form user input and b) the ability to appropriately process and respond to the free form user input, a bot 2202 could become unresponsive, for instance always forcing the user to make a pre-defined selection, or automatically restarting a conversation. Hyperspace and its associated basic capabilities provide both a core process and a flexible way for a bot to respond to such an event.

The basic tenet of the bot 2202 hyperspace is to ensure the conversation 2220 does not become 'suspended/stuck' when a user enters a free form message. Whenever a free form user entry is detected in a conversation, hyperspace is activated and the conversation is moved out of the basic conversational plane and into a parallel level above the bot's entire graph, which is termed hyperspace.

Thus, hyperspace is used in the specific use case scenario where the bot has been enabled to present the user with an option to provide free form input, as opposed to selecting button options or the like from a list picker. If the user provides input in such situations that is a non sequitur for the current place where the conversation is in the node graph, in that scenario hyperspace is invoked. So, when triggered by seemingly unresponsive user input given the location in the node graph that the conversation is in, hyperspace is invoked to perform a natural-language processing on the user input in which the question is asked as to what kind of matches can be obtained to the user input. In typical embodiments, hyperspace looks for a match at all available level labels (e.g., node tags 2211 in the current node graph 2208, node scope tag expressions 2206, and interface tag expressions 2204). In some embodiments, hyperspace looks for a match against all node tags 2211 of all nodes 2208 of all sub-channels 212 associated with a given primary communication channel 210. The end result of the action of hyperspace is that either there are zero matches (e.g., the bot cannot adequately parse the user's message by finding a matching label within any of the sub-channels of the primary communication channel), there is one node match, or there are multiple node matches.

Hyperspace works by capturing what the user typed in. Hyperspace assumes that the user needs to be lifted out of the current plane of the conversation, at least temporarily. In other words, that the position in the node graph of the conversation is presently not significant given the user's unstructured input. Hyperspace looks for matching tags (e.g., node tags 2211, scope tags 2206, or interface tags 2204). In this way, hyperspace collects all node matches for the given free form user message. It then orders multiple matches in order of proximity to the originating node (e.g. current conversational location in the current bot). For example, any node matches with direct connections to the current node, will be listed as the highest priority. More generally, node proximity prioritization is applied. The nodes 2210 in the node graph 2208 of a bot 2202 reflect a structural organization between nodes 2210 and clusters of nodes. Nodes in 'proximity' to each other, expressed through the quantity and types of edge connections between them, are logically and thematically more connected. Node proximity priority combines with the natural language processing tag matching criteria discussed herein for final matching decisions. In essence, the combination of the highest tag match score and closest proximity represents the best match.

Thus, in accordance with some embodiments of the systems and methods of the present disclosure, each node 2210 in a plurality of nodes of a first bot 2202 is associated with a different plurality of tags 2211. The plurality of nodes of the first bot 2202 constitute a node graph 2208 in which respective nodes in the plurality nodes are connected by edges. A hyperspace function is associated with this node graph 2208. A message is received in a first conversation hosted by the first bot that includes (a) a key identifying a first sub-channel, (b) a first application programming interface token identifying an end-user, (c) a communication, where the communication is free form input from the end user, and (d) a first node in the plurality of nodes that incurred the communication from the end user. Responsive to the message, the hyperspace function executes a process that evaluates the communication against each tag in each different plurality of tags associated with each respective node in the plurality of nodes, thereby obtaining zero or more tags that match the communication. The first bot further ranks these messages based on proximity to the first node.

The hyperspace function provides specific responses based upon the number of matches, an identity of the first node, and a proximity between a node that contains a matching node tag 2211 and the first node.

In some embodiments, the hypergraph function looks beyond just the sub-channel 212 of the originating first node to all the node tags 2211 of all the nodes 2210 of all the node graphs 2208 of all the bots 2202 of all the sub-channels 212 in a primary communication channel 210. Thus, the first bot that originates the message described above is in a plurality of bots, and each respective bot in the plurality of bots includes a corresponding node graph. Further, each corresponding node graph comprises a plurality of nodes and a plurality of edges, and each node in each plurality of nodes is associated with a different plurality of tags. In such embodiments, the evaluating the communication evaluates the communication against each tag in each different plurality of tags associated with a node in each plurality of nodes, thereby obtaining zero or more tags 2211 that match the communication. For instance, referring to FIG. 22, the evaluating may evaluate the communication against the tags 2211 of the nodes 2210 of two or more bots 2202, three or more bots 2202, or the tags 2204/2206 of two or more sub-channels 212.

In some embodiments, the action taken by the hyperspace function can be configured depending on the desire of the particular enterprise data source 374 (customer). For instance, a particular enterprise data source 374 may want to have the hyperspace function query the user to confirm that, before moving the user to a matching node of a matching bot, whether they want to complete their current transaction. In such instance, the hyperspace function may be configured to say, "Before I move you to a new conversation area, we were talking about something else. Do you want to complete that conversation first or would you like me to move me to one of those matching conversation areas right now. Do you want to go to a help menu?" In this way, the hyperspace function provides the user with whatever actions the particular enterprise data source 374 wants to present the user in that use case and the user can make that choice. For instance, in the above example the user could say "Okay. Yes. I actually do want to transition my conversation to one of those other topics of conversation." Or they could say, "Well, okay. You know what? I realize that I'm now sidetracking what I had before. Let me finish that." And so they could go back to the conversation that they were just having with the original bot that detected the non sequitur from the end user and complete that before going on to the next topic.

The hyperspace function is considered to be part of the originating bot. In typical embodiments the hyperspace function has a connection to each node within the bot node graph where unstructured input from the user may arise. As such, the overall process for invoking the hyperspace function is actually a two-step process. The first step is being able to capture the scenario where the user is typing in a custom message when the bot is not expecting it and being able to handle that properly. The hyperspace function looks for matches to the custom message it could move the conversation to if the user wants to accept the move. Further, the hyperspace function evaluates the matches and applies logic that can be fully customized for a particular enterprise data source in terms of how the enterprise data source wants to handle such matches. In some instances, there will be some basic things that the hyperspace function typically will do. In some instances, if there are no matches, the enterprise data source may specify that the hyperspace function will only allow the user to go back to where they originated. In some instances, if there are no matches, the enterprise data source may specify that the hyperspace function will allow the user the choice of going to a live agent. In some instances, if there are no matches, the enterprise data source may specify that the hyperspace function will send the user to a specialized help menu bot.

As such, the hyperspace function captures end-user input that is provided that is not expected. In some embodiments, it then looks across the entire spectrum of tags available for the associated enterprise data source for potential matches. In some embodiments, it looks across the entire spectrum of tags available for the sub-channel 212 for potential matches. The hyperspace function then starts to have a new conversation with the end user around the information. The hyperspace function has knowledge about the user such as what information they have put in. The hyperspace function has the information about what options are available in terms of matches. In some embodiments, while the hyperspace function looks across the entire framework of nodes, matches within the current bot itself are assumed by the jump-node destination bot to be more closely related, and are up-weighted relative to node matches that are in other bots. In some embodiments, while the hyperspace function looks across the entire framework of nodes, matches within the current bot itself that are closets to the node in the bot in which the message was incurred are up-weighted.

Thus, in accordance with the above disclosure, some embodiments of the systems and methods of the present disclosure provide a hyperspace function. The hyperspace function receives the user's free form message entry and automatically evaluates the message content against all nodes in the graph of the node and in the graph of other nodes of each different associated with a given sub-channel, or the nodes of each bot associated with any sub-channel associated with a given primary channel.

In some embodiments, node proximity prioritization is invoked. In such embodiments, the nodes in a graph reflect a structural organization between nodes and clusters of nodes. Nodes in 'proximity' to each other, expressed through the quantity and types of edge connections between them, are logically and thematically more connected and thus up-weighted relative to more distant nodes.

The hyperspace function will first collect all node matches for a given free form user message. It then orders multiple matches in order of proximity to the originating node (i.e. current conversational location in the current bot). For example, any node matches within the existing bot will thereby be listed as the highest priority.

The internal node structure and therefore the resulting behavior of the hyperspace function is fully customized and is configurable per primary communication channel and/or by sub-channel. The hyperspace function can provide specific responses based on the (i) number of node matches, (ii) node title content, and/or (iii) node proximity.

Two basic hyperspace function configuration scenarios are now described.

Conversational hyperspace function response—the desired bot behavior may be to ignore free form messages. The hyperspace function could be set up to respond with a specific notification and provide a few specific options for the user to select from, e.g.:

hyperspace function: "Sorry, I can't accept a 'free form' message here."
Button options: (Return to current chat) (Start new chat) (End chat)
Additional 'custom' options could be added to the response, e.g. a button to the "Help menu".

Conversational hyperspace function scenarios—the hyperspace function is set-up to evaluate the node matching data it receives. A basic hyperspace function configuration reacts to the number of node matches, covering the following sample scenarios.

Scenario A—Zero Destination Node Matches Found.

If the hyperspace function does not find any node matches for the content the user entered, is configured to provide an appropriate response e.g.:

hyperspace function: "Sorry, I don't have any information about that. The following options are available:"
Button options: (Return to chat) (Help menu) (New chat) (End chat) (Live Agent)

In such a case, the (Return to chat) option would take the user back to the origination node (e.g. the node at which the user entered the 'unexpected' free form message instead of selecting an option presented by that node). The node re-activates and presents its options to the user again. The message and the of the presented options in the jump node are fully customizable.

Scenario B—One Node Destination Match.

When the hyperspace function finds a single node match to the user's free form message entry, the hyperspace function responds with an appropriate message e.g.:

hyperspace function: "I can transition our chat to topic "Submit a claim""
Button options: (Transition chat) (Return to current chat) (Help menu) (New chat) (End chat) (Live Agent)

Scenario C—Multiple Node Destination Matches.

When the hyperspace function finds multiple node matches to the user's free form message entry, the hyperspace function responds with an appropriate message and associated options, e.g.:

hyperspace function: "I can transition our chat to one of the following topics: "Orange Salamanders", "Orange Frogs" "Orange Snakes"

Button options: (Orange Salamanders) (Orange Frogs) (Orange Snakes) . . . (End Chat) (Live Agent)

Figure 26:
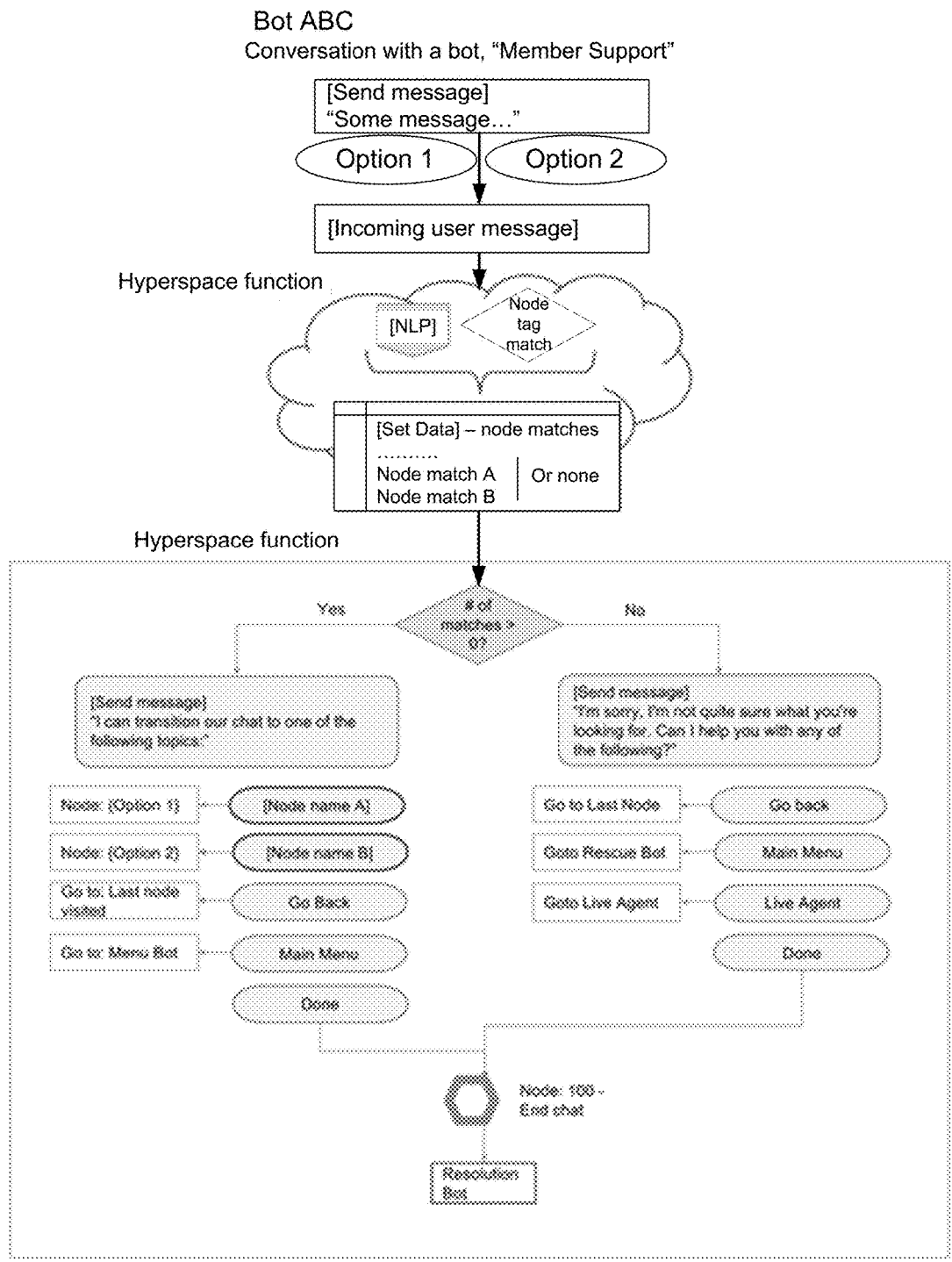
FIG. 26 provides an exemplary hyperspace function diagram in accordance with an embodiment of the present disclosure.

FIG. 26 provides an exemplary hyperspace function process diagram. In FIG. 26, the hyperspace function example provides simplified logic differentiating between zero and one/multiple node matches (from jump core node).

Enterprise Data Source can Customize Appearance of Content in Sub-Channels Through an Application Programming Interface.

Advantageously, in the disclosed systems and methods, an enterprise data source 104 can customize the content that appears in sub-channels 212. At any given time, each such sub-channel is hosting a number of conversations 2220, each such conversation with a different remote user device 104 associated with a respective end user. As such, messages are sent to the end user in such conversations and messages are received from the end user. As discussed in greater detail with respect to FIGS. 22 and 23 below, the content of messages received from an end user may trigger certain events such as the activation of a stock message 2214, stock widget 2216 (e.g., also interchangeably referred to herein as a "control" or an "applet"), stock object 2218 (e.g., image, sound file, PDF, etc.) in the conversation. Thus, when a triggering event arises, a message sent to the remote user device in a conversation may be highly customized. This very same conversation may have normal text messages. Thus, it is possible for conversations to have any number of regular text messages and customized messages.

Figure 5E:
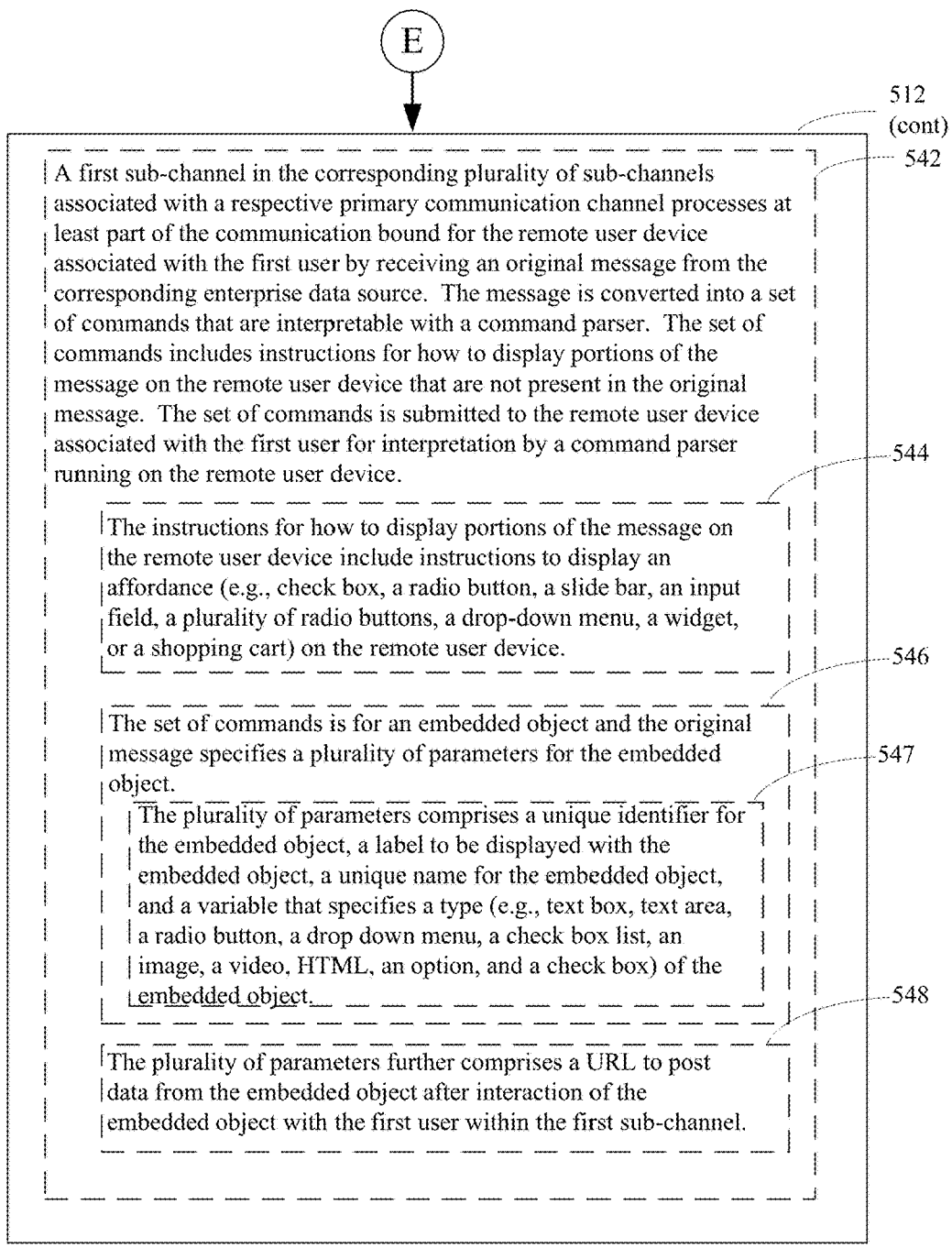

Referring to block 542 of FIG. 5E for illustration, a first sub-channel 212 in the corresponding plurality of sub-channels associated with a respective primary communication channel 380 processes at least part of the communication bound for the remote user device 104 associated with the first user (e.g., in a conversation) by receiving an original message from the corresponding enterprise data source 104. The message is converted into a set of commands that are interpretable with a command parser (e.g., a stock widget 2216 within the conversation that is running on the remote user device 104). The set of commands includes instructions for how to display portions of the message on the remote user device 104 that are not present in the original message. The set of commands is submitted to the remote user device 104 associated with the first user for interpretation by a command parser (e.g., the widget) running on the remote user device 104. The command parser may then display on the remote user device 104 within the conversation the one or more affordances in accordance with the original message from the enterprise data source 102.

Referring to block 544 of FIG. 5E, in some embodiments, the instructions for how to display portions of the message on the remote user device 104 include instructions to display one or more affordances (e.g., one or more check boxes, one or more radio buttons, one or more slide bars, one or more input fields, one or more radio buttons, one or more drop-down menus, or one or more shopping carts) on the remote user device 104.

Referring to block 546 of FIG. 5E, in some embodiments, the set of commands is for an embedded object and the original message specifies a plurality of parameters for the embedded object. For instance, in some embodiments, the embedded object is a preformatted menu of options and the plurality of parameters are the menu options. Referring to block 547 of FIG. 5E, in some such embodiments the plurality of parameters comprises a unique identifier for the embedded object, a label to be displayed with the embedded object, a unique name for the embedded object, and a variable that specifies a type (e.g., text box, text area, a radio button, a drop down menu, a check box list, an image, a video, HTML, an option, and a check box) of the embedded object. In some embodiments, the set of commands is for a plurality of such embedded objects. Referring to block 548 of FIG. 5E, in one example, the plurality of parameters further comprises one or more URL to post data from the embedded object after interaction of the embedded object with the first user within the first sub-channel 212.

File Cabinet Associated with Channels that is Automatically Populated with Channel Attachments.

In an embodiment, the secure mobile communication platform 200 provides an automated electronic file cabinet 226 to each of the users 320 for storing attachments to messages in the respective sub-channels 212 based on predetermined criteria. In some embodiments the electronic file cabinet 226 is stored on server 200 as illustrated in FIG. 2. In some embodiments the electronic file cabinet 226 is cloud based system and is accessible from any remote user device 104, for example, a personal computer, a tablet computing device, a mobile phone, a smart phone, a laptop, a personal digital assistant, etc.

To support the disclosed electronic file cabinet 226, in some embodiments an enterprise data source 102 organizes its attachments with the following considerations. There is one primary channel 210 per enterprise data source 102, multiple sub-channels 212 per primary channel 210, and multiple chatrooms per sub-channel 212. Typically, the enterprise data source 102 sets up a root folder for high level content at the primary channel 210 level. In some embodiments this high level content is accessible to all primary channel administrators 380 for distribution to users. In some embodiments, this high level content is accessible to some sub-channel administrators 392. Below the root folder, the enterprise data source 102 sets up a folder for each sub-channel 212. In some embodiments, the content in the folder the enterprise data source 102 maintains for a sub-channel 212 can be viewed by all sub-channel administrators 392. In some embodiments, the content in the folder the enterprise data source 102 maintains for a sub-channel can be edited by some sub-channel administrators 392. For each sub-channel folder, the enterprise data source 102 maintains a folder for each chatroom in the sub-channel 212. In some embodiments, the files in the chatrooms can be viewed by all sub-channel administrators 392 that have access to the chatrooms. The files in the chatrooms are the files sent by the end users, they are not created by the enterprise data source 102. The enterprise data source 102 manages content to be sent to end user at the primary channel 210 and sub-channel 212 levels. In some embodiments, to facilitate such a file system architecture, the enterprise data source super-administrator 378 and/or primary channel administrator 380 connects communications module 204-E with an administrative account on Box/Dropbox/etc. Communications module 204-E then creates a folder owned by the enterprise data source super-administrator 378 and/or primary channel administrator 380. Communication module 204-E, then creates subfolders for each sub-channel 212. Within each sub-channel, communications module 204-E creates subfolders for each chatroom. Then, the enterprise data source super-administrator 378 and/or primary channel administrator 380 has full access to the content of these folders. The sub-channel administrators 392 have to the content in the sub-channel 212 folders. The end user does not have direct access to this file system set up for the enterprise data source.

Rather, the end user makes use of the electronic file cabinet 226 described below, with reference to FIG. 16.

Figure 16:
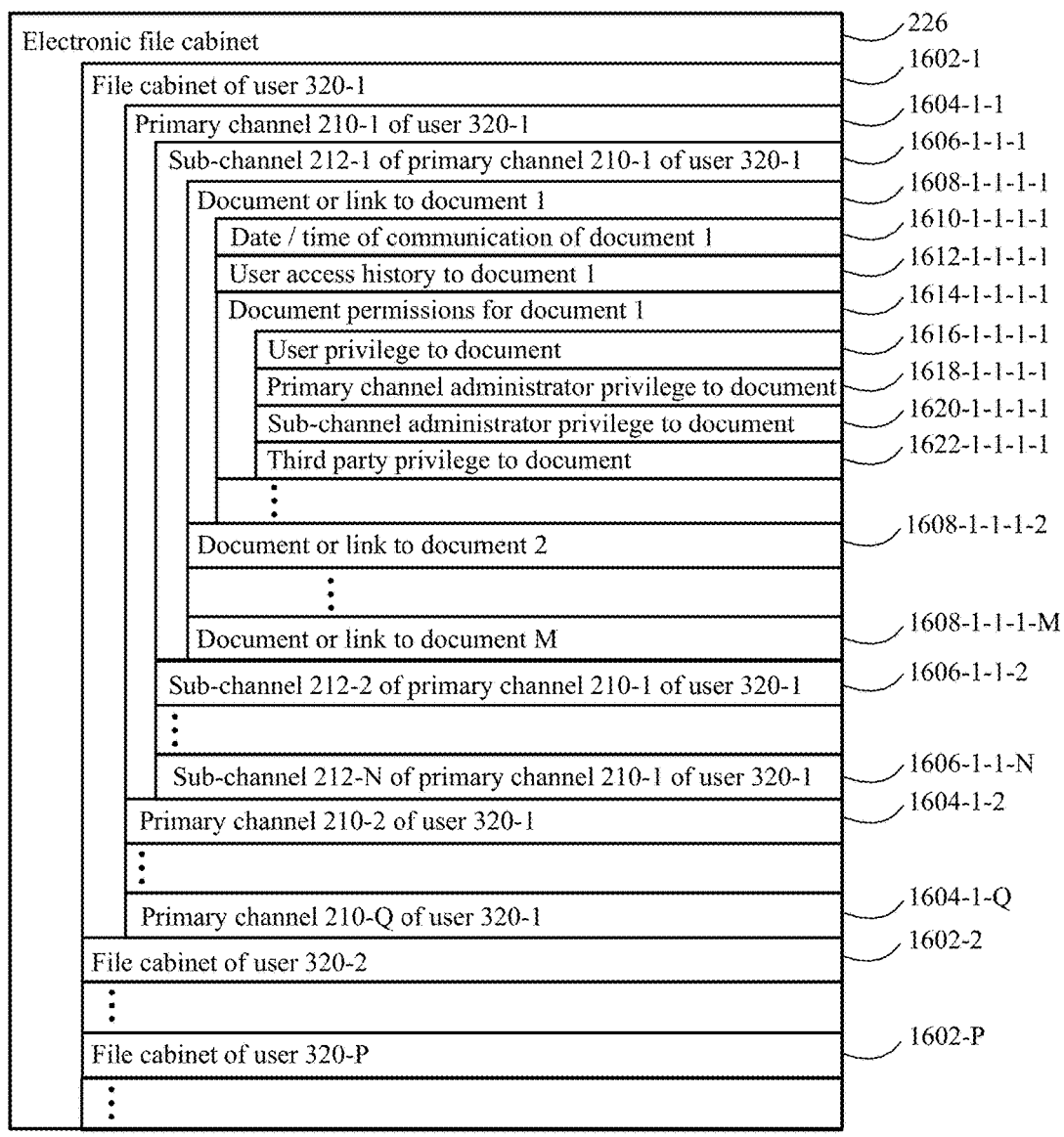
FIG. 16 illustrates an electronic file cabinet that is automatically populated with message attachments associated with users in sub-channels in accordance with an embodiment of the present disclosure.

In some embodiments, electronic file cabinet 226 of a user, such as that illustrated in FIG. 16, contains links to the appropriate files stored by enterprise data sources 102. For instance, for a given sub-channel of primary channel 210 supported by the user's electronic file cabinet 226, there are links to the documents for that sub-channel to the file system of the enterprise data source 102 described above. For instance, when a file is sent in a sub-channel 212 from an enterprise data source 102, a link to the file is stored in the electronic file cabinet 226 of the user and this link is to an actual copy of the file stored in the file system of the enterprise data source 102 described above. In other embodiments, electronic file cabinet 226 of a user, such as that illustrated in FIG. 16, contains copies of the appropriate files sent by enterprise data sources 102. For instance, when a file is sent in a sub-channel 212 from an enterprise data source 102, a copy of this file is stored in the electronic file cabinet 226 of the user, indexed to the appropriate sub-channel.

As illustrated in FIG. 16, from the end user perspective, in some embodiments, the electronic file cabinet is indexed by user 320, with each such user 320 having a file cabinet. The user file cabinet 1602 is indexed, in turn, by primary channels 210 of the user (1604), and for each such respective primary channel, a repository for each of the sub-channels 212 (1606) of the respective primary channel. In some embodiments, respective sub-channels 212 are further indexed by chatrooms within the sub-channels, and the user is only granted access to the files in those chatrooms that the user participates in.

In some embodiments, files sent from a single enterprise data source 102 to a user are viewed by the remote user at remote user device 104 collectively, together. For instance, consider the case in which the enterprise data source 102 has established a primary channel 210, containing two sub-channels 212, with a remote user at remote user device 104. Files have been sent to the user in both sub-channels and these files have been stored in the electronic file cabinet 226 in the respective sub-channel folders. Subsequently, when the remote user requests access to files from the enterprise data source 102, the electronic file cabinet 226 provides a listing of all the files in both sub-channel folders collectively. Such embodiments operate with the assumption that a user does not need to see files at the sub-channel level. However, in some embodiments, the user is able to segment their query and view just the files in a sub-channel 212 of a given enterprise data source. Users may send files to an enterprise data source 102 within chatrooms. In some embodiments, such files only appear in the enterprise data source's folder structure and not in the users file system.

FIG. 16 illustrates just one way in which files may be indexed in an electronic file cabinet 226. In general primary channels, sub-channels, and chatrooms act as independent keys by which files associated with a user are stored and retrieved by the user.

In some embodiments, the electronic file cabinet 226 stores the messages to or from the user in a sub-channel in the corresponding sub-channel repository 1606.

In some embodiments, the electronic file cabinet 226 only stores the attachments to messages to or from the user in a sub-channel in the corresponding sub-channel repository 1606.

In some embodiments, the electronic file cabinet 226 only stores the attachments to messages to the user in a sub-channel in the corresponding sub-channel repository 1606. In such embodiments, the electronic file cabinet 226 does not store messages to the user and does not store message from the user or attachments from the user.

The electronic file cabinet 226 is useful for a number of use cases. A sub-channel administrator 392 may want to share files with consumers, using files relevant to a specific sub-channel (e.g., images for coupons, PDFs for instructions). Thus, the sub-channel administrator 392 may stream these files to the user and the electronic file cabinet 226 conveniently stores these files. In another example, a sub-channel administrator may want to accept files from consumers, such as signed documents, or screenshots. Further, an end user may want to share files with an enterprise data source, by streaming the sub-channel administrator 392 in a chat room in a sub-channel 212 for the sub-channel administrator 392 to review. In still another user case, the end user may want to see content shared with the user by an enterprise data source.

In some embodiments, users 302 can use and search the electronic file cabinet 226 of the secure mobile communication platform 200 to search for messages and/or attachments. For example, a user can search the secure cloud based filing system based on respective enterprise data source 102 (e.g., all messages or message attachments sent from the enterprise data source 102 to the user or from the user to the enterprise data source 102), a relevant month (e.g., all messages or message attachments associated with the user in the relevant month), etc. In some embodiments, only message attachments, and not messages are stored in the electronic file cabinet 226.

In some embodiments, the automated filing system is a combination of file storage and related metadata storage in a database, for example, a file system implementation using the MySQL® database of MySQL AB Company with the ELASTIC SEARCH® search engine of Elasticsearch BV. In some embodiments, the established primary channels 210, the generated sub-channels 212, the stored messages (in those optional embodiments where messages are stored in the electronic file cabinet 226), the stored content (e.g., file attachments), etc., are searchable through the secure mobile communication platform for providing information on demand in real time.

Figure 5F:
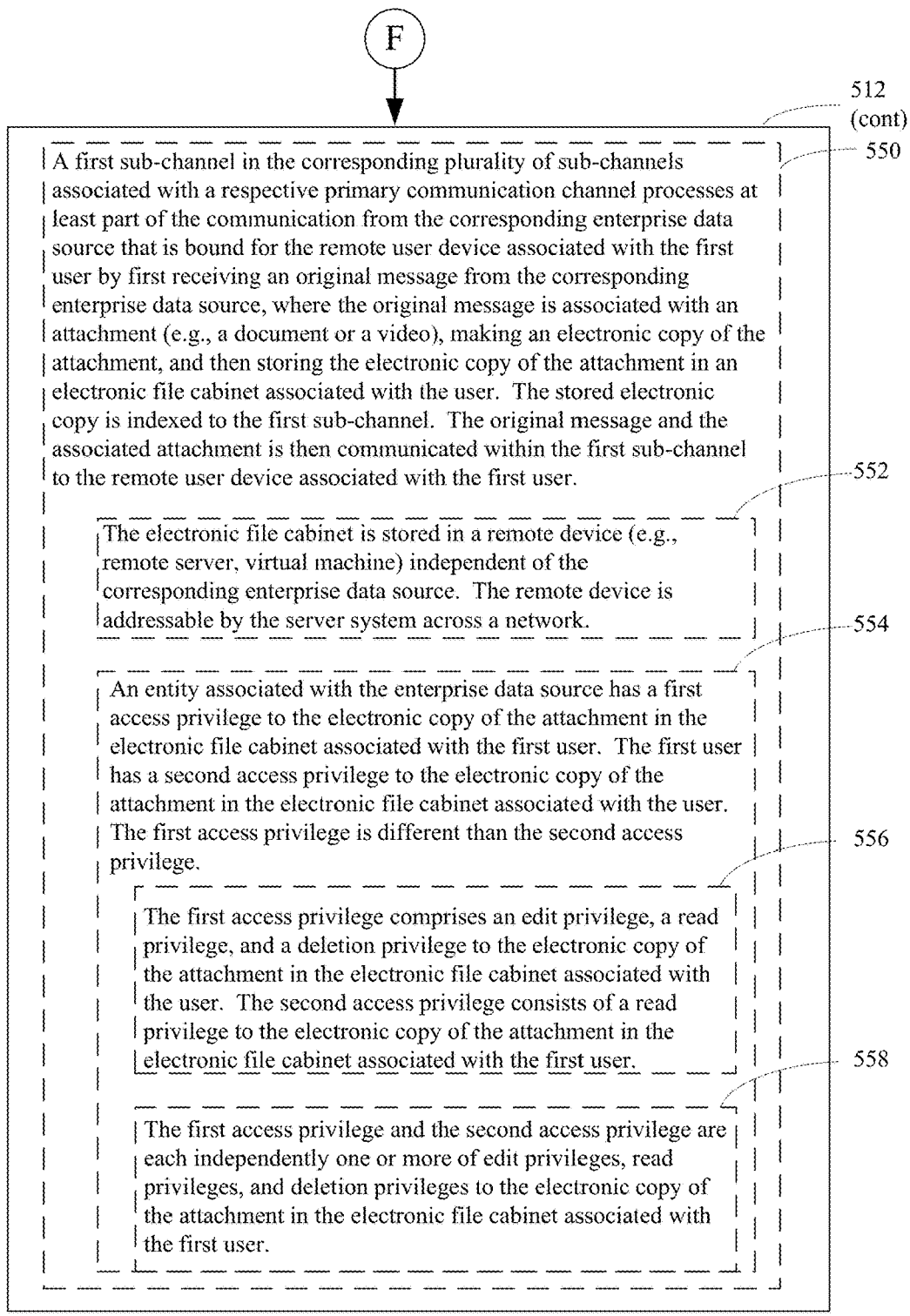

Referring to block 550 of FIG. 5F as well as FIG. 16, a first sub-channel 212 in a plurality of sub-channels associated with a respective primary communication channel 210 processes at least part of the communication from the corresponding enterprise data source 102 associated with the sub-channel that is bound for the remote user device 104 associated with a first user 320 by first receiving an original message from the corresponding enterprise data source 102. The original message is associated with an attachment 1608 (e.g., a document or a video). An electronic copy of the attachment is made and the electronic copy of the attachment in is stored in the electronic file cabinet 1602 associated with the user 320. The stored electronic copy 1608 is indexed to the first sub-channel 1606. The original message and the associated attachment is then communicated within the first sub-channel to the remote user device associated with the first user.

Referring to block 552 of FIG. 5F, in some embodiments, the electronic file cabinet 226 is stored in a remote device (e.g., remote server, virtual machine) independent of the corresponding enterprise data source 200. In such embodiments, the remote device is addressable by the server system 200 across a network 106.

Referring to FIG. 16, in some embodiments the disclosed systems and methods offer the feature of automatically storing attachments to messages communicated in a subchannel 212 in an electronic file cabinet 226. In some embodiments, the attachments are indexed by sub-channel, primary channel, and by user. In some embodiments the messages and the attachments are stored in the electronic file cabinet 226. In some embodiments, only the attachments are stored in the electronic file cabinet 226. An example of an attachment that is stored in the electronic file cabinet 226 are billing statements. Advantageously, the disclosed systems and methods provide considerable control to system designers on how to set up privileges to the documents stored in the electronic file cabinet 226. For instance, in some embodiments, user privileges to documents are set up on a user basis 1616, a primary channel administrator basis 1618, a sub-channel administrator basis 1620, and/or a third party basis 1620.

User privileges 1616 are the privileges the user associated with a given sub-channel 212 has with respect to a given document 1608. In some embodiments, these privileges are read privileges, write privileges, edit privileges, deletion privileges, and/or copy privileges to the document 1608.

Primary channel administrator privileges 1618 are the privileges the primary channel administrator 380 of the primary channel 210 of the sub-channel 212 that communicated the document has with respect to a given document 1608. In some embodiments, these privileges are read privileges, write privileges, edit privileges, deletion privileges, and/or copy privileges to the document 1608.

Sub-channel administrator privileges 1618 are the privileges the sub-channel administrator of the sub-channel 212 that communicated the document has with respect to a given document 1608. In some embodiments, these privileges are read privileges, write privileges, edit privileges, deletion privileges, and/or copy privileges to the document 1608.

Third party privileges 1620 are the privileges that a third party (other than the enterprise data source 102 and the user) has with respect to a given document 1608. In some embodiments, these privileges are read privileges, write privileges, edit privileges, deletion privileges, and/or copy privileges to the document 1608.

Accordingly, referring to block 554 of FIG. 5F, in some embodiments, an entity associated with the enterprise data source 102 (e.g., primary channel administrator privileges 1618, sub-channel administrator privileges 1620) has a first access privilege to the electronic copy of the attachment 1614 in the electronic file cabinet 1602 associated with the first user. The first user has a second access privilege 1616 to the electronic copy of the attachment 1614 in the electronic file cabinet associated with the user. In some embodiments, the first access privilege is different than (e.g., independent of) the second access privilege. For example, the first access privilege may comprise an edit privilege, a read privilege, and a deletion privilege to the electronic copy of the attachment 1608 in the electronic file cabinet associated with the user 1602. The second access privilege consists of a read privilege to the electronic copy of the attachment 1608 in the electronic file cabinet associated with the first user 1602. Referring to block 558 of FIG. 5F, as another non-limiting example, the first access privilege and the second access privilege are each independently one or more of edit privileges, read privileges, and deletion privileges to the electronic copy of the attachment 1608 in the electronic file cabinet associated with the first user 1602.

Figure 5G:
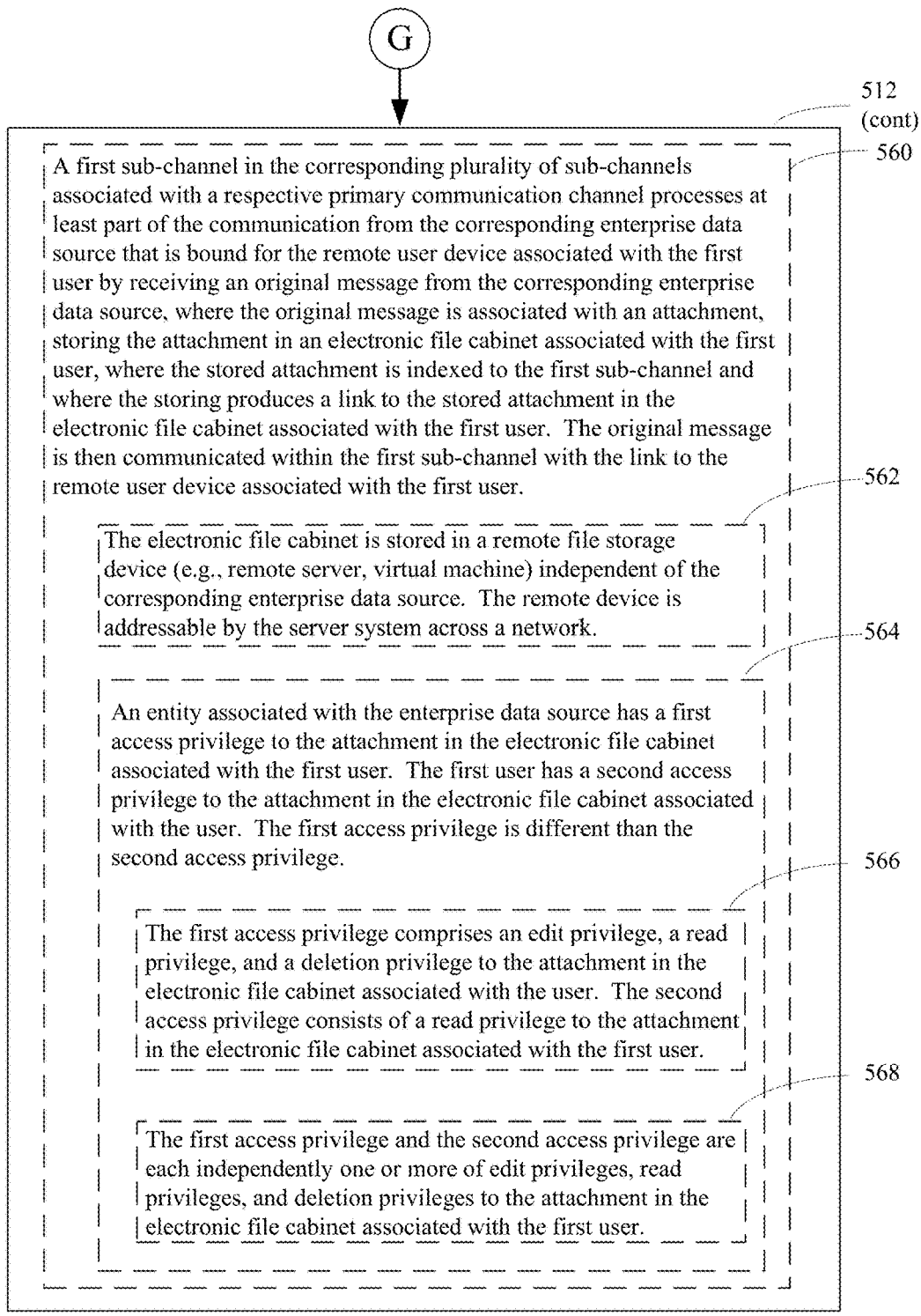

In some embodiments, a link to an attachment is generated when the attachment is stored in the electronic file cabinet 226. Then, rather than sending the full electronic version of the attachment to a user from the enterprise data source 102, a link to the attachment, now stored in the file cabinet of the user 1602 is sent. Block 560 of FIG. 5G illustrates such an embodiment: a first sub-channel 212 in the corresponding plurality of sub-channels associated with a respective primary communication channel 210 processes at least part of the communication from the corresponding enterprise data source 102 that is bound for a remote user device 104 associated with a first user by receiving an original message from the corresponding enterprise data source 102. The original message is associated with an attachment. The processing of the message causes the attachment to be stored in an electronic file cabinet associated with the first user 1602. The stored attachment 1608 is indexed to the first sub-channel and the storing produces a link to the stored attachment in the electronic file cabinet associated with the first user 1602. The original message is then communicated within the first sub-channel 212 with the link to the stored attachment to the remote user device 104 associated with the first user. If the user wishes to see the attachment, the link to the attachment in the file cabinet of the user 1602 is used to retrieve the attachment from the file cabinet of the user 1602. Referring to block 562 of FIG. 5G, in some such embodiments, the electronic file cabinet 226 is stored in a remote file storage device (e.g., remote server, virtual machine) independent of the corresponding enterprise data source 102. In such embodiments, the remote file storage device is addressable by the server system 200 across network 106. Referring to block 564 of FIG. 5G, in some such embodiments, an entity associated with the enterprise data source 102 (e.g., primary channel administrator privileges 1618, sub-channel administrator privileges 1620) has a first access privilege to the attachment 1614 in the electronic file cabinet associated with the first user 1602. The first user has a second access privilege 1616 to the attachment in the electronic file cabinet associated with the user 1602. In some embodiments, the first access privilege is different than (e.g., independent of) the second access privilege. Referring to block 566 of FIG. 5G, for example, the first access privilege may comprise an edit privilege, a read privilege, and a deletion privilege to the attachment 1608 in the electronic file cabinet associated with the user 1602. The second access privilege may consist of a read privilege to the attachment 1608 in the electronic file cabinet associated with the user 1602. Referring to block 568 of FIG. 5G, in some embodiments, the first access privilege and the second access privilege are each independently one or more of edit privileges, read privileges, and deletion privileges to the attachment 1608 in the electronic file cabinet associated with the first user 1602.

Figure 5H:
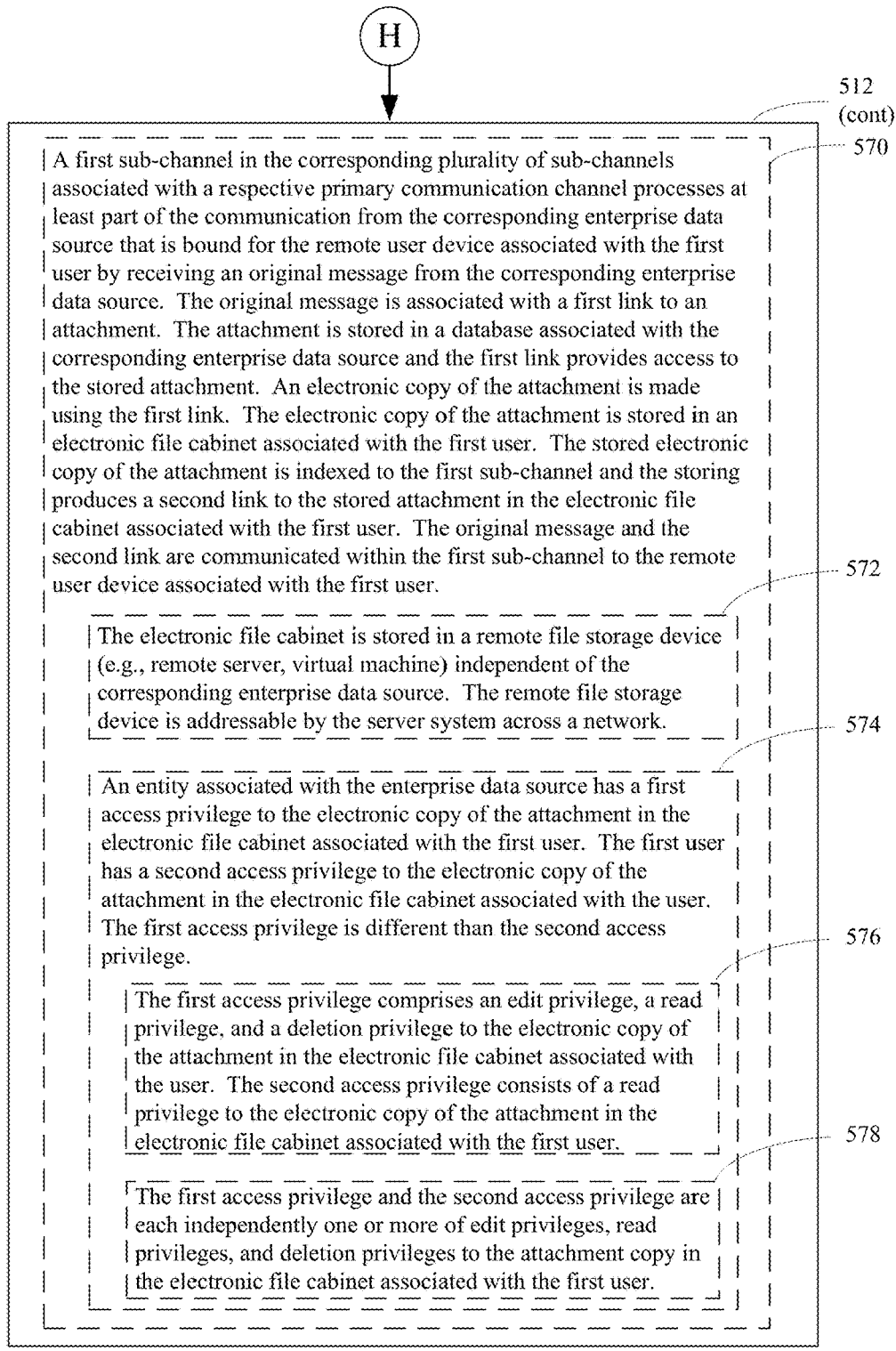

In some embodiments, the original message from an enterprise data source 102 does not include an electronic copy of an attachment but rather has a link to the attachment, where the link is an address of the attachment in a database associated with the enterprise data source. In some such embodiments, the platform 200 retrieves the attachment using the link, stores a copy of the attachment in the file cabinet of the user 1602, produces a second link to the stored attachment in the electronic file cabinet associated with the first and sends the message to the user with the second link. Block 570 of FIG. 5H illustrates such an embodiment: a first sub-channel 212 in the corresponding plurality of sub-channels associated with a respective primary communication channel 210 processes at least part of the communication from the corresponding enterprise data source 102 that is bound for the remote user device 104 associated with a first user by receiving an original message from the corresponding enterprise data source 102. The original message is associated with a first link to an attachment. The attachment is stored in a database associated with the corresponding enterprise data source 102 and the first link provides access to the stored attachment. An electronic copy of the attachment is made using the first link. The electronic copy of the attachment is stored in an electronic file cabinet associated with the first user 1602. The stored electronic copy of the attachment 1608 is indexed to the first sub-channel and the storing produces a second link to the stored attachment in the electronic file cabinet associated with the first user 1602. The original message and the second link are communicated within the first sub-channel 212 to the remote user device 104 associated with the first user. If the user wishes to see the attachment, the second link to the attachment in the file cabinet of the user is used to retrieve the attachment from the file cabinet of the user 1602. Referring to block 572 of FIG. 5H, in some embodiments, the electronic file cabinet 226 is stored in a remote file storage device (e.g., remote server, virtual machine) independent of the corresponding enterprise data source 102. In such embodiments, the remote file storage device is addressable by the server system across a network. Referring to block 574 of FIG. 5H, in some embodiments, an entity associated with the enterprise data source 102 102 (e.g., primary channel administrator privileges 1618, sub-channel administrator privileges 1620) has a first access privilege to the electronic copy of the attachment 1614 in the electronic file cabinet associated with the first user 1602. The first user has a second access privilege 1616 to the electronic copy of the attachment in the electronic file cabinet associated with the user 1620. In some embodiments, the first access privilege is different than (e.g., independent of) the second access privilege. Referring to block 576 of FIG. 5H, for example, the first access privilege may comprise an edit privilege, a read privilege, and a deletion privilege to the electronic copy of the attachment 1608 in the electronic file cabinet associated with the user 1602. The second access privilege may consist of a read privilege to the electronic copy of the attachment 1608 in the electronic file cabinet associated with the user 1602. Referring to block 578 of FIG. 5G, in some embodiments, the first access privilege and the second access privilege are each independently one or more of edit privileges, read privileges, and deletion privileges to the attachment copy in the electronic file cabinet associated with the user 1602.

Application Programming Interface Components.

Figure 21:
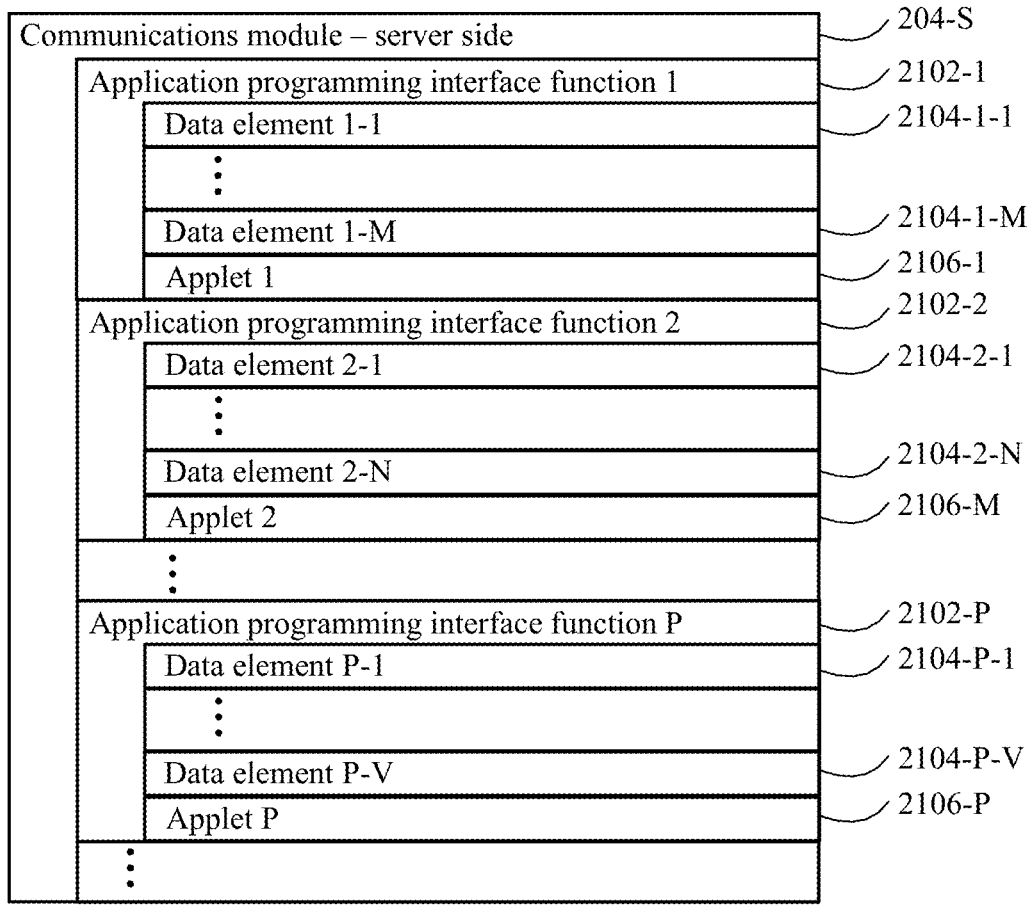
FIG. 21 illustrates several different application programming interface functions provided by an instance of a communications module running on a secure mobile communication platform where each such respective function has a number of data elements that serve as input to the function in accordance with an embodiment of the present disclosure.

Advantageously, the disclosed systems and methods provide a number of application programming interface components that may be incorporated into conversations in sub-channels 212. These application programming interface components are designed to assist the enterprise data source 102 in rapidly setting up functions, such as bill payment, menus boxes, the display of information, and other tasks that may facilitate transactions with users. Referring to FIG. 21, in some embodiments, the communications module 204, such as the instance of the communications module 204-C running on the secure mobile communication platform 200, provides several different application programming interface functions 2102. Each such function has a number of data elements 2104 that serve as input to the function 2102. Moreover, each such function 2102 is associated with an applet 2106 that is invoked when the corresponding function 2102 is called. Non-limiting examples of such applets are bill payment applets, menus box applets, and applets designed to display retrieved information. In some embodiments, an applet 2106 of FIG. 21 is a form of control 1206 of FIG. 12.

Block 542 of FIG. 5E illustrates the use of an application programming interface function 2102 in accordance with an embodiment of the present disclosure. A sub-channel 212 in a plurality of sub-channels associated with a primary communication channel processes at least part of the communication from the corresponding enterprise data source 102 that is bound for a remote user device 104 associated with a first user, for instance in a one to one conversation between the enterprise data source 102 and the remote user device 104, by receiving an original message from the corresponding enterprise data source. The original message includes a set of data elements 2104 and an application programming interface function call 2102 associated with the set of data elements. For example, consider the case where the application programming interface function call 2102 is a menu box. Here, the set of data elements 2104 would be the menu options for the menu box. Responsive to receiving the original message, the communications module 204 automatically and without human intervention, invokes the application programming interface function 2102. This invoking passes the set of data elements in the message to the application programming interface function 2102 and generates the corresponding applet 2106 that is communicated within the first sub-channel 212 to the remote user device 104 associated with the first user. For instance, continuing with the menu box example, an applet 2106 is presented within the conversation in the sub-channel 212 to the first user with a set of menu options, where each of the menu options is one of the data elements in the original message from the enterprise data source 102. Thus, in this way, the enterprise data source is able to take advantage of a mature applet by simply providing the data necessary to customize the applet.

Referring to block 582, in some embodiments the applet 2106 is an automated agent that is responsive to user input at the remote user device 104 associated with the first user. For instance, in some embodiments, the applet is an automated human interface module.

Referring to block 584, in some embodiments an applet 2106 is able to receive a query from within a first sub-channel (e.g., within a conversation in the first sub-channel). For instance, the applet 2106 may provide an inventory search panel within the conversation that accepts user queries. Responsive to such a query, a search of a database associated with the corresponding enterprise data source 102 is made outside of the first sub-channel. This database is electronically addressable by the enterprise data source 102. Then, matches to the query in the database are communicated to the applet 2106 within the first sub-channel 212

Referring to block 586, in some embodiments, the applet 2106 is a bill payment applet and the method further comprises receiving a payment communication from the applet 2106 within a first sub-channel 212 (e.g., from within a conversation in the first sub-channel) from the first user (e.g., the remote user device 104 associated with the first user) for goods or a service provided by the enterprise data source 104. The payment is verified against a credit source associated with the first user (e.g., PAYPAL, etc.). When verified by the credit source, a database (e.g., an accounting database) associated with the enterprise data source 102 is updated to reflect the payment. Further, there is a communication to the applet 2106 within the first sub-channel 212 (e.g. a one-to-one conversation in the first sub-channel between the enterprise data source 102 and the first user) that the payment has been made. When the credit source is unable to verify payment, the method further comprises communicating to the applet 2106 within the first sub-channel that the payment has not been made.

Figure 5I:
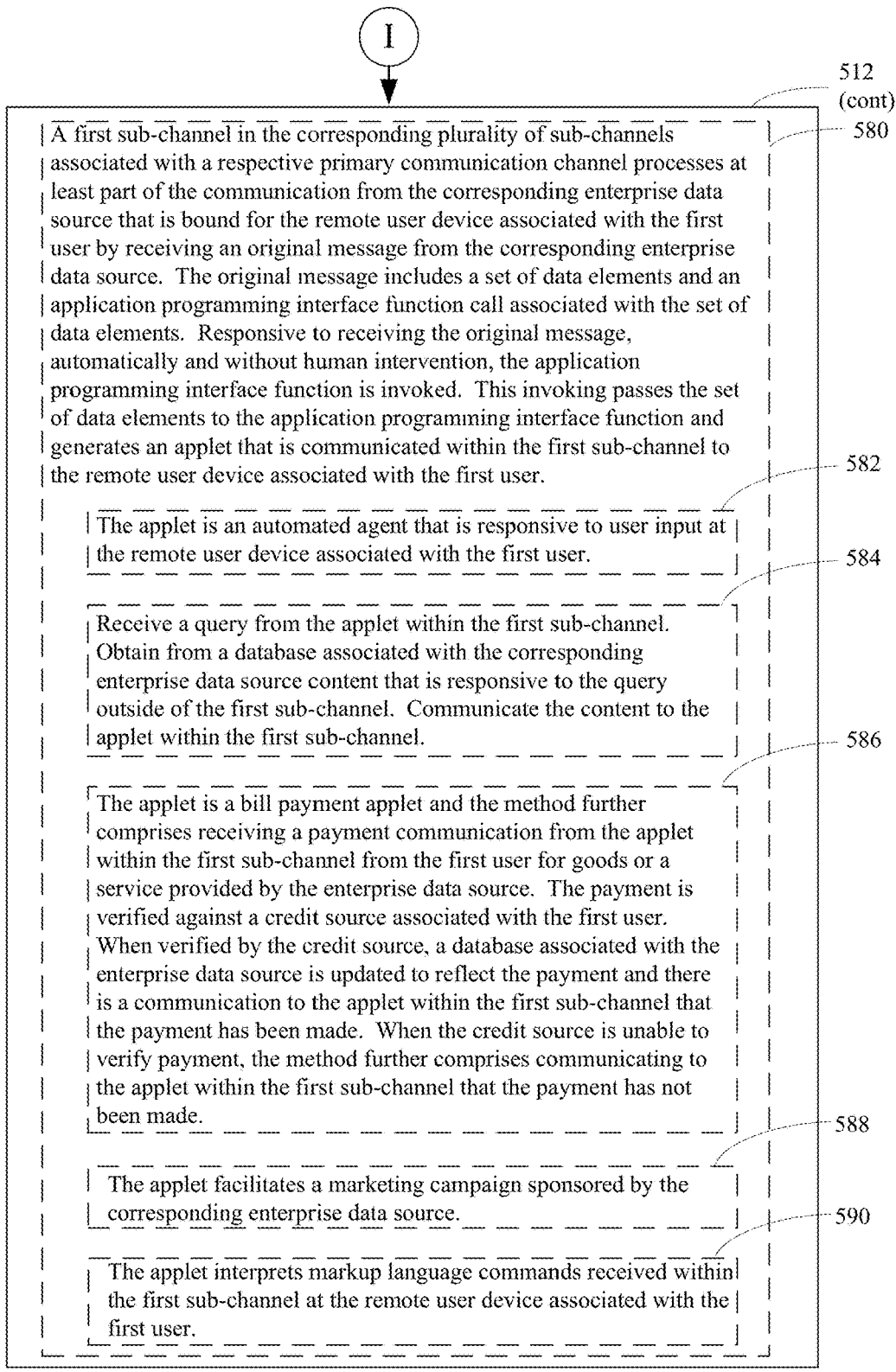

Referring to block 588 of FIG. 5I, in some embodiments, the applet 2106 facilitates a marketing campaign sponsored by the corresponding enterprise data source. IN such marketing campaigns, individualized messages offering a product, service, or incentive are sent to users in one-to-one conversations between the enterprise data source 102 and users associated with remote user devices 102. Advantageously, applets 2106 can display these messages on remote user devices 102 and track in real time the disposition of the messages, e.g., whether they were read, etc. and communicate such information back to the enterprise data source 102. The enterprise data source 102 may use such information from a single remote user device 104, or aggregated information from several remote user devices 104 to target new messages to one or more users as well as dynamically determine which variables (e.g., demographic variables, temporal variable, etc.) affect the success of the campaign. Consider a scenario in which the target is to maximize the percentage of time the sent messages are viewed by users. Does the age of the users affect this target? Does the appearance of the message in the applet 2106 affect this target? Is there some interdependence between age and the appearance of the message in the applet 2106 affects this target? The disclosed system advantageously addresses these questions in real time. In fact, the information acquired from conversations in real time can be used to dynamically segment the user population and optimize what is sent to each portion of the user population.

Referring to block 590 of FIG. 5I, in some embodiments, the applet 2106 interprets markup language commands received within the first sub-channel at the remote user device associated with the first user. For example, in some embodiments, an applet 2106 is a sophisticated HTML parser that allows for the implementation of sophisticated HTML graphics and other HTML functions within conversations.

Marketing Application Programming Interface.

The disclosed systems and methods, in which enterprises data sources 104 form conversations with individual end users allows for a unique opportunity to effectuate marketing campaigns. In such marketing campaigns, individualized messages offering a product, service, or incentive are sent to end users in one-to-one conversations between the enterprise data source 102 and users associated with remote user devices 102. Advantageously, these messages are displayed on remote user devices 102 and the real time disposition of such messages, e.g., whether they were read, etc. is track and such information is communicated back to the enterprise data source 102. The enterprise data source 102 may use such information from a single remote user device 104, or aggregated information from several remote user devices 104 to target new messages to one or more users as well as dynamically determine which variables (e.g., demographic variables, temporal variable, etc.) affect the success of the campaign. Thus, referring to block 592 of 5J, a first sub-channel 212 in the plurality of sub-channels associated with a respective primary communication channel 210 processes at least part of the communication from the corresponding enterprise data source 102 that is bound for the remote user device 104 associated with the first user (in a conversation) by receiving an original message from the corresponding enterprise data source in accordance with a message campaign sponsored by the enterprise data source 102 responsive to receiving the original message. Then, automatically and without human intervention, an application programming interface function is invoked for the message campaign. This passes information in the original message to the application programming interface function and generates an applet (e.g., widget 2216, control, etc.) that is communicated within the conversation in the first sub-channel 212 to the remote user device 104 associated with the first user. Then monitoring is set up to monitor, through communications received from the remotely installed applet within conversation in the first sub-channel, responses to the messaging campaign. Referring to block 594, in some embodiments, the invoked application programming interface function makes use of a value of a demographic characteristic (e.g., age, a location, a level of participation a customer rewards program, a length of time enrolled in a customer rewards program, a number of purchases the user has made with the enterprise data source, a total of amount of purchases the first user has made with the enterprise data source during a predetermined time frame, the last time the first user has made with the enterprise data source, a type of item the first user has purchased from the enterprise data source, or a sex of the first user) in the user profile corresponding to the first user to determine which information in the message to pass to the application programming interface function.

Security, Non-Repudiation.

Advantageously, the unique architecture disclosed herein in which conversations that are traceable to a specific end user of the system provides for a unique opportunity to ensure the security of such conversations and thus the non-repudiation of such conversations. For instance, due to the traceability of conversations and their security (e.g., with all messages in the conversation encrypted in some embodiments), when an end user makes a purchase (or other form of transaction) within a conversation in a sub-channel 212, neither the end user nor the enterprise data source 102 can repudiate the purchase (claim the transaction did not take place). Accordingly, referring to block 596 of FIG. 5J, a conversation in a first sub-channel 212 in the corresponding plurality of sub-channels is associated with a respective primary communication channel is associated with the unique identifier corresponding to first user. The unique identifier is used as a basis for non-repudiation of the conversation. In some embodiments, the conversation in the first sub-channel 212 is used to conduct a purchase (or other form of transaction) by the first user from the corresponding enterprise data source 102 associated with the conversation.

Applications Running in Cloud and Using Disclosed Systems to Communicate with End User.

In some embodiments, widgets 2216 (e.g., controls, applets) within conversations are hosted on one or more virtual machines. In other embodiments, such widgets 2216 are hosted elsewhere, such as downloaded onto end user devices 104.

Figure 5K:
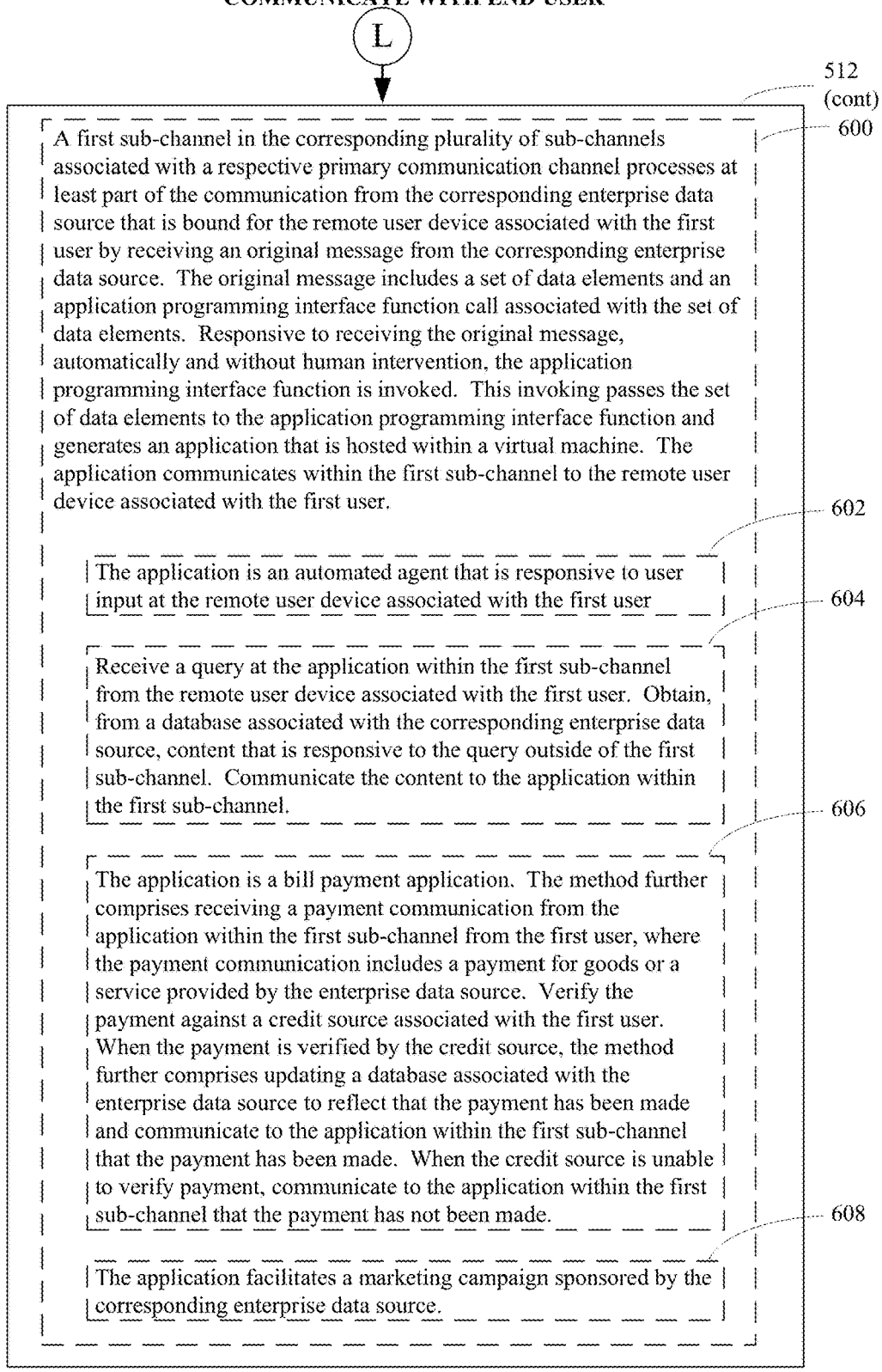
Figure 5L:
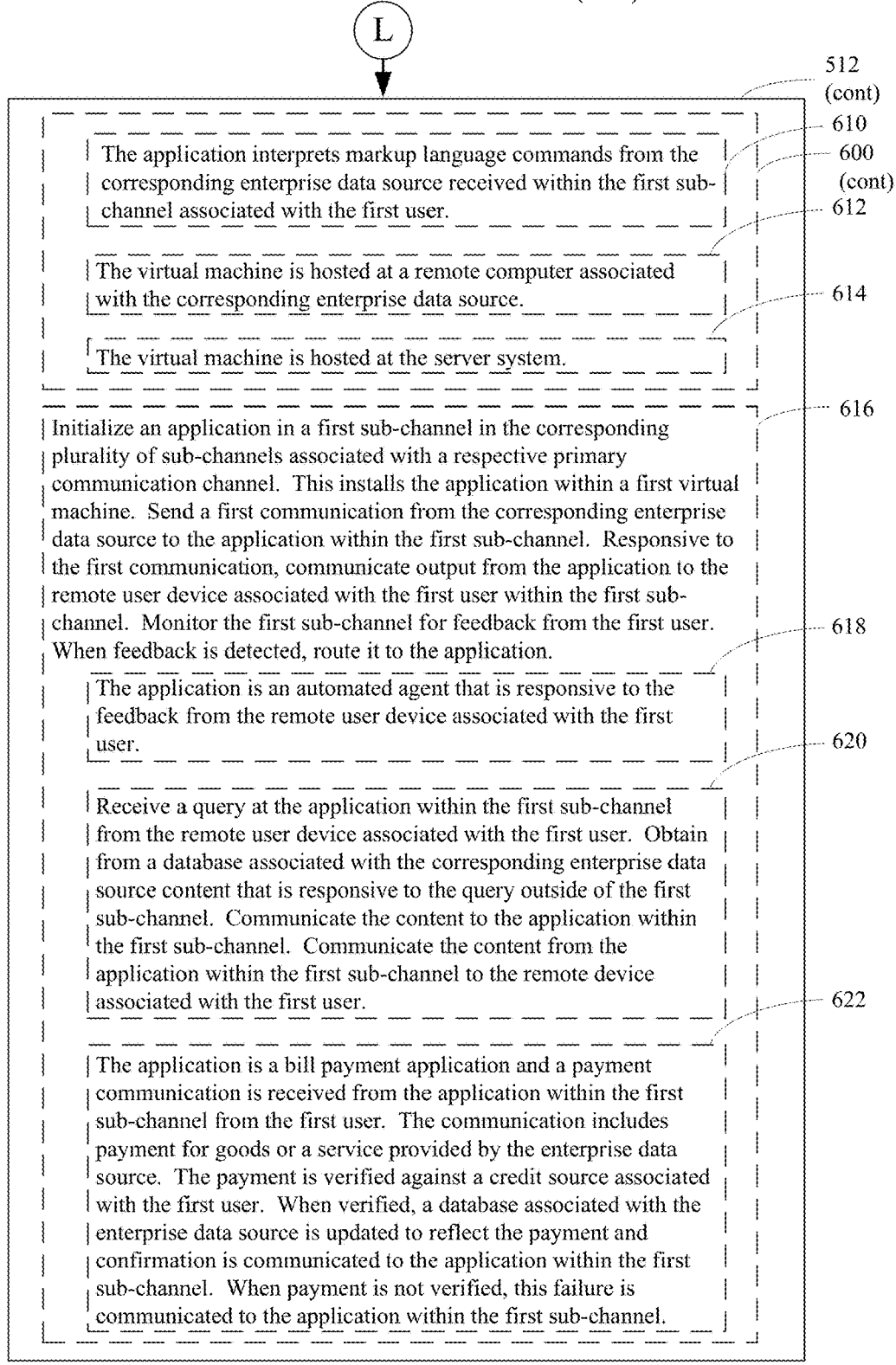

Referring to block 600 of FIG. 5K, in some embodiments a conversation in a first sub-channel 212 in the corresponding plurality of sub-channels associated with a respective primary communication channel 210 processes at least part of the communication from the corresponding enterprise data source 102 that is bound for a remote user device 104 that is associated with a first user by receiving an original message from the corresponding enterprise data source 102. The original message includes a set of data elements and an application programming interface function call associated with the set of data elements. Responsive to receiving the original message, automatically and without human intervention, the application programming interface function is invoked. This invoking passes the set of data elements to the application programming interface function.

In some embodiments this, in turn, generates an application (e.g., widget 22216, control applet) that is hosted within a virtual machine.

In other embodiments, the application is already running or is enabled on the virtual machine and the application programming interface function is passed to the application. In some embodiments, the virtual machine is run on a server that is independent from the secure mobile communications platform 200, but is addressable by the platform.

In still other embodiments, the application is already running or is enabled on the enterprise data source 102 and the application programming interface function is passed to the application.

Regardless of its location, the application communicates within (or operates on) the first sub-channel with the remote user device 104 associated with the first user.

Referring to block 602, in some embodiments the application is an automated agent that is responsive to user input at the remote user device 104 associated with the first user.

Referring to block 604, in some embodiments, a query is received at the application within the conversation in the first sub-channel from the remote user device 104 associated with the first user. In some embodiments, responsive to this, there is obtained, from a database associated with the corresponding enterprise data source 104, content that is responsive to the query outside of the conversation in the first sub-channel 212. This content is communicated to the application within the conversation in the first sub-channel. Referring to block 606, in some embodiments, the application is a bill payment application and the method further comprises receiving a payment communication from the application within the conversation in the first sub-channel from the first user, where the payment communication includes a payment for goods or a service provided by the enterprise data source 104. This payment is verified against a credit source associated with the first user. When the payment is verified by the credit source, the method further comprises updating a database associated with the enterprise data source 104 to reflect that the payment has been made and communicating to the application within the conversation in the first sub-channel that the payment has been made. When the credit source is unable to verify payment, the method further comprises communicating to the application within the first sub-channel that the payment has not been made.

Referring to block 608, in some embodiments, the application facilitates a marketing campaign sponsored by the corresponding enterprise data source.

Referring to block 610, in some embodiments, the application interprets markup language commands from the corresponding enterprise data source 102 received within the first sub-channel associated with the first user.

Referring to block 612, in some optional embodiments, as discussed above, the application is hosted on a virtual machine, and in some instances this virtual machine is hosted at a remote computer associated with the corresponding enterprise data source. Referring to block 614, in some embodiments, the virtual machine is hosted at the enterprise data source 102 server system.

Referring to block 616, in some embodiments, the application is initialized in a conversation in a first sub-channel 212 in the corresponding plurality of sub-channels associated with a respective primary communication channel 210. This installs the application within a first virtual machine. A first communication is sent from the corresponding enterprise data source to the application within the first sub-channel. Responsive to the first communication, output from the application is communicated to the remote user device 104 associated with the first user within the first sub-channel. The first sub-channel is then monitored for feedback from the first user. When feedback is detected, the feedback is routed to the application.

Referring to block 618, in some embodiments, the application is an automated agent that is responsive to the feedback from the remote user device associated with the first user.

Referring to block 620, in some embodiments, a query is received at the application within the first sub-channel from the remote user device associated with the first user. Responsive to this, there is obtained from a database (or any other form of computer readable media that is capable of storing information) associated with the corresponding enterprise data source 102 content that is responsive to the query. In some embodiments, the query is outside of the first sub-channel. The retrieve content is then communicated to the application within the first sub-channel. Further the content from the application is communicated within the first sub-channel to the remote device associated with the first user.

Referring to block 622, in some embodiments, the application is a bill payment application and a payment communication is received from the application within the first sub-channel from the first user. The communication includes payment for goods or a service provided by the enterprise data source. The payment is verified against a credit source associated with the first user. When verified, a database associated with the enterprise data source is updated to reflect the payment and confirmation is communicated to the application within the first sub-channel. When payment is not verified, this failure is communicated to the application within the first sub-channel.

Referring to block 624, in some embodiments, the application facilitates a marketing campaign sponsored by the corresponding enterprise data source.

Referring to block 626, in some embodiments, the application interprets markup language commands from the corresponding enterprise data source received within the first sub-channel associated with the first user.

As discussed above, in some embodiments the application is running on a virtual machine. Referring to block 628, in some embodiments, the virtual machine is hosted at a remote computer associated with the corresponding enterprise data source. Referring to block 630, in some embodiments, the virtual machine is hosted at the server system.

Secure Enrollment of Enterprise Data Sources.

In some embodiments, the disclosed systems and methods challenges enterprise data sources 102 in unique way prior to onboarding them into the secure mobile communications platform 200. In some embodiments, this challenge is by way of human approval. For instance, in some embodiments, prior to onboarding a potential new enterprise data source 102 into system 200, a human representative of the potential new enterprise data source 102 is interviewed by a human representative of the secure mobile communications platform 200. In some embodiments a characteristic of this interview is the disclosure by the potential new enterprise data source 102 of private information that the human representative of the secure mobile communications platform 200 can verify. This is an improvement over conventional social media platforms that do not provide adequate controls to prevent spoofing of well-known enterprises data sources (e.g., well known department stores). Such activity is prevented by the disclosed secure mobile communications platform 200 because of the verification process that enterprise data sources must undergo in order to be enrolled by the platform 200. In some embodiments, this onboarding of enterprise data sources 102 is performed on an automated basis using a specialized automated human interface module 2202 described below in conjunction with FIG. 22, where the module 2202 has a specialized node graph 2208 that steers a potential enterprise data source 102 through a series of nodes 2208 depending on information provided by the potential enterprise data source 102. In such instances, the conversation is between the potential enterprise data source 102 and the secure mobile communications platform 200. In some embodiments, artificial intelligence or machine based learning is imposed in one or more nodes of the node graph to assist in onboarding the potential enterprise data source. In some embodiments, nodes in the graph will challenge the potential enterprise data source for information and verify this information (e.g., check if the potential enterprise data source's IP address is in a specified geographic domain, check a web address associated with the potential enterprise data source, ask for a scanned or electronic copy of a business card, etc.). In some embodiments a node of the automated human interface module 2202 will ask for certain documents and will provide a widget 2216 in the conversation to assist the potential enterprise data source 102 in uploading these documents. Thus, some embodiments of the secure mobile communications platform 200 provides different ways to verify potential enterprise data sources 102

Block 632 of FIG. 5M illustrates an example embodiment for such verification. An enrollment process for a potential enterprise data source is initiated when the enterprise data source makes an enrollment request. Responsive to the enrollment request, the potential enterprise data source is electronically challenged. A response to the electronic challenge is received from the potential enterprise data source. In this way the potential enterprise data source is required to establish a basis to a claim of identity as part of enrollment in the secure mobile communications platform 200. Referring to block 634 of FIG. 5M, in some embodiments the response to the electronic challenge is parsed using a trained classifier, where the trained classifier (e.g., a support vector machine, neural network, etc.) to determine whether the response establishes the identity for the enterprise data source.

Advantages of Sub-Channels 212 as a Replacement to Conventional User Installed Applications.

Figure 17:
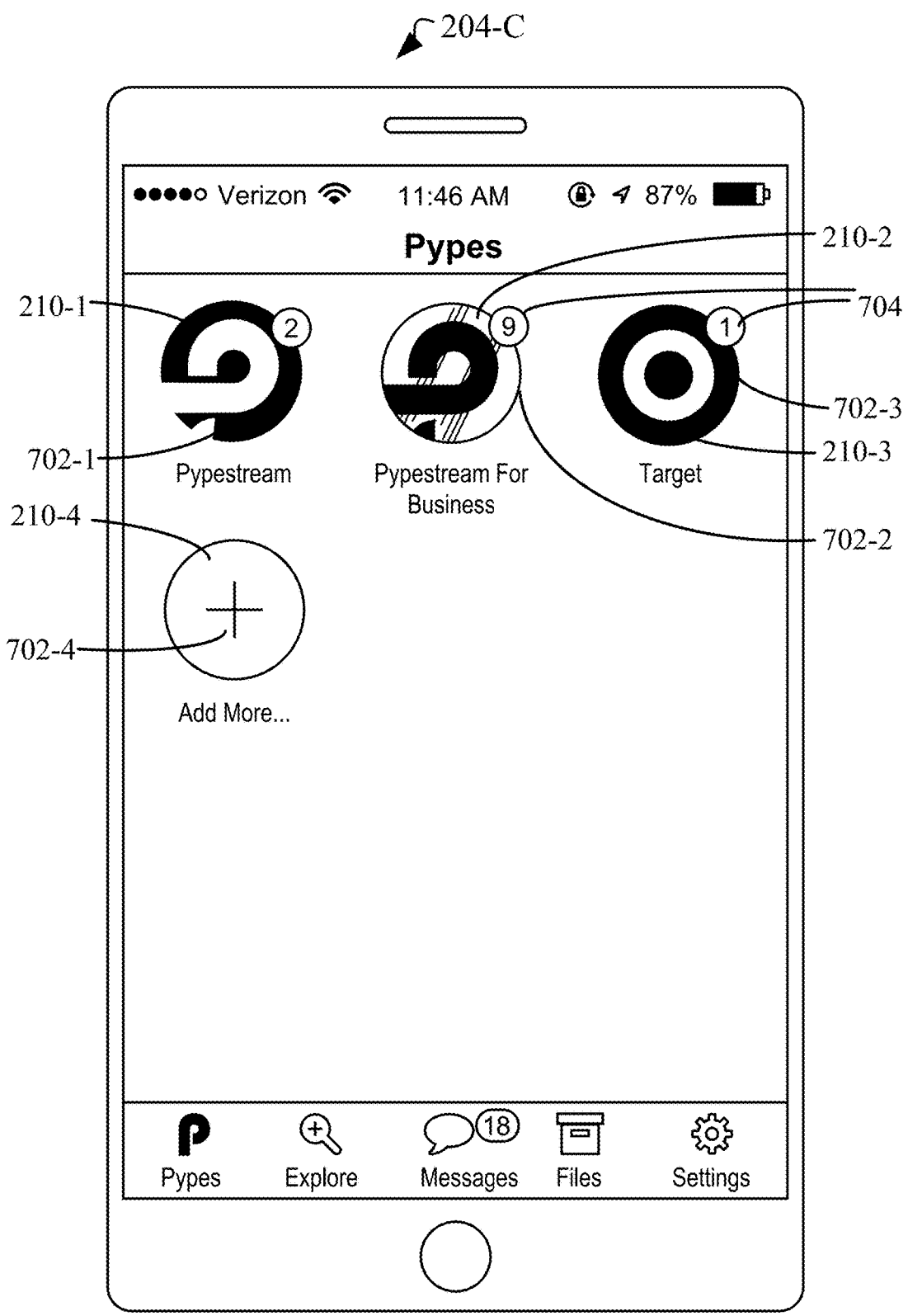
FIG. 17 provides an illustration of a graphical user interface running on a remote user device in accordance with some embodiments of the present disclosure.

Referring to FIG. 17, the disclosed user interface of the communications module-client side 204-C provides with a single affordance (e.g., affordance 702-3 for TARGET), the ability to connect with an enterprise data source 102 and obtain all the functionality that enterprise data source 102 could possibly want to provide in single selection of an affordance (e.g., a single tap of the affordance). For instance, by tapping on affordance 702-3 of FIG. 17, the user interface of module 204-C on the remote user device 104 is updated to the display illustrated in FIG. 19. In FIG. 19, all the functionality that TARGET desires to provide to end users is offered as one or more secure sub-channels 212. If desired, any of these sub-channels 212 can host a secure bi-directional conversation between the exemplary enterprise data source 102 (TARGET) and the end user associated with the remote user device 104. Further, there is no requirement that each of the sub-channels 212 host a bidirectional conversation. In some embodiments, some of the sub-channels 212 may be used to push data, such as advertisements, media, or other forms of information. Moreover, as disclosed herein, in instances where sub-channels 210 host conversations, the enterprise data source 102 can build into the conversations widgets 2216 (e.g., applets) that provide any desired functionality to support transactions and end user experience.

In conventional systems, an enterprise data source 102 must publish one or more applications to provide a comparable service to the end user. For instance as of the date of the filing of the present disclosure, AMAZON publishes one application "Amazon Music with Prime Music" for listening to music on remote devices, a second application "Amazon Video" for watching videos on remote devices, a third application "Amazon Prime Now" for shopping on the Amazon network, a fourth application "Amazon Photos" for cloud and drive storage and backup, and a fifth application "Kindle" for reading digital books. Thus, it is necessary to download from an application store and install on the remote user device 104 each of these applications in order to obtain all of AMAZON's remote device functionally. Moreover, AMAZON updates these applications, the end user is forced to download and reinstall each of these updated applications on their remote user device 104. For end users that are interested in interacting with multiple enterprise data sources 102, this leads to an untenable situation where much of their network bandwidth is devoted to the download of numerous updated applications. Using the disclosed secure mobile communications platform 200, it is possible to encapsulate all of this functionality in a single affordance (e.g., 702-3 in the case of TARGET) that expands out into a plurality of sub-channels 212. Thus, with reference to AMAZON, a first sub-channel 212 would replace AMAZON's first application "Amazon Music with Prime Music", a second sub-channel 212 would replace AMAZON's second application "Amazon Video" for watching videos on remote devices, a third sub-channel 212 would replace AMAZON's third application "Amazon Prime Now" for shopping on the Amazon network, a fourth sub-channel 212 would replace AMAZON's fourth application "Amazon Photos" for cloud and drive storage and backup, and a fifth sub-channel would replace AMAZON's fifth application "Kindle" for reading digital books. Thus, rather than downloading and installing five applications, the user would click a single button and have all the desired functionality. Moreover, as illustrated in FIG. 9 with affordances 902, if the user did not wish to have certain of the sub-channels 212, they could simply turn such sub-channels off. Thus, the disclosed systems and methods provide a novel environment in which a user connects to a primary channel 210 associated with an enterprise data source 102 and then switches on and off sub-channels 212 rather than downloading, over and over again, applications from application stores. Thus, once again referring to FIG. 17, the simple act of hitting the affordance 702-3 (for TARGET) or the plus affordance 702-4 for enterprise data source 102 is equivalent to the conventional act of going to an on-line application store, find the application, download the application, providing the application with your user name and password each time. In fact, in some embodiments of the present disclosure, the user profile stores the credentials of the user so that when the user selects a new enterprise data source 102, the credentials are passed on to the new enterprise data source 102, making the addition of a new primary channel 210 to the user interface of module 204-C a one step process.

Figure 5N:
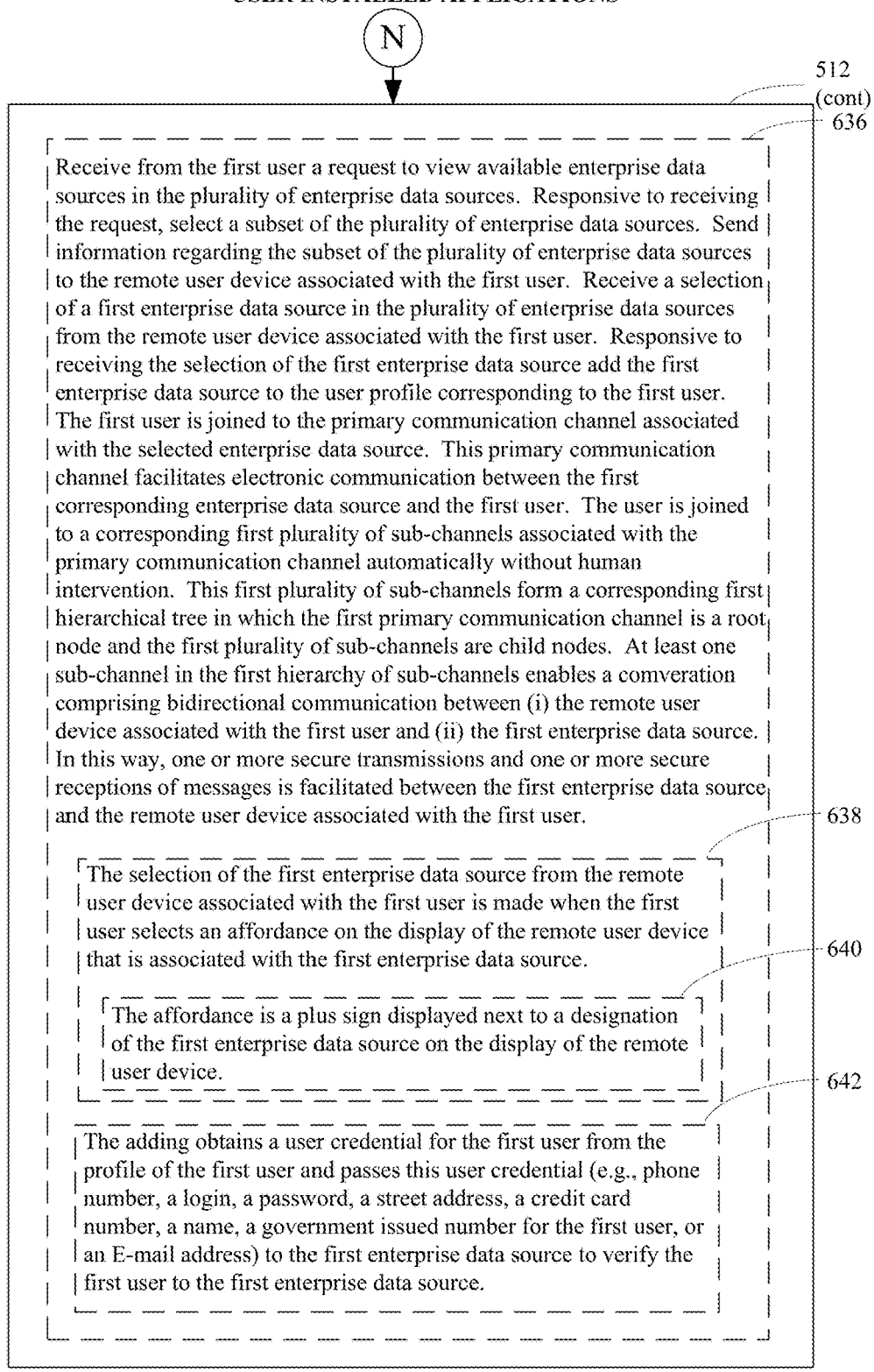

Block 636 of FIG. 5N illustrates this process in accordance with one embodiment of the present disclosure. There is received from a first user a request to view available enterprise data sources 102 in the plurality of enterprise data sources (e.g., by selection of affordance 702-4 in FIG. 17). Responsive to receiving the request, a subset of available enterprises data sources 102 in the plurality of enterprise data sources is selected. Information regarding the subset of the plurality of enterprise data sources is sent to the remote user device associated with the first user, for instance as illustrated in FIGS. 13, 14, and 15. A selection of a first enterprise data source 102 in the plurality of enterprise data sources is received from the remote user device 104 associated with the first user. Responsive to receiving the selection of the first enterprise data source, the first enterprise data source is added to the user profile 602 corresponding to the first user. The first user is joined to a primary communication channel associated with the enterprise data source 102. This primary communication channel facilitates electronic communication between the first corresponding enterprise data source and the first user. The user is further joined to a first plurality of sub-channels associated with the primary communication channel automatically without human intervention. This first plurality of sub-channels form a corresponding first hierarchical tree in which the first primary communication channel is a root node and the first plurality of sub-channels are child nodes. At least one sub-channel in the first hierarchy of sub-channels enables a conversation comprising bidirectional communication between (i) the remote user device associated with the first user and (ii) the first enterprise data source. The conversation is limited to only this first user, no other first user may participate in the conversation although the enterprise data source 102 may use the sub-channel 212 to host similar private conversations with other end users. In this way, one or more secure transmissions and one or more secure receptions of messages is facilitated between the first enterprise data source and the remote user device associated with the first user.

Referring to block 638 of FIG. 5N, the selection of the first enterprise data source from the remote user device associated with the first user is made when the first user selects an affordance on the display of the remote user device that is associated with the first enterprise data source.

Referring to block 640 of FIG. 5N, in some embodiments, the affordance is a plus sign displayed next to a designation of the first enterprise data source on the display of the remote user device.

Referring to block 642, in some embodiments, the adding obtains a user credential for the first user from the profile of the first user and passes this user credential (e.g., phone number, a login, a password, a street address, a credit card number, a name, a government issued number for the first user, or an E-mail address) to the first enterprise data source to verify the first user to the first enterprise data source.

Natural Language Processing of Customer Queries while Viewing Catalogs.

Referring to block 644 of FIG. 5O, a catalog or other information is communicated from the enterprise data source 102 to the remote user device 104 associated with a first user within a conversation hosted by a first sub-channel 212 in the corresponding plurality of sub-channels associated with a respective primary communication channel in the plurality of primary communication channels. A response from the first user regarding the catalog (or other information provided by the enterprise data source) is received within the conversation in the first sub-channel. The catalog selection (or other forms of user selection such as menu choice selection, etc.) is processed using an automated human interface module (e.g., automated human interface module 2202) employing a trained classifier, thereby generating a reply to the catalog selection (or other form of end user selection). A determination is made as to whether the reply is deemed to be satisfactory. For instance, consider a situation where a user made a request for "paint thinner." All responses to this user query are run through a classifier to determine whether the responses to the request are satisfactory. For instance, if the replies pertain to paint thinner (because the phrase "paint thinner") appears in the text of the responsive documents, the classifier will deem the documents satisfactory. When the reply is deemed to be satisfactory, the reply is communicated to the remote device 104 associated with the first user within the conversation in the first sub-channel. When the reply is deemed to not be satisfactory, communication on the first sub-channel (e.g., the conversation between the remote user device associated with the first user and the enterprise data source) is switched to a human associate with the corresponding enterprise data source of the first sub-channel (e.g., the conversation is routed to the sub-channel administrator queue 2228 of FIG. 22). Referring to block 646, in some embodiments, the trained classifier makes the determination as to whether the reply is deemed to be satisfactory. Referring to block 648, in some embodiments the automated human interface module employing the trained classifier is not associated with the enterprise data source 102.

Referring to block 680, in some embodiments a query is received from a remote user device associated with a first user within a conversation hosted in a first sub-channel in the corresponding plurality of sub-channels associated with a respective primary communication channel in the plurality of primary communication channels. The query is processed using an automated human interface module employing a trained classifier, thereby generating a reply to the query. A determination is made as whether the reply is deemed to be satisfactory. When the reply is deemed to be satisfactory, the reply is communicated to the remote device associated with the first user within the first sub-channel. When the reply is deemed to not be satisfactory, the conversation is switched to a human associate with the corresponding enterprise data source of the first sub-channel (e.g., the conversation is routed to the sub-channel administrator queue 2228 of FIG. 22). Referring to block 652, in some embodiments, the trained classifier makes the determination as to whether the reply is deemed to be satisfactory. Referring to block 654, in some embodiments the automated human interface module employing the trained classifier is not associated with the enterprise data source.

Referring to block 656, in some embodiments a query is received from a remote user device 104 associated with a first user within a conversation hosted by a first sub-channel in the corresponding plurality of sub-channels associated with a respective primary communication channel in the plurality of primary communication channels. The query is processed using an automated human interface module employing a trained classifier, thereby generating a reply to the query. The reply is communicated to the remote device associated with the first user within the first sub-channel. A determination is made as to whether the reply is deemed to be satisfactory. When the reply is deemed to not be satisfactory, the conversation is switched to a human associate with the corresponding enterprise data source of the first sub-channel (e.g., the conversation is routed to the sub-channel administrator queue 2228 of FIG. 22). Referring to block 658, in some embodiments the determination as to whether the reply is deemed to be satisfactory is based, at least in part, on further communication received from the first user within the conversation. Referring to block 660, in some embodiments, the automated human interface module employing the trained classifier is not associated with the enterprise data source.

Geographically Dependent Messaging.

Advantageously, the secure mobile communication platform 200 support permits geographic dependent messages. For instance, referring to block 662 of FIG. 5P, a location of a remote user device 104 associated with a first user within a first sub-channel 212 in the corresponding plurality of sub-channels associated with a respective primary communication channel 210 in the plurality of primary communication channels is received. A determination is made as to whether the location is within a geographical zone (e.g., country, region/state, city, town, county, metro code/zip code) in a plurality of geographical zones. When the location is within a geographical zone in the geographical plurality of zones, information from the enterprise data source 102 is communicated to the remote user device 104 associated with the first user within the first sub-channel 212 based, at least in part, on the location. When the location is not within a geographical zone in the geographical plurality of zones, no information from the enterprise data source 102 is communicated to the remote user device 104 associated with the first user within the first sub-channel 212.

To illustrate, an enterprise data source 102 (e.g., business entity), for example, MORANDI® restaurant of Morandi LLC., offers a special offer, for example, a temporal offer from Mar. 2, 2015 through Mar. 5, 2015, to users subscribing to the "ZAGATS.NYC.bestItalian.*" sub-channel 212. In an embodiment, the SMCB 200 implements a periodic geolocation mechanism to transmit location sensitive messages to users through the sub-channels 212. As used herein, "periodic geolocation mechanism" refers to a method of determining a geolocation of a user (e.g., consumer) and delivering different content to the user based on the user's location parameters comprising, for example, country, region/state, city, metro code/zip code, organization, internet protocol (IP) address, an internet service provider (ISP), etc. The SMCB 200 triggers a push notification if the user, due to the periodic geolocation obtained from the remote user device 104 associated with the user, heartbeats with a SMCB 200 presence service when proximal to the MORANDI® restaurant. For example, if the user is within a two mile radius of the MORANDI® restaurant, then the SMCB 200 sends the user a message about a 25% discount on a billing transaction for a dinner for two, provided the billing transaction is greater than $150, through the sub-channel 212. In an embodiment, a consumer agent on a server or a cloud computer handles the push notification, for example, by performing a k-cluster nearest neighbor calculation to determine a match with a standard deviation of 1 mile. As used herein, "k-cluster nearest neighbor calculation" refers to a pattern recognition calculation performed for statistical classification and regression analysis. The geolocation heartbeat can be expressed on a GOOGLE® Map of Google, Inc., to show pulse rate and movement of the user in a particular location. In an embodiment, the SMCB 200 supports the delivery of a message based on time scheduling with users being deemed active or relevant, if they meet demographic criteria and are in a particular geographical location defined, for example, by a longitudinal and latitudinal address, and therefore sends a message and/or an offer to those users in real time through their respective sub-channels 212.

Natural Language Processing.

In some embodiments of the present application, natural language processing (NLP) is invoked whenever a user enters a free form text entry while in a conversation 2220 with a chatbot 2202, as opposed to clicking on an option button, or a list picker. That is, this analysis is applied when the user provides text input versus making an offered selection, e.g. clicking on an option button, a list picker, etc.

Two-Layer Natural Language Processing.

In some embodiments, the natural language processing is divided into two layers, (i) a persistent layer natural language processing and a specialized context layer natural language processing.

In some embodiments, the persistent layer natural language processing is based on keyword analysis which is then checked for matches against all available node tags 2211 of all nodes 2208 in the node graph 2208 of the chatbot 2202 that user is interacting with. In alternative embodiments, rather than invoking such keyword tag matching, the persistent layer natural language processing makes use of vector space semantics, which provides a deeper understanding of words and in what context they are used. In such embodiments, the vector space semantics allows for the use of context to improve the identification of matching options. For instance, the understanding of what the word means, and also relationships between words is leveraged in the vector space semantics. In some such embodiments, vector based semantics is supported by building up a corpus of word combinations and understanding. In some embodiments, a different corpus of word combinations and understanding is built for different industries or categories. In other words, a specialized corpus of word combinations is built for each respective different industry or category based on the terms of art and understanding in each respective different industry or category. Thus, for each respective different industry or category a corpus relevant to a respective industry or category is used to examine frequencies in order to derive semantic information for that respective industry or category. This work is based on statistical semantics hypothesis: statistical patterns of human word usage can be used to figure out what people mean. In some embodiments, the corpus is either acquired or is built using documents relevant to the respective industry or category. To build a corpus the documents relevant to the respective industry or category corpus are examined to determine what constitutes a term and decisions are made on how to extract terms from raw text in a process that is referred to in the art at tokenization. Then, in some embodiments, the raw text is normalized, to convert superficially different strings of characters to the same form (e.g., car, Car, cars, and Cars could all be normalized to car). In some embodiments, the raw text is also annotated to mark identical strings of characters as being different (e.g., fly as a verb could be annotated as fly/VB and fly as a noun could be annotated as y/NN). Once the raw documents in the respective industry or category have been processed, event frequencies suitable for natural language process, in the form of term-document matrices, word-context matrices, and/or pair-pattern matrices. See Turney and Pantel, 2010, "From Frequency to Meaning: Vector Space Models of Semantics," Journal of Artificial Intelligence Research 37, pp. 141-188, which is hereby incorporated by reference. Such matrices can then be used to analyze text provided by a user in order to find the most suitable response. Such matrices represent a plurality of vectors, each such vector representing a possible response to the query by a user. When the user makes a query, the query is converted to a vector and the similarity between the query vector and a respective vector in the matrices is calculated, for instance by taking their cosine. This is done for a number of the vectors in the matrix to find the vector in the matrix that has a similarity to the query vector that satisfies a similarity threshold. The value of this similarity threshold is application dependent and so may vary. In some embodiments, a vector in the matrix satisfies the similarity threshold when it is more similar to the query vector than any other vector in the one or more matrices associated with the respective different industry or category.

The primary purpose of this effort is to efficiently and effectively match the user input to the most appropriate topical area in the chatbot 2202 node graph 2208, with the corpus of word vector space optimized on a per industry/category basis.

One implementation in accordance with such embodiments that uses natural language processing comprises, at a server system (e.g., secure mobile communications platform 200) comprising one or more processors 274 and memory 192/290, joining a first user to a primary communication channel 210, where the primary communication channel facilitates electronic communication between a corresponding enterprise data source 102 and a remote user device 104 associated with the first user. In the method the first user is further joined to a sub-channel 212 associated with the primary communication channel 210, where the sub-channel 212 hosts a plurality of users including the first user, each in their own conversation 2220 with the enterprise data source 102. A first message that is posted by the first user is received by the secure mobile communications platform 200. The first message comprises (a) an application programming interface token 396 identifying the first user and (b) a first text communication. Responsive to the first message, the first text communication is compared to each tag (e.g. interface tag expression 2204, scope tag expression 2206, node tag 2211) in each respective set of tags in a plurality of sets of tags, where each respective set of tags in the plurality of sets of tags is uniquely associated with (i) a different automated human interface module 2202 in one or more automated human interface modules associated with the sub-channel 212 or (ii) a different node 2210 within a plurality of nodes in an automated human interface module 2202 in the one or more automated human interface modules. The first message is routed to a first automated human interface module 2202 in the one or more automated human interface modules or a first node 2210 within the first automated human interface module that is associated with a tag (e.g. interface tag expression 2204, scope tag expression 2206, node tag 2211) that best matches the first text communication. This is an example of execution of the first layer of the two-layer natural language processing. The first automated human interface module prepares a second message responsive to the first message which is then received at the secure mobile communications platform 200 when the second message is posted by the first automated human interface module. The second message includes (a) the first application programming interface token 396 identifying the first user, and (b) a second communication responsive to the first message. The application programming interface token 396 is used to route the second message to the first user within the sub-channel 212 thereby facilitating a secure bidirectional conversation between (i) the remote user device 104 associated with the first user and (ii) the corresponding enterprise data source 102 associated with the primary communication channel 210. In some such embodiments, the first message further comprises (c) a key (e.g. API key 310) identifying the sub-channel in the one or more sub-channels, and the second message further comprises (c) the key identifying the sub-channel.

In some such embodiments, the comparing the first text communication to each tag in each respective set of tags in a plurality of sets of tags includes performing a procedure that comprises tokenizing the first text communication thereby obtaining a plurality of tokens (and optionally normalizing and/or annotating the first text communication). In such embodiments, the plurality of tokens is converted into a query vector. The query vector is then compared to a first set of tags in the plurality of sets of tags (e.g. interface tag expressions 2204, scope tag expressions 2206, node tags 2211), where the first set of tags is in the form of a matrix of target vectors (that have also been tokenized and optionally normalized and/or annotated). In such embodiments, each target vector in the matrix of target vectors includes a relative frequency of occurrence of each term in a plurality of terms. Thus, in such embodiments, each respective interface tag expressions 2204, scope tag expressions 2206, and/or node tag is a vector of tokens. Moreover, each interface tag expressions 2204, scope tag expressions 2206, and/or node tag 2211 includes a frequency of occurrence of each term in a plurality of terms. In some embodiments, the plurality of terms is associated with a context or an industry associated with the sub-channel or primary communication channel.

In some embodiments, automation is added, where the chatbot 2202 recognizes when users put in new words or word combinations that have not been presented before. When this occurs, the new words or word combinations are registered in order to automatically extend the vector space corpora of a particular node 2202. In some such embodiments, the persistent layer natural language processing of each chatbot 2202 includes automated deep learning in which the bot evolves its own word vector space corpora.

In some embodiments, the persistent layer of the natural language processing is invoked in a modular fashion. For example, in some embodiments the natural language processing includes a plurality of modules, such as a sentiment analyzer, a spell checker, entity linking, or a high level context extraction module.

Thus, in some embodiments, the comparing the first text communication to each tag in each respective set of tags in a plurality of sets of tags further comprises applying one or more extension modules to the first text communication, thereby forming an augmented first text communication that is compared to each tag in each respective set of tags in the plurality of sets of tags. In some embodiments, an extension module, in the one more extension modules, is a spell checker and the augmented first text communication is a spell-checked version of the first text communication. In some embodiments, an extension module, in the one more extension modules, is a context extraction module and the augmented first text communication comprises a context identified by the context extraction module.

In this way, additional information is extracted every time the user enters text. In some embodiments, one or more of the plurality of modules are customized by the enterprise data source 102. In some embodiments, one or more of the plurality of modules are a public domain or commercial natural language processing type library. For instance, in some embodiments, one of the sentiment analysis modules is a third-party artificial intelligence module. Thus, in situations where a particular enterprise data source 102 has a need for it, or in situations where there is a certain chatbot 2202 where this may be helpful, the persistent layer of the natural language processing functionality can be expanded beyond the default set of natural language processing modules, to further include additional natural language processing modules that provide additional natural language processing services. In some embodiments, one or more of these additional natural language processing modules is provided by third parties. In some embodiments, one or more of these additional natural language processing modules is provided by the enterprise data source 102.

Specialized Context Layer Natural Language Processing.

In some embodiments, the persistent layer natural language processing is used to route a user to a specific knowledge area in a node graph 2208 based on a context determined by the persistent layer, at which point a second specialized context layer natural language processing is invoked as a second layer of the overall natural language processing. This approach simplifies the context extraction because it streamlines and optimizes the context extraction rules to a limited scope at the second layer; e.g. making a restaurant or travel reservation, understanding the details about a device error complaint, etc. For example, if the chatbot 2202 determines from the conversation 2220 that the user is trying to make a restaurant reservation as part of the first persistent layer natural language processing, a specialized context extraction module is invoked as a second layer of the natural language processing that is specific to this particular topic. With this context in mind, the second layer of the natural language processing system has a much easier problem to solve because it needs to only look for a discrete number of items (e.g., where, which restaurant, which location, what time, how many people, any kind of diet, etc.). That is, the scope of complexity for the natural language processing system is reduced by imposing learned context in this manner.

In some such embodiments, the comparing the first text communication to each tag in each respective set of tags in a plurality of sets of tags described above includes performing a procedure that comprises converting the first text communication into a query vector, applying one or more extension modules to the query vector, thereby forming an augmented query vector, and using the augmented query vector to identify a subset of sets of tags from the plurality of sets of tags to evaluate, where each set of tags in the subset of sets of tags is in the form of a matrix of target vectors in a subset of a plurality of matrices of target vectors, and where each target vector in each respective matrix in the subset of a plurality of matrices of target vectors includes a relative frequency of occurrence of each term in a plurality of terms, and the augmented vector is compared to each respective target vector in each respective matrix in the subset. In some embodiments, an extension module, in the one more extension modules, is a spell checker and where the augmented vector is a spell-checked version of the query vector. In some embodiments, an extension module, in the one more extension modules, is a context extraction module, the augmented vector includes a context identified by the context extraction module, and the context determines the identity of the subset of the plurality of matrices of target vectors.

Figure 28:
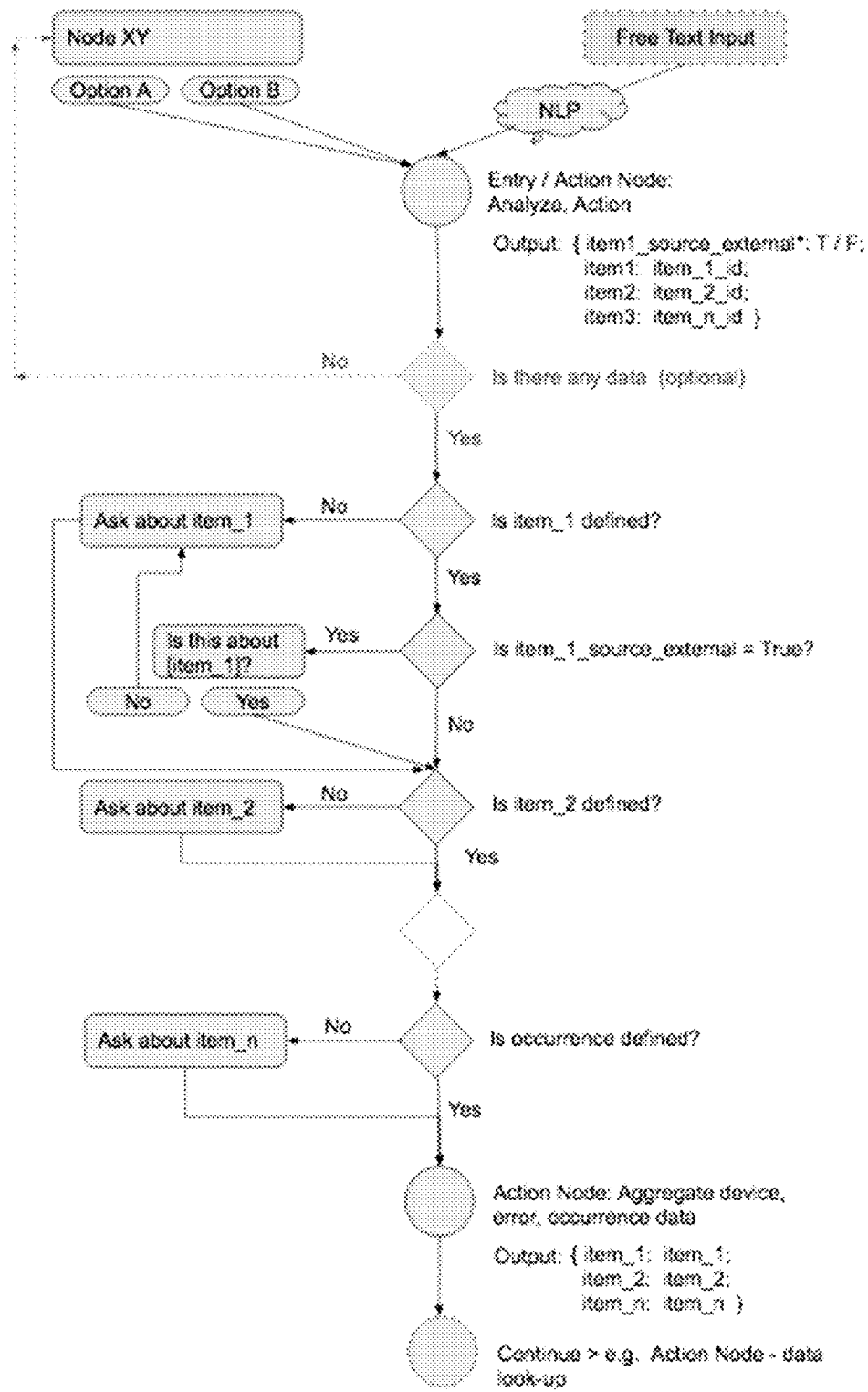
FIG. 28 illustrates a context extraction chat flow model in accordance with an embodiment of the present disclosure.

FIG. 28 provides a context extraction flow module for a conversation 2220 in accordance with some aspects of the present disclosure in which specialized natural language processing context "cards" for each specialized topic are made in the second layer of the natural language processing. The result is a growing, re-usable library of natural language processing context cards, one for reservations in general, a more specialized one for flight reservations, one for restaurant reservations, etc. Further, over time a library of such second layer natural language processing context cards is built up so a chatbot 2202 can be imbued with those cards where they make sense. For instance, a chatbot 2202 that is directed to a medical application would not have to deal with restaurant reservations and so would not get the reservation context cards, but rather will have more life sciences and medical related context cards than a chatbot 2202 that is directed to hospitality, for example. Moreover, the context cards are user independent meaning that it doesn't matter who the user is. The context cards in a given chatbot 2202 are topic based, as opposed to topic plus user. This illustrates how the two layer NLP provides a first high level NLP to understand what the user is actually talking about a higher level. Once this is understood (e.g., you are trying to make a restaurant reservation). The first layer does not concern itself with the details of the reservation or how much additional information the user provided. The purpose of the first layer is to understand what the user wants to talk about in the conversation 2220. Once the first layer of the natural language processing determines this, a specialized extraction module of the second layer of the natural language processing delves into the specifics of making a restaurant reservation with the user. Because the context has been limited for the second level, it can be easily cued to look for time, number of people, and the other details of making a reservation as a simple process as illustrated in FIG. 28. In this way, the persistent layer of the natural language processing (layer 1) is used to help steer the conversation 2220 as fast as possible to a layer having specialized context natural language processing. Thus, in such embodiments, specialized context NLPs are not invoked until more general NLP determines the correct context and thus the correct context NLP from among a plurality of context NLPs to invoke.

In some embodiments, a context for the secure bidirectional conversation 2220 is determined based, at least in part, on a first text communication posted by a user from a device 104 as part of a first layer of natural language processing. Responsive to determining the context, the secure bidirectional conversation is routed to a first node 2210 in the plurality of nodes in an automated human interface module 2202 that includes an interface module for the context. In some such embodiments, the context is a type of reservations (e.g. restaurant reservations, airline reservations, hotel reservations, automobile reservations, etc.). In some embodiments the first node 2210 performs image analysis. In some embodiments, the context is a medical application, to name a few non-limiting examples of context.

Node Cluster Functions.

Node cluster functions address the case where a chatbot 2202 has fairly expansive coverage, so there are a lot of different topical areas that are being covered by the chatbot 2202. Because to this, there are multiple areas in the chatbot that need to perform a certain function at some point in the conversations 2220 supported by the chatbot. So, for example, consider the case where the chatbot 2202 provides general technical support, and there are multiple places where a user could type in what kind of device they are having a problem with, or that they want to talk about. And then there may be multiple areas where they could type in an error code, or what the problem is. It could be through different services or products and the like. Moreover, the node cluster function executes a general sequence of instructions that are necessary at some point before the conversation 2220 can progresses. Typically, the general sequence of instructions is used to acquire a certain predetermined enumerated list of information. The node cluster function addresses this situation by providing a construct that enables a collection of action and message nodes to become a function. In other words, a centralized function is provided in the chatbot 2202 that can be called from anywhere. In some embodiments, the node cluster function performs a scripted algorithm via one or more action nodes, interacts with a user via a sequence of nodes included in the node cluster, receives input data from a user, and can provide (defined) data output. Thus, in typical embodiments, the node cluster function has a plurality of nodes. For instance, once a user has been located to a node cluster function, the chatbot 2202 may ask specific questions to fill in content that it needs. Once the node cluster function is completed its sequence of instructions, the function makes sure it has gathered all the required information and then passes the user back to a destination node 2210 in the node graph 2208 of the chatbot 2202 that is directly correlated with where they were before they passed through the node cluster function. In this way, the use of a node cluster function provides a script that can be used by many different nodes 2210 in the node graph 2208 to perform a common function that is needed by the nodes. Instead of writing such a script within each of the many different nodes, it is written once as a node cluster function. This improves efficiency. A variety of node cluster functions are contemplated by the systems and methods of the present disclosure. For instance, in some embodiments a chatbot 2202 includes a node cluster function that is a single script that just completes a certain process. In some embodiments, the node cluster function acts as a mini-chatbot 2202 that goes beyond asking a simple enumerated list of questions but rather contains conditional branches or other logic based on the answers provided by a user to initial questions. Moreover, such node cluster functions can be called from multiple areas in the node graph 2208, and in fact from multiple areas within a given node 2210. When called, the node cluster function performs its function and moves the user back to their conversational flow 2220. Any necessary data can be passed to the node cluster function and the node cluster function can return to the calling node any data acquired or calculated by the node cluster function. In some embodiments, the node cluster function performs calculations based on passed data and returns these calculations to the calling node. In some such embodiments, the node cluster function does not ask the user for any data. In some such embodiments, the node cluster function does ask the user for any data. In some embodiments, the node cluster function performs an error checking function based on data passed to the node cluster function. For instance, in the example where the chatbot 2202 is directed to technical support based on error codes, the node cluster function can be used to check to make sure that the error code entered by a user is a valid error code. In another example where the chatbot 2202 is directed to technical support based on error codes, the node cluster function can be used to obtain a help link or a document associated with the error code and return this help link or document to the calling node.

Thus in some a first automated human interface module 2202 comprises a node graph 2208, the node graph comprises a first plurality of nodes 2208 and a first plurality of edges, and each edge in the first plurality of edges connects two nodes in the first plurality of nodes. A subset of the first plurality of nodes in the node graph performs a dedicated function and is called by one or more referencing nodes in the node graph that are not part of the subset of the first plurality of nodes. In some embodiments, the dedicated function is a script that is designed to obtain information from the first user within the secure bidirectional conversation. In some embodiments, the dedicated function receives status data from a referencing node in the one or more referencing nodes to facilitate performing the dedicated function. In some embodiments, the dedicated function receives a destination node in the first plurality of nodes from a referencing node in the one or more referencing nodes, and once the subset of the first plurality of nodes in the node graph performs the dedicated function, the method further comprises passing the secure bidirectional conversation to the destination node. In some embodiments, the destination node is the same as the referencing node. In some embodiments, the destination node is other than the referencing node.

In one example of a node cluster function, users make use of a chatbot 2202 to enter into conversations 2220 to report a problem with their service on a mobile device. So, before the chatbot 2202 can address the user's problem, the chatbot will need to know three types of information: (i) the device type, (ii) the kind of error the user is encountering, and (iii) where the error is happening. So, in a typical conversational flow, the user types in text. The chatbot 2202 detects from natural language processing that the issue they are having relates to a problem with their service on a mobile device. So now, before doing anything else, the chatbot 2202 then goes through a process of obtaining the three pieces of information. The chatbot 2202 communicates to the user it knows the user has this issue, and is no now going to check if it has any of the needed information. The chatbot 2202 function looks to see if anywhere else in the bot the user has already provided any of the needed information (e.g., the type of device), so that the user is not inconvenienced by having to enter the information again. If needed information cannot be found, the chatbot 2202 will invokes a particular node cluster function that is designed to ask the user to provide the device type before returning to normal conversation flow at the calling node 2210 in the node graph 2208 of the chatbot 2202. The chatbot 2202 will then go to its next question, and see if the user has already mentioned the kind of error it is encountering anywhere in the conversation 2220. If the user has not mentioned in the conversation anything about the error, the chatbot 2202 will call a specialized node cluster function in the form of mini-bot that provides a mini-conversational (reduced set) flow, to enquire as to the kind of error the user is encountering and therefor an error code for the error. Once the specialized node cluster function has acquired the kind of error the user is encountering, process control is returned to the calling node 2210 in the node graph 2208 of the chatbot 2202. The chatbot 2202 will then go to its next question, and review the conversation flow for information on where the error is happening. If the user has not mentioned in the conversation anything about the error, the chatbot 2202 will call a specialized node cluster function in the form of mini-bot that provides a mini-conversational (reduced set) flow, to enquire as to where the user is encountering the error. Once the specialized node cluster function has acquired where the error is occurring, process control is returned to the calling node 2210 in the node graph 2208 of the chatbot 2202. Then, with this needed information, the user can be transferred to a specific destination node 2210 in the node graph 2208, which processes the services request. For instance, the destination node 2210 may look up information for the service request, move the user to a flow where there is resolution information for the user, and the like. This example illustrates a representative paradigm, in which a chatbot 2202 needs three, five, or ten pieces of information before it can perform a task. Obtaining such information involves a specific flow, and so the use of node cluster functions in the way illustrated above provides a way to extend the amount or type of information needed, or the way it is acquired, without having to extensively rewrite the nodes in the conventional node graph 2208 of the chatbot 2202. Moreover, in some embodiments, template node cluster functions are provided to allow the enterprise data source 102 a good starting point from which to develop customized node cluster functions. For instance, one template provides a sequence of information, a feature information checklist. That is, a certain informational sequence that commonly occurs. In this way, the enterprise data source 102 is given flexibility on how they interface with their customers.

Rather than reprogram an entire chatbot 2202 and recompile it every time the enterprise data source wants to interface with their customer in a different way, e.g., an improved or new list picker etc., the use of a node cluster function in the manner described herein provides a way to do so. The node cluster function is discrete and so can be easily changed and upgraded.

In some embodiments, node cluster functions include conversational flow routing, meaning that any node 2210 in the node graph 2208 of a chatbot 2202 that is making use of a node cluster function includes the destination node in the node graph 2208 as a required input parameter. This ensures the node cluster function can properly route the conversation 2220 back to the flow that requested an instance of the node cluster function.

Another example use for a node cluster function is a card checkout. For instance, consider the case in which an enterprise data source 101 sells certain products or services. To obtain these products or services, a user in a conversation 2220 has to provide a credit card. There is an amount of information, for instance whatever is on the card, that must be favorably processed. Moreover, there is billing information that must be acquired by the enterprise data source 102 from the user. This whole process is put into a particular node cluster function that serves as an ecommerce checkout function that can be called by a chatbot 2202. Moreover, the enterprise data source 102 can provide their own script for this ecommerce checkout function in the form of a node cluster function. In some embodiments, a function shell is provided to the enterprise data source 102 so that the enterprise data source 102 knows how to operate with the function, then the enterprise data source 102 can customize the function so that they best interface with their customers.

Open Artificial Intelligence Platforms.

As discussed above, in some embodiments of the present disclosure, two-layer natural language processing is invoked where the first level scans user input to deduce a context from a plurality of possible contexts, whereas the second level includes a separate natural language module for each respective context. That is, the second layer comprises a plurality of natural language modules, each dedicated to addressing one of the plurality of possible contexts. Advantageously, in the systems and methods of the present disclosure, both the first layer and the second layer are open ended, meaning that third party artificial intelligence natural language processing modules may be interfaced into either layer. In this way, any other kind of cognitive services can be integrated into either layer. In typical embodiments, such cognitive services have an application programming interface. In such embodiments, the systems and methods of the present disclosure leverage such application programming interfaces to integrate the services.

The types of artificial intelligence programs (e.g., cognitive services) that are leveraged are different for each layer of the disclosed two-layer natural processing. For the second layer, which is context specific, examples of cognitive services that can be interfaced are the MICROSOFT Cognitive Services that include APIs for emotion and video detection, facial, speech and vision recognition, and speech and language understanding, to name a few examples. See the Internet at microsoft.com/cognitive-services/en-us/documentation, which is hereby incorporated by reference. For instance, MICROSOFT offers image computer vision analysis as a cognitive service. It can look for or try to recognize people, it can try to recognize objects in a picture, it can classify a picture and so forth. Such a service is typically not appropriate for the first layer of the disclosed two-layer natural language processing, but such a service may benefit a particular context that the chatbot 2202 is responsible for (e.g., an area in the node graph 2208 of the chatbot 2202 that involves specialized image recognition), where you have an image recognition feature that you want. The disclosed open artificial intelligence platform can easily connect into the MICROSOFT's API for their image recognition service, so that, when a user uploads an image, the MICROSOFT cognitive service can be applied. As another example, the MICROSOFT linguistic analysis API can be used to perform sentence separation and tokenization, part-of speech tagging, and constituency parsing.

Moreover, third party artificial intelligence modules can be used in the first layer of the two-layer natural language processing to facilitate context determination. For instance, the MICROSOFT emotion API can be used to determine user sentiment, the MICROSOFT BING spell check API can be used to check spelling, and so forth.

Thus, any publically available cognitive service can be integrated into the two-layer natural language processing of the present disclosure. Moreover, they can also be integrated into embodiments of the present disclosure that make use of only a single layer natural language processing.

In some embodiments, the cognitive service is a knowledge exploration service that provides a way to add interactive search and refinement to applications. With the knowledge exploration service, the enterprise data source can build a compressed index from structured data, author a grammar that interprets natural language queries, and provide interactive query formulation with auto-completion suggestions as a module that is included in either the first layer or the second layer of the disclosed two-layer natural language processing. Thus, in the case of the restaurant reservation extraction, such a service can be trained to read a statement where a user is likely providing details about the restaurant reservation they want to make. In the case of a chatbot 2202 directed to a medical application, the service can be trained to read a statement where a user is likely providing details regarding a medical issue (e.g., specialized so it can detect the kind of things that a potential patient might have issues such as knee surgery, knee replacement surgery, etc.). Thus, the knowledge exploration service can be specialized to a particular context for a module in the second layer of the two-layer natural language processing. Thus, with the open AI platform, the natural language processing can be accomplished using just the tools provided inherently with the node graphs 2208 of the present disclosure. However, if an enterprise data source 102 has already worked out desired natural language processing using third party tools, or for whatever reason wanted to work with MICROSOFT, IBM or other third party cognitive services, advantageously such services can be plugged into the natural language processing of the present disclosure as discrete modules using the APIs that come with such third party cognitive services.

An additional example of such a third party cognitive service is image recognition. This is a specific cognitive service where you send the image to a MICROSOFT or IBM or other third party server, and what is returned is information regarding the image, such as whether a face is seen, and if there is a face, the sex associated with the face, likely age, skin color, etc. Thus, if an enterprise data source 102 needed to be able to work with that type of data, such data could be obtained from such a cognitive service. In this way, specialized cognitive services can be leverage for specific topics in the systems and methods of the present disclosure when needed.

Specific examples of third party cognitive services that may be interfaced into the disclosed specialized context layer of natural language processing include, but are not limited to, image analysis, expert decision models, self/machine learning models that adjusts (weight) an algorithm or expert decision model, topically focused context extraction, and web search.

Moreover, in some embodiments, any third party cognitive service can be leveraged not only for the persistent natural language processing layer of the specialized context layer of natural language processing, but also by any node 2210 in the node graph 2208 of a chatbot 2202 where such cognitive services facilitate conversation 2210 progression.

Multi-Channel Support.

Advantageously, one aspect of the present disclosure provides multi-channel support which enables chatbot 2202 integration into multi-channel end points; e.g. SMS, Facebook Messenger, etc., via a transformation layer 317 that automatically translates the default chatbot 2202 outputs to the appropriate format required for a specific channel. The chatbot platform detects the channel at the start of a conversation 2220 and applies the correct channel transformation protocol.

Referring to FIG. 4 in some embodiments, the communications module 204 is in the form of a mobile application that a user downloads onto a client device 104. However, in alternative embodiments the communications module 204 is in the form of a webchat widget that can be interfaced with another application, such as one provided by an enterprise data source 102 or a third party. Further still, in some embodiments, the communications module 204 is in the form of a webchat widget that can be added to the webpage of an enterprise data source 102 or the webpage of a third party, just like any other webchat widget that is available with the exception that conversation 2220 are initially directed through chatbots 2202 within sub-channels 212 before, on a conditional basis, getting passed on to a live agent.

In some embodiments, the communication module 204-C is in the form of a software development kit, right, that can be installed as a mobile application under select operating systems 473, such as iOS, DARWIN, RTXC, LINUX, UNIX, OS X, ANDROID, or WINDOWS.

In some embodiments, the communications module 204-C is in fact a third party application such as FACEBOOK messenger.

These disclosed embodiments allow for the expansion of the types of communication protocols and communication applications that can be used to support the conversations 2220 in sub-channels 212. For instance, they allow for the use of communication protocols such as SMS.

To support this expansion, the systems and methods of the present disclosure extend the chatbots 2202 to be able to interface with third party client device applications (e.g., FACEBOOK messenger) and/or over any of a number of communication protocols such as SMS. In the case of the FACEBOOK messenger platform, it is installed as a client application on device 104-1 and can render chatbot-like user interface features, like for example, the way chatbots typically communicate, by having conversations 2220 with a user. In such conversations 2220 such applications might present the user with some options that might be rendered as affordances (e.g., date picker, list picker, radio button, etc.), which upon user selection, take the user to the next question or element of a conversation flow.

Chatbots 2202 are extended in such embodiments of the present disclosure by the combination of a channel/communications module 204-C detection mechanism that detects the type of communication protocol being used to support a conversation 2220 in a sub-channel 212 and/or the type communications module 204-C being used to support the conversation. If the type of communication protocol and/or the type of communications module 204-C is other than default, a transformation layer 317 is imposed on the conversation to provide translated instructions to facilitate the conversation 2220 with the end user using the alternative communication protocol and/or type communications module 204-C. In some embodiments, the channel/communications module 204-C detection mechanism operates on an incoming chat request by a user from a client device 104-1 on a sub-channel 212 that is requesting to engage in a conversation 2220 with a chatbot 2202. In such embodiments, the request includes a channel definition. In one nonlimiting example, the request states that is coming from a PYPESTREAM web widget. In such an instance, the transformation layer 317 does not need to get invoked because no transformation or translation needs to take place to facilitate the conversation 2220, e.g., with a chatbot 2202 and/or live operator. If, on the other hand, the request specifies an alternative communication protocol (e.g., SMS) and/or alternative communication module 204-C (e.g., FACEBOOK messenger) then a determination is made as to whether there is a suitable transformation layer 317 to support the alternative communication protocol and/or module. If a suitable transformation layer 317 is found, then the chatbot 2202 that is executing the channel/communications module 204-C detection mechanism would communicate with the user through the communications module 204-C by first translating its questions or communications to the user using the transformation layer 317. In some embodiments, for example questions posed by the chatbot and or other forms of communication from the chatbot to the user are first translated by the application transformation layer 317 and then packed into a suitable data format such as the JSON format, that client side communications module 204-C can then parse. As such, in preferred embodiments, the transformation layer 317 is able to translate all the native affordances offered by a chatbot 2202 to an end user as part of normal conversation flow, such as radio buttons, stickers, image carousels, list pickers, and the like into equivalent affordances that can be understood by the alternative communications module 204-C (e.g., FACEBOOK messenger). In other words, the native affordances are translated (e.g., the native list picker) into the FACEBOOK messenger version of a list picker. In similar fashion, other affordances such as date pickers and buttons are translated into a format that the alternative communications module 204-C requires to render it properly. Thus, in such embodiments, the reach of the chatbots 2202 is extended to additional channels, other kinds of chat frameworks (e.g., other kinds of client side communications modules 204-C) that are publically available, including chat frameworks that do not intrinsically have native chatbot capabilities and/or a reduced set of chatbot capabilities (e.g., a reduced set of the types of affordances founds in chatbots such that some chatbot representations will work and other do not). As such, based on the results of the channel/communications module 204-C detection mechanism, the most appropriate transformation layer 317 is installed over a conversation 222. Then, those elements (e.g., affordances, objects, etc.) that are not reflected or not possible, as documented in the transformation layer 317, process control passes to the lowest common denominator affordance that is supported. In typical instances, this lowest common denominator is text presentation such as in the case of SMS. Thus, in the case of SMS, the conversation 2220 is flattened, so that all communication by the chatbot 2202 is translated into unformatted ASCII text.

Ultimately, in such embodiments the system and methods of the present disclosure provide one or more conversion tables. The one or more conversion tables serve the purpose of translating native affordances, such as a native list picker, into a data structure that is supported by the non-default communication protocol and/or non-default client side communications protocol 204-C that has been detected. This is done by using the one or more conversion tables to look up what the equivalent affordance is (e.g., what is equivalent to the native list picker). If an equivalent affordance is found, the equivalent is selected and used in place of the native affordance. If an equivalent affordance cannot be found, then the chatbot 2202 resorts using an equivalent text-based message as a substitute for the affordance. In the case where the equivalent affordance is determined, the chatbot 2202 uses the one or more conversion tables to would the native JSON format for the list picker or image carousel or other form of native affordance and then translates that to whatever structure the non-default client side communications module 204-C needs so that it can properly work with it. Moreover, the one or more conversion table may not know all the components but it would know some and so the chatbot 2202 would do the best it can with the one or more conversion tables to translate the affordances the best that it can and render the rest as unformatted, or substantially unformatted text.

Another advantage of opening up the systems and methods of the present disclosure to the use of non-default client side communications modules and/or nondefault communication protocols is that it allows the enterprise data source to leverage their existing customer base in whatever form that it is presently in. For instance, consider the case of enterprise data source 102 B that already has a lot of traffic through their FACEBOOK page. In such instances, to capitalize on this traffic, the enterprise data source 102 B places a chat widget in their FACEBOOK page where they are getting a lot of interest in their products and services as well as customer questions regarding the same. The chat widget can be used to automate servicing this interest and at the same time provide the same kind of fundamental value that is offered to enterprise data sources 102 that require their users to download the default client side communications module 204-C. The chat widget serves as a shell application that is added by the enterprise data source to their FACEBOOK page thereby enabling users to engage in conversations 2220 that are serviced by the server side communications module 204-S in accordance with the teachings of the present disclosure. In this way, the chatbot 2202 experience is provided in the FACEBOOK environment, or any other third party application. In this way, the enterprise data source 102 is using the server side communications module 204-S to host a primary communication channel 210 with one or more sub-channels 212, but the enterprise data source's clients would be on the FACEBOOK property (or other nondefault client side communications module) and communicating through the FACEBOOK client chatbot application, which serves as a shell with a collection of objects that allow live representation for chatbot-type conversations. However, what drives the conversation 2220 would remain the chatbot 2220 hosted by the secure mobile communications platform 220. For example, a chatbot 2202 on the secure mobile communications platform 200 that is driving a conversation 2220 will determine when to provide a list picker and provide these options to the end user via the third party (e.g., FACEBOOK) interface. Upon receiving such instructions from the chatbot 2202, the FACEBOOK chatbot (e.g., the non-default client application) provides the list picker or other objects to the user on the remote user device 104 associated with the user. The non-default client application then waits for the user input at the FACEBOOK client application, which is then returned back to the chatbot 2220 on the communications platform 200, where the chatbot 2220 then interprets the response and sends a further communication to the FACEBOOK client application (or other form of non-default client application) to respond. In this way, the FACEBOOK mobile application (or other form of non-default client application) is used to interact with the secure mobile communications platform 200 in order to facilitate a conversation 2220. In such embodiments, the end user is not using the default client side communications module 204-C but rather a non-default module such as FACEBOOK messenger, on their client device 104-C because that is how the corresponding enterprise data source 102 has always communicated with that particular user. The enterprise data source 102 has a lot of similarly situated user who have always communicated with the enterprise data source 102 through the same non-default client side communications module, such as FACEBOOK messenger. The enterprise data source 102 wants to go beyond the non-default client side communications basic messaging applications, for instance to partake in the full experience afforded by the conversations 2220 of the present disclosure, including secure primary communication channels 210, secure sub-channels 212, encryption, and all the functionality of the chatbots 2220 of the present disclosure including node graphs 2208 and the functionality of the nodes 2210 of the present disclosure. However, in some embodiments, the enterprise data source 102 is limited because they have traditionally used a non-default client side communications module, such as FACEBOOK messenger, to interact with their users because that is where their customer base is situated. To address this issue, the systems and methods of the present disclosure advantageously enable the use of non-default communication protocols and non-default client side communications modules so that, if there is a certain chatbot 2220 that the enterprise data source 102 wants to use in conversations, it uses the one or more conversion tables to convert messages, objects and affordances from the chatbot 2220 into a data structure (e.g., JSON equivalent of that chatbot message) that will work with the non-default client side communications module (e.g., FACEBOOK messenger). The non-default client side communications module receives this data structure and in this way the user receives the message with from the chatbot 2202 on the secure communications platform 200 converted now into something that the non-default client side communications module recognizes.

Thus, in some embodiments, a communication protocol used in a conversation 2220 with a remote device 104 is detected. When the communication protocol is other than a default communication protocol, a transformation layer 317 is invoked that translates messages from the chatbot 2202 to the remote user device 104 to a format associated with the communication protocol prior to routing the second message to the remote user device. In some such embodiments, the communication protocol is other than a default communication protocol, and the invoking the transformation layer 317 translates the messages from the chatbot 2202 to the remote user device 104 to a JSON file that is routed as the messages from the chatbot 2202 to the remote user device. In some embodiments, the communication protocol is other than a default communication protocol, the messages from the chatbot 2202 to the remote user device 104 each comprise one or more objects in other than ASCII format, and the invoking the transformation layer 317 translates an object in the one or more objects to ASCII format prior to the messages from the chatbot 2202 being routed to the remote user device. In some embodiments, the transformation layer 317 includes a lookup table that provides a translation schedule for each object in a plurality of objects, for each communication protocol in a plurality of communication protocols. In some embodiments, the communication protocol is other than a default communication protocol, a messages from the chatbot 2202 comprises one or more objects in other than ASCII format, and the invoking the transformation layer 317 translates an object in the one or more objects to another format prior to the message being routed to the remote user device in accordance with the lookup table.

Customization of User Experience Based on Identity of the Client Side Communications Module.

An additional advantage of the channel/communications module 204-C detection mechanism is that the enterprise data source 102 can customize the node graph 2208 of its chatbots 2208 as a function of the identity of the communications protocol (e.g., default web based or non-default communication protocol such as short message service) and/or identity of the client side communications module (e.g., default proprietary client side communications module 204-C versus third party non-default client side communications module such as FACEBOOK messenger). Alternatively, or additionally, the enterprise data source 102 can customize which chatbots 2202 interface with a user as a function of the identity of the communications protocol (e.g., default web based or non-default communication protocol such as short message service) and/or identity of the client side communications module (e.g., default proprietary client side communications module 204-C versus third party non-default client side communications module such as FACEBOOK messenger). As an example of such embodiments, an enterprise data source 102 can have an overall chatbot 2202 that does an enumerated list of tasks (e.g., x, y, z) and thus can address different disciplines and/or can have multiple chatbots. Thus, upon receiving a user request, not only can the secure mobile communications platform 200 detect what the user is asking about, what affordances they clicked on etc. and bring them to the appropriate place in the node graph 2208 of a chatbot 2202, but as a result of the channel/communications module 204-C detection mechanism, the system can differentiate the user experience based on client side communications module identity (e.g., default client side communications module 204-C, non-default client side communications module type A, non-default client side communications module type B, etc.). This is done not only to access the appropriate translations as discussed above, but also to customize the user experience. For instance, the enterprise data source 102 may have varying degrees of trust for the various non-default client side communications modules (e.g., high degree of trust for non-default client side communications module type A, medium degree of trust for non-default client side communications module type B, no trust for non-default client side communications module type C). This trust may be a result of the policies of the business organizations that are associated with such non-default client side communications module types. For instance, a low amount of trust would be attributed to a non-default client side communications module type that is provided by a business organization that is known to listen in on all communications through its non-default client side communications modules. As another example, a high degree of trust would be attributed to a non-default client side communications module type that is provided by a business organization that is known to protect all communications through its non-default client side communications module and not listen in on such communications. In some embodiments this trust is alternatively or additionally a result of the degree to which a suitable transformation layer 317 can be imposed to ensure a uniform customer experience. For instance, a low amount of trust would be attributed to a non-default client side communications module type for which the most suitable transformation layer 317 can only implement a few of the affordances needed by the enterprise data source 102 chatbot 2202 to provide effective communication. As another example, a high degree of trust would be attributed to a non-default client side communications module type for which the most suitable transformation layer 317 can implement most or all of the affordances needed by the enterprise data source 102 chatbot 2202 to provide effective communication. As such, the channel/communications module 204-C detection mechanism affords enterprise data sources 102 with the ability to put predetermined constraints on conversations 2220 with users that are using non-default client side communications modules and/or nonstandard communication protocols. This is beneficial to an enterprise data source 102 because it expands its reach to users. Rather than always requiring a user to download onto their client device the highly trusted client side communications module 204-C, the enterprise data source 102 can immediately engage with its users on those nondefault client side communications modules 204-C that it already has an established foothold in. In some embodiments, the enterprise data source 102 views such conversations with nondefault client side communications modules for which is has a low degree of trust as an exploration phase that users might be in where they are evaluating the services or products of the enterprise data source 102. In some embodiments, the enterprise data source 102 will move such conversations 22220 to a special branch of a node graph 2208 of a chatbot 2202 to communicate in a certain way, to make certain things available but other things not. The goal in such instances is try to steer a user to become customer. Through this process, at some point, the enterprise data source 102 will inform the user what actions need to be taken in order to become a more valuable customer for which purely private conversations 2220 can take place (e.g., by having the user download a more trusted nondefault client side communications module and/or the default client side communications module 204-C). As such, the channel/communications module 204-C detection mechanism advantageously provides the additional element of the enterprise data source 102 being able to recognize how conversations are happing (what communication protocol), where it is happening from (what kind of client side communications protocol) and allowing the enterprise data source to optimize and streamline the specific type of conversations that they will have in light of this. Thus, where a similar question from an existing customer coming through the enterprise data source's 102 own default client side communications module 204-C might offer some additional elements to the customer, the enterprise data source 102 may tone down change the offerings to a user that is using a nondefault client side communications module. As such, in some embodiments, the node graph is conditioned based on the results of the channel/communications module 204-C detection mechanism. At some point, the enterprise data source 102 will steer the user that is using the nondefault client side communications module to a more trusted client side communications module (e.g., one that is provided by the enterprise data source 102), and/or a PYPESTREAM client side communications module 204-C. Alternatively, at some point, the enterprise data source 102 will steer the user to a mobile website that is more mobile friendly to improve the user experience. In this way the enterprise data source 102 does not have to limit communication to only users that are using the default client side communications module 204-C on client devices 104, but rather can host conversations 2220 with an array of different nondefault client side communications modules including client side applications and websites. And, depending on which client side communications module a user of a client 104 is using, what an enterprise data source 102 offers us (e.g., which chatbot 2202 and/or which branch in the node graph 2208 of a given chatbot) may differ. For some such communications modules, there may be some translation of objects and/or affordances that is necessary as discussed above. In some instances, where a translation is not possible, then parts of the message are downgraded to text. Moreover, as additional communication protocols (e.g., channels) come up that the enterprise data source 102 is interested in supporting, advantageously, all that is involved is to build one more transformation layers 317 for the new communication protocol (e.g., channel). This allows the enterprise data source to extend to different communication protocols (e.g. channels) that the chatbots 2202 could be active in, in a very streamlined fashion.

In some embodiments, a node graph 2208 of a chatbot 2202 directs a whole customer experience, depending on what actions the user takes. Moreover, in some such embodiments, as a result of the channel/communications module 204-C detection mechanism, the node graph 2208 includes a conditional branch from one node to another in an existing node graph to direct the customer experience. In alternative embodiments, as a result of the channel/communications module 204-C detection mechanism, a determination is made as to what kind of chatbot 2202 in a plurality of different kinds of chatbot 2202 is used to direct the customer experience. In alternative embodiments, as a result of the channel/communications module 204-C detection mechanism, a determination is made as to what kind of chatbot 2202 in a plurality of different kinds of chatbot 2202, and what branch of the node graph 2208 of the selected chatbot 2202 is used to direct the customer experience.

In some embodiments, some aspects of the enterprise data source 102 offering are preserved regardless of the communication protocol and/or type of client side communications module that a client is using. For instance, in some embodiments the enterprise data source provides a frequently asked questions chatbot 2202 that, for example, stays the same, regardless of communication protocol and/or client side communications module type. As such, the channel/communications module 204-C detection mechanism advantageously provides a high degree of flexibility to the enterprise data source 102. As such, logic responsive to the results of the channel/communications module detection mechanism can be imposed in many different contexts by the enterprise data source (e.g., as a branch in a node graph, as a branch within a node, and/or as a determination as to which node a user interacts).

When non-default client side communications modules are used by users, an integration component is needed in order to preserve the integrity of conversations 2220 (e.g., the user identifier, sub-channel identifier, primary communication channel 210 identifier etc.). This integration component serves so track which nondefault client side communication module instances interface with which conversations 2220 on the secure mobile communications platform 200. In this way, anytime a user operating at a client device 104 sends a communication through the non-default client side communications module the integration component executes a handshake to let the secure mobile communications platform 200 know which conversation 2220 (and thus which primary communication channel 210 and sub-channel 212) the communication is for so that the secure mobile communications platform 200 know which chatbot 2202 to direct the communication.

Another aspect of the support provided for nondefault client side communications modules 204-C is that anonymous users can be supported. That is, in such embodiments, the user of a device 104 does not have to set up an account where they provide credentials such as an E-mail address, name, and/or mobile number. In such embodiments, the user can still interact with enterprise data sources 102 on a one on one basis. That is, they can navigate to the webpage of enterprise data source A, and then navigate to the webpage of enterprise data source B and so forth. In this way the user selects an enterprise data sources 102 to interact with provided that the enterprise data sources 102 permits anonymous communication. When the user wants to engage in a particular transaction or other form of communication with the enterprise data source 102, one of the chatbots 2202 for that enterprise data source can handle the communication on an anonymous basis in instances where the chatbot 2202 permits anonymous communication. In some embodiments, some enterprise data sources 102 permit anonymous communication and some do not permit anonymous communication. In some embodiments, the communication channel itself provides to the integration component enough identifying information on create a new user account (e.g., to uniquely identify a user) so that the user can be assigned a user identifier and be properly tracked as a known registered user within the secure mobile communications platform. Regardless of whether the user is identified or not, such embodiments allow communication with interested users of clients 104 and enterprise data sources 102 to occur. In typical embodiments, when a user is using a nondefault client side communications module 204-C the user can't open up multiple primary communication channels 210 with multiple different enterprise data sources 102 through a single client side application. Such functionality typically requires the default client side communications module. Thus, the user on the client 104 side using a nondefault client side communications module would have to navigate from the page for one enterprise data source 102 to the next until arriving at an enterprise data source 102 that the user wants to interact with. At some point the user may be steered to a default client side communications module 204 that allows the user to open up a plurality of primary communications channels with a plurality of enterprise data sources 102. However, the support for nondefault client side communications modules and the support for anonymous users provides enterprise data sources 102 an advantageous degree of flexibility to incorporate the functionality of the secure mobile communications platform into whatever framework they already have working for themselves, and build from there, rather than start from ground zero with an exclusive requirement that all users be declared (e.g., have a user identifier) and/or use the default client side communications module 204-C.

In some embodiments, the remote user device includes a client side communications module for sending and receiving communications and an identity of the client side communications module is determined within a conversation 2220. When the client side communications module is determined to be a first type of client side communications module, a transformation layer 317 is invoked that translates messages from a chatbot 2202 to a user associated with a client device 104 to a format associated with the client side communications module prior to routing the message to the remote user device within the conversation. When the client side communications module is determined to be a second type of client side communications module, messages from a chatbot 2202 to a user associated with a client device 104 within the conversation 2220 are sent to the remote user device without translating the messages to a format associated with the client side communications module. In some such embodiments, the client side communications module is determined to be the first type of client side communications module, and the invoking the transformation layer 317 translates a message from the chatbot 2202 to a JSON file that is routed as the message from the chatbot to the user associated with a remote user device 104. In some embodiments, the client side communications module is determined to be the first type of client side communications module, a message from a chatbot 2202 in the conversation 2220 comprises one or more objects in other than ASCII format, and the invoking the transformation layer 317 translates an object in the one or more objects to ASCII format prior to the message being routed from the chatbot to the remote user device. In some embodiments, the transformation layer 317 includes a lookup table that provides a translation schedule for each object in a plurality of objects, for each type of client side communications module in a plurality of types of client side communications module. In some such embodiments, the client side communications module is determined to be the first type of client side communications module, a message from the chatbot 2202 in the conversation 2220 comprises one or more objects in other than ASCII format, and the invoking the transformation layer 317 translates an object in the one or more objects to another format prior to the message being routed from the chatbot to the remote user device in accordance with the lookup table.

Integration into Third Party Customer Relationship Management Systems.

The systems and methods of the present disclosure provide chatbots 2208 that are able to facilitate conversations with end users on behalf of enterprise data sources 102. In some embodiments, an enterprise data source 102 has invested time in developing a customer relationship management (CRM) tool using a third party vendor such as SALESFORCE. Advantageously, the systems and methods of the present disclosure allow for the integration of such CRM tools. In such embodiments, referring to FIGS. 1 and 2, the enterprise source side communications module 204-E interfaces with a third party customer relationship management application 105 to route logic within conversations 2220 and handle communication between the third party CRM application 105 and users. This enables the chatbots 2202 associated with such enterprise data sources 102 to continue to use their existing third party customer relationship management applications, while leveraging the messaging and intelligent automation afforded by the chatbots 2202 of the present disclosure.

To illustrate, in some embodiments, when a conversation 2220 moves from a chatbot 2202 to a live agent associated with a sub-channel 212, a routing process is invoked. Moreover, in some embodiments, for a given enterprise data source 102, multiple live agents log in and receive incoming chat requests from users. In some embodiments, server side communications module 204-S supports this plurality of chat requests using a round robin solution. However, in some embodiments, an enterprise data source 102 does not want to use the native solution provided by the service side communications module 204-S, but rather wants to use the solution for servicing the requests that it has already developed with a third party customer relationship management application 105 such as those provided by SALESFORCE, SAP, and ORACLE, to name a few such vendors. Thus, in some embodiments of the present disclosure, the secure mobile communications platform 200 affords the enterprise data source 102 with the choice to select the native CRM capabilities of the server side communications module 204-S or the third party customer relationship management application 105 whether that be ORACLE, or SAP or SALESFORCE, or some other vendor.

As an example of the investment some enterprise data sources 102 may already have, an enterprise data source 102 may have already trained two to three hundred support agents, field agents, to use, for example, the same source, their live agent chat widget that is part of an overall third party customer relationship management application 105. In such instances, the enterprise data source 102 will want to integrate this investment into the secure mobile communications platform 200 but retain the existing CRM solution.

In some embodiments, the server side communications module 204-S exactly replaces the enterprise data source's 102 existing third party customer relationship management application 105 user interface as part of an integration approach. In alternative embodiments, the third party customer relationship management application 105 is interfaced with the service side communications module 204-S such that messages originating from a chatbot 2202 or a live agent in a conversation 2220 in a sub-channel 212 comes from the enterprise data source 102, through the secure mobile communications platform 200, and are connected right up to the point of an outer layer of the third party CRM application 105. In other words, the messages in the conversation are routed to the third party customer relationship management application 105 instead of, or in addition to, being routed by the server side communications module 204-S. For instance, in the case where the third party CRM application 105 is SALESFORCE, the server side communications module 204-S connects directly into the SALESFORCE routing mechanism and then, from there, anything upward that the enterprise data source 102 is already using in terms of the third party CRM application 104, whether it be SALESFORCE Live Agent, Live Agent Supervisor, or any other tools, is the same. In such connections, the primary communication channel 210 channel is preserved. That is, conversations 2220 within a particular primary communication channel 210 stay within their primary channel 210. Moreover, in typical embodiments, conversations 2220 within a particular sub-channel 212 stay within their sub-channel 212 by enforcement of the requirement that all messages in a conversation include a user identifier 218.

From the standpoint of the server side communications module 204-S, the chatbot 2202 messages within conversations 2220 are streamed in real time to the third party customer relationship management application 105 thereby enabling an open connection between the end user is having a conversation 2220 and the third party customer relationship management application 105. In embodiments where the third party customer relationship management application 105 operates asynchronously a CRM interface module 205 is included within the server side communications module 204-S (FIG. 2) that allows for the asynchronous messaging connection into third party customer relationship management application 105. The CRM interface module 205 checks on a recurring basis to see whether the third party CRM application 105 has sent a communication back to the secure mobile communications platform 200. If the third party CRM application 105 has sent a communication, the CRM interface module 205 obtains the communication and places it in the correct conversation 2220. If the third party CRM application 105 has not sent a communication, the check is made and no action is taken. In this way, the third party CRM application 105 is integrated into the secure mobile communications platform 200. And then, all of the routing, however it is set up, the logic that the enterprise data source 102 has set up in the third party CRM application 105 operates as is. Such embodiments blend the capability of the third party CRM application 105 with the capability of the secure mobile communications platform 200. In some embodiments, for example, the enterprise data source 102 use the webchat functionality afforded by the disclosed chatbots 2202 because of their advanced functionality that is not found in conventional third party CRM applications 105. Thus, in such embodiments the enterprise data source 102 replaces the third party CRM application 105 webchat with that afforded by the disclosed chatbots 2202 so that the chatbots 2202 handle user messages whereas the third party CRM application 105 is used to handle the live agent tasks in the way that has been traditionally done by the enterprise data source's 102 existing tools within the third party CRM application 105.

In some embodiments each messages handled by the secure mobile communications platform 200 has a) a key identifying a first sub-channel 212 in the one or more pre-existing sub-channels and (b) an application programming interface token identifying the first user. In some embodiments, where the enterprise data source 102 makes use of a third party CRM application 105, some of these messages are passed to the third party CRM application 105. When such messages are passed to the third party CRM application an identifier is provided for each such message so that any return messages from the CRM application are routed to the correct application. In some embodiments, the identifier is a) a key identifying a sub-channel 212 in the one or more pre-existing sub-channels (e.g., API key 310) and (b) the application programming interface token 396 identifying the first user associated with the message. In some embodiments, the identifier is a conversation identifier. In some embodiments, the CRM interface module 205 includes a lookup table that is used to assign a new identifier to such messages when the third party CRM application 105 requires the identifiers to be in a certain format. In such embodiments, when the CRM application 105 provides response messages, the CRM interface module 205 uses the lookup table to determine which conversation 2220 the response message is to be posted to. In some embodiments, the message identifiers form the basis for a unique channel for each conversation thread that is passed to the third party CRM application 105. The third party CRM application 105 uses the message identifiers for its own routing purposes. The CRM interface module 205 uses these message identifiers as discrete channels that it pings against on a recurring basis to look for response messages from the third party CRM application 105 to post back to the appropriate conversations 2220.

As such, on a recurring basis, the CRM interface module 205 looks to see if there are responsive messages, and it puts the requisite identifiers (e.g., the API key 310 identifying a first sub-channel 212 in the one or more pre-existing sub-channels and the application programming interface token 396 identifying the first user) on the responsive messages so that the messages are routed into the correct conversations 2220. The routing within the third party CRM application 105 is preserved in such embodiments. That is, whatever logic the third party CRM application 105 has to route messages to certain agents, but not others, is preserved.

To illustrate, consider the case where the third party CRM application 105 is SALESFORCE. The secure mobile communications platform 200 will send messages into SALESFORCE. The CRM interface module 205, operating within the secure mobile communications platform 200 will have an identifier for the specific conversation 2220 of such messages that it maintains so that whatever agent picks up the conversation 2220 within the third party CRM application 105, the CRM interface module 205 has a channel that it can poll on a recurring basis to see if any agents have responded. When the CRM interface module 205 does discover a responsive message, the identifier is used to send the responsive message right back to the correct conversation 2220. Thus, the way the CRM interface module 205 knows that an agent associated with the third party CRM application 105 has posted a responsive message is because the response message includes an identifier. In some embodiments, the CRM interface module 205 opens a channel for each conversation 2220 passed to the third party CRM application 105. This retains the integrity between the conversation 2220 and the third party CRM application 105. The third party CRM application 105 must retain the integrity of this channel using the identifier so that response messages are routed to the correct conversation 2220. In some embodiments, the CRM interface module 205 pings on a recurring basis against the identifier to see if the third party CRM 105 has responded. In some embodiments, responsive messages passed back by the third party CRM 105 include objects rather than just simple text. For instance, in some embodiments such objects are embedded in JSON format. In some embodiments, such objects encode messages, affordances, HTML, or other logic. In such embodiments, the CRM interface module 205 includes a special lookup table in order to understand how such objects are to be processed and posted to the associated conversation.

In some embodiments, in addition to routing messages to the third party CRM application 105, additional parameters are passed (e.g., topic indicators or codes, right, that help the routing process within the third party CRM application 105). In some embodiments, where a conversation 2220 has already been developed on the mobile communications platform 200 prior to passing it on to the third party CRM application, the user conversation history 2224 is passed on to the third party CRM application 105 the first time the CRM interface module interfaces with the third party CRM application 105 for that conversation. Subsequently, if the CRM interface module receives responsive messages for the conversation from the third party CRM application 105 and needs to posts subsequent messages from the chatbot 2202 to the third party CRM application 105 for the same conversation, the CRM interface module 205 does not need to repost the conversation history 2224 to the third party CRM application 105 because the third party CRM application already has the conversation history 2224 from the first time that that the CRM interface module 205 posted to the third party CRM application 105. In this way, a live agent working with the third party CRM application 105 opening up the message from the mobile communications platform 200 would see the previous the conversation 2220 up to date within their own user interface.

The use of the CRM interface module 205 in the ways detailed in the present disclosure afford the enterprise data source 102 with the ability to preserve their third party CRM investment. In such embodiments, with respect to this CRM investment, the secure mobile communications platform serves as the middleware for messaging. In this way, the enterprise data source 102 can retain its third party CRM capability while at the same time taking advantage of all the functionality of the present disclosure including but not limited to the functionality of the chatbots 2202, their reduced volume, very specific end-user secure connection that the platform 200 provides out of the box, the efficiency from the chatbots 2202, the overall security and storability of the messaging platform 200 and the encryption.

In some embodiments, the enterprise data source 102 is associated with a customer relationship application 105 on a server computer associated with the enterprise data source 102. In some such embodiments the routing of a message from a chatbot 2202 in a conversation 2220 to a user within a sub-channel 212 comprises routing the message to the customer relationship application 105 within a secure bidirectional conversation 2220. In some such embodiments, the secure bidirectional conversation comprises a conversation history 2224 and the routing the message from the chatbot 2202 to the customer relationship application 105 includes the conversation history and the application programming interface token (e.g., API access token 396) identifying the user of the device 104 participating in the conversation. In some embodiments, the application programming interface token identifying the first user is used to poll the customer relationship application 105 on a recurring basis for a response by the customer relationship application to a message from a chatbot 2202 in a conversation 2220, and responsive to receiving the response to the message, using the application programming interface token to route the response to the message to the chatbot 2202 or a node within the chatbot in the conversation 2220.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIGS. 1, 2, 3, 4, 6, 16, 21, 22, 23, and 27. These program modules can be stored on a CD-ROM, DVD, magnetic disk storage product, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method, comprising:
   at a server system comprising one or more processors and memory:
      joining a first user to a primary communication channel, wherein the primary communication channel facilitates electronic communication between a corresponding enterprise data source and a remote user device associated with the first user and wherein the primary communication channel hosts a plurality of users including the first user;
      receiving a first message that is posted by the first user, wherein the first message comprises (a) an application programming interface token identifying the first user and (b) a first text communication;
      responsive to the first message, comparing the first text communication to each tag in each respective set of tags in a plurality of sets of tags, wherein each respective set of tags in the plurality of sets of tags is uniquely associated with (i) a different automated human interface module in one or more automated human interface modules associated with the primary communication channel or (ii) a different node within a plurality of nodes in an automated human interface module in the one or more automated human interface modules, wherein
         the first message is routed to a first automated human interface module in the one or more automated human interface modules or a first node within the first automated human interface module that is associated with a tag that best matches the first text communication, and
         the first automated human interface module prepares a second message responsive to the first message;
      receiving the second message that is posted by the first automated human interface module, wherein the second message includes (a) the first application programming interface token identifying the first user, and (b) a second communication responsive to the first message; and
      using the application programming interface token to route the second message to the first user within the primary communication channel thereby facilitating a secure bidirectional conversation between (i) the remote user device associated with the first user and (ii) the corresponding enterprise data source associated with the primary communication channel.

2. The method of claim 1, wherein the comparing the first text communication to each tag in each respective set of tags in a plurality of sets of tags includes performing a procedure that comprises:
   tokenizing the first text communication thereby obtaining a plurality of tokens;
   converting the plurality of tokens into a query vector; and evaluating the query vector to a first set of tags in the plurality of sets of tags, and wherein, the first set of tags is in the form of a matrix of target vectors, and each target vector in the matrix of target vectors includes a relative frequency of occurrence of each term in a plurality of terms.

3. The method of claim 2, wherein the plurality of terms is associated with a context or an industry associated with the primary communication channel.

4. The method of claim 1, wherein the comparing the first text communication to each tag in each respective set of tags in the plurality of sets of tags further comprises applying one or more extension modules to the first text communication, thereby forming an augmented first text communication that is compared to each tag in each respective set of tags in the plurality of sets of tags.

5. The method of claim 4, wherein an extension module, in the one more extension modules, is a spell checker and wherein the augmented first text communication is a spell-checked version of the first text communication.

6. The method of claim 4, wherein an extension module, in the one more extension modules, is a context extraction module and wherein the augmented first text communication comprises a context identified by the context extraction module.

7. The method of claim 1, wherein the comparing the first text communication to each tag in each respective set of tags in the plurality of sets of tags includes performing a procedure that comprises:

converting the first text communication into a query vector;

applying one or more extension modules to the query vector, thereby forming an augmented query vector;

using the augmented query vector to identify a subset of sets of tags from the plurality of sets of tags to evaluate, wherein each set of tags in the subset of sets of tags is in the form of a matrix of target vectors in a subset of a plurality of matrices of target vectors, and each target vector in each respective matrix in the subset of the plurality of matrices of target vectors includes a relative frequency of occurrence of each term in a plurality of terms; and comparing the augmented vector to each respective target vector in each respective matrix in the subset.

8. The method of claim 7, wherein an extension module, in the one more extension modules, is a spell checker and wherein the augmented vector is a spell-checked version of the query vector.

9. The method of claim 7, wherein an extension module, in the one more extension modules, is a context extraction module, the augmented vector includes a context identified by the context extraction module, and the context determines the identity of the subset of the plurality of matrices of target vectors.

10. The method of claim 1, wherein the first automated human interface module comprises a node graph, the node graph comprises a first plurality of nodes and a first plurality of edges, each edge in the first plurality of edges connects two nodes in the first plurality of nodes, and a subset of the first plurality of nodes in the node graph performs a dedicated function and is called by one or more referencing nodes in the node graph that are not part of the subset of the first plurality of nodes.

11. The method of claim 10, wherein the dedicated function is a script that is designed to obtain information from the first user within the secure bidirectional conversation.

12. The method of claim 10, wherein the dedicated function receives status data from a referencing node in the one or more referencing nodes to facilitate performing the dedicated function.

13. The method of claim 10, wherein the dedicated function receives a destination node in the first plurality of nodes from a referencing node in the one or more referencing nodes, and once the subset of the first plurality of nodes in the node graph performs the dedicated function, the method further comprises passing the secure bidirectional conversation to the destination node.

14. The method of claim 13, wherein the destination node is the same as the referencing node.

15. The method of claim 13, wherein the destination node is other than the referencing node.

16. The method of claim 1, wherein the method further comprises:

determining a context for the secure bidirectional conversation based, at least in part, on the first text communication as part of a first layer of natural language processing; and responsive to determining the context, routing the secure bidirectional conversation to a first node in the plurality of nodes in the automated human interface module that includes an interface module for the context.

17. The method of claim 16, wherein the context is a type of reservations.

18. The method of claim 16, wherein the first node performs image analysis.

19. The method of claim 16, wherein the context is a medical application.

20. The method of claim 1, the method further comprising:

detecting a communication protocol used by the server system to communicate the second communication to the remote user device; and when the communication protocol is other than a default communication protocol, invoking a transformation layer that translates the second message to a format associated with the communication protocol prior to routing the second message to the remote user device.

21. The method of claim 20, wherein the communication protocol is other than a default communication protocol, and the invoking the transformation layer translates the second message to a JSON file that is routed as the second message to the remote user device.

22. The method of claim 20, wherein the communication protocol is other than a default communication protocol, the second message comprises one or more objects in other than ASCII format, and the invoking the transformation layer translates an object in the one or more objects to ASCII format prior to the second message being routed to the remote user device.

23. The method of claim 22, wherein the transformation layer includes a lookup table that provides a translation schedule for each object in a plurality of objects, for each communication protocol in a plurality of communication protocols.

24. The method of claim 23, wherein
the communication protocol is other than a default communication protocol,
the second message comprises one or more objects in other than ASCII format, and
the invoking the transformation layer translates an object in the one or more objects to another format prior to the second message being routed to the remote user device in accordance with the lookup table.

25. The method of claim 1, wherein the remote user device includes a client side communications module for sending and receiving communications, the method further comprising:
determining an identity of the client side communications module; and
when the client side communications module is determined to be a first type of client side communications module, invoking a transformation layer that translates the second message to a format associated with the client side communications module prior to routing the second message to the remote user device, and
when the client side communications module is determined to be a second type of client side communications module, routing the second message to the remote user device without translating the second message to a format associated with the client side communications module.

26. The method of claim 25, wherein
the client side communications module is determined to be the first type of client side communications module, and
the invoking the transformation layer translates the second message to a JSON file that is routed as the second message to the remote user device.

27. The method of claim 25, wherein
the client side communications module is determined to be the first type of client side communications module,
the second message comprises one or more objects in other than ASCII format, and
the invoking the transformation layer translates an object in the one or more objects to ASCII format prior to the second message being routed to the remote user device.

28. The method of claim 27, wherein the transformation layer includes a lookup table that provides a translation schedule for each object in a plurality of objects, for each type of client side communications module in a plurality of types of client side communications module.

29. The method of claim 28, wherein
the client side communications module is determined to be the first type of client side communications module,
the second message comprises one or more objects in other than ASCII format, and
the invoking the transformation layer translates an object in the one or more objects to another format prior to the second message being routed to the remote user device in accordance with the lookup table.

30. The method of claim 1, wherein
the enterprise data source is associated with a customer relationship application on a server computer associated with the enterprise data source,
the routing the second message to the first user within the primary communication channel comprises routing the second message to the customer relationship application.

31. The method of claim 30, wherein the secure bidirectional conversation comprises a conversation history and wherein routing the second message to the customer relationship application includes the conversation history and the application programming interface token identifying the first user.

32. The method of claim 30, wherein the method further comprises:
using the application programming interface token identifying the first user to poll the customer relationship application on a recurring basis for a response by the customer relationship application to the second message; and
responsive to receiving the response to the second message, using the application programming interface token to route the response to the second message to the first automated human interface module or the first node within the first automated human interface module that provided the second communication.

33. The method of claim 1, wherein the primary communication channel hosts five or more conversations, each conversation between the enterprise data source and a different user in the plurality of users.

34. The method of claim 1, wherein the enterprise data source is a store, a chain of stores, a government institution or service, a company, a corporation, an enterprise, an advertising firm, a restaurant, a healthcare organization, an organization, or a social organization.

35. The method of claim 1, wherein
all or a portion of the secure bidirectional conversation is recorded into a first data structure,
the method further comprises transferring the secure bidirectional conversation to a first survey automated human interface module at a conclusion of the secure bidirectional conversation thereby initiating a survey of the first user by the survey automated human interface module, and
the survey of the first user is not recorded in the first data structure.

36. The method of claim 35, wherein an identity of the first survey automated human interface module is determined by an identity of the primary communication channel.

37. The method of claim 35, the method further comprising:
using the survey of the first user to generate a net promotor score for the secure bidirectional conversation; and
making the net promotor score available to an administrator associated with the enterprise data source corresponding to the primary communication channel.

38. The method of claim 37, wherein the net promotor score comprises a plurality of questions and the net promotor score is determined from the answers provided by the first user to the plurality of questions.

39. The method of claim 37, the method further comprising:
aggregating the net promotor score associated with each conversation in a plurality of conversations associated with the primary communication channel thereby forming an aggregate net promotor score; and
making the aggregate net promotor score available to the administrator associated with the enterprise data source corresponding to the primary communication channel.

40. The method of claim 39, wherein conversations occurring in the primary communication channel prior to a predetermined period of time are excluded from the plurality of conversations that are aggregated to form the aggregate net promotor score.

41. The method of claim 39, wherein the individual net promotor scores of conversations terminating more recently are given more weight than the individual net promotor scores of conversations ending less recently when forming the aggregate net promotor score.

42. The method of claim 35, wherein the survey collects numeric survey data from the first user on a response scale between a first numeric value and a second numeric value.

43. The method of claim 35, wherein the survey collects text based feedback from the first user.

44. The method of claim 1, the method further comprising, prior to receiving the second message:
   loading information regarding one or more prior electronic conversations between the first user and the enterprise data source corresponding to the primary communication channel; and
   using the information regarding one or more prior electronic conversations to determine the second communication.

45. The method of claim 44, wherein the information regarding one or more prior electronic conversations comprises an electronic shopping cart including items offered by the enterprise data source corresponding to the first primary communication channel that the first user has selected in the one or more prior electronic conversations.

46. The method of claim 44, wherein the information regarding one or more prior electronic conversations is used in the determination of which node, in the plurality of nodes, is initially used by the automated human interface module to drive the secure bidirectional conversation.

47. A non-transitory computer readable storage medium, wherein the non-transitory computer readable storage medium stores instructions, which when executed by a computer system, cause the computer system to perform the method of:
   joining a first user to a primary communication channel, wherein the primary communication channel facilitates electronic communication between a corresponding enterprise data source and a remote user device associated with the first user and wherein the primary communication channel hosts a plurality of users including the first user;
   receiving a first message that is posted by the first user, wherein the first message comprises (a) an application programming interface token identifying the first user and (b) a first text communication;
   responsive to the first message, comparing the first text communication to each tag in each respective set of tags in a plurality of sets of tags, wherein each respective set of tags in the plurality of sets of tags is uniquely associated with (i) a different automated human interface module in one or more automated human interface modules associated with the primary communication channel or (ii) a different node within a plurality of nodes in an automated human interface module in the one or more automated human interface modules, wherein
      the first message is routed to a first automated human interface module in the one or more automated human interface modules or a first node within the first automated human interface module that is associated with a tag that best matches the first text communication, and
      the first automated human interface module prepares a second message responsive to the first message;
   receiving the second message that is posted by the first automated human interface module, wherein the second message includes (a) the first application programming interface token identifying the first user, and (b) a second communication responsive to the first message; and
   using the application programming interface token to route the second message to the first user within the primary communication channel thereby facilitating a secure bidirectional conversation between (i) the remote user device associated with the first user and (ii) the corresponding enterprise data source associated with the primary communication channel.

48. A server system, comprising:
   one or more processors;
   memory; and
   one or more programs, wherein the one or more programs are stored in the memory and are configured to be executed by the one or more processors, the one or more programs including instructions for:
   joining a first user to a primary communication channel, wherein the primary communication channel facilitates electronic communication between a corresponding enterprise data source and a remote user device associated with the first user and wherein the primary communication channel hosts a plurality of users including the first user;
   receiving a first message that is posted by the first user, wherein the first message comprises (a) an application programming interface token identifying the first user and (b) a first text communication;
   responsive to the first message, comparing the first text communication to each tag in each respective set of tags in a plurality of sets of tags, wherein each respective set of tags in the plurality of sets of tags is uniquely associated with (i) a different automated human interface module in one or more automated human interface modules associated with the primary communication channel or (ii) a different node within a plurality of nodes in an automated human interface module in the one or more automated human interface modules, wherein
      the first message is routed to a first automated human interface module in the one or more automated human interface modules or a first node within the first automated human interface module that is associated with a tag that best matches the first text communication, and
      the first automated human interface module prepares a second message responsive to the first message;
   receiving the second message that is posted by the first automated human interface module, wherein the second message includes (a) the first application programming interface token identifying the first user, and (b) a second communication responsive to the first message; and
   using the application programming interface token to route the second message to the first user within the primary communication thereby facilitating a secure bidirectional conversation between (i) the remote user device associated with the first user and (ii) the corresponding enterprise data source associated with the primary communication channel.

* * * * *